United States Patent
Suzuki et al.

(10) Patent No.: US 8,956,227 B2
(45) Date of Patent: Feb. 17, 2015

(54) STORAGE MEDIUM RECORDING IMAGE PROCESSING PROGRAM, IMAGE PROCESSING DEVICE, IMAGE PROCESSING SYSTEM AND IMAGE PROCESSING METHOD

(75) Inventors: Toshiaki Suzuki, Kyoto (JP); Zenta Andou, Tokyo (JP); Takashi Nozue, Tokyo (JP)

(73) Assignee: Nintendo Co., Ltd., Tokyo (JP)

(*) Notice: Subject to any disclaimer, the term of this patent is extended or adjusted under 35 U.S.C. 154(b) by 0 days.

(21) Appl. No.: 13/223,708

(22) Filed: Sep. 1, 2011

(65) Prior Publication Data

US 2012/0094754 A1 Apr. 19, 2012

(30) Foreign Application Priority Data

Oct. 15, 2010 (JP) ................................. 2010-232645

(51) Int. Cl.
*A63F 9/24* (2006.01)
*A63F 13/40* (2014.01)
*G06T 19/00* (2011.01)

(52) U.S. Cl.
CPC ............... *A63F 13/10* (2013.01); *G06T 19/006* (2013.01); *A63F 2300/105* (2013.01);
(Continued)

(58) Field of Classification Search
CPC ....... G06T 19/006; G06T 15/00; G06T 13/40; G06T 2207/30201; G06F 3/005; G06F 17/30256; G06F 17/30247; G06F 3/0481; G06F 3/04815; G06F 2300/204; G06F 2300/69; G06F 2300/8082; G06F 2300/5553; G06F 2300/695
USPC ...................................... 463/30–33
See application file for complete search history.

(56) References Cited

U.S. PATENT DOCUMENTS 4,710,873 A * 12/1987 Breslow et al. .................. 463/31
5,553,864 A * 9/1996 Sitrick ............................. 463/31
(Continued)

FOREIGN PATENT DOCUMENTS

JP 11-104354 4/1999
JP 2003-143477 5/2003
(Continued)

OTHER PUBLICATIONS

Bichlmeier et al. "Contextual Anatomic Mimesis Hybrid In-Situ Visualization Method for Improving Multi-Sensory Depth Perception in Medical Augmented Reality", Mixed and Augmented Reality, ISMAR 2007 6th IEEE and ACM International Symposium on, IEEE, Piscataway, NJ, pp. 129-138 (Nov. 13, 2007).

(Continued)

*Primary Examiner* — Steve Rowland
(74) *Attorney, Agent, or Firm* — Nixon & Vanderhye, P.C.

(57) ABSTRACT

An example image processing method for rendering an object arranged in a virtual space, the method being implemented by a computer executing: acquiring a captured image of a subject captured by an imaging device; determining an imaging direction of a virtual camera arranged in the virtual space, such that the imaging direction is changed in conjunction with motion of the imaging device; specifying, in information for performing predetermined image processing on the captured image, a particular piece of information determined according to the imaging direction of the virtual camera determined in the determining; an image processing of performing the predetermined image processing on the captured image acquired in the acquiring, by using the piece of information specified in the specifying; and causing a display device to display the captured image subjected to the predetermined image processing in the image processing.

27 Claims, 61 Drawing Sheets

(52) U.S. Cl.
CPC .. *A63F 2300/204* (2013.01); *A63F 2300/6018* (2013.01); *A63F 2300/6646* (2013.01); *A63F 2300/6653* (2013.01); *A63F 2300/6676* (2013.01); *A63F 2300/695* (2013.01); *A63F 2300/8076* (2013.01)
USPC .................. 463/33; 463/30; 463/31; 463/32

(56) References Cited

U.S. PATENT DOCUMENTS

| | | | | |
|---|---|---|---|---|
| 5,846,084 | A | * | 12/1998 | Volpe Prignano ............ 434/151 |
| 6,283,858 | B1 | * | 9/2001 | Hayes et al. ..................... 463/31 |
| 7,538,775 | B2 | | 5/2009 | Ishihara |
| 2001/0006391 | A1 | * | 7/2001 | Sawano et al. ................ 345/418 |
| 2002/0082082 | A1 | * | 6/2002 | Stamper et al. ................. 463/32 |
| 2004/0077393 | A1 | | 4/2004 | Kim et al. |
| 2005/0007384 | A1 | * | 1/2005 | Yamada et al. ............... 345/619 |
| 2006/0046844 | A1 | | 3/2006 | Kaneko |
| 2006/0146009 | A1 | * | 7/2006 | Syrbe et al. .................... 345/156 |
| 2007/0035561 | A1 | * | 2/2007 | Bachelder et al. ............ 345/633 |
| 2007/0167204 | A1 | * | 7/2007 | Lyle et al. ......................... 463/9 |
| 2008/0158242 | A1 | * | 7/2008 | St. Jacques .................... 345/589 |

FOREIGN PATENT DOCUMENTS

| | | |
|---|---|---|
| JP | 2003-281439 | 10/2003 |
| JP | 2004-230480 | 8/2004 |
| JP | 2004-294615 | 10/2004 |
| JP | 2006-68138 | 3/2006 |
| JP | 2006-285609 | 10/2006 |
| JP | 2008-43589 | 2/2008 |
| JP | 2010-068222 | 3/2010 |
| JP | 2010-199883 | 9/2010 |
| WO | 2009004296 | 1/2009 |
| WO | 2009127701 | 10/2009 |

OTHER PUBLICATIONS

Fuchs et al. "Augmented Reality Visualization for Laparoscopic Surgery", Medical Image Computing and Computer-Assisted Intervention—MICCAI'98, 1496:934-943 (1998).
Kalkofen et al. "Comprehensible Visualization for Augmented Reality", IEEE Transactions on Visualization and Computer Graphics, 15:193-204 (2009).
Partial European Search Report for European Application No. 11180041, 7 pages, dated Dec. 11, 2012.
Kalkofen et al. "Interactive Focus and Context Visualization for Augmented Reality" Mixed and Augmented Reality, 6th IEEE and ACM International Symposium on IEEE, Piscataway, NJ, pp. 191-201, Nov. 13, 2007.
Livingston et al. "Resolving Multiple Occluded Layers in Augmented Reality" Proceedings of International Symposium on Mixed and Augmented Reality, Tokyo, Japan, pp. 56-65, Oct. 7-10, 2003.
European Search Report for Application No. EP11180041, 16 pages, dated Jun. 21, 2013.

* cited by examiner

FIG.13

| GENDER | AGE | NUMBER OF ACQUIRED FACE IMAGES |
|---|---|---|
| MALE | UNDER 10 | K |
| MALE | 10'S | 0 |
| MALE | 20'S | M |
| MALE | 30'S | N |
| MALE | 40'S | P |
| MALE | UNDER 50 | Q |
| MALE | 60'S | R |
| MALE | OVER 70 | 0 |
| FEMALE | UNDER 10 | 0 |
| FEMALE | 10'S | 0 |
| FEMALE | 20'S | 0 |
| FEMALE | 30'S | L |
| FEMALE | 40'S | M |
| FEMALE | UNDER 50 | N |
| FEMALE | 60'S | K |
| FEMALE | OVER 70 | K |

Dn2

| SOLID MODEL OF ENEMY OBJECT | PLANAR POLYGON FOR SHADOW | BULLET MODEL, ETC |
|---|---|---|
| OPACITY (ALPHA VALUE) 1.0 (SET AS TEXTURE) | OPACITY (ALPHA VALUE) 1.0 (SET AS TEXTURE) | OPACITY (ALPHA VALUE) 1.0 (SET AS TEXTURE) |
| SEMI-TRANSPARENT ENEMY OBJECT /EFECT MODEL | SCREEN OBJECT | α TEXTURE (MAP) |
| OPACITY (ALPHA VALUE) 0.6 (SET AS TEXTURE) | OPACITY (ALPHA VALUE) 0.2 | NON-OPEN PORTION: OPACITY (ALPHA VALUE) "1" OPEN PORTION: OPACITY (ALPHA VALUE) "0" |

*FIG.28*

STORAGE MEDIUM RECORDING IMAGE PROCESSING PROGRAM, IMAGE PROCESSING DEVICE, IMAGE PROCESSING SYSTEM AND IMAGE PROCESSING METHOD

This application is based upon and claims the benefit of priority of the prior Japanese Patent Application No. JP2010-232645, filed on Oct. 15, 2010, the entire contents of which are incorporated herein by reference.

FIELD

This invention relates to image processing for rendering an object arranged in a virtual space.

BACKGROUND

A game device is known which is designed such that a field object with a preset transparency flag of 1 is rendered by using mask data obtained by rendering a circular mask region around the position of a character object projected on a plane, while a character object and a field object with a transparency flag of 0 are rendered by an ordinary method (see Japanese Patent Application Publication No. 2006-68138).

A game device is also known which is designed such that, when relative positions of objects with respect to a view point varies, a virtual image containing the objects is rendered by referring to information indicating transparency of the objects, while updating, every unit time, information indicating a transparency of any object that is determined to be located at a distance smaller than a predetermined distance from the viewpoint in the virtual space, so that the transparency of the object is increased gradually (see Japanese Translation of PCT Application No. 2008-43589).

There is a technology called AR (Augmented Reality) wherein a real space image received from a camera is displayed in a far-side layer of a display facing the opposite direction from the imaging direction of the camera, while displaying, in a near-side layer, information according to the directions of the camera and the display, and a current position calculated based on input from a GPS (Global Positioning System), an acceleration sensor or an angular rate sensor, whereby the real space information displayed in the display is augmented.

However, such technology is only designed to augment the volume of information that a user can obtain from the real space by displaying the information on top of the real space image, and is not designed to augment the space recognized by the user.

In view of the problems described above, an object of this invention is to make it possible to augment the space recognized by a user and to enhance the effects of augmented reality.

SUMMARY

In order to solve the problems described above, this invention employs the following measures. An aspect of his invention provides a storage medium recording an image processing program for causing a computer of an image processing device for processing a captured image of a subject captured by an imaging device to execute: a captured image acquisition of acquiring a captured image; a virtual camera direction determination of determining an imaging direction of a virtual camera arranged in a virtual space, such that the imaging direction is changed in conjunction with motion of the imaging device; a specification of specifying, in information for performing predetermined image processing on the captured image, a particular piece of information determined according to the imaging direction of the virtual camera determined in the virtual camera direction determination; an image processing of performing the predetermined image processing on the captured image acquired in the captured image acquisition, by using the piece of information specified in the specification; and a display control of causing a display device to display the captured image subjected to the predetermined image processing in the image processing.

The specification may be performed by rendering an object with pasted texture in which information (e.g. transparency) for performing predetermined image processing is set. However, any other method may be employed as a method of designating specific items of the information for performing the predetermined image processing or designating a portion to be subjected to the predetermined image processing, and a method of specifying the portion captured by the virtual camera. In the case of an object formed of a plurality of polygons, for example, this may be accomplished by setting polygons to be subjected to the predetermined image processing and those not to be subjected to the predetermined image processing. Such image processing allows the user who views a synthesized image to recognize a space in which the real space is augmented by virtue of the spatial structure of the virtual space. In other words, according to this invention, unlike the conventional AR, the space recognized by the user can be augmented and the effects of augmented reality can be enhanced. The acquisition of a captured image from the imaging device in the captured image acquisition may be performed by means of either an imaging device provided in the same housing as the computer or an external imaging device which is wirelessly or wiredly connected.

According to this invention, the information for performing the predetermined image processing may be formed of a data group indicating whether or not the predetermined image processing is to be performed for each portion of the captured image.

According to this invention, when the information for performing the predetermined image processing may be formed of a data group indicating whether or not the predetermined image processing is to be performed for each portion of the captured image, it is possible to determine whether or not the predetermined image processing is to be performed for each portion of the captured image, so that the predetermined image processing can be performed or not performed for each portion of the captured image.

According to this invention, the information for performing the predetermined image processing may be formed of a data group synthesized with the captured image for each pixel and indicating transparency of each pixel of the captured image.

When the information for performing the predetermined image processing is a data group of transparency synthesized for each pixel of a portion of the captured image, it can be designed such that transparency processing as the predetermined image processing is not performed if the transparency is one (the captured image is left as it is), whereas the transparency processing is performed if the transparency is zero (the captured image is changed).

According to this invention, the information for performing the predetermined image processing may correspond to a predetermined region set in the virtual space.

When the information for performing the predetermined image processing corresponds to a predetermined region set in the virtual space, image processing according to the information for performing the predetermined image processing can be applied for the predetermined region set in the virtual space.

According to this invention, the predetermined region set in the virtual space may correspond to an imaged portion captured by the virtual camera when the imaging device has rotated 360 degrees in a certain direction.

According to this invention, the imaging direction of the virtual camera arranged in the virtual space is determined such that it is changed in conjunction with motion of the imaging device. Therefore, when the predetermined region to which the information for performing the predetermined image processing corresponds is made to correspond to the imaged portion captured by the virtual camera when the imaging device has rotated 360 degrees in a certain direction, the predetermined image processing can be applied to the imaged portion captured by the virtual camera, no matter which direction the virtual camera faces while the imaging device rotates 360 degrees in a certain direction.

The image processing program according to this invention may cause the computer to further execute: generating a virtual object image by imaging a virtual object arranged in the virtual space with the virtual camera; and a synthesis of synthesizing the captured image subjected to the predetermined image processing in the image processing with the virtual object image generated in the generating.

The synthesis of the captured image with the virtual object image enables the virtual object such as an enemy character in the game to appear in the captured image which has been subjected to the predetermined image processing, whereby the effects of the augmented reality can be enhanced even more.

The image processing program according to this invention may cause the computer to further execute a detection of detecting motion of the imaging device, and the imaging direction of the virtual camera may be determined in the virtual camera direction determination such that it is changed in conjunction with the motion detected by the detection.

By detecting motion of the imaging device and determining an imaging direction of the virtual camera such that it is changed in conjunction with the detected motion, the real space that the user views without involving a display device can be synchronized with the space that the user views through a display device.

According to this invention, the captured image may be an image captured by either a monocular imaging device or a compound-eye imaging device.

The use of an image captured by a monocular or compound-eye imaging device as the captured image makes it possible to use a planar image or 3D image as an image of the real world.

According to this invention, the information for performing the predetermined image processing may be set in an object arranged in the virtual space, and the object arranged in the virtual space may be an object partitioning the virtual space into a near side space and a far side space as viewed from the virtual camera.

When the object with which the captured image is synthesized is an object partitioning the virtual space into a near side space and a far side space, the user is thereby enabled to recognize the virtual space extending behind the real space recognized according to the captured image. The object for partitioning the virtual space into the near side space and the far side space may be provided, for example, by a planar polygon the relative position of which is fixed with respect to the virtual camera in the virtual space and on which texture of the captured image is pasted. Alternatively, it may be provided by an object having a cylindrical or spherical boundary (virtual surface) around the virtual camera. However, the object arranged in the virtual space is not limited to those examples described above, but may be any of various objects including characters, and background building and rocks appearing in the virtual space.

According to this invention, a shadow of another object arranged in the far side space may be rendered on the object partitioning the space into the front and far side spaces.

When a shadow of another object arranged in the far side space is rendered on the object such as a boundary arranged in front of that another object, the user is thereby enabled to easily recognize the positional relationship between the objects present in the virtual space.

Further, according to the invention, there is arranged in the virtual space a character object on which a face image of a person to be imaged captured by the imaging device is pasted, and the image processing program according to this invention may cause the computer, when the face image is captured, to execute: a determination of determining based on the face image captured by the imaging device whether or not a distance between the face of the person to be imaged and the imaging device is within a predetermined range; and displaying, on the display device, a target position for alignment of at least one feature point contained in the face image of the person to be imaged together with the face image of the person to be imaged that is repeatedly captured by the imaging device, if it is determined in the determination that the distance between the face of the person to be imaged and the imaging device is within the predetermined range.

The imaging device used here may be directed to various directions. For example, the imaging device may be directed to an opposite direction from or the same direction as the direction the display surface of the display device faces. According to this invention, the face of the person to be imaged can be introduced to an appropriate position in the image, and thus the accuracy in arrangement of the face of the person to be imaged with respect to the target position in the face image can be improved. Further, an operator who operates the information processing device or the imaging device can be guided smoothly so that the hassles that the operator may feel in operations of such device can be reduced by first performing relatively easy and rough adjustment of distance between the face of the person to be imaged and the imaging device and then performing relatively complicated and delicate adjustment of the position of the feature point in the face of the person to be imaged.

According to this invention, there is arranged in the virtual space a character object on which a face image of a person to be imaged captured by the imaging device is pasted, and the image processing program according to this invention may cause the computer to further execute: a face image acquisition of acquiring the face image and temporarily storing the same in a first storage area at start of a game; generating a character object containing the face image stored in the first storage area; a game processing of accepting the user's operation and conducting a game associated with the character object containing the face image; determining whether or not the user succeeds in the game executed by the user's operation; and accumulatively storing, in a second storage area, the face image stored in the first storage area when the user's success in the game is determined.

According to this invention, if the user is determined to have not succeeded, the acquired face image cannot be accumulatively stored in the second storage area, which causes the user to feel a sense of tension in playing the game. In contrast, if the user is determined to have succeeded, the acquired face image can be accumulatively stored in the second storage area and the user is allowed to use the acquired face images. Therefore, the user is encouraged to concentrate in playing the game and to earnestly execute the game in the game processing.

According to this invention, there is arranged in the virtual space character objects on each of which a face image of a person to be imaged captured by the imaging device is pasted, and the image processing program according to this invention may cause the computer to further execute: a face image acquisition of acquiring a face image; generating a first character object based on the acquired face image; and a game processing of executing a game by displaying a second character object different from the first character object, together with the first character object. The game processing may include contributing to the user's success in the game by the user's operation to attack the first character object; and invalidating the user's operation to attack the second character object.

Further, according to this invention, there is arranged in the virtual space character objects on each of which a face image of a person to be imaged captured by the imaging device is pasted, and the image processing program according to this invention may cause the computer to further execute: a face image acquisition of acquiring face images; generating a first character object containing one of the acquired face images; and a game processing of executing a game by displaying, together with the first character object, a second character object containing the same face image as the first character object but being smaller in size than the first character object, and a third character object containing a face image other than the face image of the first character object but being smaller in size than the first character object. The game processing may include: increasing deformation of the face image contained in the first character object in response to the user's operation to attack the third character object; and decreasing the deformation in response to the user's operation to attack the second character object, such that the deformed face image contained in the first character object is restored closer to the original acquired face image.

Further, according to this invention, there is arranged in the virtual space a character object on which a face image of a person to be imaged captured by the imaging device is pasted, and the image processing program according to this invention may cause the computer to further execute: a face image acquisition of acquiring a face image; generating a character object containing a face image produced by deforming the acquired face image; a game processing of accepting the user's operation and conducting a game associated with the face image; determining whether or not the user succeeds in the game executed by the user's operation; and restoring the deformed face image to the original acquired face image if the result indicates success in the game.

The following measures may be employed to solve the problems as described above. Specifically, an aspect of this invention provides an image processing program for rendering an object arranged in a virtual space, which causes a computer to execute a captured image acquisition of acquiring a captured image captured by the imaging device; a specification of specifying, in information designating a visible portion of the object, an imaged portion captured by a virtual camera arranged in the virtual space based on the imaging direction of the virtual camera; and a synthesis of synthesizing the imaged portion that is specified in the specification as being the imaged portion captured by the virtual camera with the captured image acquired in the captured image acquisition.

The term "visible portion" as used herein refers to a portion that is eventually made visible for the user. The information designating the visible portion may be, for example, texture which is to be pasted on an object whose shape is defined with a polygon or the like and transparency of which is set for each pixel. In this case, the specification in the specification can be performed, for example, by rendering the object on which the texture with set transparency is pasted. However, other methods may be used for designating a visible portion or for specifying an imaged portion captured by the virtual camera. For example, the specification of the visible portion may be performed by setting, in an object formed of a plurality of polygons, polygons to be rendered visibly and those to be rendered transparently. Such image processing makes it possible to cause the user who views the synthesized image to recognize a space in which the real space is augmented by virtue of the spatial structure of the virtual space. In other words, according to this invention, unlike the conventional AR, the space recognized by the user can be augmented and the effects of augmented reality can be enhanced. The acquisition of a captured image from an imaging device in the captured image acquisition may be performed either from an imaging device provided in the same housing as the computer or from an external imaging device which is wirelessly or wiredly connected.

According to this invention, in the synthesis, the imaged portion captured by the virtual camera specified in the specification may be synthesized with the captured image acquired in the captured image acquisition such that at least part of the captured image is displayed in the visible portion included in the imaged portion captured by the virtual camera.

When the synthesis is performed such that at least part of the captured image is displayed in the visible portion, it is thereby made possible to display a real space image in the visible portion and to display a virtual space image in a portion other than the visible portion (e.g. a transparent portion or semi-transparent portion), so that the user is caused, when viewing the synthesized image, to recognize a space in which the real space is augmented by virtue of the spatial structure of the virtual space.

The image processing program according to this invention may cause the computer to execute an imaging direction acquisition of acquiring an imaging direction of the imaging device, and a virtual camera direction determination of determining an imaging direction of a virtual camera arranged in a virtual space at least based on the imaging direction of the imaging device.

When the imaging direction of the imaging device in the real space is acquired, and the imaging direction in the virtual space is determined in conjunction therewith, it is thereby made possible to synchronize the real space which the user views without involving a display or the like with the space which the user views through the display or the like.

According to this invention, the information designating the visible portion of the object may be transparency information set for each portion of the object.

When the transparency information is used as the information designating the visible portion, the synthesis described above can be performed by multiplying the transparency information of the imaged portion captured by the virtual camera and the information of the captured image for each unit of the information for which the transparency is set. Further, the use of the transparency information makes it possible to easily generate an image in which the captured image and the virtual space image are transparently overlapped.

The image processing program according to this invention may cause the computer to further execute outputting the image synthesized in the synthesis to a display device.

This invention can be comprehended as a method implemented by a device, system or computer executing the processing as described above, or a program executed by a computer. This invention also may be comprehended as a recording medium recording such a program, which is readable by a computer or other device or machine. The term "recording medium readable by a computer or the like" refers to a recording medium on which information such as data or a program is stored by any of electrical, magnetic, optical, mechanical, and chemical means, such that the information is readable by a computer or the like.

According to this invention, the space recognized by the user can be augmented, and the effects of augmented reality can be improved.

BRIEF DESCRIPTION OF THE DRAWINGS

FIG. 13 illustrates an example of a summary sheet in which acquired face images are classified according to their attributes;

FIG. 28 is a diagram illustrating an example of opacity of each object;

DESCRIPTION OF EMBODIMENTS

First Embodiment

Below, an image processing device which executes an image processing program forming one embodiment relating to the present invention is described with reference to concrete examples. The embodiment described below is an example and the present invention is not limited to the composition of the embodiment described below.

In the embodiment described above, the data processed by the computer is described using graphs and natural language as examples, but more specifically, the data is specified in the form of virtual language, commands, parameters, machine language, sequences, and the like, which can be recognized by the computer. The present invention does not limit the method of representing data.

<Example of Hardware Configuration>

Firstly, a portable game device 10 will be described as one example of an image processing device which executes an image processing program relating to the present embodiment, with reference to the drawings. However, the image processing device relating to the present invention is not limited to a game device. The image processing device relating to the present invention may be any computer system, such as a generic computer, for example. Furthermore, the device does not have to be a portable device.

The image processing program relating to the present embodiment described below is a game program, but the image processing program relating to the present invention is not limited to a game program. The image processing program according to the present invention may be applied by being executed in any computer system. Furthermore, the respective processes of the present embodiment may be distributed amongst a plurality of devices linked in a network, or may be executed by a network system or a so-called cloud network in which main processes are carried out in a server and processing results are then delivered to a terminal.

FIG. 1, FIG. 2, FIG. 3A, FIG. 3B, FIG. 3C and FIG. 3D are plan diagrams showing one example of the external appearance of a game device.

The game device 10 shown in FIG. 1 to FIG. 3D has a built-in imaging unit (camera), and is able to capture an image by means of this imaging unit, display a captured image on a screen, and save data of a captured image. Furthermore, the game device 10 is able to execute a game program stored on an exchangeable memory card, or a game program received from a sever or other game device via a network. Moreover, the game device 10 is able to generate an image captured by a virtual camera set in a virtual space, by computer graphics processing, and display the image on a screen.

Figure 1:
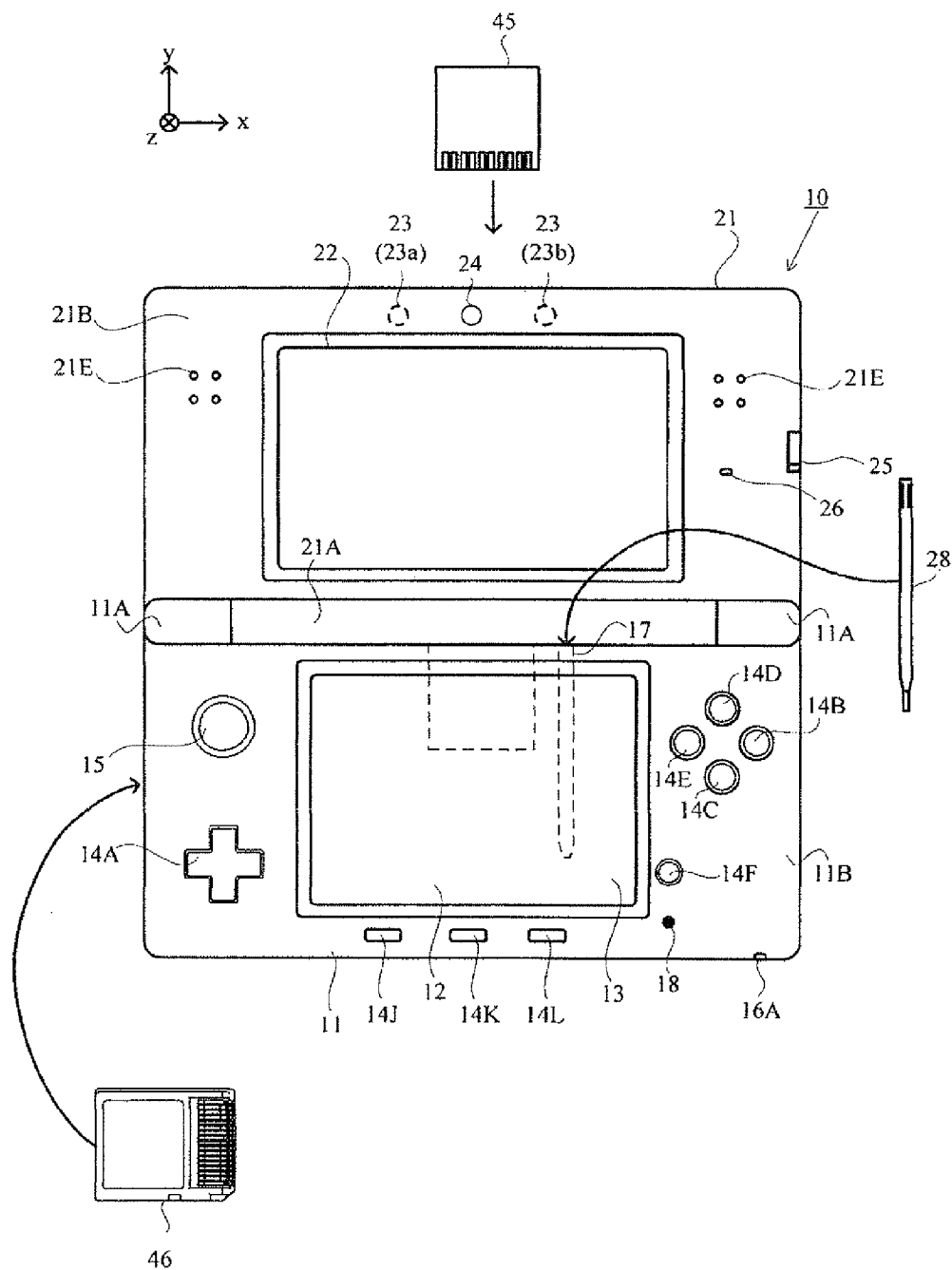
FIG. 1 is a front-view diagram illustrating an example of a game device 10 in an open state.
Figure 2:
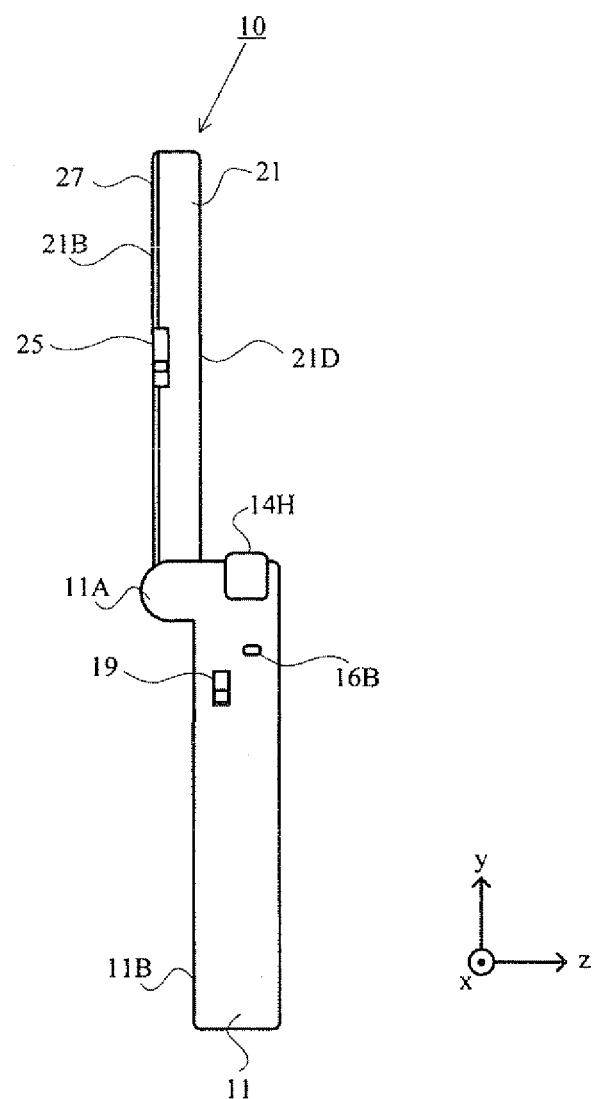
FIG. 2 is a side-view diagram illustrating an example of a game device 10 in an open state.
Figure 3:
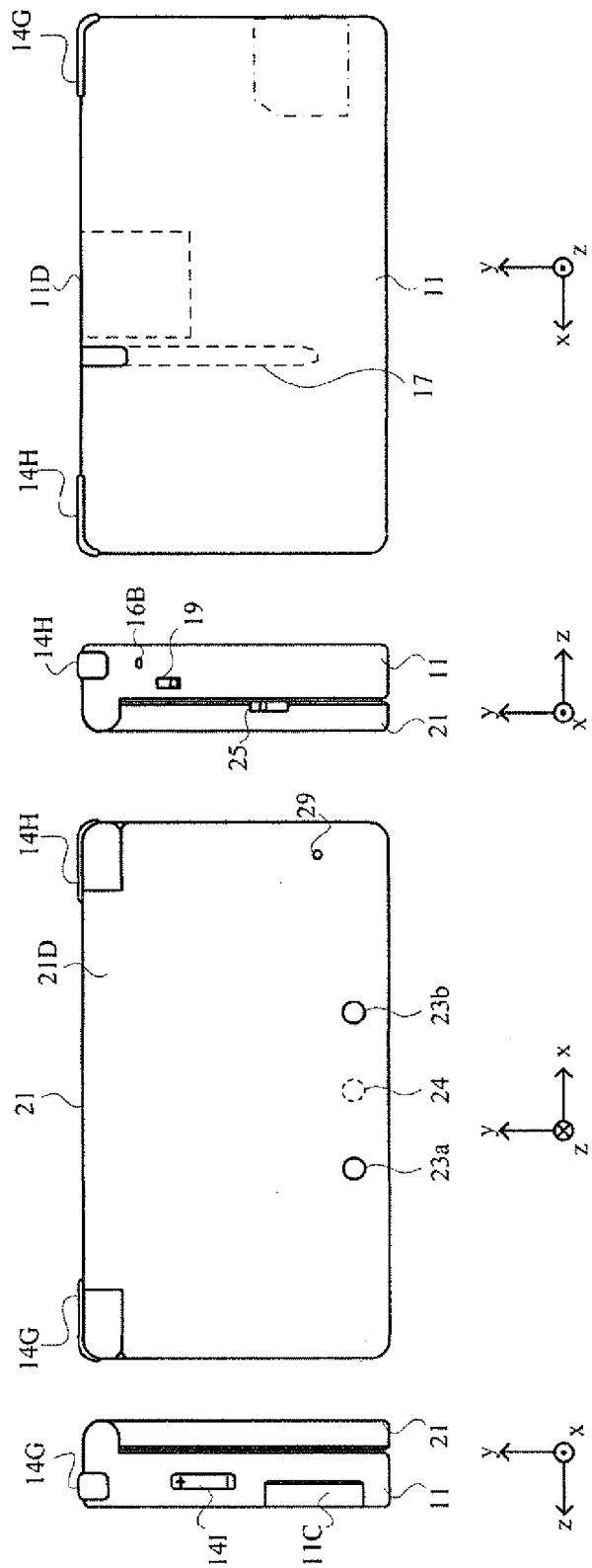
FIG. 3A is a left side-view diagram illustrating an example of a game device 10 in a closed state.
FIG. 3B is a front-view diagram illustrating an example of a game device 10 in a closed state.
FIG. 3C is a right side-view diagram illustrating an example of a game device 10 in a closed state.
FIG. 3D is a rear-view diagram illustrating an example of a game device 10 in a closed state.

The game device 10 shown in FIG. 1 to FIG. 3D has a lower housing 11 and an upper housing 21. The lower housing 11 and the upper housing 21 are coupled openably and closably (in a folding fashion) by means of a hinge structure. In other words, the upper housing 21 is installed rotatably (swingably) with respect to the lower housing 11. By this means, the game device 10 has two modes: a closed state where the upper housing 21 lies in close contact with the lower housing 11 (FIG. 3A and FIG. 3C), and a state (open state) where the upper housing 21 has been rotated with respect to the lower housing 11 and released from the state of close contact. As shown in FIG. 2, the upper housing 21 is allowed to rotate until reaching a position where the upper housing 21 and the lower housing 11 are substantially parallel in the open state (see FIG. 2).

FIG. 1 is a front view diagram showing one example of a game device 10 in an opened state (open state). The lower housing 11 and the upper housing 21 of the game device 10 are respectively formed in a horizontally-long rectangular plate shape having a planar shape with a long direction (horizontal direction (left/right direction): the x direction in FIG. 1) and a short direction ((vertical direction): the y direction in FIG. 1). The outer edge portion on the lower side in the lengthwise direction of the upper housing 21 and the outer edge portion on the upper side in the lengthwise direction of the lower housing 11 are coupled rotatably by means of a hinge structure. When the user uses the game device 10, the game device 10 is normally set to an open state. When the user stores the game device 10, the game device 10 is normally set to a closed state. Furthermore, the upper housing 21 can maintain a stationary state at any angle desired by the user with respect to the lower housing 11, due to a frictional force which is produced in the coupling portion with the lower housing 11. In other words, in the game device 10, the upper housing 21 can be halted at a desired angle with respect to the lower housing 11. In general, from the viewpoint of the visibility of a screen provided in the upper housing 21, the upper housing 21 is opened to a position forming a perpendicular angle or obtuse angle with respect to the lower housing 11. Below, when the game device 10 is in the closed state, the respectively opposing surfaces of the upper housing 21 and the lower housing 11 are called "inner surfaces" or "main surfaces". Furthermore, the respective surfaces of the upper housing 21 and the lower housing 11 on the opposite side to the inner surfaces (main surfaces) are called "outer surfaces".

Protrusions (bearing sections) 11A which protrude in a direction (the z direction in FIG. 1) perpendicular to the inner surface (main surface) 11B of the lower housing 11 are provided in the upper long edge portion of the lower housing 11 of the game device 10. Furthermore, a protrusion (bearing section) 21A which protrudes in a direction perpendicular to the lower surface of the upper housing 21 from this lower surface is provided in the lower long edge portion of the upper housing 21. A rotating axle (not illustrated) extending in the x direction from one protrusion 11A, through the protrusion 21A, to the other protrusion 11A is accommodated in the protrusions 11A, 21A, 11A, and the upper housing 21 is able to rotate relatively with respect to the lower housing 11 about this rotating axle. In this way, the lower housing 11 and the upper housing 21 are connected in a foldable fashion.

A lower LCD (Liquid Crystal Display) 12, a touch panel 13, operating buttons 14A to 14L, an analog stick 15, a first LED 16A and a microphone hole 18 are provided on the inner surface 11B of the lower housing 11 which is shown in FIG. 1.

The lower LCD 12 is accommodated in the lower housing 11. The planar shape of the lower LCD 12 is a horizontally-long rectangular shape, the long edge direction thereof being arranged to coincide with the lengthwise direction of the lower housing 11 (the x direction in FIG. 1). The lower LCD 12 is provided in the center of the inner surface (main surface) of the lower housing 11. The screen of the lower LCD 12 is exposed via an opening section provided in the inner surface of the lower housing 11. When the game device 10 is not in use, it is possible to prevent soiling or scratching of the screen of the lower LCD 12 by setting the game device 10 to the closed state described above. The number of pixels of the lower LCD 12 is 320 dot×240 dot (horizontal×vertical), for instance. The lower LCD 12 is a display device which displays images in a planar view (not a stereoscopic view), in contrast to the upper LCD 22 which is described below. In the present embodiment, an LCD is used as a display device, but it is also possible to use another display device, such as one using EL (Electro Luminescence), for example. Moreover, for the lower LCD 12, it is possible to use a display device having a desired resolution.

The touch panel 13 is one of input devices of the game device 10. The touch panel 13 is installed so as to cover the screen of the lower LCD 12. In the present embodiment, the touch panel 13 employs a resistance film type of touch panel. However, the touch panel 13 is not limited to a resistance film type and it is also possible to use a touch panel based on any press operation method, such as an electrostatic capacitance method, or the like. Furthermore, in the present embodiment, the touch panel 13 is employed, which has the same resolution (detection accuracy) as the resolution of the lower LCD 12. Here, it is not especially necessary for the resolution of the touch panel 13 and the resolution of the lower LCD 12 to be matching.

The operating buttons 14A to 14L are input devices for performing predetermined inputs. Among the operation buttons 14A to 14L, a four-way button 14A (direction input button 14A), a button 14B, a button 14C, a button 14D, a button 14E, a power button 14F, a select button 14J, a home button 14K and a start button 14L are provided on the inner surface (main surface) of lower housing 11.

The four-way button 14A has a cross shape and includes at least buttons indicating upward, downward, leftward and rightward directions. The four-way button 14A is provided in the lower part of the region to the left-hand side of the lower LCD 12. The four-way button 14A is located in a position where it can be operated by the thumb of a user's left hand when gripping the lower housing 11.

The four buttons, button 14B, button 14C, button 14D and button 14E, are situated in a cross shape in the upper part of the region to the right-hand side of the lower LCD 12. The button 14B, button 14C, button 14D and button 14E are situated in a place where the thumb of a user's right hand is naturally positioned when gripping the lower housing 11. The power button 14F is situated in the lower part of the region to the right-hand side of the lower LCD 12.

The select button 14J, the home button 14K and the start button 14L are respectively situated in the region below the lower LCD 12.

The buttons 14A to 14E, the select button 14J, the home button 14K and the start button 14L are assigned appropriately to functions corresponding to a program which is executed by the game device 10. For example, the four-way button 14A is used for selection operations and character movement operations during a game, and the like. The operating buttons 14B to 14E, for example, are used for a setting operation or a canceling operation, or the like. Furthermore, the power button 14F is used to switch the power supply of the game device 10 on and off.

The analog stick 15 is a device for indicating directions. The analog stick 15 is provided in the upper part of the region to the left-hand side of the lower LCD 12 on the inner surface (main surface) of the lower housing 11. More specifically, the analog stick 15 is provided above the four-way button 14A. Moreover, the analog stick 15 is located in a position where it can be operated by the thumb of a user's left hand when gripping the lower housing 11. By providing the analog stick 15 in the upper part, the analog stick 15 is situated in a place where the thumb of a user's left hand is naturally positioned when gripping the lower housing 11. The four-way button 14A is situated in a position slightly below the thumb of the user's left hand when gripping the lower housing 11. Therefore, the user is able to operate the analog stick 15 and the four-way button 14A simply by moving his or her left thumb up or down while gripping the lower housing 11. The analog stick 15 is composed in such a manner that the top of the key slides in parallel with the inner surface of the lower housing 11. The analog stick 15 functions in accordance with the program being executed by the game device 10. For example, when a game in which a predetermined object appears in a three-dimensional virtual space is executed by the game device 10, the analog stick 15 functions as an input device for moving the predetermined object within the three-dimensional virtual space. In this case, the predetermined object is moved in the direction in which the key top of the analog stick 15 is slid. For the analog stick 15, it is possible to use a stick capable of producing an analog input by tilting by a predetermined amount in any one of the upward, downward, leftward or rightward directions or an oblique direction.

The four buttons, button 14B, button 14C, button 14D and button 14E, and the analog stick 15 are disposed in laterally symmetrical positions on either side of the lower LCD 12. By this means, depending on the game program, a left-handed person, for example, is able to input a direction instruction by using the four buttons, button 14B, button 14C, button 14D and button 14E.

The first LED 16A (FIG. 1) notifies the user of the power on/off state of the game device 10. The first LED 16A is provided on the right-hand side of the edge portion common to the inner surface (main surface) of the lower housing 11 and the lower side face of the lower housing 11. By this means, the user is able to see whether or not the first LED 16A is lit, regardless of the open and closed state of the game device 10.

The microphone hole 18 is a hole for a microphone which is built into the game device 10 as a voice input device. The built-in microphone detects external sounds via the microphone hole 18. The microphone and the microphone hole 18 are provided below the power button 14F on the inner surface (main surface) of the lower housing 11.

An insertion hole 17 for a touch pen 28 (indicated by dotted lines in FIG. 1 and FIG. 3D) is provided in the upper side face of the lower housing 11. The touch pen 28 used for performing operations on the touch panel 13 can be accommodated via the insertion hole 17. Inputs via the touch panel 13 are usually performed using the touch pen 28. However, the user may also use his or her finger, instead of the touch pen 28.

The game device 10 and an insertion hole 11D (indicated by a dotted line in FIG. 1 and FIG. 3D) for inserting an external memory 45 on which a game program is recorded are provided in the upper side face of the lower housing 11. A connector (not illustrated) for electrically connecting the external memory 45 and an internal circuit in a detachable fashion is provided inside the insertion hole 11D. By connecting the external memory 45 to the game device 10, a predetermined game program is executed by a processor included in the internal circuit. The connector and the insertion hole 11D may be provided in another side face (for example, the right-hand side face) of the lower housing 11.

Speaker holes 21E, an upper LCD 22, an inside imaging unit 24, a 3D adjustment switch 25, and a 3D indicator 26 are provided on the inner surface 21B of the upper housing 21 shown in FIG. 1.

The upper LCD 22 is a display device which is capable of displaying stereoscopically viewable images. The upper LCD 22 is capable of displaying a left-eye image and a right-eye image using substantially the same display region. More specifically, the upper LCD 22 is a display device based on a method in which a left-eye image and a right-eye image are displayed alternately in predetermined units (for example, one column each) in the horizontal direction. The upper LCD 22 may also be a display device based on a method in which a left-eye image and a right-eye image are displayed alternately. Furthermore, the upper LCD 22 is a display device producing a display which can be viewed stereoscopically with the naked eye. In this case, the upper LCD 22 employs a lenticular method or parallax barrier method in such a manner that a left-eye image and a right-eye image which are displayed alternatively in the horizontal direction are viewed separately by the left eye and the right eye, respectively. In the present embodiment, the upper LCD 22 is a display device based on a parallax barrier method. The upper LCD 22 displays an image (stereoscopic image) which can be viewed stereoscopically with the naked eye, by using a left-eye image and a right-eye image. More specifically, the upper LCD 22 is able to display a stereo image (a stereoscopically viewable image) which creates a three-dimensional impression for the user, by causing the left-eye image and the right-eye image to be viewed respectively by the user's left eye and the user's right eye, by means of a parallax barrier. Furthermore, in the upper LCD 22, the parallax barrier can be disabled, and when the parallax barrier is disabled, an image can be displayed in planar view (the opposite of the stereoscopic view described above; in other words, a display mode in which the same displayed image is viewed by both the right eye and the left eye). In this way, the upper LCD 22 is a display device capable of switching between a stereoscopic display mode which displays a stereoscopically viewable image and a planar display mode which displays an image in planar view (displays a planar image). This switching of the display mode is performed by means of a 3D adjustment switch 25, which is described below.

The upper LCD 22 is accommodated in the upper housing 21. The upper LCD 22 is a horizontally long rectangular shape, and is arranged in the center of the upper housing 21 with the long edge direction coinciding with the long edge direction of the upper housing 21. The surface area of the screen of the upper LCD 22 is set to be larger than the surface area of the screen of the lower LCD 12, for example. More specifically, the screen of the upper LCD 22 is set to have a greater horizontal length than the screen of the lower LCD 12. More specifically, the ratio of the horizontal width in the aspect ratio of the screen in the upper LCD 22 is set to be greater than the ratio of the horizontal width in the aspect ratio of the screen in the lower LCD 12.

The screen of the upper LCD 22 is provided on the inner surface (main surface) 21B of the upper housing 21, and the screen of the upper LCD 22 is exposed via an opening section provided in the inner surface 21B of the upper housing 21. Furthermore, the inner surface of the upper housing 21 is covered with a transparent screen cover 27. The screen cover 27 protects the screen of the upper LCD 22 and is also integrated with the upper LCD 22 and the inner surface of the upper housing 21 so as to create a unified impression. The number of pixels of the upper LCD 22 is 800 dot×240 dot (horizontal×vertical), for instance. In the present embodiment, the upper LCD 22 is described as being a liquid crystal device. However, it is not limited to this and a display device using EL, or the like, for example, may also be used. Furthermore, it is possible to use a display device of any resolution for the upper LCD 22.

The speaker holes 21E are holes for outputting sound from a speaker 44 which is a sound output device of the game device 10. The speaker holes 21E are disposed in lateral symmetry on either side of the upper LCD. Sound from speakers 44, which are described below, is output via the speaker holes 21E.

The inside imaging unit 24 is an imaging unit having an imaging direction in an inward normal direction to the inner surface 21B of the upper housing 21. The inside imaging unit 24 includes an imaging element having a predetermined resolution and a lens. The imaging element is, for example, a CCD image sensor, a CMOS image sensor, or the like. The lens may include a zoom mechanism.

The inside imaging unit 24 is disposed above the upper end of the screen of the upper LCD 22 on the inner surface 21B of the upper housing 21, in a central position in the left/right direction of the upper housing 21 (on a line which divides the upper housing 21 (the screen of the upper LCD 22) into two equal parts in the left/right direction). By arranging the inside imaging unit 24 in this way, it is possible to capture an image of the user's face from the front side with the inside imaging unit 24, when the user is looking straight at the upper LCD 22. An outside left imaging unit 23a and an outside right imaging unit 23b are described below.

The 3D adjustment switch 25 is a sliding switch, which is used to switch the display mode of the upper LCD 22, as described previously. Furthermore, the 3D adjustment switch 25 is used to adjust the three-dimensional impression of the stereoscopically viewable image (stereo image) displayed on the upper LCD 22. The 3D adjustment switch 25 is provided in the edge portion of the upper housing 21 which is common to the inner surface 21B and the right side face, so as to be visible by the user regardless of the open and closed state of the game device 10. The 3D adjustment switch 25 has a slider which can be slid to any position in a predetermined direction (for example, the up/down direction), the display mode of the upper LCD 22 being set in accordance with the position of the slider.

For example, if the slider of the 3D adjustment switch 25 is situated in the lowest position, then the upper LCD 22 is set to planar display mode, and a planar image is displayed on the screen of the upper LCD 22. It is also possible to provide a planar display by leaving the upper LCD 22 in the stereoscopic display mode and using the same image for the left-eye image and the right-eye image. On the other hand, if the slider is situated to the upper side of the lowest position described above, then the upper LCD 22 is set to stereoscopic display mode. In this case, a stereoscopically viewable image is displayed on the screen of the upper LCD 22. Here, if the slider is situated above the lowest position, then the appearance of the stereo image is adjusted in accordance with the position of the slider. More specifically, the amount of displacement of the lateral direction positions of the right-eye image and the left-eye image is adjusted in accordance with the position of the slider.

The 3D indicator 26 indicates whether the upper LCD 22 is in stereoscopic display mode. For example, the 3D indicator 26 is an LED, which lights up when the stereoscopic display mode of the upper LCD 22 is enabled. The 3D indicator 26 is provided on the inner surface 21B of the upper housing 21, and in the vicinity of the screen of the upper LCD 22. Consequently, if the user is looking straight at the screen of the upper LCD 22, the user is able to see the 3D indicator 26 easily. Therefore, the user is able readily to identify the display mode of the upper LCD 22, even while looking at the screen of the upper LCD 22.

FIG. 2 is a front right side diagram showing one example of the game device 10 in an open state. A second LED 16B, a wireless switch 19 and an R button 14H are provided in the right side face of the lower housing 11. By lighting up, the second LED 16B notifies the user of the established status of wireless communication of the game device 10. The game device 10 is able to perform wireless communication with other devices, and the second LED 16B lights up when wireless communication with another device has been established. The game device 10 has a function of connecting to a wireless LAN by a method conforming to the IEEE 802.11b/g standard, for example. The wireless switch 19 enables or disables the wireless communication function. The R button 14H is described below.

FIG. 3A is a left side diagram showing one example of a game device 10 in a closed state. An openable cover section 11C, an L button 14G and a volume button 14I are provided on the left side face of the lower housing 11 shown in FIG. 3A. The volume button 14I is a button for adjusting the volume of the speakers 44 provided in the game device 10.

A connector (not illustrated) for electrically connecting the game device 10 with an external data memory 46 (see FIG. 1) is provided on the inside of the cover section 11C. The external data memory 46 is installed detachably in the connector. The external data memory 46 is used, for example, to store (save) data of images captured by the game device 10. The connector and the cover section 11C may also be provided on the right side face of the lower housing 11. The L button 14G is described below.

FIG. 3B is a front view diagram showing one example of the game device 10 in a closed state. An outside left imaging unit 23a, an outside right imaging unit 23b and a third LED 29 are provided in the outer surface of the upper housing 21 shown in FIG. 3B.

The outside left imaging unit 23a and the outside right imaging unit 23b respectively include an imaging element having a predetermined common resolution (for example, a CCD image sensor or a CMOS image sensor, or the like), and a lens. The lens may include a zoom mechanism. The imaging direction of both the outside left imaging unit 23a and the outside right imaging unit 23b is an outward normal direction from the outer surface 21D. In other words, the imaging direction (visual axis of the camera) of the outside left imaging unit 23a and the imaging direction of the outside right imaging unit 23b are mutually parallel. The outside left imaging unit 23a and the outside right imaging unit 23b are referred to jointly below as the outside imaging unit 23.

The outside left imaging unit 23a and the outside right imaging unit 23b which constitute the outside imaging unit 23 are arranged in line in the horizontal direction of the screen of the upper LCD 22. In other words, the outside left imaging unit 23a and the outside right imaging unit 23b are arranged in such a manner that a straight line linking the outside left imaging unit 23a and the outside right imaging unit 23b lies in the horizontal direction of the screen of the upper LCD 22. Furthermore, if the user turns the upper housing 21 to a predetermined angle (for example, 90°) with respect to the lower housing 11 and views the screen of the upper LCD 22 from the front, then the outside left imaging unit 23a is positioned on the left-hand side of the user viewing the screen and the outside right imaging unit 23b is positioned on the right-hand side of the user viewing the screen (see FIG. 1). The distance between the outside left imaging unit 23a and the outside right imaging unit 23b is set to approximately the distance between a person's eyes, for example, this distance may be set in the range of 30 mm to 70 mm. However, the distance between the outside left imaging unit 23a and the outside right imaging unit 23b is not limited to this range. In the present embodiment, the outside left imaging unit 23a and the outside right imaging unit 23b are fixed to the upper housing 21 and the imaging direction thereof cannot be changed.

The outside left imaging unit 23a and the outside right imaging unit 23b are respectively disposed in symmetrical positions with respect to a line dividing the upper LCD 22 (upper housing 21) into two equal parts in the left/right direction. Furthermore, the outside left imaging unit 23a and the outside right imaging unit 23b are disposed in the upper part of the upper housing 21 on the rear side of positions above the upper end of the screen of the upper LCD 22, when the upper housing 21 is open (see FIG. 1). In other words, the outside left imaging unit 23a and the outside right imaging unit 23b are disposed on the outer surface of the upper housing 21, above the upper end of the screen of the upper LCD 22 when the upper LCD 22 is projected to a position on the outer surface.

In this way, by arranging the outside left imaging unit 23a and the outside right imaging unit 23b in linear symmetry with respect to the central line in the short edge direction of the upper LCD 22, the respective imaging directions of the outside imaging unit 23 can be made to coincide with the respective lines of sight of the user's left and right eyes, when the user is looking straight at the upper LCD 22. Furthermore, because the outside imaging unit 23 is disposed in a rear side position above the upper end of the screen of the upper LCD 22, then there is no interference between the outside imaging unit 23 and the upper LCD 22 inside the upper housing 21. Moreover, the outside left imaging unit 23a and the outside right imaging unit 23b are provided in lateral symmetry on either side of the projected position of the inside imaging unit 24, when the inside imaging unit 24, which is provided on the inner surface of the upper housing 21, is projected to the outer surface of the upper housing 21, as indicated by the dotted line in FIG. 3B. Consequently, it is possible to make the upper housing 21 thinner compared to a case where the outside imaging unit 23 is disposed to the rear side of the screen of the upper LCD 22 or a case where the outside imaging unit 23 is disposed to the rear side of the inside imaging unit 24.

The outside left imaging unit 23a and the outside right imaging unit 23b can be used as stereo cameras by the program executed by the game device 10. Furthermore, either one of the two outside imaging elements (the outside left imaging unit 23a and the outside right imaging unit 23b) can be used independently depending on the program, allowing the outside imaging unit 23 to be used as a non-stereo camera. If executing a program which uses the outside imaging units 23a and 23b as stereo cameras, the outside left imaging unit 23a captures a left-eye image which is seen by the user's left eye and the outside right imaging unit 23b captures a right-eye image which is seen by the user's right eye. Furthermore, the program can also synthesize images captured by the two outside imaging units (the outside left imaging unit 23a and the outside right imaging unit 23b), or use the images in complementary fashion to perform imaging in an expanded imaging range. Moreover, it is also possible to generate a left-eye image and a right-eye image having parallax, from a single image captured by one of the outside imaging units 23a and 23b, so as to produce a pseudo-stereo image just like one captured by two cameras. In generating a pseudo-stereo image of this kind, the distance between the virtual cameras can be set as desired.

The third LED 29 lights up when the outside imaging unit 23 is operating, thereby indicating that the outside imaging unit 23 is operating. The third LED 29 is provided in the vicinity of the outside imaging unit 23 on the outer surface of the upper housing 21.

FIG. 3C is a right side diagram showing one example of the game device 10 in a closed state. FIG. 3D is a rear view diagram showing one example of the game device 10 in a closed state.

An L button 14G and an R button 14H are provided on the upper surface of the lower housing 11 shown in FIG. 3D. The L button 14G is provided in the left end portion of the upper surface of the lower housing 11 and the R button 14H is provided in the right end portion of the upper surface of the lower housing 11. The L button 14G and the R button 14H are assigned to appropriate functions corresponding to the program executed by the game device 10. For example, the L button 14G and the R button 14H function as shutter buttons (imaging instruction buttons) for the respective imaging units described above.

Although not shown in the drawings, a rechargeable battery forming a power source for the game device 10 is accommodated in the lower housing 11, and this battery can be recharged via a terminal provided in a side face (for example, the upper side face) of the lower housing 11.

Figure 4:
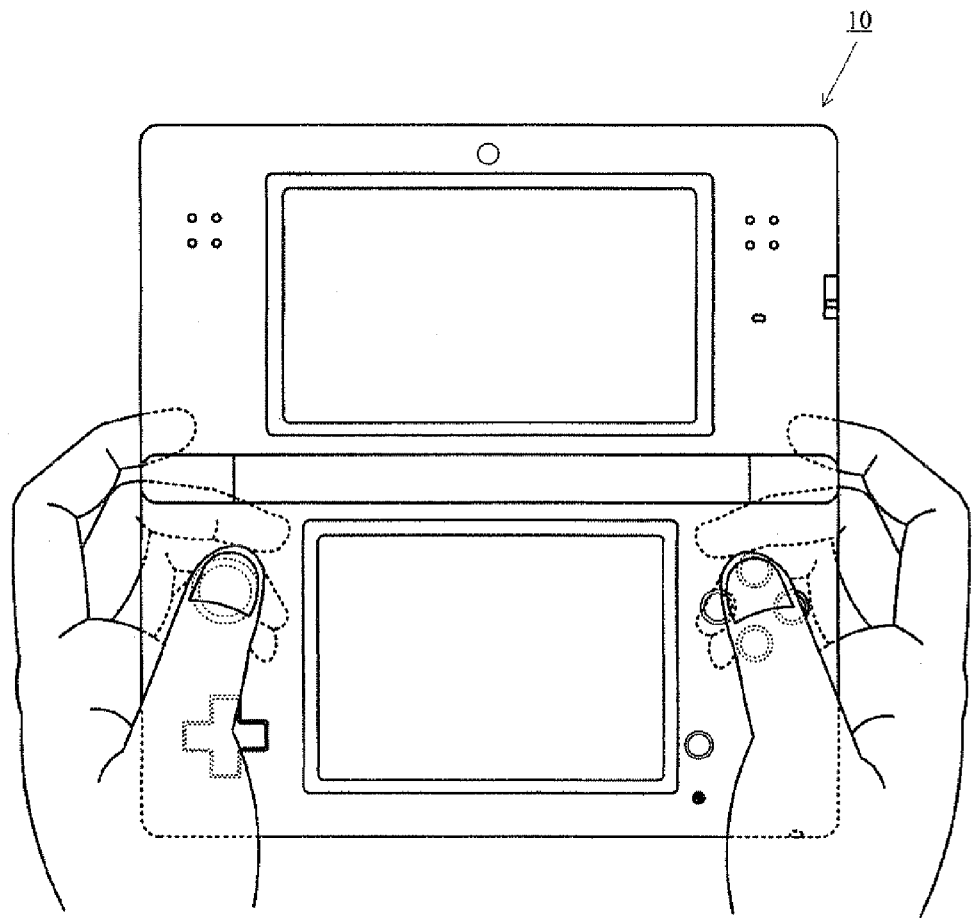
FIG. 4 is a diagram illustrating an example of a situation in which a user grips a game device 10 with both hands.
Figure 5:
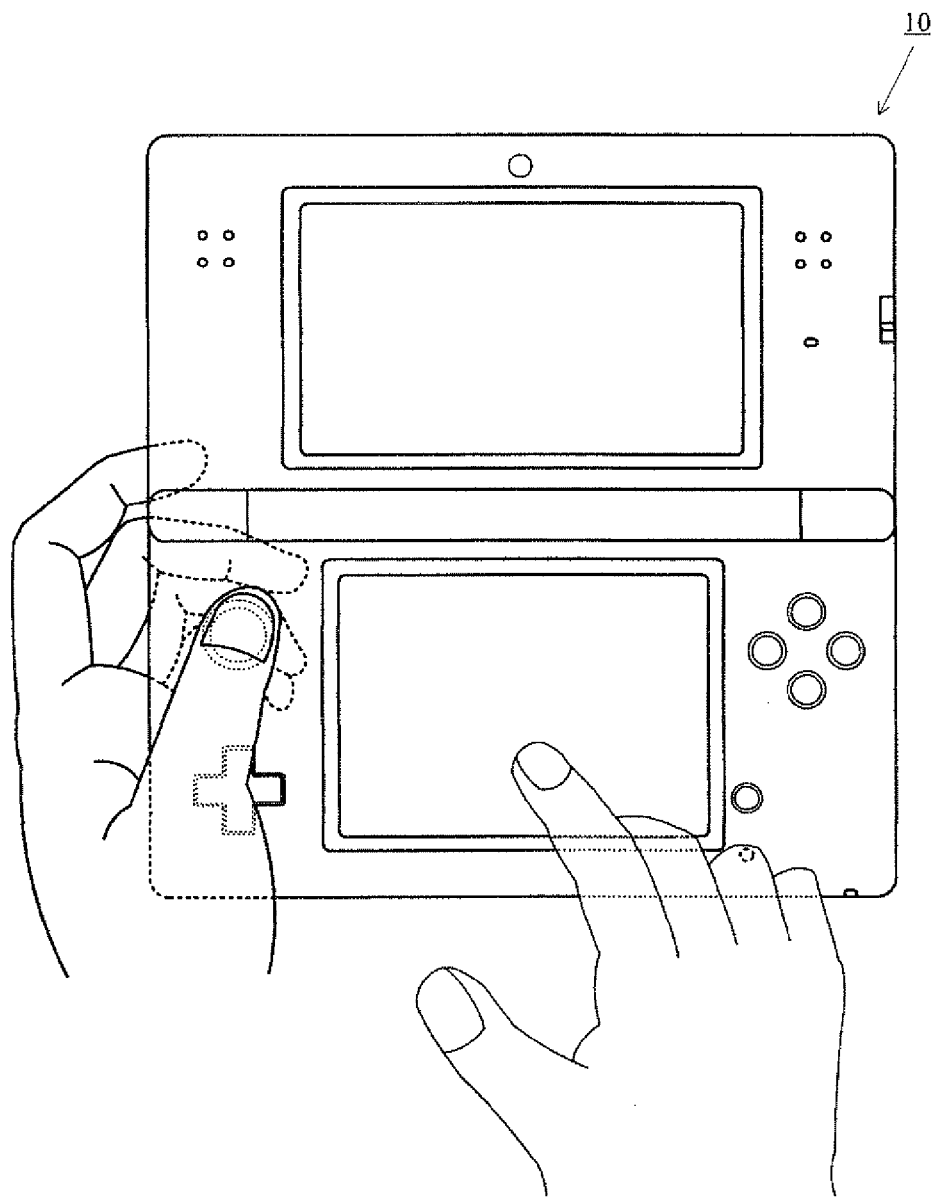
FIG. 5 is a diagram illustrating an example of a situation in which a user grips a game device 10 with one hand.

FIG. 4 and FIG. 5 respectively show one example of the state of use of the game device 10. FIG. 4 is a diagram showing one example of a situation where a user is gripping the game device 10 with both hands.

In the example shown in FIG. 4, the user grips the inner surface and the outer surface (the surface on the opposite side to the inner surface) of the lower housing 11 with the palm, middle finger, fourth finger and little finger of each hand, with the lower LCD 12 and the upper LCD 22 facing towards the user. By gripping the device in this way, the user is able to operate the operating buttons 14A to 14E and the analog stick 15 with his or her left and right thumbs and operate the L button 14G and the R button 14H with his or her left and right index fingers, while gripping the lower housing 11.

FIG. 5 is a diagram showing one example of a situation where a user is gripping the game device 10 with one hand. In the example shown in FIG. 5, when making an input to the touch panel 13, the user releases one of the hands gripping the lower housing 11 and grips the lower housing 11 with the other hand only. By this means, the user is able to make inputs to the touch panel 13 with the released hand.

Figure 6:
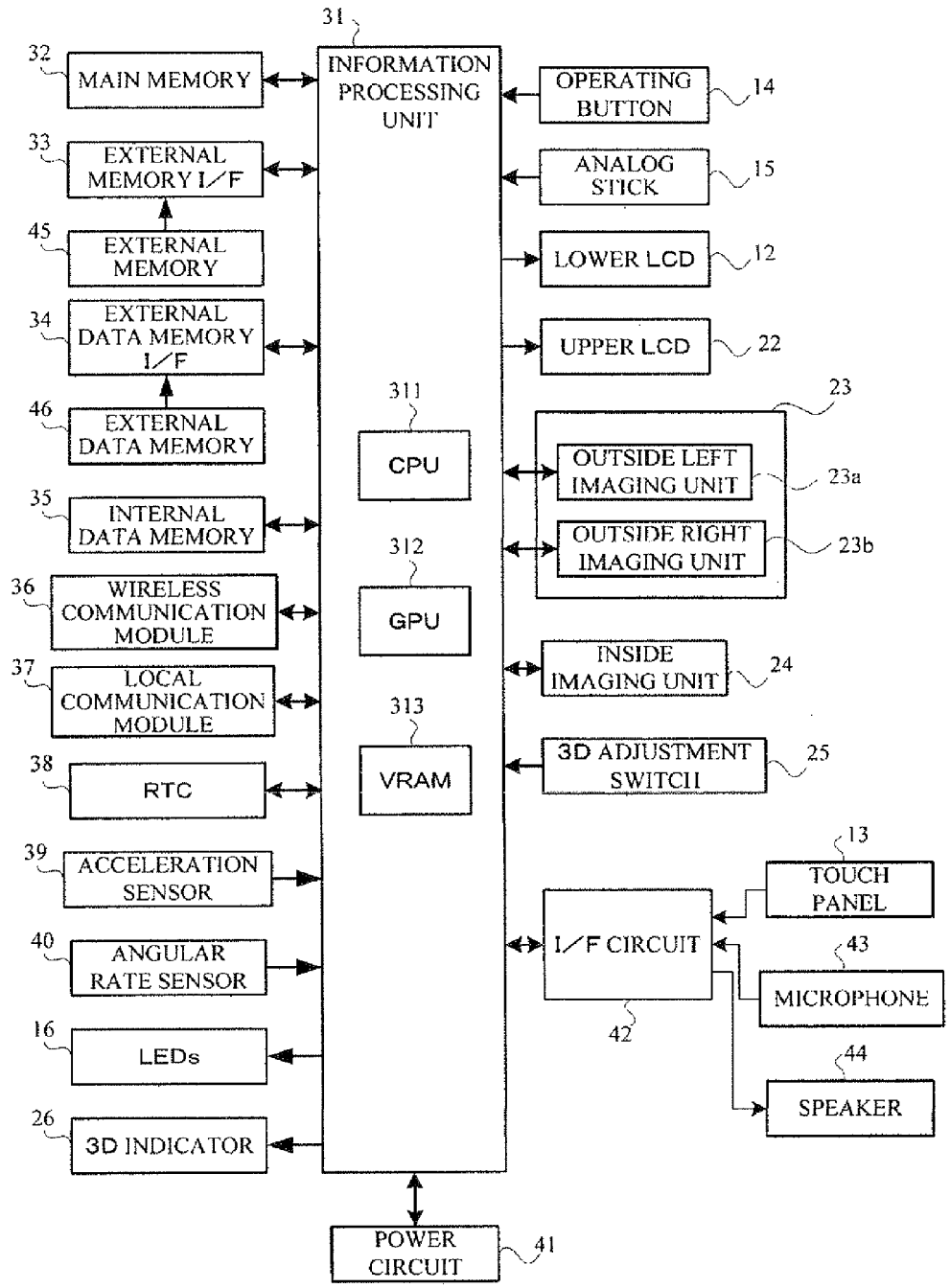
FIG. 6 is a block diagram illustrating an example of the internal configuration of a game device 10.

FIG. 6 is a block diagram showing one example of the internal composition of the game device 10. The game device 10 comprises, in addition to the constituent parts described above, electronic components, such as an information processing unit 31, a main memory 32, an external memory interface (external memory I/F) 33, an external data memory I/F 34, an internal data memory 35, a wireless communication module 36, a local communication module 37, a real-time clock (RTC) 38, an acceleration sensor 39, an angular rate sensor 40, a power supply circuit 41 and an interface circuit (I/F circuit) 42, and the like. These electronic components are mounted on an electronic circuit board and are accommodated inside the lower housing 11 (or inside the upper housing 21).

The information processing unit 31 is information processing means comprising a CPU (Central Processing Unit) 311 for executing a predetermined program and a GPU (Graphics Processing Unit) 312 for performing image processing, or the like. In the present embodiment, the predetermined program is stored in a memory inside the game device 10 (for example, an external memory 45 connected to the external memory I/F 33 or the internal data memory 35). The CPU 311 of the information processing unit 31 executes image processing and game processing as described below, by executing the predetermined program. The program executed by the CPU 311 of the information processing unit 31 may be acquired from another device by means of communication with the other device. Furthermore, the information processing unit 31 includes a VRAM (Video RAM) 313. The GPU 312 of the information processing unit 31 generates an image in accordance with a command from the CPU 311 of the information processing unit 31 and renders the image in the VRAM 313. The GPU 312 of the information processing unit 31 outputs the image rendered in the VRAM 313 to the upper LCD 22 and/or the lower LCD 12, and this image is displayed on the upper LCD 22 and/or the lower LCD 12.

The main memory 32, external memory I/F 33, external data memory I/F 34, and internal data memory 35 are connected to the information processing unit 31. The external memory I/F 33 is an interface for detachably connecting the external memory 45. Furthermore, the external data memory I/F 34 is an interface for detachably connecting the external data memory 46.

The main memory 32 is volatile storage means which is used as a work area or buffer area of the information processing unit 31 (CPU 311). In other words, the main memory 32 temporarily stores various data used in image processing and game processing, and temporarily stores a program acquired from an external source (the external memory 45, another device, or the like). In the present embodiment, a PSRAM (Pseudo-SRAM), for example, is used as the main memory 32.

The external memory 45 is non-volatile storage means for storing a program which is executed by the information processing unit 31. The external memory 45 is composed by a read-only semiconductor memory, for example. When the external memory 45 is connected to the external memory I/F 33, the information processing unit 31 is able to read a program stored in the external memory 45. Predetermined processing is carried out by executing the program read in by the information processing unit 31. The external data memory 46 is constituted by a non-volatile rewriteable memory (for example, a NAND type flash memory), and is used to store predetermined data. For example, images captured by the outside imaging unit 23 or images captured by another device are stored in the external data memory 46. When the external data memory 46 is connected to the external data memory I/F 34, the information processing unit 31 is able to read in images stored in the external data memory 46 and display the images on the upper LCD 22 and/or the lower LCD 12.

The internal data memory 35 is constituted by a non-volatile rewriteable memory (for example, a NAND type flash memory), and is used to store predetermined data. For example, data and programs downloaded by wireless communication via the wireless communication module 36 are stored in the internal data memory 35.

The wireless communication module 36 has a function of connecting to a wireless LAN by a method conforming to the IEEE 802.11b/g standard, for example. Furthermore, the local communication module 37 has a function of performing wireless communication with a game device of the same type, by means of a predetermined communication method (for example, infrared communication). The wireless communication module 36 and the local communication module 37 are connected to the information processing unit 31. The information processing unit 31 can use the wireless communication module 36 to send and receive data to and from other devices via the Internet, and can use the local communication module 37 to send and receive data to and from other game devices of the same type.

The acceleration sensor 39 is connected to the information processing unit 31. The acceleration sensor 39 determines the magnitude of acceleration (linear acceleration) in linear directions following three axial directions (in the present embodiment, the xyz axes). The acceleration sensor 39 is provided inside the lower housing 11, for example. As shown in FIG. 1, the acceleration sensor 39 respectively determines the magnitude of the linear acceleration of the game device 10 produced in each axial direction, taking the x axis to be the long edge direction of the lower housing 11, taking the y axis to be the short edge direction of the lower housing 11, and taking the z axis to be direction perpendicular to the inner surface (main surface) of the lower housing 11. The acceleration sensor 39 is, for instance, an electrostatic capacitance type of acceleration sensor, but it is also possible to use an acceleration sensor based on another method. Furthermore, the acceleration sensor 39 may also be an acceleration sensor which determines acceleration in one axial direction or two axial directions. The information processing unit 31 receives data indicating the acceleration as determined by the acceleration sensor 39 (acceleration data), and calculates the attitude and movement of the game device 10.

The angular rate sensor 40 is connected to the information processing unit 31. The angular rate sensor 40 respectively determines the angular velocity produced about the three axes of the game device 10 (in the present embodiment, the xyz axes), and outputs data indicating the determined angular velocities (angular velocity data) to the information processing unit 31. The angular rate sensor 40 is provided inside the lower housing 11, for example. The information processing unit 31 receives angular velocity data output from the angular rate sensor 40 and calculates the attitude and movement of the game device 10.

The RTC 38 and power supply circuit 41 are connected to the information processing unit 31. The RTC 38 outputs a time count to the information processing unit 31. The information processing unit 31 calculates a current time (and date) on the basis of the time measured by the RTC 38. The power supply circuit 41 controls the power from the power source of the game device 10 (the rechargeable battery accommodated in the lower housing 11) and supplies power to the respective components of the game device 10.

The I/F circuit 42 is connected to the information processing unit 31. The microphone 43, speakers 44 and touch panel 13 are connected to the I/F circuit 42. More specifically, the speakers 44 are connected to the I/F circuit 42 via an amplifier which is not illustrated. The microphone 43 detects the user's voice and outputs an audio signal to the I/F circuit 42. The amplifier amplifies the audio signal from the I/F circuit 42, and outputs sound to the speakers 44. The I/F circuit 42 includes an audio control circuit which controls the microphone 43 and the speakers 44 (amplifier), and a touch panel control circuit which controls the touch panel 13. The audio control circuit performs A/D conversion and D/A conversion of the audio signal, or converts the audio signal to audio data of a predetermined format. The touch panel control circuit generates touch position data of a predetermined format on the basis of a signal from the touch panel 13 and outputs the touch position data to the information processing unit 31. The touch position data indicates the coordinates of a position where an input has been made (touch position) on the input surface of the touch panel 13. The touch panel control circuit reads in a signal from the touch panel 13 and generates touch position data at a rate of once every predetermined time period. The information processing unit 31 can identify the touch position where input has been made on the touch panel 13, by acquiring the touch position data.

The operating buttons 14 include the operating buttons 14A to 14L mentioned above, and are connected to the information processing unit 31. Operating data indicating the input status of the respective operating buttons 14A to 14I (whether or not the button is pressed) is output to the information processing unit 31 from the operating buttons 14. The information processing unit 31 executes processing in accordance with the inputs to the operating buttons 14, by acquiring operating data from the operating buttons 14.

The lower LCD 12 and the upper LCD 22 are connected to the information processing unit 31. The lower LCD 12 and the upper LCD 22 display images in accordance with instructions from the information processing unit 31 (GPU 312). In the present embodiment, the information processing unit 31 causes an image for a handwritten image input operation to be displayed on the lower LCD 12, and causes an image acquired by either the outside imaging unit 23 or the inside imaging unit 24 to be displayed on the upper LCD 22. In other words, the information processing unit 31 causes a stereo image (a stereoscopically viewable image) using a right-eye image and a left-eye image captured by the outside imaging unit 23 to be displayed on the upper LCD 22, or causes a planar image captured by the inside imaging unit 24 to be displayed on the upper LCD 22, or causes a planar image using one of the right-eye image and the left-eye image captured by the outside imaging unit 23 to be displayed on the upper LCD 22.

More specifically, the information processing unit 31 is connected to an LCD controller (not illustrated) of the upper LCD 22, and controls the on/off switching of the parallax barrier in the LCD controller. If the parallax barrier of the upper LCD 22 is switched on, then the right-eye image and the left-eye image stored in the VRAM 313 of the information processing unit 31 (images captured by the outside imaging unit 23) are output to the upper LCD 22. More specifically, the LCD controller reads out a right-eye image and a left-eye image from the VRAM 313 by alternately repeating a process of reading out pixel data for one line in the vertical direction in respect of the right-eye image and a process of reading out pixel data for one line in the vertical direction in respect of the left-eye image. By this means, the right-eye image and the left-eye image are divided into strip-shaped images in which pixels are aligned vertically for each line, and an image formed by alternately arranging the divided strip-shaped images of the right-eye image and strip-shaped images of the left-eye image is displayed on the screen of the upper LCD 22. When this image is viewed by the user via the parallax barrier of the upper LCD 22, the right-eye image is viewed by the user's right eye and the left-eye image is viewed by the user's left eye. By this means, a stereoscopically viewable image is displayed on the screen of the upper LCD 22.

The outside imaging unit 23 and the inside imaging unit 24 are connected to the information processing unit 31. The outside imaging unit 23 and the inside imaging unit 24 capture images in accordance with an instruction from the information processing unit 31, and output captured image data to the information processing unit 31. In the present embodiment, an imaging instruction is issued to either one of the outside imaging unit 23 and the inside imaging unit 24, and the imaging unit receiving the imaging instruction captures an image and sends image data to the information processing unit 31. More specifically, an imaging unit to be used is selected by an operation performed by the user via the touch panel 13 or the operating buttons 14. The information processing unit 31 (CPU 311) detects that an imaging unit has been selected and duly issues an imaging instruction to the outside imaging unit 23 or the inside imaging unit 24.

When the outside imaging unit 23 or the inside imaging unit 24 is started up by an instruction from the information processing unit 31 (CPU 311), imaging is performed at a rate of 60 frames per second, for example. The images captured by the outside imaging unit 23 or the inside imaging unit 24 are successively supplied to the information processing unit 31, and displayed on the upper LCD 22 or the lower LCD 12 by the information processing unit 31 (GPU 312). When the captured images are output to the information processing unit 31, the images are stored in the VRAM 313 and output to the upper LCD 22 or the lower LCD 12, and then deleted at a predetermined timing. By capturing images at a rate of 60 frames per second, for example, and displaying the captured images, the game device 10 can display the scene in the imaging range of the outside imaging unit 23 and the inside imaging unit 24, in real time, on the upper LCD 22 or the lower LCD 12.

The 3D adjustment switch 25 is connected to the information processing unit 31. The 3D adjustment switch 25 sends an electric signal corresponding to the position of the slider to the information processing unit 31.

The 3D indicator 26 is connected to the information processing unit 31. The information processing unit 31 controls the lighting up of the 3D indicator 26. For example, if the upper LCD 22 is in stereoscopic display mode, then the information processing unit 31 causes the 3D indicator 26 to light up.

<Description of Functions>

An example of game processing executed by the game device 10 will be schematically described. The game device 10 provides a function to collect, for example, human face images by acquiring the face images by means of the inside imaging unit 24 or the outside imaging units 23 and storing them, according to operations by a user (hereafter, also referred to as a player). In order to collect the face images, the user executes a game (first game) using an acquired face image and is allowed to store the acquired image if the result indicates success in the game. The game device 10 stores the acquired face image in a saved data storage area Do (see FIG. 11) which is accessible during execution of the game processing, as described later. The user repeats the same operations on the game device 10 so that a plurality of face images can be collected, added to, and accumulated in the saved data storage area Do. Since the saved data storage area Do is an area which can be accessed by the game device 10 during execution of the game, the acquired face images become available by being stored in the saved data storage area Do. Further, the game device 10 displays a list of face images collected as a result of the first game by retrieving the data accumulated in the saved data storage area Do. The game device 10 then executes a game (second game), using face images selected by the user from the displayed face image list or those automatically selected by the game device 10.

The games (first and second games) executed by the game device 10 are played, for example, by making an attack, aiming at an enemy object EO, to destroy the enemy object EO. According to the first embodiment, for example, the face images acquired by the user, which have been stored or have not stored yet in the saved data storage area Do, are used as texture in character objects including the enemy object EO, and mapped thereon.

In the first game execution stage, the user acquires a desired face image by means of an imaging unit such as a camera, and plays the first game. If the user succeeds in the first game, the acquired face image can be accumulatively stored in the saved data storage area Do so that it is displayed in the list and used in the second game. The term "accumulatively stored" as used herein means that a face image newly acquired by the user is added to the stock of face images when the user succeeds in the first game.

In the second game execution stage, the user is allowed to generate an enemy object EO by selecting a desired face image from the collected face images. Then, the user is allowed to play the game using the enemy object EO generated by using the desired face image. The game may be for example a game to destroy the generated enemy object EO. However, a face image may be selected randomly or automatically by the game device 10, without involving operations by the user, from the face images stored in the saved data storage area Do in order to generate the enemy object EO or the like. In the first game execution stage as well, a character object may be generated using a face image already collected in the saved data storage area Do and used in the game together with another character object generated using a face image which has not yet been stored in the saved data storage area Do. In the description below, if there are a plurality of enemy objects EO and they should be discriminated from each other, they shall be referred to as the enemy object EO1, the enemy object EO2, and so on. On the other hand, if the enemy objects EO1, EO2 and so on should be generically referred to, or the plurality of enemy objects need not be distinguished from each other, they shall be referred to as the enemy object EO or the enemy objects EO.

Figure 7:
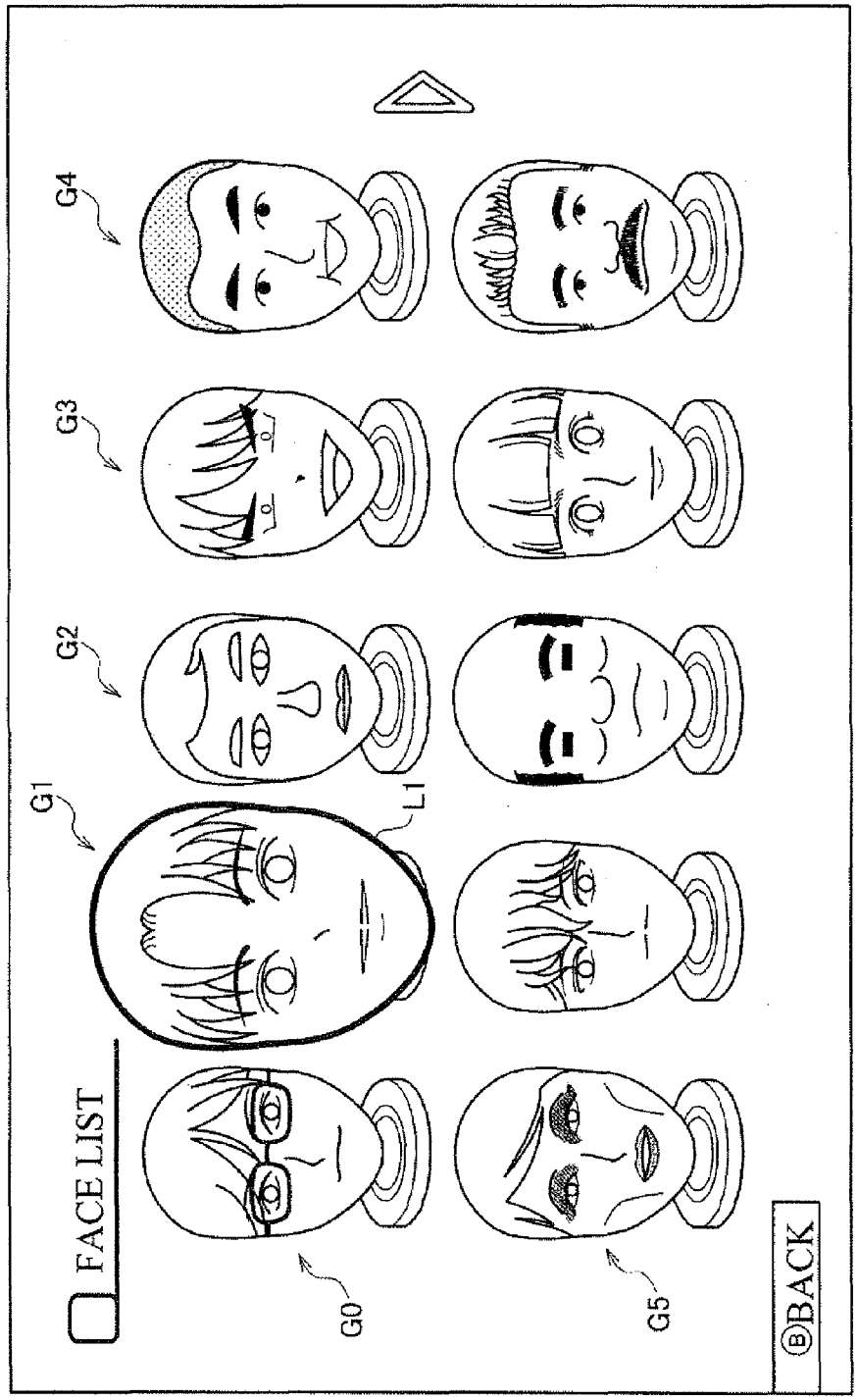
FIG. 7 illustrates an example of face images displayed in a list form.

Next, referring to FIGS. 7 to 10, examples of display by the game device 10 according to the first embodiment will be described. FIG. 7 illustrates an example of face images displayed in a list form on the upper LCD 22 of the game device 10. As described above, acquired face images can be stored and displayed in a list form as shown in FIG. 7 if the user succeeds in the first game. The face images displayed in the list are those each of which is generated by texture mapping image data acquired by means of the inside imaging unit 24, the outside left imaging unit 23a, the outside right imaging unit 23b or the like on a three-dimensional model of a human facial surface. For example, the image data is pasted as texture on the surface of a three-dimensional model formed by combination of a plurality of polygons. However, the face images used in the game executed by the game device 10 are not limited to those generated by texture mapping on three-dimensional models. For example, the game device 10 may be designed to display, as a face image, image data held in a simple two-dimensional pixel array. Further, one or more of the face images displayed in the list as shown in FIG. 7 may be those held in simple two-dimensional pixel arrays, while the remaining may be those texture-mapped on three-dimensional models.

In FIG. 7, a face image G1 is enclosed by the bold line L1. The bold line L1 indicates that the face image G1 is in a selection state. The term "selection state" means that the subject has been selected as an object to be processed, by the user manipulating the operation button 14 or the like. The selection state is also referred to as the focused state. Every time the user presses the operation button 14, for example, the face image to be placed in the selection state is shifted from the left to right and from the top to bottom. For example, when the user presses the four-way button 14A at right in the state shown in FIG. 7, the face image in the selection state is shifted to the right from the face image G1 to a face image G2, from the face image G2 to a face image G3, and so on. The shift of the face image in the selection state means that the face image enclosed by the bold line L1 on the screen of the upper LCD 22 is changed over.

The transverse arrangement of the face images in FIG. 7 shall be referred to "a row". When the rightmost face image G4 is in the selection state and the user presses the four-way button 14A at right, the face image in the selection state is changed over to the face image G5 located at the left end of the lower row. Conversely, when the user presses the four-way button 14A at left, for example, when the face image G5 at the left end in the lower row is in the selection state, the face image in the selection state is shifted right-upward from the face image G5 to the face image G4, and then from the face image G4 to the face image G3.

However, the selection state can be changed not only by pressing the four-way button 14A at right or left, but also by pressing it at up or down. Further, the face image in the selection state can be changed over not only by pressing of the four-way button 14A but also by pressing another type of operation button 14. For example, the face image in the selection state may be changed by pressing the operation button 14B (A-button). Further, a configuration is also possible such that the face image in the selection state is switched over by manipulating the touch screen 13 on the lower LCD 12. Specifically, for example, the game device 10 may be designed to display on the lower LCD 12 a list of face images similar to those displayed on the upper LCD 22. The game device 10 may be designed to detect which face image is in the selection state by detecting a manipulation on the touch screen 13. The game device 10 then displays the face image in the selection state, for example the face image G1 by enclosing the same with the bold line L1.

As described above, the user is allowed to view the list of the currently acquired face images displayed on the screen of the upper LCD 22 as shown in FIG. 7. The user is also allowed to select a desired face image from the list of currently acquired face images on the screen to set the selected one in the selection state. Then, the selection state can be finalized, for example by selecting a predetermined select/enter button, for example a select/enter button displayed on the lower LCD 12, through the touch screen 13 or the operation button 14. Further, the face image list screen on the upper LCD 22 may be closed and a standby menu screen (not shown) is displayed by the user pressing the button 14C (also referred to as the B-button).

Figure 8:
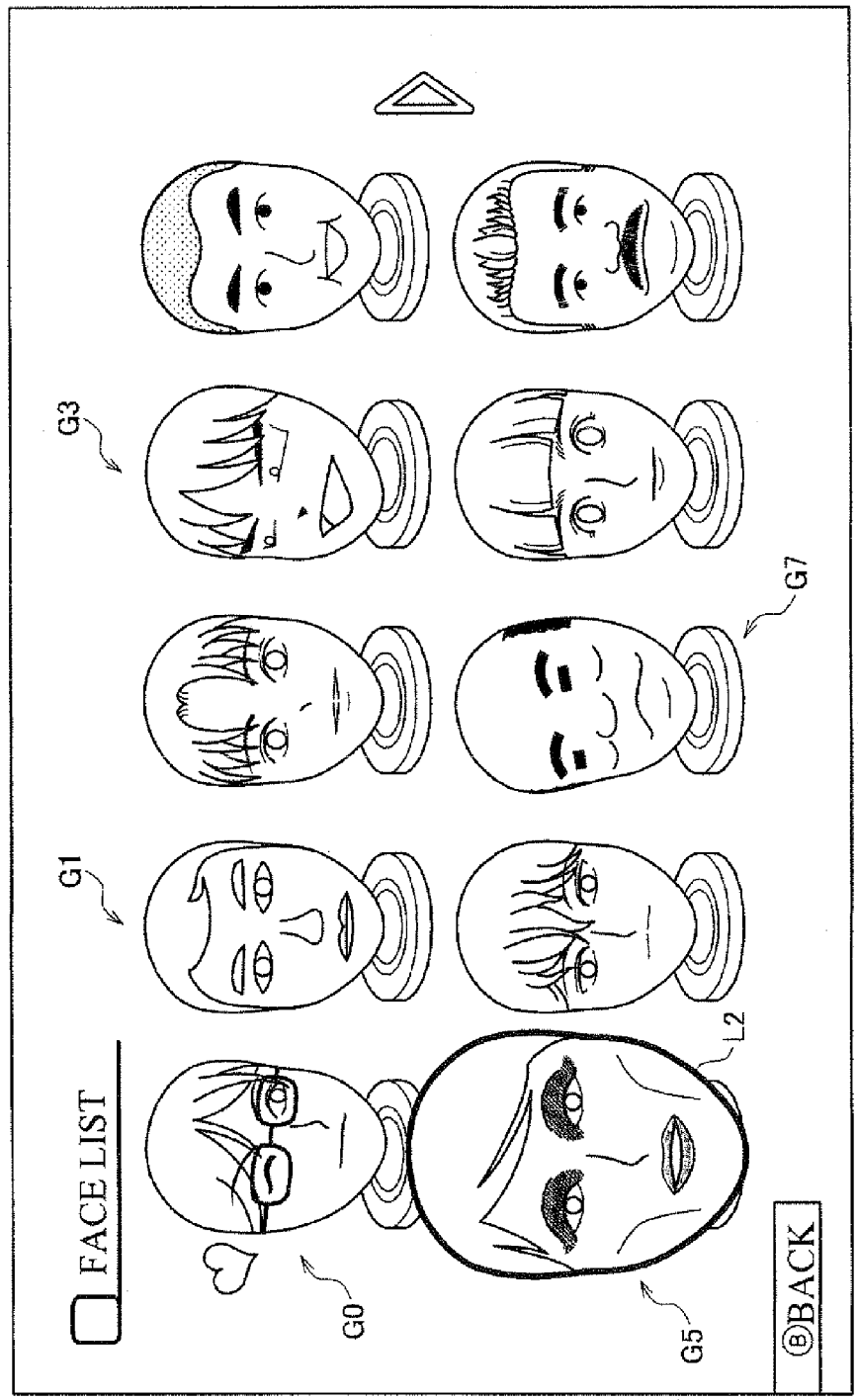
FIG. 8 illustrates another example of face images displayed in a list form.

FIG. 8 illustrates another example of face images displayed in a list form. In the example shown in FIG. 8, the face image G5 is in the selection state and enclosed with the bold line L2. In this example, once the face image G5 is set in the selection state, a face image associated with the face image G5 makes a reaction thereto. For example, a heart mark is displayed in the vicinity of the face image G0, and the face image G0 is looking at the face image G5 in the selection state, with one eye closed. Additionally, the face image G3 and the face image G7 also have turned their faces to and are looking at the face image G5 in the selection state.

However, the reactions of the face image associated with the face image in the selection state are not limited to actions such as turning the face to with a heart mark displayed near the face, looking at with one eye closed, and turning the face to an looking at the face image in the selection state. For example, the associated face image may be caused to make other reactions such as laughing and emitting voice. Conversely, it is also possible that a face image not associated with the face image in the selection state is changed from a smiling face to a face without smile. Further, a face image not associated with the face image in the selection state may be caused to face the opposite direction from the face image in the selection state.

The associated face images may be defined for example at the stage of acquisition of the face images. Specifically, for example, groups for classifying the face images are preliminarily set so that each time a face image is acquired, the user determines and inputs which group the acquired face image belongs to. Alternatively, groups of face images are defined according to progress of the game to classify the face images. Specifically, for example, when the face image G1 is newly acquired while the game is being played using the face image G0, the face image G0 and the face image G1 can be determined to belong to the same group and to be associated with each other.

As seen from FIG. 8, when a face image, for example the face image G5 is set to the selection state by means of the operation button 14 or the like and other face images G0, G3, G7 and so on make reaction thereto, a sense of affinity can thereby be expressed among the acquired face images. This means that the collected face images are not simply classified into groups. A sense of affinity among a plurality of face images can be expressed by facial expressions and reactions of the face images, and thus human-to-human relationships and strength of such relationships in the real world can be expressed in the virtual world of the game device 10.

Figure 9:
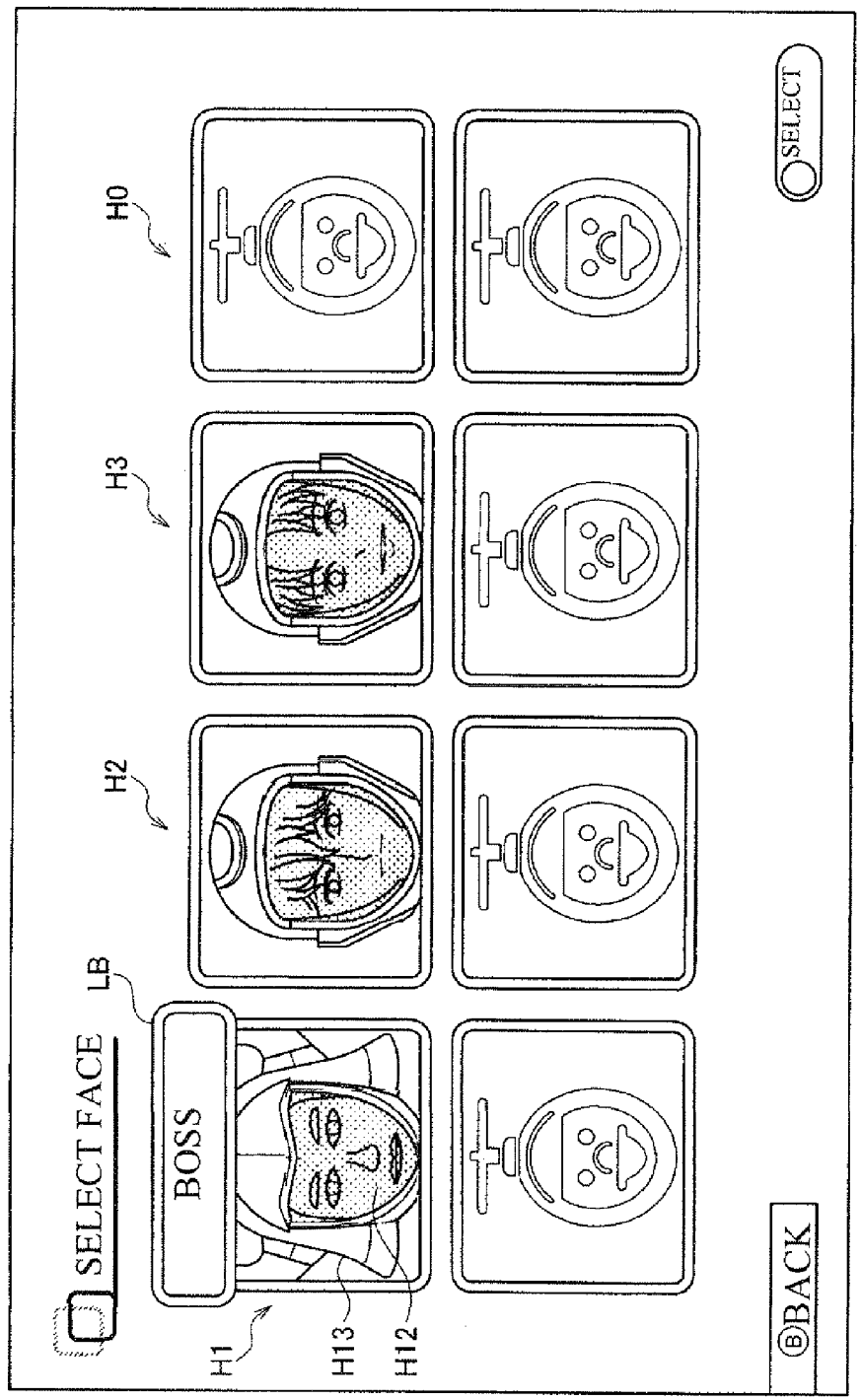
FIG. 9 illustrates an example of a screen for performing processing to fit a face image in an enemy object.
Figure 10:
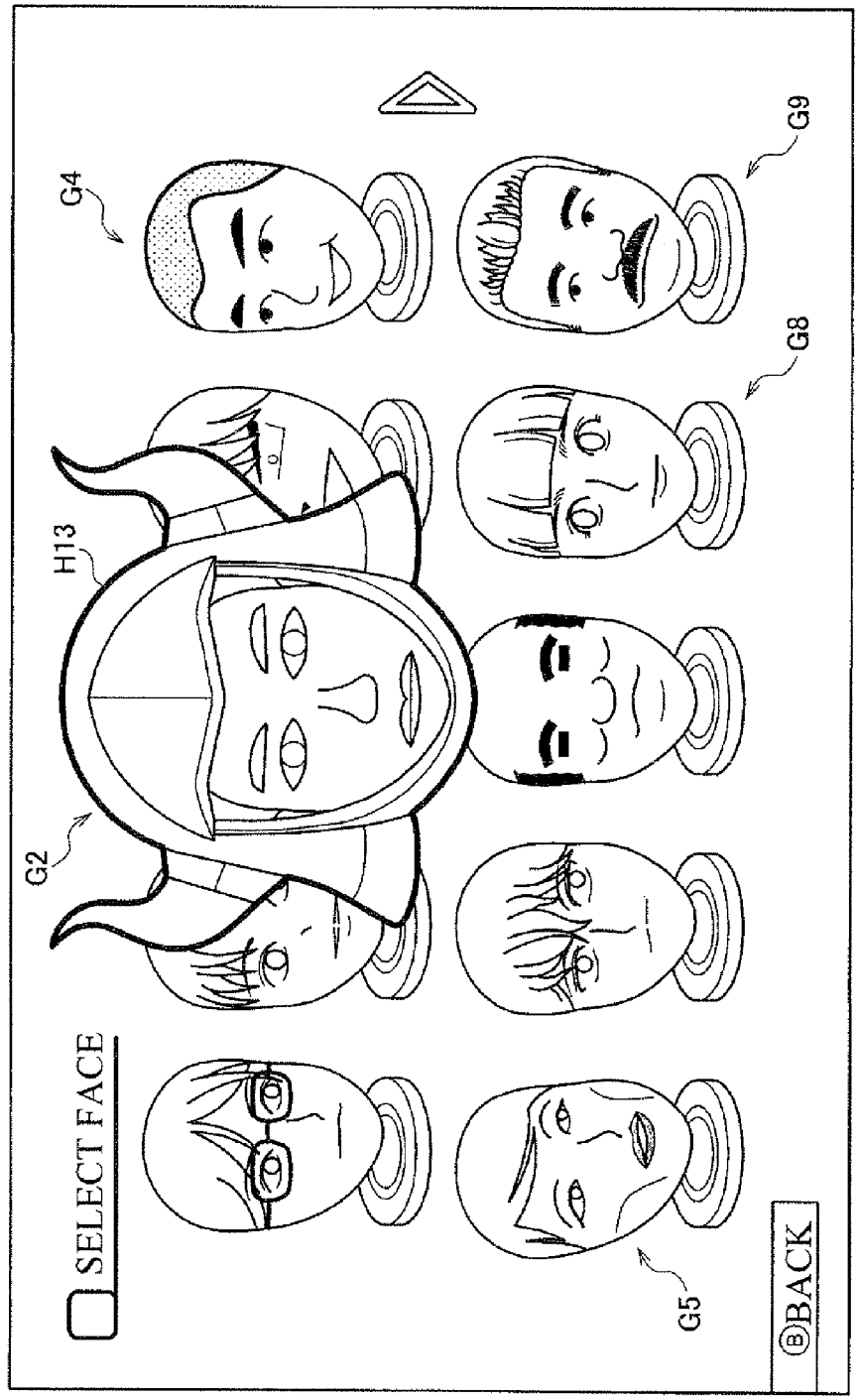
FIG. 10 is a diagram illustrating an example of a face image selection screen.

FIG. 9 and FIG. 10 illustrate examples of screens for fitting a face image in the enemy object EO as one of the game characters. FIG. 9 shows an example of the screen for selecting a head of the enemy object EO. For example, when the user selects a menu "Choose Boss" from the menu list displayed on the lower LCD 12 of the game device 10 by manipulating the touch screen 13, a list of head shapes of the enemy object EO prepared in the game device 10 is displayed as shown in FIG. 9. However, the list of head shapes as shown in FIG. 9 can be displayed not only by the manipulation of the touch screen 13, but also by manipulation of the operation button 14 or the like.

There are displayed in FIG. 9 three types of head shapes H1, H2, and H3. The head shape H1 for example includes a face part H12 formed in a three-dimensional model and a peripheral part H13 surrounding the face part H12. As illustrated in FIGS. 7 and 8, the enemy object EO appearing in the game is formed by texture-mapping the face image on the face part H12 which is a three-dimensional model.

The peripheral part H13 may have a shape that implies characteristics of the enemy object EO appearing in the game. Specifically, for example, if the peripheral part H13 has a shape like a warrior helmet, it will express belligerent characteristics of the enemy object EO. There is shown in FIG. 9 a list of head shapes arranged in two rows and four columns, in which three types of head shapes H1, H2, and H3 are shown as examples, while the remaining are indicated by the mark H0 denoting "undefined". This means that the head shapes H1 to H3 are shown for an illustrative purpose only, and the types of the head shapes are not limited to these three. For example, other head shapes can be newly added from a media for upgrading the game program or from a website providing game parts on the Internet.

In FIG. 9, a label LB denoted as "Boss" indicates that the head shape H1 has been selected by the user. The label LB can be moved by means of the four-way button 14A or the like. The user can manipulate the four-way button 14A to move the label LB so that the head shape H2 or H3 for example is set in the selection state. The selection state can be established by the user pressing the operation button 14B (A-button) or the like after setting any one of the head shapes in the selection state. The label LB is placed by determining the head shape in the selection state, and thus the selection of the head shape, for example the head shape H1 in the example shown in FIG. 9 is finalized. The screen for selecting the head of the enemy object EO can be closed to return the previous operation screen by the user pressing the operation button 14C (B-button) with the screen of FIG. 9 displayed on the upper LCD 22.

FIG. 10 illustrates an example of a face image selection screen. The screen of FIG. 10 is displayed when the selection state of the head shape is finalized by the user pressing the operation button 14B (A-button) or the like when the screen for selecting the head of the enemy object EO shown in FIG. 9 is displayed on the upper LCD 22. The screen of FIG. 10 is similar to those shown in FIG. 7 and FIG. 8, but it differs from those of FIG. 7 and FIG. 8 in that the peripheral part H13 of the head shape selected in FIG. 9 is added to the face image set in the selection state.

The face image to be selected can be changed in the screen of FIG. 10 by the user manipulating the four-way button 14A or the like. Specifically, the user is allowed to shift the face image in the selection state from the face image G0 to G1, from the face image G1 to G2, and so on. The face image set in the selection state is displayed by being texture-mapped on the face part of a head shape. Specifically, in the example of FIG. 10, the face image G2 is texture-mapped on the face part H12 of the head shape H1 selected in the screen of FIG. 9 and displayed in combination with the peripheral part H13.

Thus, the enemy object EO is temporarily generated by displaying the combination of the peripheral part H13 and the face image G2. The user is allowed to imagine the image of the opponent whom he/she will confront in the game based on the enemy object EO displayed temporarily. The user can replace the face image of the enemy object EO by manipulating the four-way button 14A or the like to change the face image to be selected. This means that the user can generate the enemy object EO as desired by replacing the face of the enemy object EO one after another until the enemy object EO fits an image to be confronted in the game.

Specifically, in the game device 10, the face images collected and accumulated in the saved data storage area Do by the user succeeding in the first game as described above are used in the following second game. This means that the game device 10 executes the game processing using the enemy objects EO generated with the use of the collected face images. For example, the game device 10 executes processing called casting determination processing before the game is started, according to the user's operations, so that the enemy objects EO each fits the user's perception of an enemy he/she confronts in the game. Alternatively, the game device 10 may generate the enemy objects EO automatically before the game is started. The term "automatically" means herein the game device 10 is capable of generating the enemy objects EO by randomly selecting a required number of face images from the collected face images, the required number being the number of the enemy objects EO appearing in the game. Further, the game device 10 may generate each enemy object EO by selecting a face image that is estimated to be preferred by the user based on the history of processing of the games played by the user in the past, or based on characteristics and taste of the user. The game device 10 may select face images to be used in the next game based on the history of processing of the game played by the user up to that point in consideration of the attributes of the subjects of the face images such as age, gender, and companionship (relationship with family, friends, colleagues, schoolmates, and neighbors), and in consideration of the ownership if the subject is a pet animal or the like. Further, the game device 10 may select face images to be used in the next game based on the user's results in the games played by the user in the past.

The game device 10 thus executes the game processing (second game) using the generated enemy object EO according to the designation by the user's operation or the processing by the game device 10. Although the description here is made using "the enemy object EO" by way of example only, character objects appearing in the game are not limited to those who fight as enemies, but may be those who fight as allies. Further, the game is not limited to a game in which the relationship of enemies and allies exists, but may be a game in which a player object modeled on the user himself/herself appears. Further, the game may be a game in which an object called an agent which supports the user playing the game appears.

The game device 10 executes a game in which various character objects including the enemy object EO as described above appear. The character objects appearing in this game are generated by texture-mapping the face images collected by the user succeeding in the first game. Therefore, character objects including the face images collected by the user himself/herself appear in the game executed by the game device 10. Thus, face images of persons or images of a symbolizing part of animals or other living creatures such as face images thereof are used for such various character objects, whereby the user is allowed to play the game reflecting the relationship in the real world with persons or living creatures of the used face images. For example, the user is allowed to play the game which is full of positive emotions and feelings such as love, affection, friendliness, and negative ones such as hatred.

When a face image is selected in the face image selection screen of FIG. 10, like that of FIG. 8, other face images associated with the selected face image may be caused to make reactions. In the example shown in FIG. 10, the face image G2 which is combined with the peripheral part 13 of the head shape H1 is selected, and the associated face image, for example the face image G4 has turned the face thereto and is looking at the face image G2 with a smile. The face image G5 is looking up at the face image G2 with envious eyes. The face images G8 and G9 are also looking at the face image G2. On the other hand, in FIG. 10, face images other than the face images G4, G5, G8, and G9 have not shown any reaction to the selection of the face image G2. Thus, the affinity relationship among the face images can be expressed by such differences in reaction. In this manner, when the persons of these face images are in a specific relationship with the user, for example, when the persons of the face images and the user belong to a plurality of groups of friends, the game device 10 is able to introduce the person-to-person relationship such as person-to-person affinity in the real world into the virtual world expressed by the game device 10.

<Example of Various Types of Data>

Figure 11:
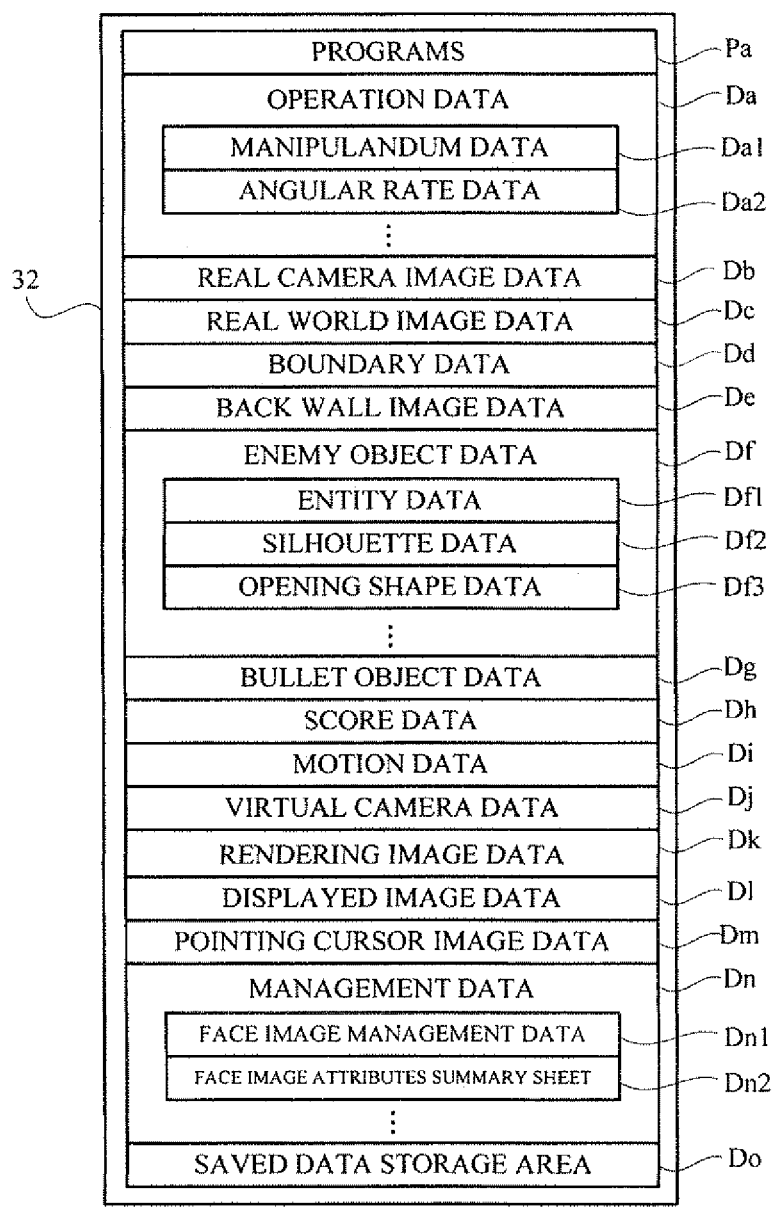
FIG. 11 is a diagram illustrating examples of various types of data stored in a main memory by executing an image processing program according to an embodiment of the invention on the game device shown in FIG. 1.

FIG. 11 is a diagram illustrating an example of various types of data stored in the main memory 32 as the image processing program is executed.

A program for executing the processes of the game device 10 is included in a memory built into the game device 10 (for example, the internal data memory 35), the external memory 45, or the external data memory 46, and when the power supply to the game device 10 is switched on, the program is read out to the main memory 32 from the built-in memory, or from the external memory 45 or the external data memory 46 via the external memory I/F 33 or the external data memory I/F 34, and the program is executed by the CPU 311.

In FIG. 11, a program read out from the internal memory, the external memory 45 or the external data memory 46, and temporary data generated during image processing, are stored in the main memory 32. In FIG. 11, a data storage region of the main memory 32 stores operating data Da, real camera image data Db, real world image data Dc, boundary surface data Dd, back wall image data De, enemy object data Df, bullet object data Dg, points score data Dh, movement data Di, virtual camera data Dj, rendered image data Dk, display image data Dl, pointing cursor image data Dm, management data Dn, saved data storage area Do and the like. Furthermore, a group Pa of various programs which constitute the image processing program are stored in the program storage region of the main memory 32.

<Operating Data Da>

The operating data Da is data indicating operating information produced by the user operating the game device 10. The operating data Da includes control data Da1 and angular rate data Da2. The control data Da1 is data indicating that the user has operated a control, such as an operating button 14 or the analog stick 15 of the game device 10. The angular rate data Da2 is data indicating the angular velocity determined by the angular rate sensor 40. For example, the angular rate data Da2 includes x-axis-centered angle rate data which indicates an angular velocity about the x-axis, y-axis-centered angle rate data which indicates an angular velocity about the y-axis, and z-axis-centered angle rate data which indicates an angular velocity about the z-axis, as determined by the angle rate sensor 40. For example, the operating data from the operating buttons 14 and the analog stick 15 and the angular rate data from the angular rate sensor 40 are acquired in the time units at which the game device 10 carries out processing (for example, 1/60 second) and are stored and updated in the control data Da1 and the angular rate data Da2 in accordance with this data acquisition process.

In the game processing flow described below (for example, the processing in FIG. 20A and onwards), an example is given in which the control data Da1 and the angular rate data Da2 are respectively updated every frame, which is the processing period, but the data may also be updated on the basis of another processing period. For example, a mode is possible in which control data Da1 is updated each time it is detected that the user has operated a control, such as an operating button 14 or the analog stick 15, or the like, and this updated control data Da1 is used at each processing period. Furthermore, it is also possible to adopt a mode in which the angular rate data Da2 is updated at each angular rate detection period of the angular rate sensor 40, and this updated angular rate data Da2 is used at each processing period. In this case, the respective periods at which the control data Da1 and the angular rate data Da2 are updated differ from the processing period.

<Real Camera Image Data Db>

The real camera image data Db is data indicating a real camera image which has been captured by either the outside imaging unit 23 or the inside imaging unit 24. In the description of the processing given below, a mode is used in which the real camera image data Db is updated by using a real camera image captured by either one of the outside imaging unit 23 and the inside imaging unit 24 in the step of acquiring the real camera image. The period at which the outside imaging unit 23 or the inside imaging unit 24 captures an image and the real camera image data Db is updated using the captured real camera image may be same as the unit processing time in the game device 10 (for example, 1/60 second) or may be shorter than the unit processing time. If the period at which the real camera image data Db is updated is shorter than the processing period in the game device 10, then the real camera image data Db may be updated as appropriate, independently of the processing described below. In this case, in the step of acquiring real camera image described below, processing should always be carried out using the most recent real camera image which is indicated by the real camera image data Db. Below, in the present embodiment, the real camera image data Db is data indicating a real camera image which has been captured by the outside imaging unit 23 (for example, the outside left imaging unit 23a).

<Real World Image Data Dc>

In the game processing to be described later, for example in the game execution processing in step 18 of FIG. 14, and more specifically in the processing steps illustrated in FIG. 20A and onwards, there is introduced a boundary surface 3 onto which a real camera image captured by the real camera (the outside imaging unit 23 or the inside imaging unit 24) of the game device 10 is texture-mapped. The real world image data Dc is data for generating a real world image which appears to be situated on the boundary surface 3, using the real camera image captured by the real camera (the outside imaging unit 23 or the inside imaging unit 24) of the game device 10. In the first rendering method described below, for example, the real world image data Dc includes texture data of a real camera image in order to attach a real world image to the boundary surface (a screen object in the display range of the virtual camera). Moreover, in the second rendering method, for example, the real world image data Dc includes planar polygon data for generating a real world image, texture data of a real camera image for mapping to the planar polygon, data indicating the position of the planar polygon in the virtual space (the position from the real world rendering camera described below), and the like.

<Boundary Surface Data Dd>

The boundary surface data Dd is data for generating a real world image which appears to be situated on the boundary surface 3, in combination with the real world image data Dc. In the first rendering method, for example, the boundary surface data Dd is data relating to a screen object, and includes opening judgment data (corresponding to the α texture data described below) which indicates the state (for example, whether or not there is an opening) of each point constituting the boundary surface 3, data indicating the arrangement position of the boundary surface 3 in the virtual space (the coordinates of the boundary surface 3 in the virtual space), and the like. Furthermore, in the second rendering method, for example, the boundary surface data Dd is data for representing an opening in a planar polygon of the real world image, and includes opening judgment data (corresponding to the α texture data described above) which indicates the state (for example, whether or not there is an opening) of each point constituting the boundary surface 3, data indicating the arrangement position of the boundary surface 3 in the virtual space (the coordinates of the boundary surface 3 in the virtual space), and the like. The data indicating the arrangement position of the boundary surface 3 in the virtual space is, for example, the condition formula of the spherical surface described above (the relationship formula which defines the spherical surface in the virtual space), and this data indicates the range where the boundary surface 3 is present in the virtual space.

The opening judgment data which indicates the opening state is, for example, two-dimensional texture data (having a rectangular shape of 2048 pixels×384 pixels, for example) which can specify an alpha value (opacity) for each point. The alpha value is a value from a minimum value of "0" to a maximum value of "1". The alpha value indicates transparency at a value of "0" and indicates opacity at a value of "1". The opening judgment data can indicate an open state at a position for which a value of "0" is stored in the opening judgment data, and a non-open state at a position for which a value of "1" is stored in the opening judgment data. The alpha value can be set for the game world image generated inside the game device 10, or for pixels on the upper LCD 22 or pixel block units consisting of a plurality of pixels. In the present embodiment, a "predetermined value greater than 0 and less than 1 (in the present embodiment a value of 0.2)" is stored for a non-open region. This data is not used when applied to the real world image. When applied to the real world image, an alpha value of "0.2" which has been stored in the open judgment data is treated as a value of "1". The alpha value of "0.2" is used when rendering a shadow ES of the enemy object EO as described above. The setting of the alpha value and the range of values that can be taken by the alpha value do not limit the image processing program of the present invention.

The image processing program according to the present embodiment is able to generate a real world image having an opening, in a first rendering method, by multiplying the region corresponding to the virtual camera imaging range, from amongst the opening judgment data, by the color information (pixel value) of the texture of the real world image attached to the boundary surface 3. Furthermore, in the second rendering method, a real world image having an opening can be generated by multiplying the alpha value of the region corresponding to the imaging range of the virtual world rendering camera, from amongst the opening judgment data, by the color information (pixel value) of the real world image (more specifically, the rendered image data of the real camera image which has been rendering by parallel projection (described below) using the aforementioned real world image data Dc). The reason for this is that the value of the color information of the real world image becomes "0" (a completely transparent state), when the alpha value "0" stored for an open position is multiplied by the color information of the real world image at that position.

In the first rendering method, as described below, an image to be displayed on the upper LCD 22 is generated by rendering a virtual space image of each virtual object including real world image objects to which the opening judgment data has been applied.

Furthermore, in the second rendering method, more specifically, a virtual space image is rendered by taking account of the opening judgment data, as described below. In other words, a priority for each virtual object with respect to the boundary surface (a priority with respect to the real world image) is judged on the basis of the opening judgment data, and a virtual space image is generated by rendering each virtual object. The image to be displayed on the upper LCD 22 is generated by synthesizing the real world image and the virtual space image which have been generated in this way.

Figure 20A:
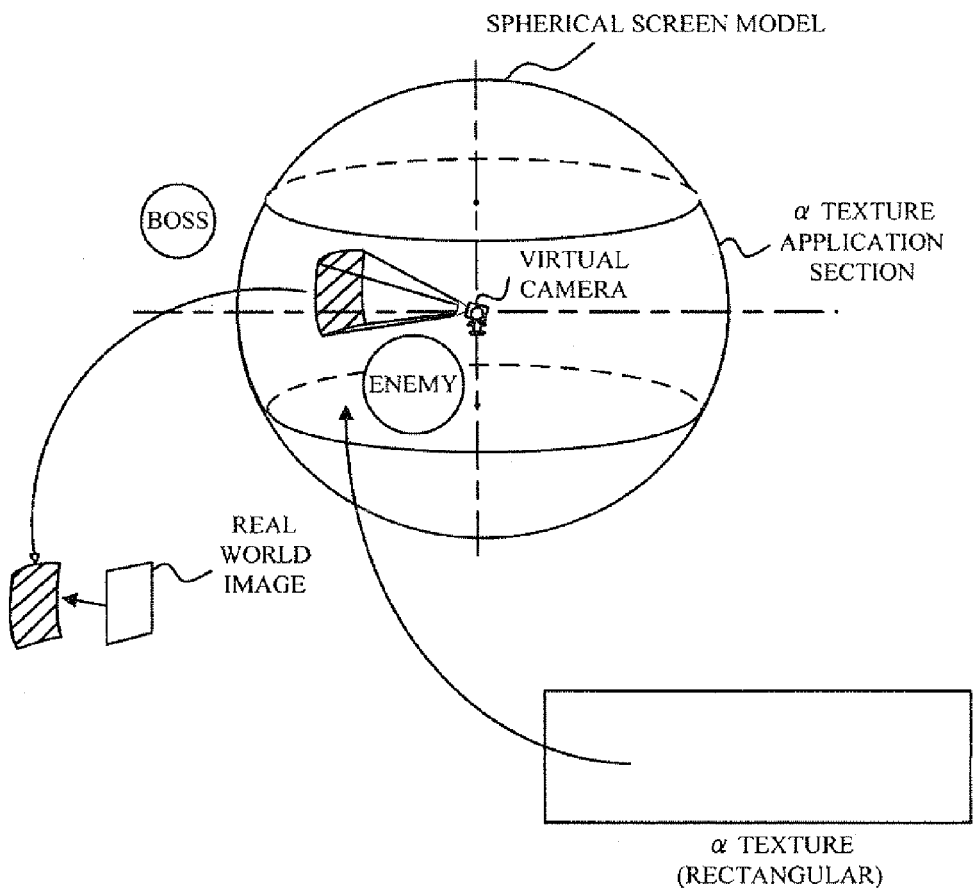
FIG. 20A shows a general outline of a virtual space which is an example of an image processing program.
Figure 20B:
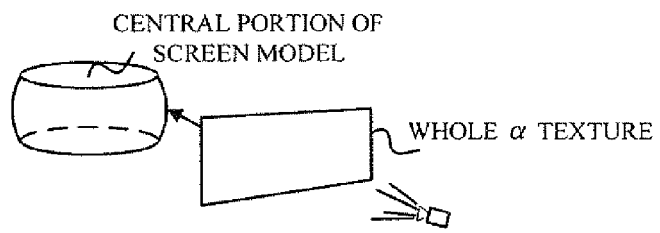
FIG. 20B is a diagram illustrating a relationship between screen model and α texture.

Furthermore, in the image processing program according to the present embodiment, the shape of the boundary surface 3 is a spherical surface (see FIG. 20A and FIG. 20B). The shape of the opening judgment data in the present embodiment may be a rectangular shape. By mapping this opening judgment data having a rectangular shape to the central portion of the spherical surface such as that shown in FIG. 20A and FIG. 20B, it is possible to associate each point in the opening judgment data with a corresponding point of the boundary surface.

In the present embodiment, the opening judgment data is only data corresponding to the central portion of the spherical surface shown in FIG. 20A, and therefore, depending on the orientation of the virtual camera (in the second rendering method, the virtual world rendering camera), there are cases where no opening judgment data exists. If there is no opening judgment data in this way, then the real world image is rendered directly, without alteration. More specifically, the image is rendered by setting the α value to "1".

The image processing for an opening which is created on the boundary surface 3 is described below.

<Back Wall Image Data De>

The back wall image data De is data relating to a back wall BW which is present in the second space 2. For example, the back wall image data De includes image data for generating an image of the back wall BW and data indicating the position in the virtual space of the polygon model which defines the back wall BW.

The polygon model defining the back wall BW is typically a model of the same shape as the central portion of the sphere shown in FIG. 20A, which has a larger radius than the radius of the sphere shown in FIG. 20A and is centered on a vertical axis extending from the position of the virtual camera (the virtual world rendering camera in the case of the second rendering method). In other words, the model defining the back wall BW includes the boundary surface 3. Furthermore, it may also be a planar polygon which is disposed behind a predicted position of an opening formed in the boundary surface 3. Furthermore, it is also possible to arrange a planar polygon defining a projected surface of the opening in the second space 2, each time an opening is formed in the boundary surface 3.

The image data (texture) which is attached to the polygon model of the back wall BW may be any data. However, this image data represents another space which is located behind the real world image (a second space 2), and therefore it is desirable for this image data to be an image which represents an unreal situation, such as an image showing outer space, the sky, or an underwater scene, since this can evoke a sense of mystery for the player, as if there were an unreal space beyond the real space. For instance, if the game according to the present embodiment is played in a room, then it is possible to create a sense of there being an unreal space beyond the room. Moreover, the texture of the back wall BW may also depict a background scene that the player is not liable to see, such as sand or grass. In this way, by selecting the texture of the back wall BW, it is possible to make the player aware of a desired image relating to another world which is hidden behind the real image depicted as a background of the game world.

Furthermore, for example, if the image data is an image which can be depicted repeatedly, such as an image of outer space, or the like, then the data size of the image data (texture) can be reduced. Moreover, if the image data is an image of this kind, then it is possible to render an image of the back wall BW even if the position where the back wall BW is to be rendered in the virtual space is not specified. This is because if the image data is an image which can be depicted repeatedly, then the rendered image does not depend on the position (a repeated pattern can be depicted over the whole of the polygon model).

In the present embodiment, since the rendering priority described below is determined on the basis of the alpha value, then an alpha value is determined for this image data. In the present embodiment, the alpha value determined for the image data is "1".

<Enemy Object Data Df>

The enemy object data Df is data relating to an enemy object EO and includes solid data Df1, silhouette data Df2 and opening shape data Df3.

The solid data Df1 is data for rendering a solid enemy object EO, and includes, for example, a polygon model which defines the three-dimensional shape of the solid body of the enemy object EO, and texture data for mapping to this polygon model. This texture data may be a photograph of the user's face, for example, which has been captured by one of the imaging units of the game device 10. In the present embodiment, since the priority of rendering described below is determined by the alpha value, then an alpha value is determined for the texture data. In the present embodiment, the alpha value determined for the texture data is "1".

Figure 27A:
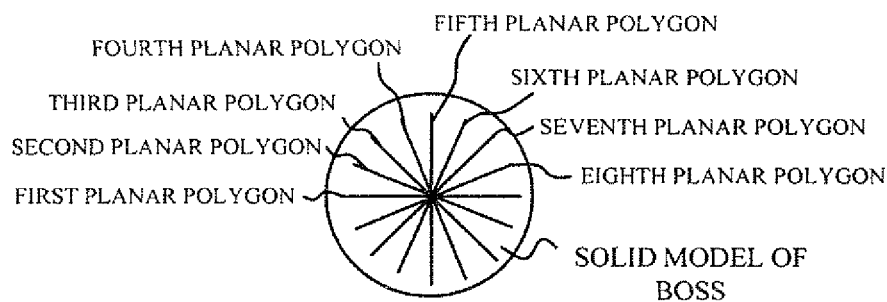
FIG. 27A is a diagram illustrating an example of a silhouette model of a shadow object as viewed from the above.
Figure 27B:
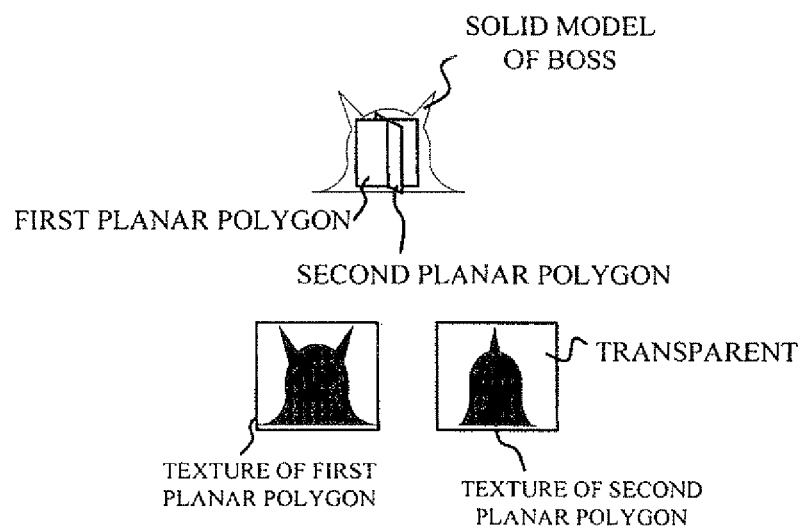
FIG. 27B is a diagram illustrating an example of a silhouette model of a shadow object.

The silhouette data Df2 is data for rendering a shadow of an enemy object EO which is present in the second space 2 as a semi-transparent image on the real world image, and includes a polygon model and texture data which is attached to the polygon model. For example, this silhouette model includes eight planar polygons, as stated above, and is arranged at the same position as the position of the enemy object EO which is situated in the second space 2. It is possible to depict a shadow of an enemy object EO which is situated in the second space 2 by imaging a silhouette model to which this texture has been attached with a virtual world rendering camera and rendering the silhouette model as semi-transparent, or the like, on the real world image. Furthermore, the texture data of the silhouette data Df2 may comprise images of the enemy object EO viewed from respective directions, as shown in FIG. 27A and FIG. 27B, for example, (such as eight planar polygons). Moreover, this image may be an image in which the silhouette model of the enemy object EO is simplified. In the present embodiment, since the rendering priority described below is determined on the basis of the alpha value, then an alpha value is determined for the texture data which is attached to the silhouette model. In the present embodiment, the alpha value determined for the texture data is "1" for a shadow image portion and is "0" for a portion where there is no shadow image (peripheral portion).

The opening shape data Df3 is data relating to the shape of an opening created in the boundary surface 3 when an enemy object EO moves between the first space 1 and the second space 2. In the present embodiment, the opening shape data Df3 is data for setting an alpha value of "0" at a position in the opening judgment data which corresponds to a position on the boundary surface 3 where an opening is created. For example, the opening shape data Df3 is texture data having an alpha value of "0" which is matched to the shape of the opening created. In the present embodiment, the alpha value is set to "0" in the opening judgment data, in accordance with the shape of the opening shape data Df3 and centered on a location corresponding to the position where the enemy object EO has passed through the boundary surface 3. The image processing carried out when an enemy object EO creates an opening in the boundary surface 3 is described below.

<Bullet Object Data Dg>

The bullet object data Dg is data relating to a bullet object BO which is fired in accordance with an attack operation by the player. For example, the bullet object data Dg includes a polygon model and bullet image (texture) data for rendering a bullet object BO, data indicating the direction of arrangement and position of arrangement of the bullet object BO, data indicating the velocity of movement and the direction of movement of the bullet object BO (for example, a movement velocity vector), and the like. In the present embodiment, since the rendering priority described below is determined by the alpha value, then an alpha value is determined for this bullet image data. In the present embodiment, the alpha value determined for the bullet image data is "1".

<Points Score Data Dh>

The points score data Dh is data indicating a points score of a game in which enemy objects EO appear. For example, as stated above, game points are added when an enemy object EO is defeated by an attack operation, and game points are deducted if an enemy object EO reaches the user's position (in other words, the arrangement position of the virtual camera in the virtual space).

<Movement Data Di>

The movement data Di is data which indicates movement of the game device 10 in the real space. For example, the movement of the game device 10 is calculated from the angular velocity determined by the angular rate sensor 40.

<Virtual Camera Data Dj>

The virtual camera data Dj is data relating to a virtual camera arranged in the virtual space. In the first rendering method, for example, the virtual camera data Dj includes data indicating the arrangement direction and arrangement position in the virtual space of the virtual camera. Furthermore, in the second rendering method, for example, the virtual camera data Dj includes respective data indicating an arrangement direction and arrangement position in the virtual space of the real world rendering camera, and data indicating an arrangement direction and arrangement position in the virtual space of the virtual world rendering camera. For example, the data indicating the arrangement direction and arrangement position in the virtual space of the virtual camera in the first rendering method and the virtual world rendering camera in the second rendering method changes with the movement of the game device 10 (angular velocity) which is indicated by the movement data Di. Moreover, the virtual camera data Dj includes the picture angle (imaging range) data of the virtual camera. By this means, the imaging range on the boundary surface 3 (the imaging position) changes with variation in the position and orientation of the virtual camera in the first rendering method and of the virtual world rendering camera in the second rendering method.

<Rendered Image Data Dk>

The rendered image data Dk is data relating to an image which has been rendered by the processing described below.

In the first rendering method, since the real world image is rendered as an object in a virtual space, then the rendered image data Dk includes rendered image data for a virtual space. The rendered image data for the virtual space is data indicating a virtual world image which is obtained by rendering an enemy object EO, a bullet object BO, a boundary surface 3 (screen object) to which a real world image is attached as texture, and a virtual space in which a back wall BW is situated, by perspective projection by a virtual camera.

On the other hand, in the second rendering method, since the real world image and the virtual world image are rendered by separate virtual cameras, then the rendered image data Dk includes rendered image data of the real camera image and rendered image data of the virtual space. The rendered image data of the real camera image is data which indicates a real world image that is obtained by rendering a planar polygon onto which texture of a real camera image is mapped, by parallel projection by a real world rendering camera. The rendered image data of the virtual space is data indicating a virtual world image which is obtained by rendering an enemy object EO, a bullet object BO, a boundary surface 3, and a virtual space in which a back wall BW is situated, by perspective projection by a virtual world rendering camera.

<Display Image Data Dl>

The display image data Dl is data indicating a display image which is displayed on the upper LCD 22. In the first rendering method, for example, the display image to be displayed on the upper LCD 22 is generated by a virtual space rendering process. Furthermore, in the second rendering method, for example, the display image to be displayed on the upper LCD 22 is generated by synthesizing the rendered image data of the camera image described above and the rendered image data of the virtual space, by the method described below.

<Pointing Cursor Image Data Dm>

The pointing cursor image data Dm is image data for a pointing cursor AL which is displayed on the upper LCD 22. The image data may be any data.

In the present embodiment, the data relating to each object used in rendering (the boundary surface data Dd, back wall image data De, solid body data Df1, silhouette data Df2, bullet image data) includes priority information which determines a rendering priority. In the present embodiment, an alpha value is used for the priority information. The relationship between the alpha value and the image processing is described below.

Furthermore, in the present embodiment, data relating to each object used in rendering includes data indicating whether or not to carry out depth judgment between the respective objects. As stated above, this data is set in such a manner that depth judgment is enabled respectively between an enemy object EO, a bullet object BO, a semi-transparent enemy object, an effect object, and a screen object (boundary surface 3). Furthermore, the data is set in such a manner that depth judgment is enabled respectively "between a shadow planar polygon (silhouette data Df2) and an enemy object EO (solid body data Df1)", "between a shadow planar polygon (silhouette data Df2) and a bullet object BO", "between a shadow planar polygon (silhouette data Df2) and a semi-transparent enemy object", and "between a shadow planar polygon (silhouetted data Df2) and an effect object". Moreover, this data is set in such a manner that depth judgment is disabled between a shadow planar polygon (silhouette data Df2) and a screen object (boundary surface data Dd).

<Management Data Dn>

Management data Dn is data for managing data to be processed by the game device 10 or data accumulated by the game device 10, such as the collected face images. The management data Dn includes face image management information Dn1 and face image attributes summary sheet Dn2, for example. There are stored, in the face image management information Dn1, data storage destination for each of the face images (e.g. the address of the main memory 32), acquisition source of the face image (e.g. the inside imaging unit 24 or the outside imaging unit 23), attributes of the face image (e.g. gender and age of the subject of the face image), and information on other face images associated with the face image. There is stored, in the face image attributes summary sheet Dn2, the number of face images currently collected by the user for each of the attributes. Specifically, for example, when the subjects of the collected face images are classified by gender or age groups, the number of collected faces images for each classification is stored. Data structures of the face image management information Dn1 and face image attributes summary sheet Dn2 will be described later.

<Saved Data Storage Area Do>

The saved data storage area Do is an area to store data to be processed by the information processing unit 31 and data obtained as a result of the processing by the information processing unit 31 when an image processing program such as a game program is executed. For example, in the game device 10 according to the present embodiment, data of face images acquired by the game device 10 is stored in the saved data storage area Do by way of the inside imaging unit 24, the outside imaging unit 25, the wireless communication module 36, and the local communication module 37. Specifically, for example, in the game device 10 according to the present embodiment, the information processing unit 31 executes the first game with the acquired face images being temporarily stored in the main memory 32. Then, according to the user's operation, the information processing unit 31 stores, in the saved data storage area Do, the face images temporarily stored in the main memory 32 if it is determined that the user succeeds in the first game. Thus, the face images stored in the saved data storage area Do become available in subsequent game processing.

Configuration of the saved data storage area Do is not limited particularly. For example, the saved data storage area Do may be located in the same physical address space as a regular memory so that the saved data storage area Do is accessible from the information processing unit 31. Alternatively, the saved data storage area Do may be configured such that the information processing unit 31 is able to secure (or allocate) the same in predetermined block units or page units whenever necessary. Further, the saved data storage area Do may be configured such that it is connected by means of management information such as information on points to connect blocks, in the same manner as a computer file system.

Further, the saved data storage area Do may be configured such that an individual area is secured for each program executed by the game device 10. Accordingly, the saved data storage area Do may be configured such that, one game program is loaded into the main memory 32, the information processing unit 31 is able to access (input data to or output data from) the saved data storage area Do based on the management information of the game program.

Still further, the saved data storage area Do for one program may be configured to be accessible from the information processing unit 31 which is executing another program. In this manner, data processed by one program can be transferred to another program. For example, the configuration may be such that data of the face images stored in the saved data storage area Do as a result of the executed first game to be described later is retrieved by the information processing unit 31 which is executing the second game in order to generate character objects. It should be understood that the saved data storage area Do is an example of the second storage area.

<Structure of Various Data>

Figure 12:
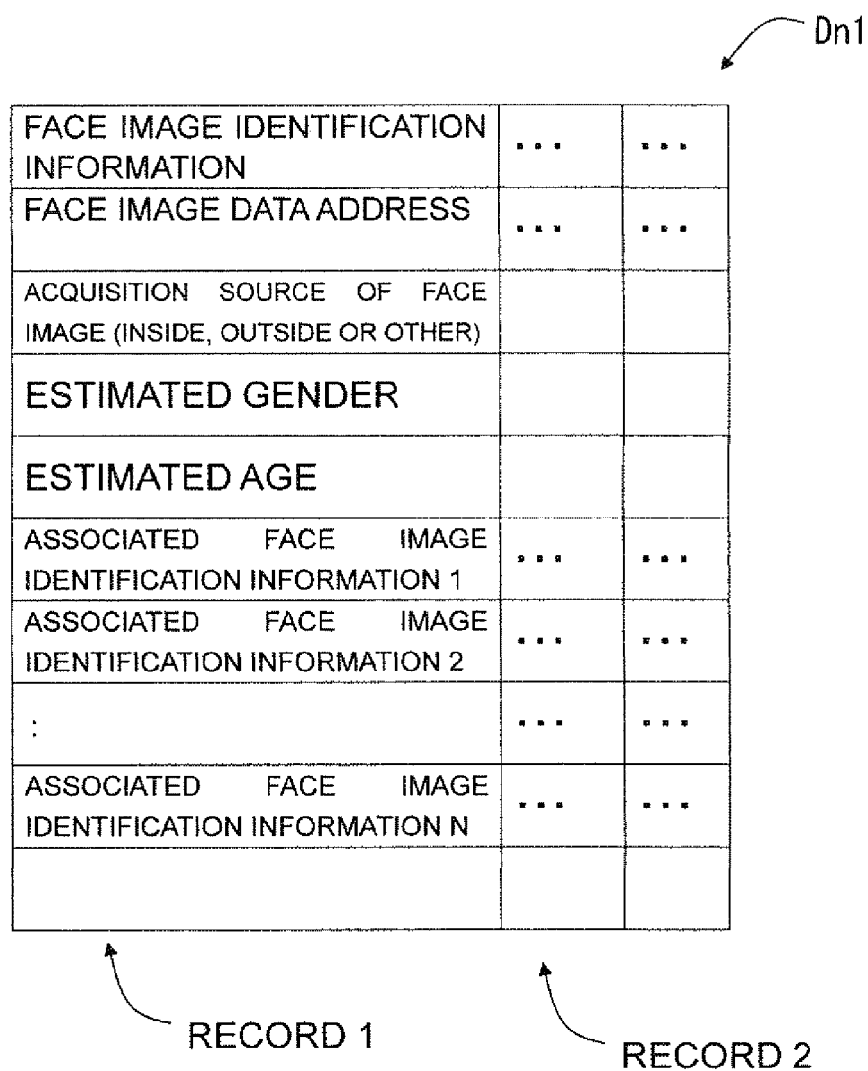
FIG. 12 illustrates an example of a data structure of face image management information.

Referring to FIGS. 12 and 13, an example of a structure of data for managing face images in the game device 10.

FIG. 12 illustrates an example of a data structure of the face image management information Dn1 for managing face images stored by the game device 10. The game device 10 is enabled to display a list of face images as those shown in FIGS. 7 and 8 on the screen of the upper LCD 22 by recording data of the stored face images in the face image management information Dn1. The face image management information Dn1 is generated as information one record of which is prepared for each face image. The image management information Dn1 is stored for example in the internal data storing memory 35 or the external data storing memory 46. In FIG. 12, the record 1 indicates examples of record elements, while in FIG. 12, particulars of the records 2 and onwards are omitted. Although not shown in the figures, the information processing unit 31 may store the total number of records of the face image management information Dn1, that is the total number of acquired face images in the internal data storing memory 35 or the external data storing memory 46.

In the example shown in FIG. 12, the face image management information Dn1 has, for example, face image identification information, address of face image data, acquisition source of the face image, estimated gender, estimated age, associated face image information 1 to N, and so on. However, the face image management information Dn1 is shown in FIG. 12 by way of example only, and the face image management information is not limited to the elements shown in FIG. 12.

The face image identification information is information for uniquely identifying each of the stored face images. The face image identification information may be a serial number, for example.

The face image data address is for example an address of the internal data storing memory 35 or the external data storing memory 46 where the face image data is stored. However, if the face image data is to be stored in a storage medium having a file system by the relevant OS (operating system), the face image data address may be a path name or file name in the file system.

The face image acquisition source is, for example, information for identifying the imaging device which has acquired the face image. For example, information for identifying the inside imaging unit 24, the outside left imaging unit 23a, and the outside right imaging unit 23b is set as the face image acquisition source. However, when both of the outside left imaging unit 23a and the outside right imaging unit 23b are used to acquire the face image, information indicating the both is set. Further, when the face image is acquired by other photographing device outside the game device 10, instead of the inside imaging unit 24, the outside left imaging unit 23a, or the outside right imaging unit 23b, information indicating that effect (e.g. "other") is set as the face image acquisition source. When it is stated herein that a face image is acquired by other photographing device outside the game device 10, it means for example that an image imaged by other game device 10 similar to but separate from the game device 10 is acquired through the external memory interface 33, the wireless communication module 36, and the local communication module 37. It is also the case when an image captured by a camera other than the game device 10, an image captured by a scanner, or a video image captured by video equipment is acquired through the external memory interface 33 and the wireless communication module 36.

The estimated gender is information indicating whether the relevant face image is of a male or female. The estimation of gender may be carried out according to procedures described later in relation to another embodiment of the invention. The estimated age is information indicating the age of the person of the face image. The estimation of age may be carried out according procedures described later in relation to another embodiment of the invention.

The associated image identification information 1 to N is information indicating other face images associated with the relevant face image. For example, face image identification information for a maximum of N associated other face images may be set in the associated image identification information 1 to N. The associated other face images may be specified by the user's operation on the GUI. Specifically, for example, when a face image is newly acquired, one or more face images associated with the acquired face image are selected by the user manipulating the operation button 14 or the like, and then the information processing unit 31 detects operation of the GUI to instruct setting of the associated images. Alternatively, the acquired face images may be simply classified into groups prepared by the game device 10, such as the user himself/herself, friends, colleagues, and strangers, so that face images belonging to the same group are linked through the associated image identification information 1 to N. If the face images are classified using the groups prepared by the game device 10, an element called "face image groups" is provided instead of preparing the entry of the associated face image identification information 1 to N, so that the user himself/herself, friends, colleagues, and strangers are set therein. Although in FIG. 12, the number of items of the associated image identification information is set to a fixed value of 1 to N, the value of N may be a variable value. In this case, the set value of N may be held in the face image management information Dn1. Further, records in the face image management information Dn1 may be interconnected through a pointer chain among the associated face images.

FIG. 13 illustrates an example of a data structure of the face image attributes summary sheet Dn2. The face image attributes summary sheet Dn2 consists of a table in which acquired face images are classified based on attributes, and numbers of classified images are tallied. In the following description, the face image attributes summary sheet Dn2 shall also be referred to simply as the summary sheet. The information processing unit 31 stores the summary sheet as shown in FIG. 13 in the internal data storing memory 35, the external data storing memory 46, or the like. In the example shown in FIG. 13, the summary sheet stores the numbers of acquired face images in the rows classified by combinations of gender (male and female) and age groups (under 10, 10's, 20's, 30's, 40's, 50's, 60's, and over 70). This means that each row in the table of FIG. 13 includes elements of gender, age, and number of acquired face images. In the column of the number of acquired face images, the acquired face images are classified and the respective numbers of the acquired face images are tallied. However, the groups or attributes of the face images are not limited to gender and age groups as shown FIG. 13.

<Example of Processing Flow>

Referring to FIGS. 14 to 19, description will be made of an example of operation according to an image processing program executed by the information processing unit 31 of the game device 10. First, the power source (the power button 14F) of the game device 10 is turned ON, whereupon a boot program (not shown) is executed by the CPU 311 so that a program stored in the integrated memory, or the external memory 45 or external data storing memory 46 is deployed in the main memory 32 in a format executable by the CPU 311. The term "format executable by the CPU 311" as used herein means a format, for example, in which machine instructions of the CPU 311 are described in a predetermined sequence of processing, and arranged at adequate addresses in the main memory 32 so that they can be retrieved by a control unit in the CPU 311 for processing the machine instructions. The program deployment in the executable format may be simply referred to as program loading. It should be noted that in FIGS. 14 to 19, illustration of processing not directly relating to the first embodiment is omitted.

Figure 14:
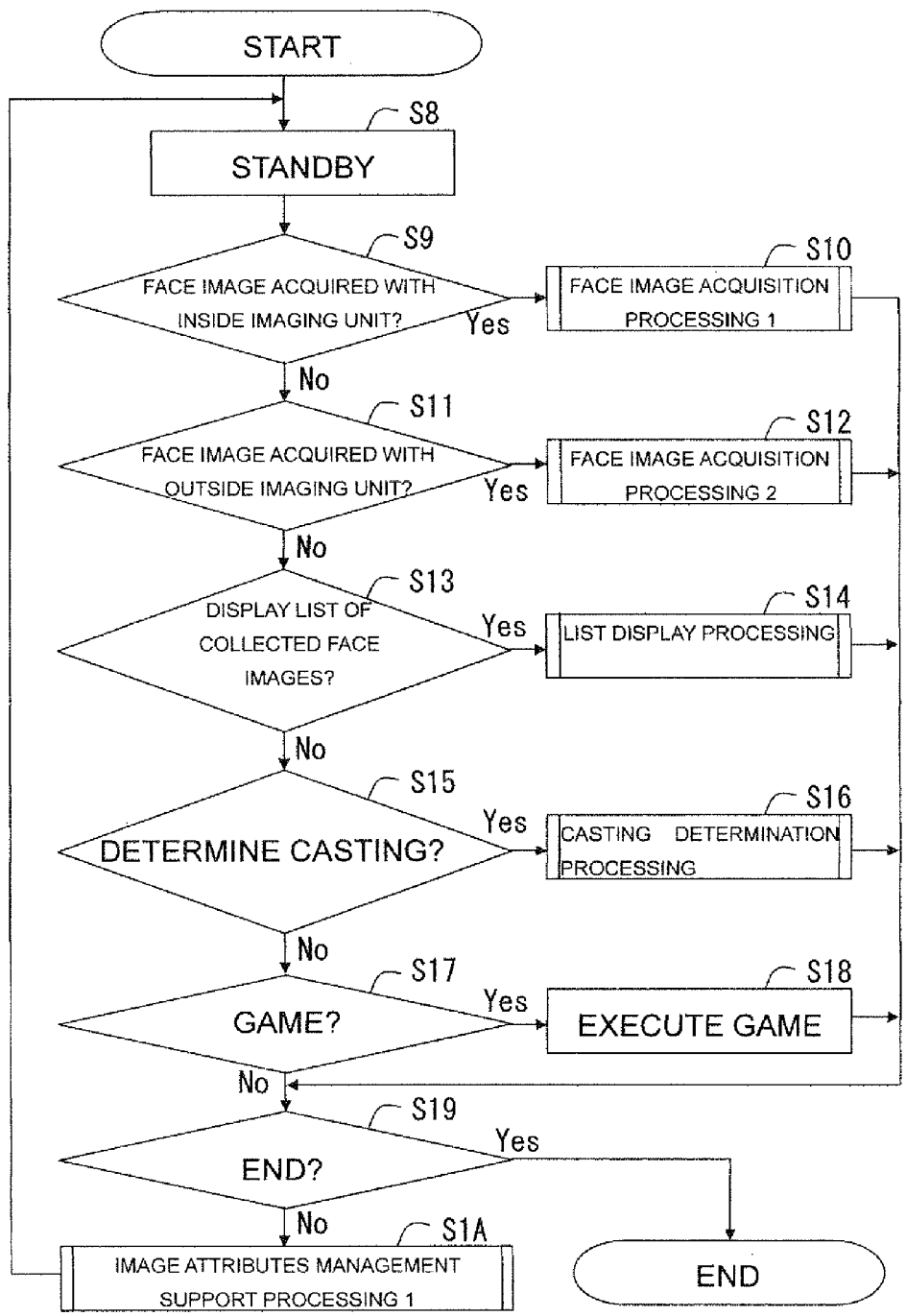
FIG. 14 is a flowchart illustrating an example of operation of a game device 10 according to a first embodiment of the invention.

FIG. 14 is a flowchart illustrating an example of operation performed by the information processing unit 31. After a series of processing steps after the power is turned ON, the information processing unit 31 executes processing shown in FIG. 14 upon detecting an operation by the user on a graphical user interface (hereafter, referred to as the GUI) displayed on the lower LCD 12, for example by way of manipulation on the touch screen 13 displaying a menu or graphic objects such as icons or manipulation of the operation button 14. Hereafter, the operation by the user on the GUI through the touch screen 13 or the operation button 14 shall be simply referred to as "the operation on the GUI". In the example shown in FIG. 14, the information processing unit 31 assumes a standby state waiting for operation by the user (step 8). In the flowcharts, "step" shall be abbreviated as "S".

Upon detecting the operation by the user, the information processing unit 31 executes processing of steps 9 and onwards. Specifically, for example, if the user's operation on the GUI is "to instruct acquisition of a face image with the inside imaging unit 24" (Yes in step 9), the information processing unit 31 executes face image acquisition processing 1 (step 10). The term "to instruct acquisition of a face image with the inside imaging unit 24" as used herein means to instruct to image with the inside imaging unit 24 by the user's operation on the GUI or the like. The information processing unit 31 then advances the control to step 19. The face image acquisition processing 1 will be described later in detail with reference to FIG. 15. In contrast, if the user's operation on the GUI is not "to instruct acquisition of a face image with the inside imaging unit 24" (NO in step 9), the information processing unit 31 then advances the control to step 11.

Next, if the user's operation on the GUI is "to instruct acquisition of a face image with the outside imaging unit 23" (Yes instep 11), the information processing unit 31 executes face image acquisition processing 2 (step 12). After that, the information processing unit 31 advances the control to step 19. The term "to instruct acquisition of face image with the outside imaging unit 23" as used herein means to instruct to image with the outside imaging unit 23 by the user's operation on the GUI or the like. The face image acquisition processing 2 will be later described in detail with reference to FIG. 16. In contrast, if the user's operation on the GUI is not "to instruct acquisition of face image with the outside imaging unit 23" (No in step 11), the information processing unit 31 advances the control to step 13.

Next, if the user's operation on the GUI is to instruct to display a list of collected face images (Yes in step 13), the information processing unit 31 executes list display processing (step 14). After that, the information processing unit 31 advances the control to step 19. The list display processing will be later described in detail with reference to FIG. 17. In contrast, if the user's operation on the GUI is not to instruct to display a list of collected face images (No in step 13), the information processing unit 31 advances the control to step 15.

If the user's operation on the GUI is to instruct to determine casting (Yes in step 15), the information processing unit 31 executes casting determination processing (step 16). After that, the information processing unit 31 advances the control to step 19. The casting determination processing will be later described in detail with reference to FIG. 18. In contrast, if the user's operation on the GUI is not to instruct to determine casting (No in step 15), the information processing unit 31 advances the control to step 17.

If the user's operation is to instruct execution of a game (Yes in step 17), the information processing unit 31 executes the game (step 18). The processing in step 18 is an example of a second game processing step. The game device 10 executes game processing in which various character objects including the enemy object EO generated in the casting determination processing in step 16 appear. The game is not limited to any particular type of game. For example, the game executed in step 18 may be a battle game in which the user battles against the enemy object EO generated in the casting determination processing. In this case, the user battles against the enemy object EO of the face image collected by the face image acquisition processing 1 of step 10 and the face image acquisition processing 2 of step 12, and displayed by the list display processing of step 14. Alternatively, the game executed in step 18 may be an adventure game in which a player object representing the user moves forward, overcoming various barriers and obstacles. Further, the game may be a simulation game, such as a war simulation game in which historical characters appear, a business simulation game in which the player object appears, or a driving simulation game in which the player object appears and drives a vehicle or the like. Further, the game may be a novel game based on an original novel, in which the character objects appear. The game may be a roll-playing game (RPG) in which the user operates a central character and other characters to enjoy playing those characters. Further, the game may be a game in which the user receives some sort of training with assistance from an agent appearing in the game.

The face images collected by the user succeeding in the first game in step 10 are pasted on the character objects appearing in such game processing by means of a texture mapping technique or the like. Therefore, the character objects appearing in the game executed in step 18 contain the face images collected by the user himself/herself. This allows the user to play a game, using the face images, which are images of body parts which well represent persons or living creatures, for various character objects. Therefore, the user is allowed to play the game reflecting the relationship with the persons (or the living creatures) of the face images in the real world. For example, the user is allowed to play a game which is full of positive emotions and feelings such as love, affection, friendliness, and negative ones such as hatred.

On the other hand, if the user's operation is not to instruct execution of the game (No in step 17), the information processing unit 31 advances the control to step 19.

The information processing unit 31 then determines whether or not the processing is to be terminated. The information processing unit 31 terminates the processing of FIG. 14 if it detects an instruction to terminate the processing through the GUI. In contrast, if the information processing unit 31 detects an instruction not to terminate the processing through the GUI (e.g. instruction to re-execute), the information processing unit 31 executes image attributes management support processing 1 (step 1A). The face image management support processing 1 is processing to assist the user to acquire face images by providing the user with information on attributes of the face image to be acquired next, on the basis of the face images already acquired. An example of detailed procedure of the image attributes management support processing 1 will be described later with reference to FIG. 19A. After that, the information processing unit 31 returns the control to step 8.

Figure 15:
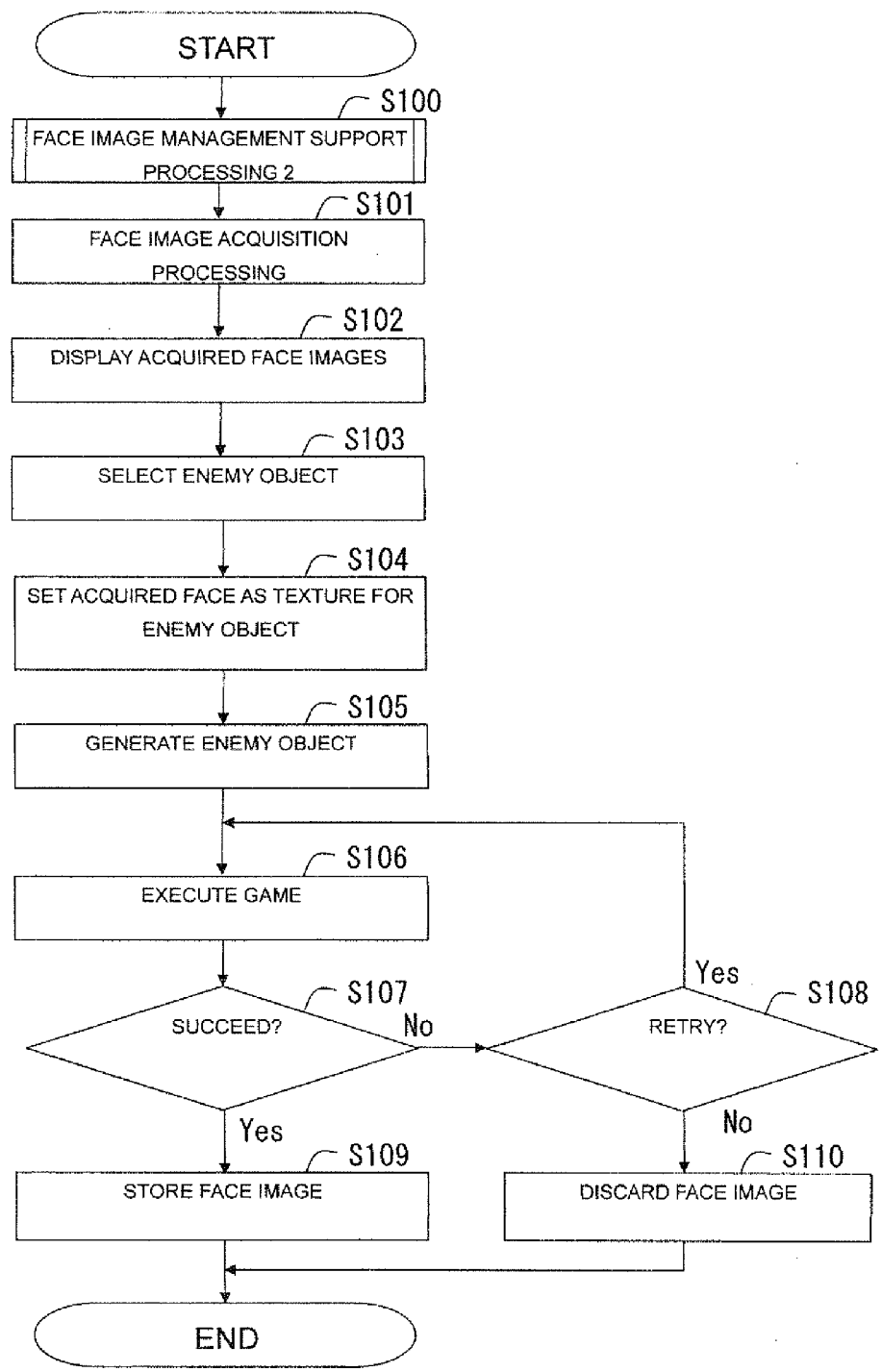
FIG. 15 is a flowchart illustrating an example of detailed procedure of face image acquisition processing.

FIG. 15 is a flowchart illustrating an example of detailed procedure of the face image acquisition processing 1 (step 10 of FIG. 14). In this processing, the information processing unit 31 firstly executes face image management support processing 2 (step 100). The face image management support processing 2 is processing to assist the user to acquire face images by providing the user with information on attributes of face images to be acquired based on face images already acquired. An example of detailed procedure of the face image management support processing 2 will be described later with reference to FIG. 19B.

Then, the information processing unit 31 executes face image acquisition processing (step 101). The CPU 311 of the information processing unit 31 executes the processing of step 101 as an example of image acquisition means.

The information processing unit 31 retrieves the images captured by the inside imaging unit 24, the outside left imaging unit 23a, or the outside right imaging unit 23b, in predetermined cycles, and displays them on the upper LCD 22. The display cycle in this case may be the same as the processing unit time used in the game device 10 (e.g. ⅟₆₀ seconds), or may be shorter than the unit time. The information processing unit 31 displays, for example, an image from the inside imaging unit 24 on the upper LCD 22 in the initial state directly after the game device 10 is powered-on and the image processing program is loaded, or directly after the processing of FIG. 14 is started. The lower LCD 12 is provided with an imaging unit selection GUI for selecting from the inside imaging unit 24, the outside left imaging unit 23a, and the outside right imaging unit 23b (including selecting both the outside left imaging unit 23a and the outside right imaging unit 23b). In the processing of FIG. 15, the user is allowed by the imaging unit selection GUI to freely switch the imaging unit to be used. In the following description, no matter which of the inside imaging unit 24, the outside left imaging unit 23a, and the outside right imaging unit 23b is selected by the user's operation in the initial state or the user's operation on the imaging unit selection GUI, the one used for imaging shall be simply referred to as the imaging unit.

For example, when the inside imaging unit 24 is used, the user's face will be displayed on the upper LCD 22 when the user faces the inner surface 21B of the upper housing 21 with the upper housing 21 being open. If the user presses the R-button 14H (or the L-button 14G), for example, the information processing unit 31 acquires, as data, the image from the inside imaging unit 24 displayed on the upper LCD 22, and temporarily stores the data in the main memory 32. At this point, this image data exists only on the main memory 32, and is not stored in the saved data storage area Do to be described later. The data on the main memory 32 can be utilized only in a game executed in step 106 to be described later, and will be discarded if the game is terminated without the user succeeding in this game, as described later. The main memory 32 is an example of the first data storage area.

In the processing according to the present embodiment, the game is executed by texture mapping a face image acquired in step 101 on the face part of the enemy object EO or the like. Therefore, in the image acquisition processing of step 101, the image acquired from the imaging unit is preferably trimmed to leave only its face image. In the present embodiment, the following processing procedures for example are performed.

(1) The information processing unit 31 detects the face outline in an acquired image. The face outline is estimated based the distance between eyes and the positional relationship between eyes and mouth. Specifically, the information processing unit 31 recognizes, based on the layout of eyes and mouth, the boundary between the face outline and the background, using standard facial dimensions. The boundary can be obtained by combining conventional image processing methods such as a differential processing method (outline emphasis) and an average processing method (leveling computation). The detection of the facial outline can be performed by any other known method.

(2) The information processing unit 31 enlarges or reduces the size of the acquired face image to adjust the same to the size of the face of the head shape of the enemy object EO. According to this processing, even face images which are different in size to some extent can be acquired by the game device 10 and pasted on the enemy object EO.

The processing for acquiring face images by the game device 10 according to the present embodiment is not limited to the procedures as described above. For example, a face image of a target size may be acquired by an imaging unit instead of acquiring an image of an arbitrary size from an arbitrary distance. For example, a face image may be captured after the distance from the imaging unit to the subject is established such that the distance between eyes of the face image obtained from the subject is close to a predetermined number of pixels. The choice of the distance to the subject may be guided by the information processing unit 31. Further, after the distance to the subject has been established, the information processing unit 31 may guide the subject person or the user who takes the image so as to adjust the angle of the subject face to the optical axis of the imaging unit. Further, the information processing unit 31 may be designed to store the image upon determining that the adjustment of the distance to the subject and the angle of the face to the optical axis of the imaging unit has been completed, instead of storing the image by the user pressing the R-button 14H (or the L-button 14G). For example, the information processing unit 31 may be designed to display marks on top of the face image of the subject on the upper LCD 22, so that these marks indicate target positions for positional adjustment of the eyes and mouth. Thus, the information processing unit 31 stores the image in the memory once the positions of the eyes and mouth of the subject image acquired by the imaging unit are located within a predetermine allowance range from the marks corresponding to the target position of eyes and mouth.

The information processing unit 31 updates the number of acquired face images in the corresponding row of the face image attributes summary sheet Dn2 of FIG. 13 every time an image is acquired in step 101. The term "the corresponding row" refers to, for example, a row for the attributes corresponding to the gender and the age estimated in step 1002 of FIG. 19B to be described later.

The information processing unit 31 then displays the image acquired by the processing in step 101 on the upper LCD 22, for example (step 102).

Subsequently, the information processing unit 31 executes processing for selecting an enemy object EO (step 103). In this example, the information processing unit 31 prompts the user to select a head shape for the enemy object EO. For example, a list of head shapes as shown in FIG. 9 may be displayed and selection of the user may be received through the GUI. Then, the information processing unit 31 texture-maps the acquired face image onto the enemy object EO (step 104), whereby the enemy object EO is generated (step 105). The enemy object generated in step 105 is an example of the first character object. The information processing unit 31 executes the processing of step 105 as an example of means for producing a character object.

Then, the information processing unit 31 executes a game using the enemy object EO thus generated (step 106). The CPU 311 of the information processing unit 31 executes the processing of step 106 as an example of first game processing means. The game here may be of any type. For example, the game may be a game simulating a battle against the enemy object EO. The game may be one in which the user competes with the enemy object EO in scoring points. After the execution of the game, the information processing unit 31 determines whether or not the user succeeds in the game (step 107). The information processing unit 31 executes processing of step 107 as an example of means for determining whether the user succeeded or not. The term "the user succeeds in the game" means that the user defeated the enemy object EO in a game in which the user battles against the enemy object EO, for example. The term "the user succeeds in the game" also means that the user has scored higher than the enemy object EO in a game in which the user competes with the enemy object EO in scoring points, for example. The term "the user succeeds in the game" may also mean that the user has successfully reached the goal in a game in which the user overcomes barriers or obstacles placed by the enemy object EO.

There may be introduced in the game in step 106, not only the character objects including the face images acquired in step 101, but also other character objects generated by using face images collected in the past. For example, the user is allowed to play a game reflecting the human relationship in the real world by introducing character objects generated by pasting face images collected in the past onto the enemy object EO or objects on the user's side.

If the user succeeds in the game, the information processing unit 31 stores the above-described data of the face images on the main memory 32 acquired in step 101, in the saved data storage area Do of the game in addition to the face image data stored before (step 109). The CPU 311 of the information processing unit 31 executes the processing in step 109 as an example of data storing means. The saved data storage area Do of the relevant game is a storage area provided in a memory which is readable and writable by the information processing unit 31 executing the game, for example the internal data storing memory 35 or the external data storing memory 46. Once data of a face image is newly stored in the saved data storage area Do of the relevant game, the information processing unit 31 executing the game is thereby enabled to display the new face image data on the screen of the upper LCD 22 in addition to the list of the face images described in relation to FIG. 7 and FIG. 8. Thus, according to the processing of FIG. 15, the user plays a game (first game) in order to store the face images acquired in step 101 in the saved data storage area Do of the game. When the user introduces, in this game, character objects using the face images which the user has stored in the saved data storage area Do, the user playing the game with the game device 10 is thereby allowed to collect and add new face images to those in the saved data storage area Do while reflecting the human relationship in the real world.

In this procedure, the information processing unit 31 newly generates the face image management information Dn1 illustrated in FIG. 12 in order to manage the face image stored in the saved data storage area Do of the relevant game and stores the generated information in the internal data storing memory 35 or the external data storing memory 46. This means that the information processing unit 31 newly generates face image identification information and sets it in a record of the face image management information Dn1. Further, the information processing unit 31 newly sets an address of the face image stored in the saved data storage area Do of the game, as the face image data address. Further, the information processing unit 31 sets acquisition source, estimated gender, and estimated age of the face image, and identification information 1 to N on the associated face images.

The information processing unit 31 may be designed to estimate attributes of the face image added to the saved data storage area Do, and to update the tally results in the face image attributes summary sheet Dn2 described in FIG. 13. Specifically, the information processing unit 31 may be designed to newly estimate the age and gender of the face image added to the saved data storage area Do so that the estimation is reflected in the tally results in the face image attributes summary sheet Dn2.

Further, the information processing unit 31 may be designed to allow the user to duplicate or change the data stored in the saved data storage area Do of the game, or to transfer the data through the wireless communication module 36. The information processing unit 31 may save, duplicate, change, or transfer the face image stored in the saved data storage area Do according to the user's operation on the GUI or manipulation of the operation button 14.

If the user does not succeed in the game, the information processing unit 31 inquires the user whether or not he/she wishes to retry the game (step 108). Specifically, for example, the information processing unit 31 displays a message on the upper LCD 22 to inquire whether the user wishes to retry the game or not, and receives the user's selection indicated by the user's operation on the GUI (Yes or No icon, or menu) through the touch screen 13 of the lower LCD 12, or by the user's manipulation of the operation button 14. If the user instructs to retry the game, the information processing unit 31 returns the control to step 106. In contrast, if the user does not instruct to retry the game, the information processing unit 31 discards the face images acquired in step 101 (step 110), and terminates the processing. The information processing unit 31 may be designed to discard the face images acquired in step 101, if the user does not succeed in the game, without waiting for the user's instruction about retry in step 108.

Figure 16:
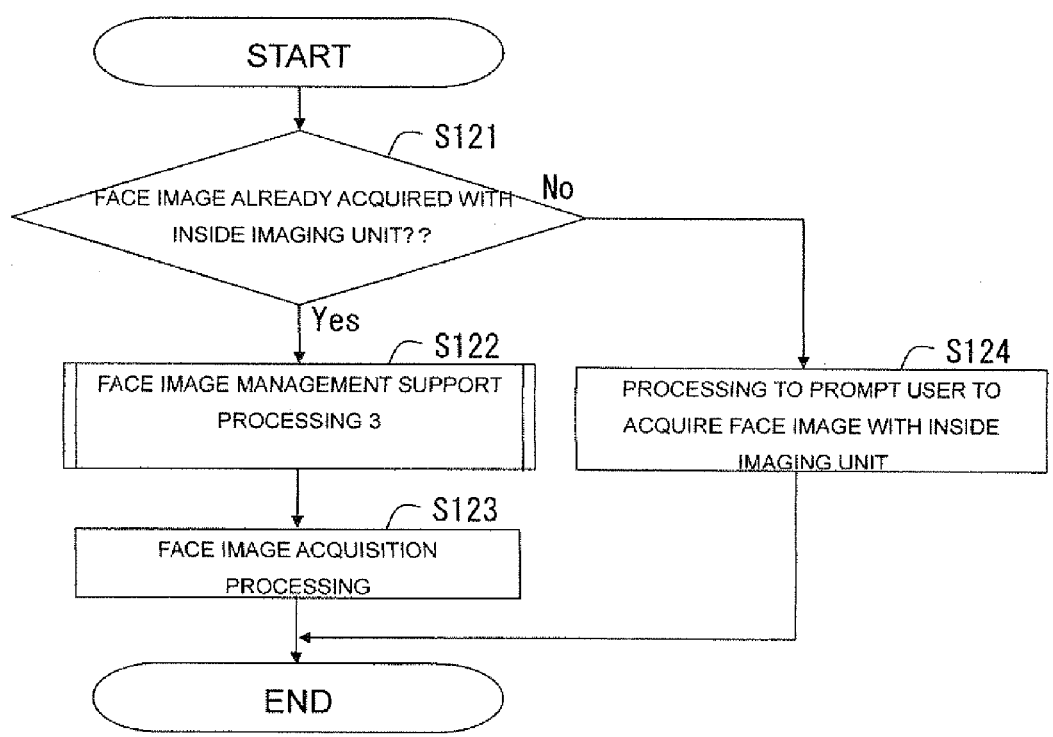
FIG. 16 is a flowchart illustrating an example of operation of the game device 10 according to a second embodiment of the invention.

Referring to FIG. 16, an example of detailed procedure of the face image acquisition processing 2 (step 12 in FIG. 14) will be described. The description here will be made of a case in which the user is guided, in the face image acquisition processing, to take an image by using the inside imaging unit 24 prior to the two outside imaging units 23 (the outside left imaging unit 23a and the outside right imaging unit 23b). The reason why the game device 10 causes the user to take an image with the inside imaging unit 24 prior to the outside imaging units 23 is that the ownership of the game device 10 is clarified and thereby the use of the game device 10 by others can be limited.

Referring to FIG. 16, an example of operation of the image processing program executed by the information processing unit 31 of the game device 10 will be described. In this processing procedure, the information processing unit 31 first determines whether or not a face image has been captured by the inside imaging unit 24 (step 121). The determination on whether or not a face image has been captured by the inside imaging unit 24 may be made based on whether or not there exists a record in which the inside imaging unit 24 is set as the face image acquisition source according to the face image management information Dn1 shown in FIG. 12. Further, when the game device 10 is provided with a function to register in the game device 10 the face image of the owner of the game device 10 captured by the inside imaging unit 24, the determination may be made based on whether or not the face image of the owner has been registered.

If a face image has been acquired with the inside imaging unit 24 (Yes in step 121), the information processing unit 31 executes face image management support processing 3 (step 122). The face image management support processing 3 will be described later with reference to FIG. 19C. The information processing unit 31 executes the face image acquisition processing with the use of the outside imaging unit 23 (step 123). In this procedure, the information processing unit 31 stores the face image from the outside imaging unit 23 in the main memory 32, and further in the internal data storing memory 35 or the external data storing memory 46 according to a similar imaging instruction to that in step 101 in FIG. 15, for example according to an instruction given by the user pressing the R-button 14H (or the L-button 14G). In contrast, if a face image has not been acquired with the inside imaging unit 24 (No in step 121), the information processing unit 31 prompts the user to execute the face image acquisition processing with the inside imaging unit 24 (step 124). More specifically, there is displayed on the upper LCD 22 a message to the effect, for example, that "the game device 10 is not able to execute the face image acquisition processing with the outside imaging unit 23 unless a face image has been acquired with the inside imaging unit 24". Alternatively, the information processing unit 31 may request the user to register the owner's face image in the first place.

Figure 17:
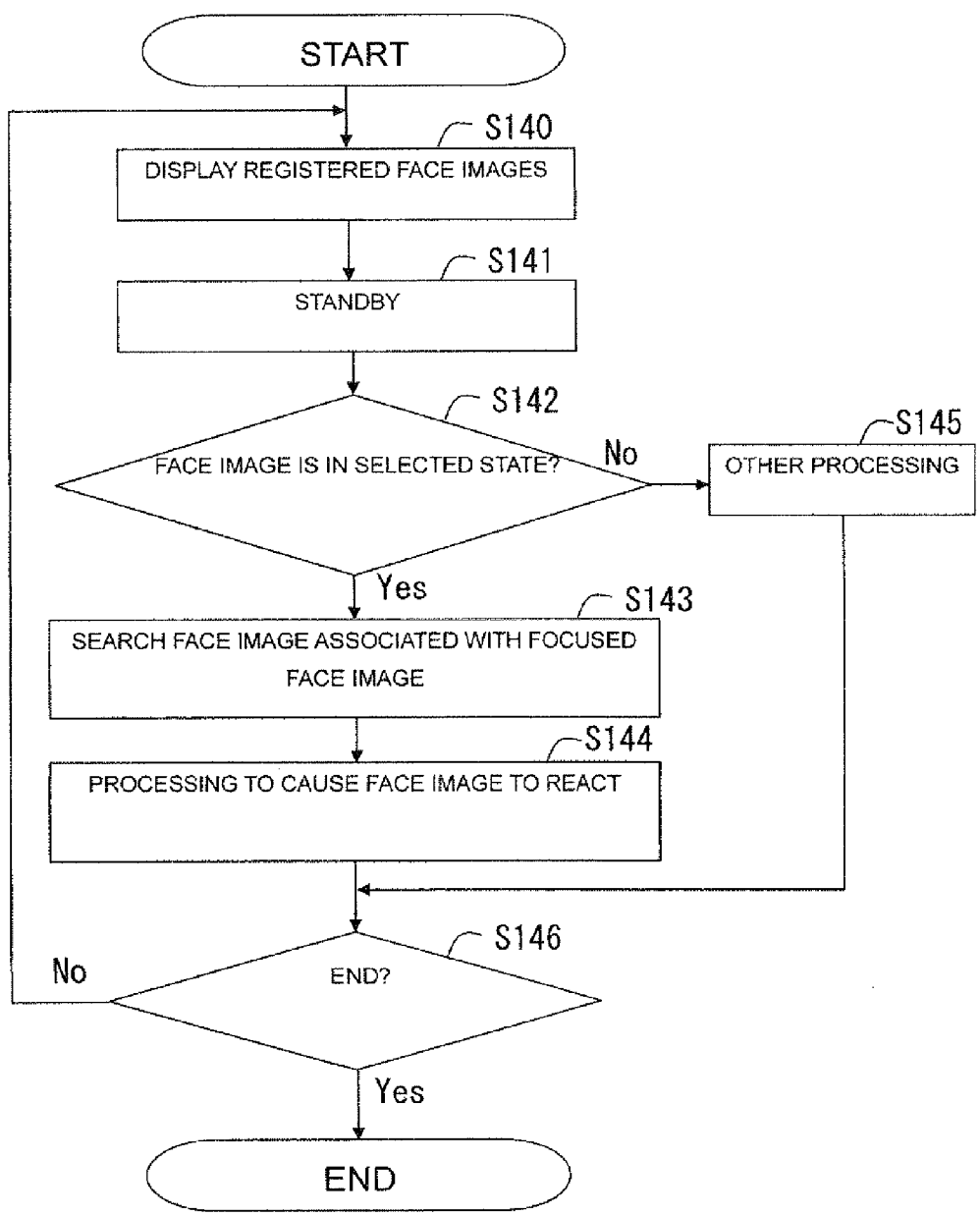
FIG. 17 is a flowchart illustrating an example of detailed procedure of list display processing.

FIG. 17 is a flowchart illustrating an example of detailed procedure of the list display processing (step 14 in FIG. 14). In this processing, the information processing unit 31 firstly retrieves the registered face images from the saved data storage area Do of the internal data storing memory 35 or external data storing memory 46 and displays them on the upper LCD 22 (step 140). More specifically, the information processing unit 31 acquires respective addresses of the face image data from the face image management information Dn1 stored in the saved data storage area Do. The information processing unit 31 then retrieves the face images based on the addresses in the internal data storing memory 35 or external data storing memory 46, and displays them on the upper LCD 22.

Subsequently, the information processing unit 31 assumes a standby state waiting for operation by the user (step 141). According to the user's operation, it is determined whether or not a face image is in the selection state (step 142). The determination on whether or not a face image is in the selection state is made based on an operation state after the user presses the operation button 14 or after the user manipulates the GUI when a list of face images is displayed on the upper LCD 22 as shown in FIGS. 7 and 8. The face image in the selection state is displayed, being enclosed with the bold line L1 or the like, as shown in FIGS. 7 and 8.

When any face image is in the selection state, the information processing unit 31 searches for a face image associated with the face image in the selection state, using the face image management information Dn1 (see FIG. 12) (step 143).

Then, the information processing unit 31 executes processing to cause the associated face image to make a reaction such as looking at the face image in the selection state (step 144). The processing to cause the associated face image to make a reaction may be executed, for example, by the procedures as described below. A plurality of patterns of eyes with different directions of the gaze as those shown in FIG. 8 and a plurality of patterns of face images with different face directions as those shown in FIG. 8 are preliminarily prepared. A pattern of an appropriate direction of the gaze and a pattern of an appropriate face direction are selected on the basis of the positional relationship between the associated face image and the face image in the selection state. Then, the selected pattern of the direction of the gaze and the selected pattern of the face direction are displayed in place of patterns of direction of the gaze and face direction which are presently displayed. In other words, the eye part of the original face is replaced with an image of an eye part that is determined based on the positional relationship between the associated face image and the face image in the selection state. When changing the face direction, the entire face image may be replaced. In respect of directions of the gaze, a plurality of patterns with different angles of direction may be prepared such that these patterns cover 360 degrees with intervals of a predetermined angle, for example 15 degrees. It is also possible to determine an angle based on the positional relationship between the face image in the selection state and the associated face image, and to select a pattern with an angle of direction of the gaze that is closest to the determined angle.

In respect of face directions, a plurality of patterns of face images with different angles of face direction are prepared by defining the face direction facing the normal line of the screen as zero degrees, and varying the direction horizontally to 30, 60, and 90 degrees for example. Further, patterns of face images in which the face direction is vertically changed for example by about 30 degrees are prepared. Furthermore, patterns of face images in which the face direction is varied vertically may be prepared for the face image in which the face direction has been changed horizontally by 90 degrees, such that the face direction is obliquely upward (e.g. at an angle of 15, 30, or 45 degrees up), or obliquely downward (e.g. at an angle of 15, 30, or 45 degrees down). Thus, an angle of face direction is determined based on the positional relationship between the face image in the selection state and the associated face image, and then a face image with a face direction that is closest to the selected angle is selected from among the prepared patterns. It is also possible to emphasize the affinity by displaying a face image sending a wink by means of animation of a three-dimensional model. Further, various marks such as heart marks may be prepared so that a mark is displayed near a face image associated with the face image in the selection state.

If it is determined in step 142 that no face image is in the selection state, the information processing unit 31 executes other processing (step 145). This "other" processing includes processing to be done in response to the user's operation on another GUI on the lower LCD 12, or operation of an operation button 14 other than the operation button 14 used for selecting face images (i.e. buttons 14a, 14b, and 14c). Then, the information processing unit 32 determines whether or not the processing is to be terminated (step 146). For example, if the information processing unit 31 detects pressing of the button 14c (B-button) when the screen of FIG. 8 is displayed, the information processing unit 31 determines that it is instructed to "return" and terminates the processing of FIG.

17. If the processing is not to be terminated, the information processing unit 31 returns the control to step 140.

Figure 18:
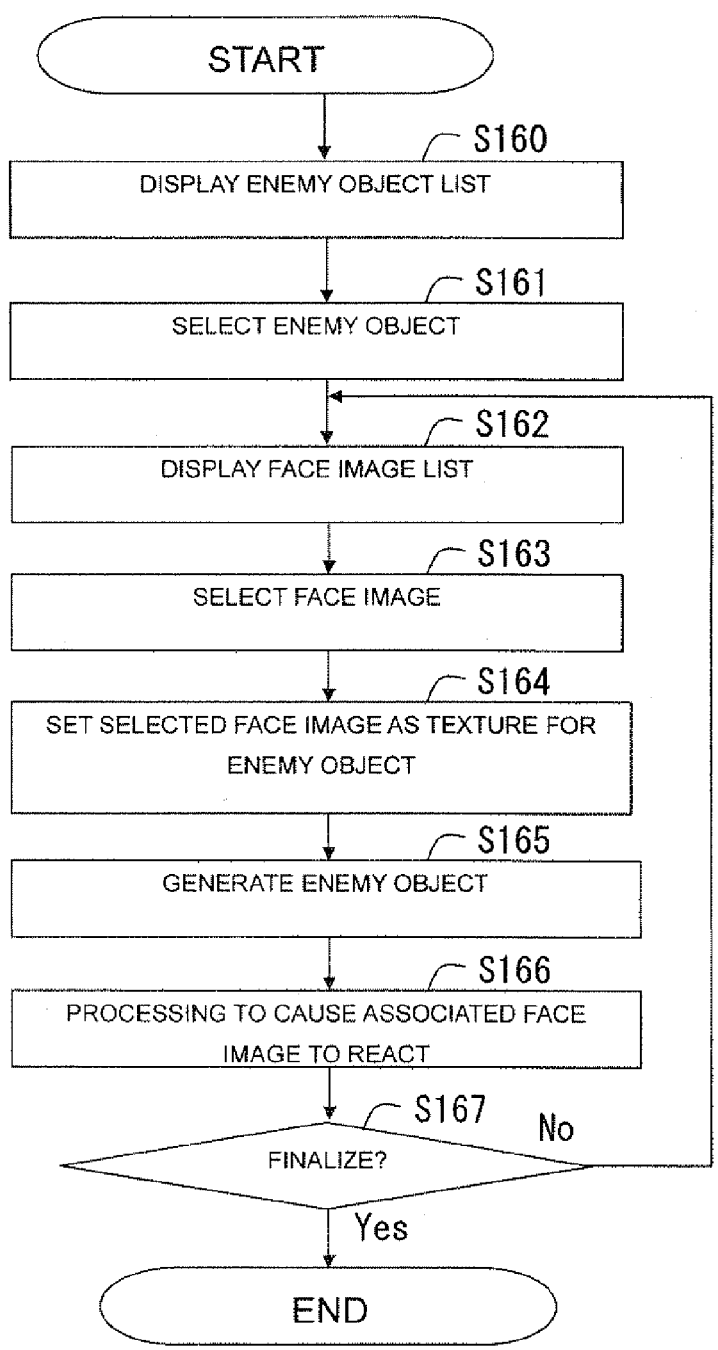
FIG. 18 is a flowchart illustrating an example of detailed procedure of casting determination processing.

FIG. 18 is a flowchart illustrating an example of detailed procedure of the casting determination processing (step 16 in FIG. 14). Firstly in this processing, the information processing unit 31 displays a list of head shapes for the enemy object EO (step 160). Although the description here will be made taking the enemy object EO as an example, the processing procedure will be the same when other character objects than the enemy object EO are generated. The information processing unit 31 stores head shapes for the enemy object EO in the internal data storing memory 35 preliminarily, for example before the game device 10 is shipped, or when image processing program is installed or upgraded. The information processing unit 31 retrieves the head shapes for the enemy object EO currently stored in the internal data storing memory 35, and displays them in an arrangement as shown for example in FIG. 9.

Next, the information processing unit 31 detects the user's selecting operation using the GUI or the operation button 14, and accepts selection of a head shape for the enemy object EO (step 161). Upon completion of the selection of the head shape of the enemy object EO, the information processing unit 31 displays a list of face images (step 162). The information processing unit 31 then detects the user's selecting operation using the GUI or the operation button 14, and accepts selection of a face image (step 163). In the example of processing in FIG. 18, the information processing unit 31 determines a face image by detecting the selecting operation in step 163. However, instead of such processing, the information processing unit 31 may be designed to automatically determine a face image. For example, the information processing unit 31 may randomly selects a face image from among the face images accumulated in the saved data storage area Do. Further, the information processing unit 31 may preliminarily store history of the game played by the user on the game device 10 in the main memory 32, the external memory 45, the external data storing memory 46, or the internal data storing memory 35, so that a face image is selected on the basis of the user's characteristics, taste and the like estimated from the history. Specifically, for example, a face image to be selected next may be determined according to how frequently the user has selected each face image in the past.

The information processing unit 31 then sets the selected face image as texture for the enemy object EO (step 164). The enemy object EO is generated by texture-mapping the selected face image on the face part of the enemy object EO (step 165). The enemy object generated in step 165 is an example of the second character object. The information processing unit 31 then displays the generated enemy object EO on the screen of the upper LCD 22, for example in the form of the enemy object EO as shown in FIG. 10.

Then, the information processing unit 31 executes processing to cause an associated face image to make a reaction (step 166). This processing is the same as the processing in step 143 and step 144 of FIG. 17. Further, the information processing unit 31 determines whether or not the generated enemy object EO is to be finalized, according to the user's operation on the GUI (step 167). If the enemy object EO is not to be finalized, the information processing unit 31 returns the control to step 162 and accepts selection of another face image. However, when the enemy object EO is not to be finalized, the information processing unit 31 may return the control to step 160 to accept selection of a head shape for the enemy object EO. In contrast, if the enemy object EO is to be finalized, the information processing unit 31 terminates the processing.

The information processing unit 31 executes the game processing of step 18 in FIG. 14 with the use of this finalized enemy object EO. However, although not clearly shown in FIG. 18, the processing of FIG. 18 may be terminated, without finalizing the enemy object EO, by means of a GUI menu or the like prepared for that purpose.

Figure 19A:
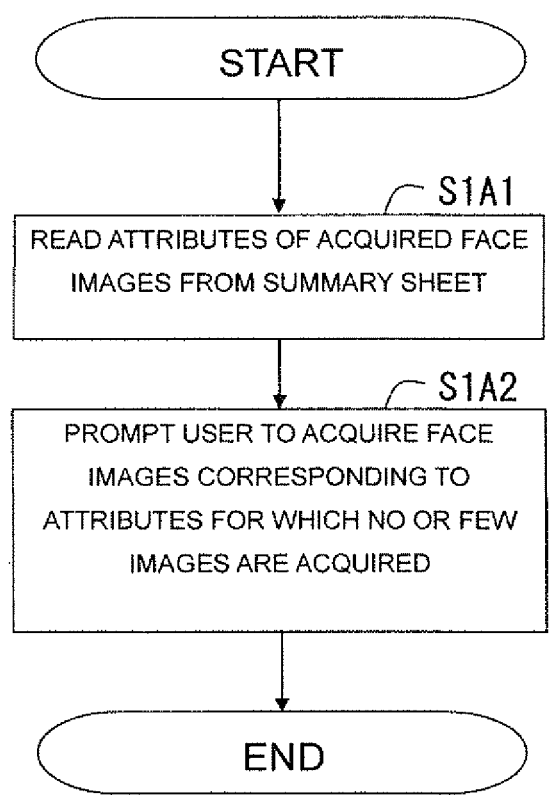
FIG. 19A is a flowchart illustrating an example of detailed procedure of face image management processing 1.

FIG. 19A is a flowchart illustrating an example of detailed procedures of the face image management processing 1 (step 1A of FIG. 14). In this procedure, the information processing unit 31 reads attributes of the acquired face image from the face image attributes summary sheet Dn2 (step 1A1). The information processing unit 31 then searches the face image attributes summary sheet Dn2 for unacquired attributes or attributes for which few face images have been acquired. The term "unacquired attributes" means those for which no face image has been acquired in the table as shown as an example in FIG. 13. The term "attributes for which few face images have been acquired" means those attributes ranked in a predetermined number of lowermost groups when the attributes are sorted into groups using the number of acquired face images in the table shown in FIG. 13 as the sorting key.

Then, the information processing unit 31 executes processing to prompt the user to acquire a face image corresponding to the unacquired attributes (step 1A2). Specifically, for example, the information processing unit 31 may display, on the lower LCD 12 or the upper LCD 22, a message generated by combining "male" and "age of 10's" as attributes and a term "number of acquired images is zero" from the table as shown in FIG. 13. The information processing unit 31 may display a message generated by combining "male" and "age of 10's" as attributes and a term "the number of acquired images is low". However, the number of combinations of displayed attributes (the number of rows in the table of FIG. 13) is not limited to one, but may be two or more. The information processing unit 31 may terminate the processing of FIG. 19A upon detecting the user pressing the operation button 14B (A-button). After that, the information processing unit 31 returns the control to step 8 of FIG. 14.

The face image management processing 1 illustrated in FIG. 19A has been described as an example of detailed procedure to be performed when it is determined that the game is to be terminated as shown in FIG. 14 (step 1A). However, the face image management processing 1 is not necessarily be executed when termination of the game is determined after the game is executed (step 1A). For example, the information processing unit 31 may execute the face image management processing 1 during execution of the list display processing (step 14) or the casting determination processing (step 16), or during execution of the game (step 18) in order to prompt the user to acquire a face image.

Figure 19B:
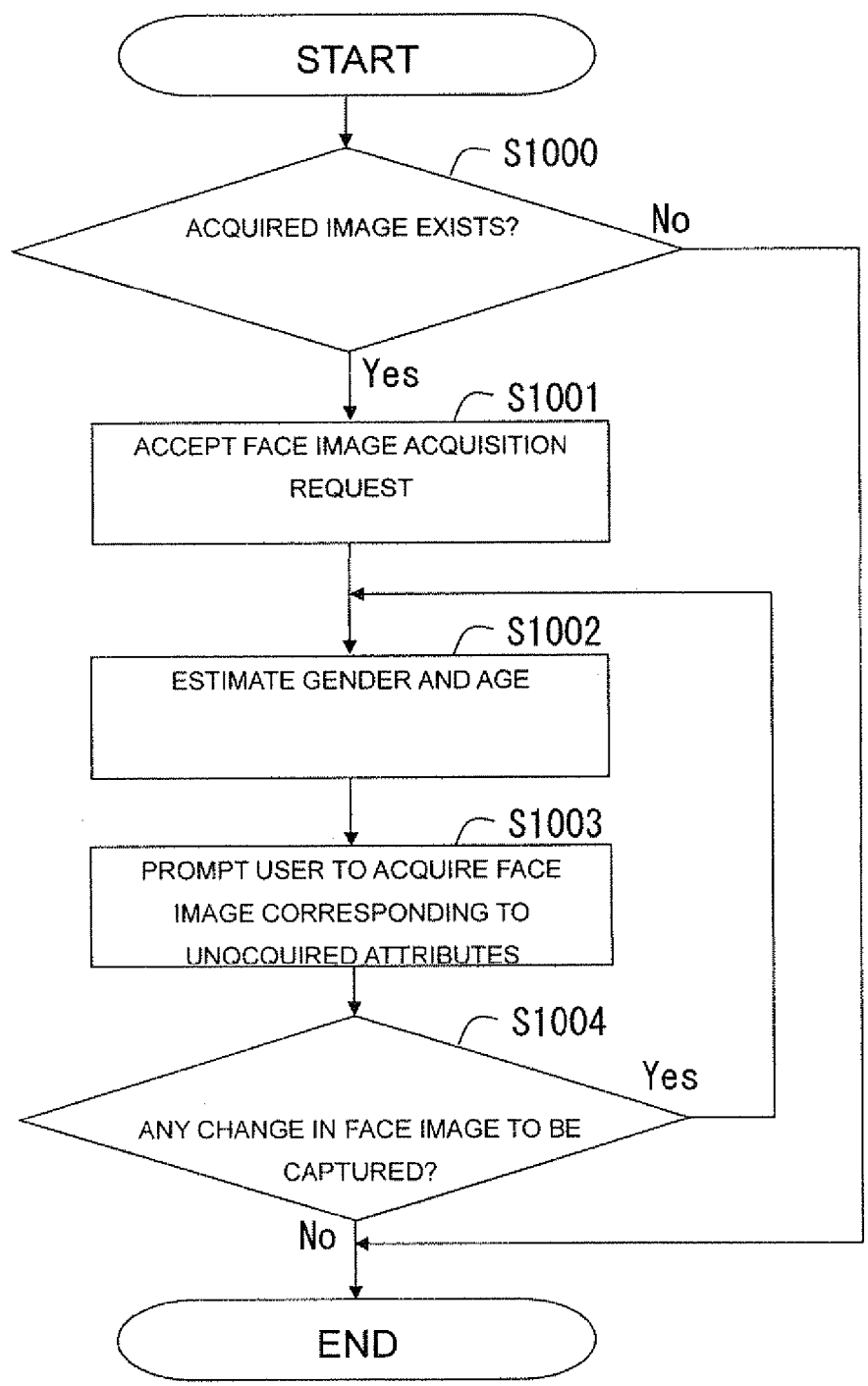
FIG. 19B is a flowchart illustrating an example of detailed procedure of face image management processing 2.

FIG. 19B is a flowchart illustrating an example of detailed procedure of the face image management processing 2 (step 100 of FIG. 15). In this procedure, the information processing unit 31 firstly determines whether or not an acquired image exists with reference to the number of acquired images (step 1000). The information processing unit 31 may store the number of acquired images as the number of records of the face image management information Dn1, in the main memory 32, the external memory 45, the external data storing memory 46, the internal data storing memory 35, or the like.

If there exists no acquired image (No in determination of step 1000), the information processing unit 31 terminates the processing. In contrast, if there exists an acquired image (Yes in determination of step 1000), the information processing unit 31 advances the control to step 1001. The information processing unit 31 then accepts a face image acquisition request (step 1001). The information processing unit 31 recognizes the face image acquisition request, for example when receiving an instruction to take an image by way of the L-button 14G or R-button 14H in the state in which the face image is displayed on the upper LCD 22 through the inside imaging unit 24 or the outside imaging unit 23.

Then, the information processing unit 31 estimates attributes such as gender and age of the face image acquired with the inside imaging unit 24 or the outside imaging unit 23 and displayed on the upper LCD 22 (step 1002). For example, the gender can be estimated based on the size of skeleton including cheekbones and jaw bones in the face image and the facial size. Specifically, the information processing unit 31 calculates relative dimensions of the facial outline (e.g. width of the face, and distance between eyes and jaw) with respect to the distance between eyes and the distance between eyes and mouth. If the relative dimensions thus obtained are close to statistically obtained average values for males, then the information processing unit 31 can determine that the face image is of a male. On the other hand, if the relative dimensions thus obtained are close to statistically obtained average values for females, then the information processing unit 31 can determine that the face image is of a female.

The information processing unit 31 may preliminarily store feature information including average positions of facial parts and the numbers of wrinkles in respective facial parts for each of age groups (e.g. under 10, 10's, 20's, 30's, 40's, 50's, 60's, and over 70). The information processing unit may calculate the aforementioned feature information of the face image acquired with the outside imaging unit 23 and displayed on the upper LCD 22. The information processing unit 31 thus can estimate which age group the face image belongs to by finding one closest to the calculated feature information. However, the description above of how to specify gender and age is only for illustrative purposes only, and gender and age can be determined by other processing as well. Various conventionally proposed techniques for determining gender and age can be applied to the processing of step 1002.

Subsequently, the information processing unit 31 prompts the user to acquire a face image corresponding to the unacquired attributes (step 1003). For example, the information processing unit 31 may display a message on the upper LCD 22 to prompt the user to acquire a face image corresponding to the unacquired attributes. This processing is the same as that of FIG. 19A. Then, the information processing unit 31 determines whether or not the face image to be captured has been changed by the user's operation (step 1004). Specifically, for example, the information processing unit 31 determines that the face image to be captured has been changed if features of the face image acquired with the inside imaging unit 24 or the outside imaging unit 23, such as distance between eyes and distance between eyes and mouth have been changed. Alternatively, the information processing unit 31 may be designed to determine that the face image to be captured has been changed, when the image-capturing instruction is released by the L-button 14G or the R-button 14H and then the image-capturing instruction is again given by the L-button 14G or the R-button 14H. If the face image to be captured has been changed, the information processing unit 31 returns the control to step 1002.

In contrast, if the face image to be captured has not been changed, the information processing unit 31 directly terminates the processing. The situation in which the face image to be captured has not been changed occurs, for example, when the user has terminated the face image management processing 2 by means of the GUI or the operation button 14C (B-button). Further, the information processing unit 31 may determine that the face image to be captured has not been changed if the situation in which the face image to be captured has not been changed continues for a predetermined period. In this case, the information processing unit 31 advances the control to step 101 of FIG. 15 and executes the face image acquisition processing. As already mentioned in the description of the processing of step 101 of FIG. 15, the information processing unit 31 updates the number of acquired face images in the corresponding row of the face image attributes summary sheet Dn2 shown in FIG. 13.

The situation in which it is determined in the determination processing in step 1004 that the face image to be captured has not been changed occurs, for example, when the variation in distance between eyes or distance between eyes and mouth is within an allowable range. Further, the information processing unit 31 may determine that the image-capturing instruction has not been released when the image-capturing instruction is left valid for a predetermined period of time without the image-capturing instruction being released by the L-button 14G or the R-button 14H.

Figure 19C:
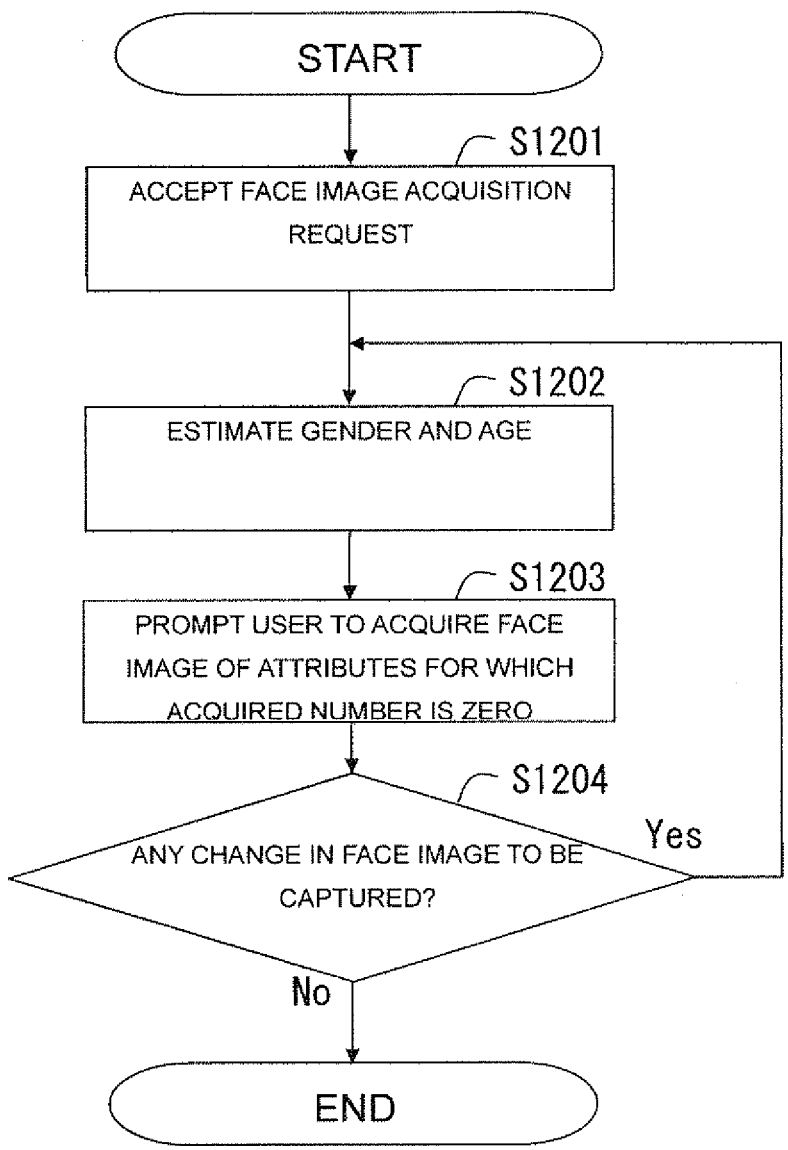
FIG. 19C is a flowchart illustrating an example of detailed procedure of face image management processing 3.

FIG. 19C is a flowchart illustrating an example of detailed procedure of the face image management processing 3 (step 122 of FIG. 16). Since the processing of FIG. 19C is the same as the processing from step 1001 to step 1004 in FIG. 19B, the description thereof will be omitted.

According to the processing illustrated in FIGS. 19A to 19C, the information processing unit 31 guides the user to capture a face image corresponding to the unacquired attributes prior to other face images. Such processing is capable of assisting a user who wants to acquire face images with least bias in terms of attributes.

The description of this embodiment has been made in terms of a case in which the age groups are classified into under 10, 10's, 20's, 30's, 40's, 50's, 60's, and over 70. However, this invention is not limited to such classification of the age groups. For example, the age groups may be classified more precisely into more categories. Conversely, the age groups may be classified more roughly, for example into children, adults, and elders.

In the present embodiment, the information processing unit 31 recognizes a face image acquisition request when receiving an image-capturing instruction from the L-button 14G or the R-button 14H. However, instead of this, as described in the first embodiment, for example, the information processing unit 31 may be designed to estimate attributes of a face image such as gender and age in guidance processing to guide a distance between the game device 10 and the subject face, and an angle between the face and the optical axis of the imaging unit in order to acquire a face image with target dimensions from the imaging unit. This means that when the information processing unit 31 acquires face images on a real-time basis or every frame period (1/60 seconds) for the purpose of such guidance processing, the attributes of the face image can be specified based on the acquired face images.

Here, an example of game processing in which character objects using face images appear will be described with reference to FIG. 20A to FIG. 40. The following processing is executed in, for example, step 18 of FIG. 14 using an enemy object EO containing face images accumulated in the saved data storage area Do.

Firstly, an overview of a game which a player can play by means of the game device 10 executing a game program in the present embodiment will be described. The game according to the present embodiment is a so-called shooting game in which the player is the main protagonist of the game and shoots down enemy characters which appear in a virtual three-dimensional space provided as a game world. The virtual three-dimensional space forming the game world (virtual space, also called game space) is displayed from the player's viewpoint (a so-called subjective viewpoint), on the display screen (for example, the upper LCD 22) of the game device 10. Of course, an objective viewpoint may also be adopted. Points are added, when the player shoots down an enemy character. If, on the other hand, the enemy character and the player collide (more specifically, if the enemy character comes within a predetermined distance of the position of the virtual camera), then points are deducted.

Furthermore, the game according to the present embodiment synthesizes and displays an image of the real world (hereinafter, called a "real world image") acquired by the imaging units provided in the game device 10, and a virtual world image which represents a virtual space (corresponding to the "virtual image" relating to the present invention). More specifically, the virtual space is divided into a region near to the virtual camera (hereinafter, called the "near side region") and a region distant from the virtual camera (hereinafter, called the "far side region"); an image representing a virtual object situated in the near side region is displayed on the near side of a real world image, and a virtual object situated in the far side region is displayed behind the real world image. More specifically, as described below, a virtual object situated in the near side region is synthesized preferentially over the real world image, and the real world image is synthesized preferentially over a virtual object situated in the far side region.

Any method may be employed to synthesize the real world image and the virtual world images. For example, a real world image may be situated as an object in the same virtual space as a virtual object (more specifically, attached as a texture of the virtual object), and the real world image rendered together with the virtual object by a common virtual camera.

Furthermore, in another example, the real world image is captured and rendered by a first virtual camera (hereinafter, called a real world rendering camera) to form a first rendered image, a virtual object is captured and rendered by a second virtual camera (hereinafter, called a virtual world rendering camera) to form a second rendered image, and the first rendered image and the second rendered image are synthesized in such a manner that a virtual object situated in the near side region has priority over the real world image, and the real world image has priority over a virtual object situated in the far side region.

In the former method, typically, an object which uses a real world image as texture (hereinafter, this object is called a screen object) is disposed in a position on the boundary between the near side region and the far side region, and can be imaged together with a virtual object, such as an enemy character, by a common virtual camera. In this case, typically, the object to which the real world image is attached is an object at a predetermined distance from the virtual camera, which has a surface of which the normal coincides with the imaging direction of the virtual camera, and the real world image can be attached as texture onto this surface (which is called the "boundary surface" below).

Furthermore, in the latter method, the second rendered image described above is obtained by rendering a virtual object while judging the depth (by a Z buffer) in relation to the boundary surface between the near side region and the far side region (hereinafter, simply called the boundary surface), and the first rendered image described above is obtained by attaching a real world image as texture onto a surface at a predetermined distance from the virtual camera, which has a normal coinciding with the imaging direction of the virtual camera. If the second rendered image is synthesized preferentially over the first rendered image, then the real world image appears to be situated on the boundary surface in the synthesized image.

In either of these methods, the relationship between the distance from the virtual camera, the angle of view, and the size of the real world image object (the size in the imaging direction) are set in such a manner that the real world image is covered by the range of vision of the virtual camera.

Below, the former method is called a first rendering method and the latter method is called a second rendering method.

Furthermore, if a predetermined event condition is satisfied in the game, then a portion of the real world image is opened and a virtual space in the far side region is displayed so as to be visible through this opening. Furthermore, an enemy character object is situated in the near side region and a special enemy character (a so-called "boss character") appears in the far side region if a predetermined condition is satisfied. By shooting down the boss character, a stage of the game is cleared. Several stages are prepared and when all of the stages are cleared, the player has cleared the game. On the other hand, if predetermined game over conditions are satisfied, then the game is over.

In a typical example of the first rendering method described above, data indicating the position of the opening in the real world image may be set on the boundary surface of the screen object. More specifically, an opening may be displayed or not displayed depending on the opacity of the texture (so-called $\alpha$ texture) which is used at the boundary surface. Furthermore, in the second rendering method, it is possible to set data indicating the position of an opening in the boundary surface.

Moreover, in the present embodiment, the presence or absence of an opening is set in respect of the real world image, but it is also possible to apply other image processing to the real world image. For example, it is also possible to apply desired image processing based on specialist technical knowledge, such as applying a soiling or blurring process to the real world image. In these examples, it is possible to set data indicating a position where image processing is applied to the boundary surface.

<Game World>

In this way, in a game relating to the present embodiment, a player is made to feel that a virtual space (far side region) exists behind the real image, and hence there is an increased sense of depth in the virtual space represented by the game screen. The real world image may be a normal image as captured by a single-eye camera or a stereo image as captured by a compound-eye camera.

In the game relating to the present embodiment, an image captured by the outside imaging unit 23 is used as the real world image. More specifically, the real world image peripheral to the player which is captured by the outside imaging unit 23 during game play (a moving image of the real world acquired in real time) is used. Consequently, if the user (game player) who is holding the game device 10 changes the imaging range of the outside imaging unit 23 by changing the orientation of the game device 10 in the left/right direction or the up/down direction, then the real world image displayed on the upper LCD 22 is also changed in accordance with the change in the imaging range.

Here, broadly speaking, the orientation of the game device 10 during game play is changed in accordance with either (1) the player's intentions and (2) the intention (scenario) of the game. When the player intentionally changes the orientation of the game device 10 during play, the real world image captured by the outside imaging unit 23 changes, and hence the player can intentionally change the real world image displayed on the upper LCD 22 in this way.

Furthermore, change in the orientation of the game device 10 is determined by the angular rate sensor 40 provided in the game device 10, and the orientation of the virtual camera is changed accordingly. More specifically, the virtual camera is changed from the current orientation in the direction of change of the orientation of the outside imaging unit 23. Moreover, the virtual camera is changed from the current orientation by the amount of change (angle) in the orientation of the outside imaging unit 23. More specifically, if the orientation of the game device 10 is changed, the real world image is changed, and the displayed range of the virtual space is changed. In other words, by changing the orientation of the game device 10, the real world image and the virtual world image change in a coordinated fashion, and therefore it is possible to display a synthesized image just as if the real world and virtual world are related. In the present embodiment, the position of the virtual camera does not change, but it is also possible to change the position of the virtual camera by detecting movement of the game device 10.

In the second rendering method, processing of this kind for changing the orientation of the virtual camera is applied to the virtual world rendering camera and is not applied to the real world rendering camera.

Furthermore, when an object is displayed at a location such as an edge of the screen (for example, the right-hand edge or the left-hand edge) during game play, then the player naturally wishes to move the object to the center of the screen, and the player moves the game device 10 (outside imaging unit 23). As a result of this, the real world image displayed on the screen is changed. It is possible to make the player carry out this change in the orientation of the game device 10 (real world image change) naturally by means of programming which causes an object displayed in accordance with the game scenario to be intentionally displayed at the edge of the screen.

<Details of Virtual Space>
(Rendering of Real World Image)

The real world image captured by the outside imaging unit 23 is synthesized so as to appear to be situated at the boundary position between the near side region and the far side region of the virtual space. FIG. 20A shows one example of a virtual space according to the present embodiment. Furthermore, FIG. 20B shows a relationship between a screen model and α texture in the present embodiment. In the first rendering method, in order to display a real world image, a spherical model (the aforementioned screen model) which is centered on the position of the virtual camera can be set in the virtual space, as shown in FIG. 20A, and a real world image can be attached to the inner surface of this sphere so as to form a screen object. More specifically, the real world image is attached as texture to the whole of the portion of the screen model that is imaged by the virtual camera. The area of the screen model apart from this portion is set to be transparent and therefore is not visible on the screen. In this example, the boundary surface is a spherical surface; more specifically, as shown in FIG. 20A, the side toward the virtual camera from the surface of the sphere is the near side region (corresponding to the "second region" of the present invention), and the side beyond the surface of the sphere as viewed from the virtual camera is the far side region (corresponding to the "first region" of the present invention).

In the second rendering method, in order to display a real world image, a planar polygon for attaching texture of the real world image is disposed inside the virtual space. In this virtual space, the relative position of the planar polygon with respect to the real world rendering camera is fixed at all times. In other words, the planar polygon is disposed at a predetermined distance from the real world rendering camera and in such a manner that the normal direction of the polygon coincides with the viewpoint (visual axis) of the real world rendering camera.

Furthermore, this planar polygon is set so as to encompass the range of vision of the real world rendering camera. More specifically, the size of the planar polygon and the distance thereof from the virtual camera are set in such a manner that the planar polygon can encompass the range of vision of the virtual camera. Since a real world image is attached to the whole surface of the planar polygon on the virtual camera side, then when the planar polygon to which the real world image has been attached is imaged by the virtual camera, the real world image is displayed so as to correspond to the whole area of the image generated by the virtual camera.

Figure 21:
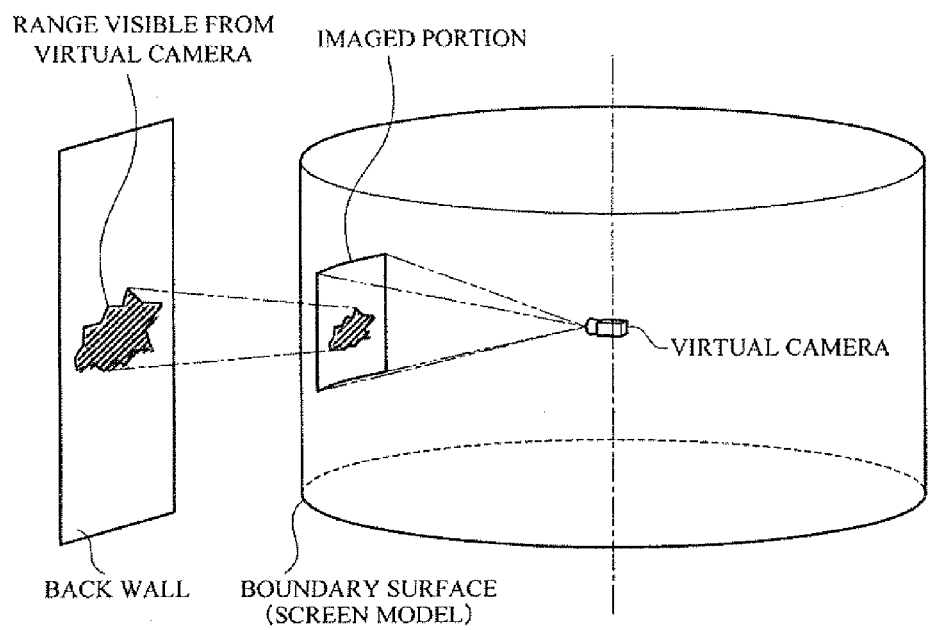
FIG. 21 is a diagram illustrating an example of a virtual space.

As shown in FIG. 21, the boundary surface may also have a round cylindrical shape. FIG. 21 shows a further example of a virtual space in the present embodiment. In this case, a virtual round cylindrical surface (boundary surface) having a central axis which is a vertical axis passing through the position of the virtual camera (in the present embodiment, the Y axis of the virtual space corresponds to the vertical direction and the X axis and the Z axis correspond to horizontal directions) is disposed in the virtual space. However, as stated above, the round cylindrical surface is not an object that is viewed, but rather an object used for processing an opening. The outer circumferential surface of this round cylinder divides the virtual space into a first space where the virtual camera is positioned (corresponding to the "second region" of the present invention) and a second space situated about the periphery of the first space (corresponding to the "first region" of the present invention).

(Processing for Opening the Real World Image)

Moreover, in a game relating to the present embodiment, an opening is provided in the real world image and the player is made aware of the existence of a far side region behind the real world image. To be more precise, the opening portion of the real world image is displayed as transparent or semi-transparent and the world behind this opening portion is synthesized with the opening portion. Consequently, a portion of the real world image is opened (erased) whenever a predetermined event occurs in the game, and an image showing another virtual space (far side region) which exists behind the real world image is displayed via this opening.

In the present embodiment, the boundary surface is a spherical surface and in the first rendering method, processing of this kind for displaying the far side region by providing an opening in the real world image is realized by means of texture attached to the inner surface of the spherical screen object described above, as shown in FIG. 20A and FIG. 20B. Below, this texture is called the screen α texture (the opening judgment data described below). In the present embodiment, the screen α texture is attached to a portion rotated through 360° in at least one direction about the virtual camera. More specifically, as shown in FIG. 20B, the screen α texture is attached to the central portion of the sphere, in other words, to a portion having a predetermined width in the Y direction which is rotated through 360° in a direction parallel to the XY plane about the position of the virtual camera (below this position is called the "α texture application section"). By adopting this composition, it is possible to simplify the handling of the screen α texture. More specifically, in the present embodiment, the screen α texture has a rectangular shape. By attaching this α texture to the portion shown in FIG. 20A, the information for each dot of the screen α texture corresponds to respective coordinates of the α texture application section of the screen object.

As described above, by attaching a real world image and capturing an image of the screen object on which α texture has been set, with the virtual camera, a real world image having an opening is rendered so as to be situated on the boundary surface (the inner surface of a sphere). The portion of the α texture corresponding to the real world image is calculated by imaging by the virtual camera.

In the second rendering method, data indicating the position of the opening is set on the boundary surface of the virtual space (here, the inner surface of a sphere). Typically, data is set to indicate the presence or absence of an opening at each point of the boundary surface. More specifically, a spherical object similar to that described above is arranged in the virtual world where a virtual object is present, and a similar α texture is set for this spherical object. When rendering the real world image, the α texture of the portion corresponding to the portion imaged by the virtual world rendering camera, of the spherical object on which the α texture has been set, is rendered by application to the planar polygon described above. Alternatively, after using the α texture of this portion to carry out processing for making the opening in the real world image transparent, the real world image thus processed is attached to the planar polygon described above and rendered by the real world rendering camera. This spherical object is an object which is used only for calculating an opening, and is not rendered when rendering the virtual world.

In the present embodiment, the data indicating the opening is data including information for each point of the boundary surface, but the data may also be information which defines a position of an opening in the boundary surface by a calculation formula.

A polygon (object) is disposed in the second space in order to attach a background image (texture) of the second space which comes within the field of view of the virtual camera via the opening. The background of the second space may also be called a "back wall".

Objects are disposed in the first space in order to show an enemy character and various characters depicting bullets for shooting down the enemy character. Predetermined objects (for example, a portion of enemy characters) are also disposed in the second space. Each of the objects arranged in the virtual space move within the virtual space in accordance with a previously programmed logic (algorithm).

Moreover, a portion of the enemy characters can move between the first space and the second space via an opening formed in the boundary surface. Alternatively, the enemy characters can move between the first space and the second space by themselves forming an opening in the boundary surface. A predetermined event in the game for forming an opening is, for example, an event (collision event) in which an enemy character collides with the boundary surface. Alternatively, there are events in which the boundary surface is broken down at a predetermined timing during the progress of the game scenario, and an enemy character which was situated in the second space advances into the first space (enemy character appearance event). As another alternative, it is also possible for an opening to be formed automatically depending on the elapsed time. Furthermore, it is possible to repair the opening in accordance with a predetermined game operation by the player. For example, it is possible to make the opening smaller (repair the opening), by firing bullets at the opening that has been formed.

Figure 22:
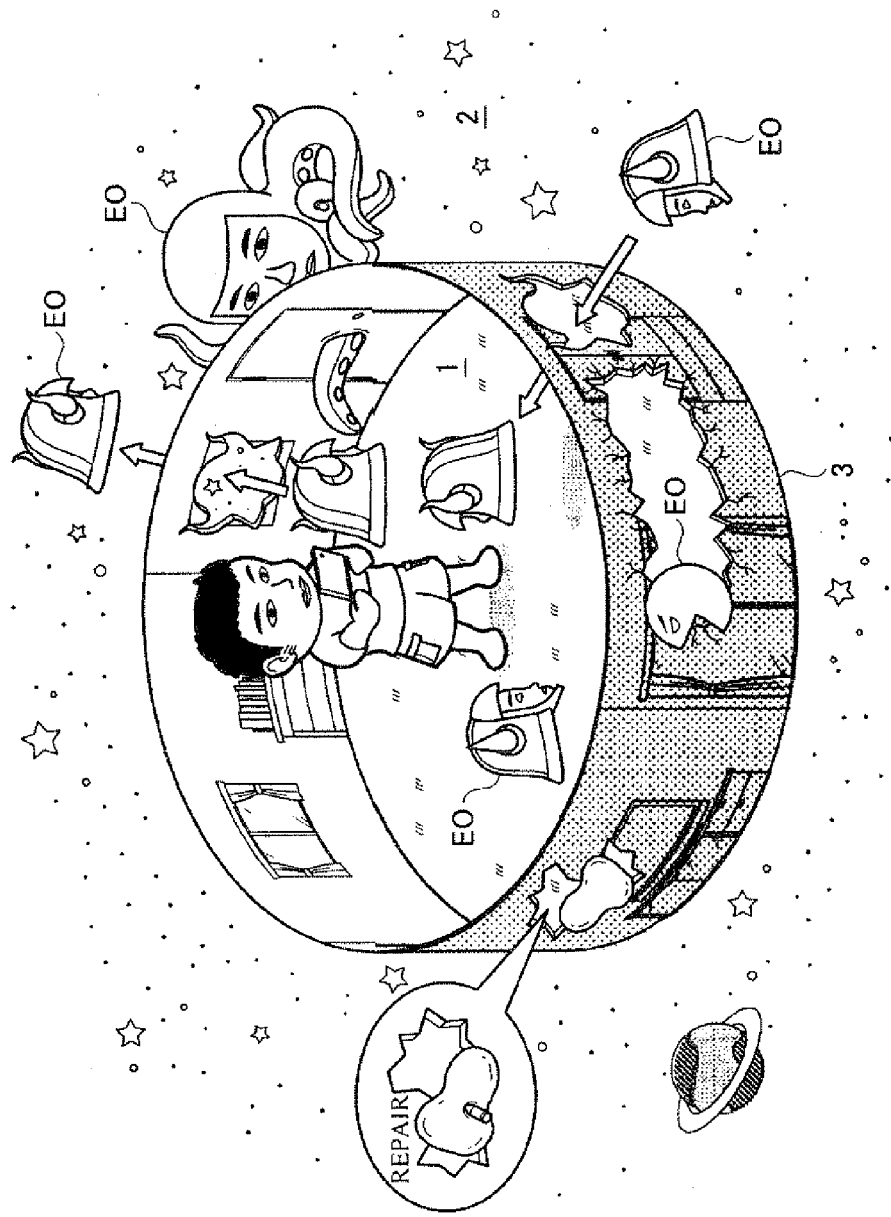
FIG. 22 is a diagram illustrating a virtual three-dimensional space (game world) defined in a game program as an example of the image processing program.

FIG. 22 shows a virtual three-dimensional space (game world) which is defined in a game program, as one example of an image processing program according to an embodiment of the invention. As described above, in the present embodiment, the boundary surface is spherical, but in FIG. 22, the boundary surface is depicted as having a round cylindrical shape for the purpose of simplification. As described above, in the game relating to the present embodiment, a virtual world image representing a virtual three-dimensional space and a real world image are synthesized and displayed on the upper LCD 22 of the game device 10.

Furthermore, as shown in FIG. 22, the virtual space in the game according to the present embodiment is divided into a first space 1 and a second space 2 by a boundary surface 3 formed by a spherical surface having a central axis passing through the position of a virtual camera.

At the boundary surface 3, a camera image CI (FIG. 23), which is a real world image captured by a real camera built into the game device 10, is synthesized with a virtual world image so as to be situated at the position of the boundary surface 3, by the processing in steps 81 and 82 described below in the first rendering method and by the processing in steps 83 to 85 described below in the second rendering method.

The real world image according to the present embodiment is a planar view image. Furthermore, the virtual world image is also a planar view image. More specifically, a planar view image is displayed on the LCD 22. However, the real world image may also be a stereoscopically viewable image. The present invention is not limited in terms of the type of real world image. The camera image CI in the present embodiment may be a still image or a real-time real world image (moving image). In the game program according to the present embodiment, the camera image CI is a real-time real world image. Furthermore, the camera image CI which is a real world image is not limited in terms of the type of camera. For example, the camera image CI may be an image obtained by a camera which can be connected externally to the game device 10. Moreover, in the present embodiment, the camera image CI may be an image acquired from one of the outside imaging unit 23 (compound-eye camera) or the inside imaging unit 24 (single-eye camera). In the game program according to the present embodiment, the camera image CI is an image acquired by using one of the outside left imaging unit 23a and the outside right imaging unit 23b of the outside imaging unit 23 as a single-eye camera.

As described above, the first space 1 is a space to the forward side of the boundary surface 3 as viewed from the virtual camera, which is enclosed by the boundary surface 3. Furthermore, the second space 2 is a space to the rear side of the boundary surface 3 as viewed from the virtual camera. Although not shown in FIG. 20A and FIG. 21, there is a back wall BW enclosing the boundary surface 3. In other words, the second space 2 is a space located between the boundary surface 3 and the black wall BW. A desired image is attached to the back wall BW. For example, a previously prepared image representing outer space is attached to the back wall BW, and the presence of a second space, which is an outer space area, is displayed behind the first space. More specifically, the first space, the boundary surface 3, the second space and the back wall are arranged in sequence from the front side as viewed from the virtual camera.

Figure 24:
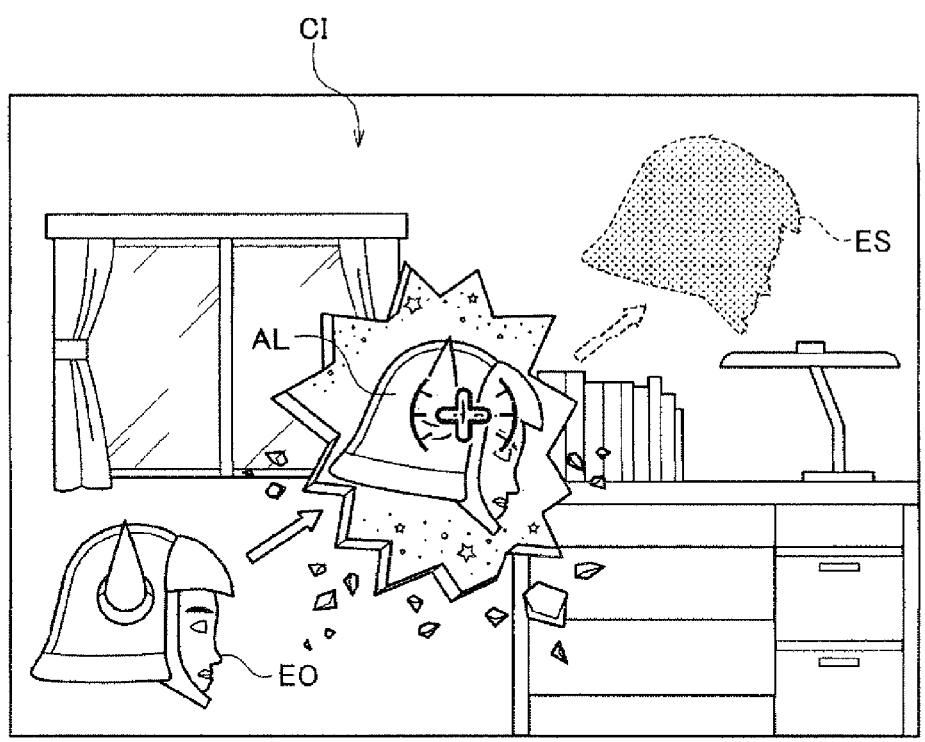
FIG. 24 is a diagram illustrating another example of various processing stages in an exemplary display form displayed on the upper LCD of a game device as an example of a device for executing the image processing program.

As stated above, the image processing program according to the present invention is not limited to a game program, and these settings and rules do not limit the image processing program of the present invention. As shown in FIG. 22, enemy objects EO move in a virtual three-dimensional space and are able to move back and forth between the first space 1 and the second space 2 by passing through the boundary surface 3 described above. When an enemy object EO has moved between the first space 1 and the second space 2 by passing through a region of the boundary surface 3 which is imaged by the virtual camera, in the image displayed on the LCD 22, the enemy object EO is shown as breaking through the real world image and moving from the far side to the near side, or from the near side to the far side. The aspect of the enemy object EO moving back and forth between the first space 1 and the second space 2 is displayed on the screen by using an opening (hole) which has been produced in the real world image by the game scenario or by an event. FIG. 22 and FIG. 24 show an aspect where an enemy object EO moves back and forth between the first space 1 and the second space 2 by creating an opening in the boundary surface 3 or by passing through an opening already present in the boundary surface 3.

In the image processing program according to the present embodiment, there are three types of object present in the first space 1 or the second space 2, namely, enemy objects EO, bullet objects BO, and a back wall BW, but the image processing program according to the present invention is not limited in terms of the type of objects. In the image processing program according to the present embodiment, an object is a virtual object which is present in the virtual space (the first space 1 and the second space 2). For example, in the image processing program according to the present embodiment, it is also possible for any desired object, such as an obstacle object, to be present.

<Display Mode Examples>

FIG. 23 to FIG. 26 show examples of a game screen displayed on the upper LCD 22. Below, the display mode examples shown in each of these drawings are described.

Firstly, a pointing cursor AL which is displayed in each one of FIG. 23 to FIG. 26 will be described. In each of FIG. 23 to FIG. 26, a pointing cursor AL of a bullet object BO which is fired in accordance with an attack operation using the game device 10 (for example, pressing the button 14B (A button)) is displayed on the upper LCD 22. In the game program according to the present embodiment, the pointing cursor AL is set so as to face in a predetermined direction in accordance with the program which is executed by the game device 10.

For example, the pointing cursor AL is set so as to be fixed in the line of sight direction of the virtual camera, in other words, in the center of the screen on the upper LCD 22. In this case, as described above, in the present embodiment, the direction of imaging of the virtual camera (the virtual camera in the first rendering method or the virtual world rendering camera in the second rendering method) changes in accordance with change in the direction of imaging of the outside imaging unit 23, and therefore the player changes the orientation of the pointing cursor AL in the virtual space by changing the orientation of the game device 10. The player then performs an attack operation by pressing the button 14B (A button) provided on the game device 10 with the thumb of his or her right hand, which is gripping the lower housing 11. By this means, the player fires a bullet object BO by performing the attack operation, and defeats the enemy object EO in the game according to present embodiment, or repairs the opening present in the boundary surface 3.

Next, each drawing in FIG. 23 to FIG. 26 will be described separately.

Figure 23:
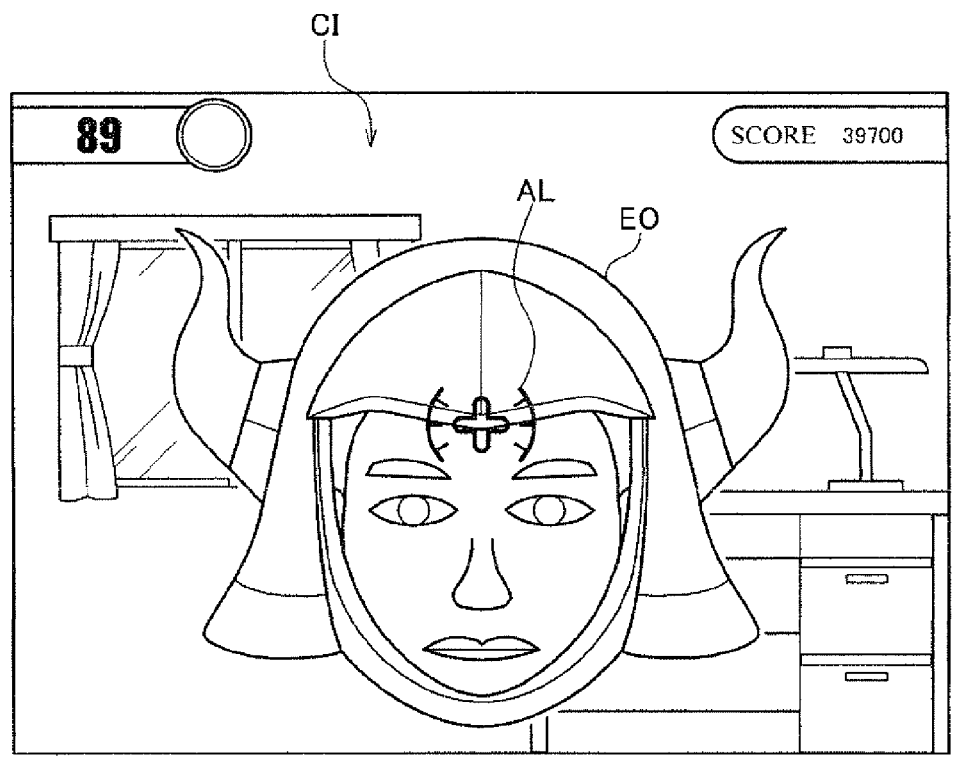
FIG. 23 is a diagram illustrating an example of various processing stages in an exemplary display form displayed on the upper LCD of a game device as an example of a device for executing the image processing program.

In FIG. 23, an enemy object EO which is present in the first space 1 and a camera image CI captured by a real camera built into the game device 10 are displayed on the upper LCD 22. The enemy object EO is set to a desired object.

The enemy object EO is an object which, for example, is created by attaching, in a predetermined method, an image (for example, a photograph of a human face) stored in the external data memory 46 of the game device 10, or the like, as texture, to a three-dimensional polygon model of a predetermined shape (a polygon model representing the three-dimensional shape of a human head).

Furthermore, in the present embodiment, the camera image CI shown on the upper LCD 22 is a real world image which is captured in real time by a real camera built into the game device 10, as stated above. Apart from this, the camera image CI may also be, for example, an image (such as photograph of scenery) stored in the external data memory 46 of the game device 10, or the like.

The enemy object EO may move in any fashion when the camera image CI is displayed on the upper LCD 22. For example, an enemy object EO present in the first space 1 can move to the second space 2. FIG. 24 shows one example of an aspect where an enemy object EO present in the first space 1 is moving from the first space 1 to the second space 2. In the example shown in FIG. 24, the enemy object EO present in the first space 1 creates an opening in the boundary surface 3 and moves to the second space 2. In the non-open region of the boundary surface 3, the enemy object EO which has moved to the second space 2 is displayed as a shadow (silhouette model) ES at the position viewed by the virtual camera. Furthermore, the second space 2 is viewed through the opening in the boundary surface 3. In other words, when there is an opening in the boundary surface 3 in the field of view of the virtual camera, then a portion of the image of the second space 2 is displayed via the opening on the upper LCD 22. More specifically, the image of the second space 2 is of objects that are present in the second space 2, for example, an enemy object EO which present in the second space 2 and the back wall BW. The shadow ES is a display which depicts a shadow of an enemy object EO. FIG. 27A shows a diagram of a silhouette model of the shadow of an enemy object EO as viewed from above. Furthermore, FIG. 27B shows an example of a silhouette model of the shadow of an enemy object EO. As shown in FIG. 27A and FIG. 27B, in the present embodiment, a silhouette model is set in relation to an enemy object EO, for each of a plurality of orientations. More specifically, the silhouette model comprises, for example, the eight planar polygons shown in FIG. 27A. This silhouette model (eight planar polygons) is arranged at the same position as the enemy object EO, which is a solid model. Furthermore, the respective planar polygons are of a size which is contained within the solid model (the polygons do not project beyond the solid model). Moreover, a texture is attached to each planar polygon, and this texture depicts a shadow image of the enemy object EO as viewed from the normal direction of the polygon surface. If the enemy object EO is situated behind a non-open region of the boundary surface 3, then a shadow ES is displayed by rendering this silhouette model.

Figure 25:
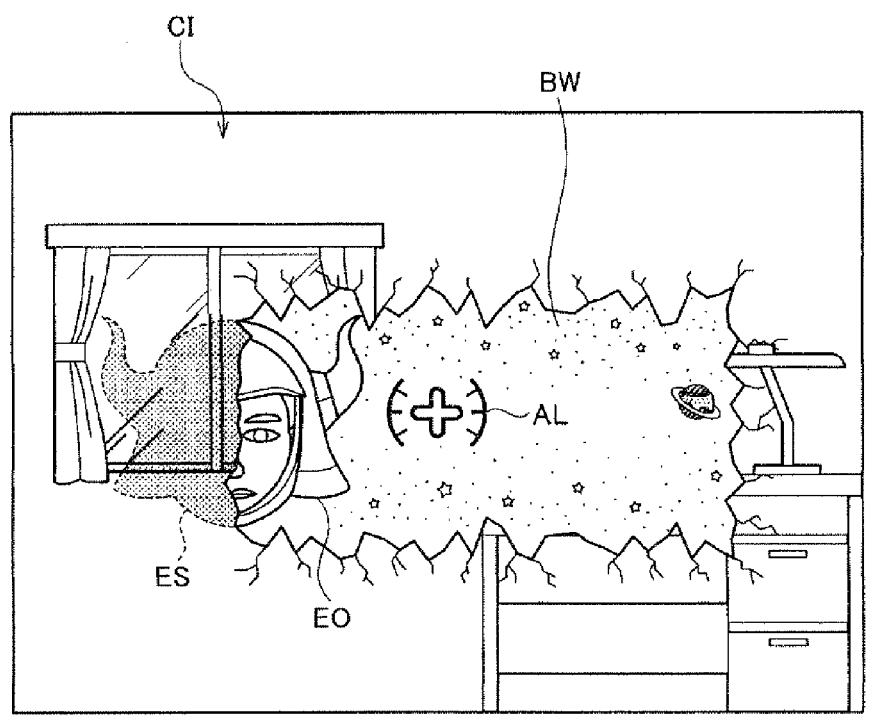
FIG. 25 is a diagram illustrating another example of various processing stages in an exemplary display form displayed on the upper LCD of a game device as an example of a device for executing the image processing program.

All of the eight planar polygons are rendered. If an enemy object EO is situated behind the non-open region of the boundary surface, then on the basis of depth judgment, a solid model of the enemy object EO is not depicted since it is hidden by the boundary surface (screen object). However, since a silhouette model is set in such a manner that depth judgment is not carried out in respect of the boundary surface (screen object), then even if an enemy object EO (and a silhouette model thereof) is situated behind the non-open region of the boundary surface, the silhouette model is rendered and a shadow is displayed as shown in FIG. 24 or FIG. 25. However, if the enemy object EO is situated in front of the boundary surface, or is situated behind the open region of the boundary surface, then the silhouette model is located behind the solid model, the solid model of the enemy object EO is rendered, and therefore the silhouette model is not rendered and the shadow is not displayed. This is because the silhouette model is set so as to be encompassed by the solid model of the enemy object EO.

Images are synthesized in the following order of priority and displayed on the upper LCD 22.

(1) An image of an object present in the first space 1.

(2) A synthesized image of a real world image and a shadow image of an object present in the second space 2, in the non-open region of the real world image (for example, the shadow image is semi-transparent and is synthesized with the real world image).

(3) In the open region of the real world image, an image of an object present in the second space 2 (solid image) is synthesized preferentially and a back wall image is synthesized behind this image.

However, depending on the movement condition of the enemy object EO situated in the second space 2, there are scenes where the enemy object EO is situated so as to span between the open region and the non-open region. In other words, there are scenes where the enemy object EO is present at the edge of the opening, in the position viewed from the virtual camera. FIG. 25 shows a state where an enemy object EO present in the second space 2 has moved to the edge of an opening set on the boundary surface 3. As shown in FIG. 25, in the range where the second space 2 can be viewed via the opening as seen from the virtual camera, the image of the enemy object EO present in the second space 2 is displayed directly on the upper LCD 22, and in the range where the second space 2 cannot be viewed via the opening, a shadow ES of the enemy object EO is displayed on the upper LCD 22.

More specifically, as shown in FIG. 28, data indicating the opacity (alpha value) is set for each object. FIG. 28 shows an example of the opacity (alpha value) set for each object in the present embodiment. An opacity of 1 is set for the texture of the whole solid model of the enemy object. Furthermore, an opacity of 1 is set for the texture of the whole shadow image of the silhouette model (planar polygon) of the enemy object. The same applies to the bullet model. An opacity of 0.6 is set for the texture of, for example, the whole model of an enemy object which is a semi-transparent object model or an effect model. An opacity of 0.2 is set as material for a screen object (the spherical screen model shown in FIG. 20A), and a value of 1 or 0 is set for each point of the α texture which is the texture of the screen object. 1 indicates a non-open section and 0 indicates an open section. More specifically, two opacity value settings are made for the screen object: a material setting and a texture setting.

Furthermore, depth judgment is enabled between an enemy object, a bullet object, a semi-transparent enemy object, an effect object and a screen object. Depth judgment is enabled "between a shadow planar polygon and an enemy object", "between a shadow planar polygon and a bullet object", "between a shadow planar polygon and a semi-transparent enemy object", and "between a shadow planar polygon and an effect object". Depth judgment is disabled between a shadow planar polygon and a screen object.

If the depth judgment is enabled, then rendering is performed in accordance with a normal perspective projection. Hidden surfaces are removed in accordance with the depth direction from the virtual camera. If depth judgment is disabled, then an object is rendered even if there is a target object situated nearer to the virtual camera than that object.

In the present embodiment, during rendering, it is possible to set a rendering formula for each object. More specifically, a rendering formula is set as indicated below.

A solid enemy object, a bullet object, a semi-transparent enemy object, and an effect object are rendered by the following formula.

"Object color×object opacity+background color×(1−object opacity)"

A screen object is rendered by the following formula.

"Object color (color of real world image)×object texture opacity+background color×(1−object texture opacity)"

A silhouette model of an enemy object is rendered by the following formula.

"Object color×(1−background material opacity)+background color×background material opacity"

When an enemy object is rendered, the background is a screen object (boundary surface 3), and therefore in the formula above, "background material opacity" means the "opacity of the material of the screen object (boundary surface 3)".

By means of the various settings described above, when an enemy object is present behind a non-open portion of the boundary surface, a solid object is not displayed and a shadow is shown, whereas when an enemy object is present in front of the boundary surface or when an enemy object is present in the opening of the boundary surface, a shadow is not displayed and a solid object is shown.

Figure 26:
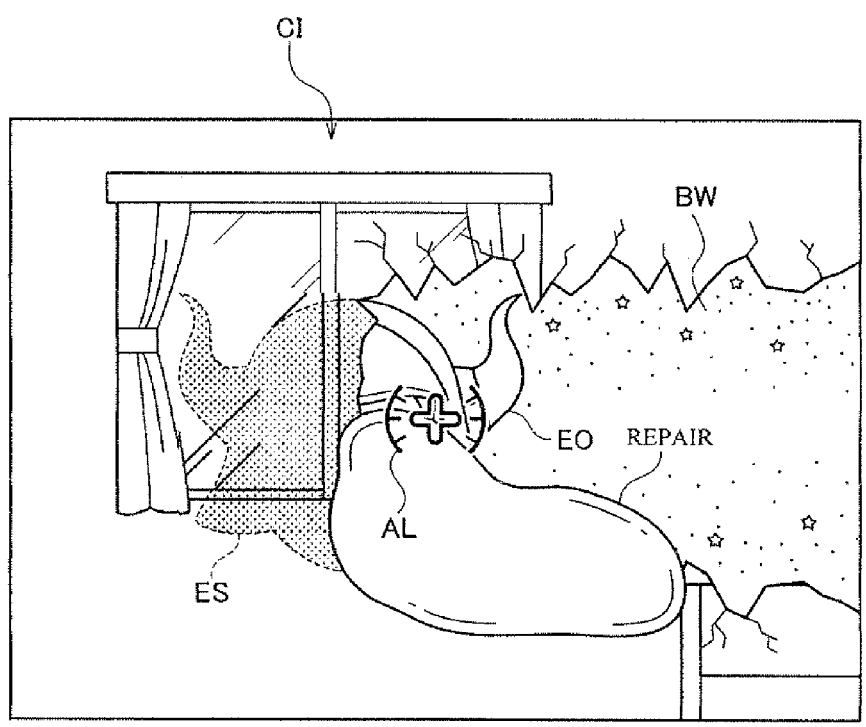
FIG. 26 is a diagram illustrating another example of various processing stages in an exemplary display form displayed on the upper LCD of a game device as an example of a device for executing the image processing program.

Furthermore, in the game according to the present embodiment, the opening which exists in the boundary surface 3 can be repaired by firing a bullet object BO at the opening. FIG. 26 shows a state of closing up an opening in the boundary surface 3 by firing a bullet object BO at the opening. As shown in FIG. 26, if a bullet object BO strikes a non-open region on the boundary surface 3, then non-open data is set for the boundary surface in a predetermined range from the point of impact. By this means, if there was an opening within the predetermined range from the point of impact, then that opening is closed. In the present embodiment, a bullet object BO which strikes an opening is lost (and therefore, the bullet object BO has disappeared in FIG. 26). Furthermore, when a bullet object BO has struck an opening in the boundary surface 3, then the bullet object passes through the opening and moves into the second space.

As described above, a real world image captured in real time by a real camera built into the game device 10 is displayed on the upper LCD 22 as an image which appears to be located on the boundary surface 3. By changing the direction of the game device 10 within the real space, the imaging range captured by the game device 10 is changed, and therefore the camera image CI displayed on the upper LCD 22 also changes. In this case, the game device 10 changes the direction of the aforementioned virtual camera in the aforementioned virtual space (in the second rendering method, the virtual world rendering camera), in accordance with the movement of the game device 10 within the real space. By this means, an enemy object EO shown as if disposed in a real space and/or an opening present in the boundary surface 3 are displayed as if disposed at the same position in the real space, even if the direction of the game device 10 changes in the real space. For example, it is supposed that the imaging direction of the real camera of the game device 10 is changed toward the left. In this case, the display positions of the enemy object EO and the opening in the boundary surface 3 which are shown on the upper LCD 22 move in the opposite direction (rightwards) to the direction in which the imaging direction of the real camera is changed, in other words, the direction of the virtual camera (in the second rendering method, the virtual world rendering camera) in the virtual space where the enemy object EO and the opening in the boundary surface 3 are arranged moves in the same leftward direction as the real camera. Consequently, even if the direction of the game device 10 is changed and the imaging range of the real camera is changed, the enemy object EO and the opening in the boundary surface 3 are displayed on the upper LCD 22 just as if they were situated in the real space represented by the camera image CI.

<Examples of Image Processing Operation>

Figure 29:
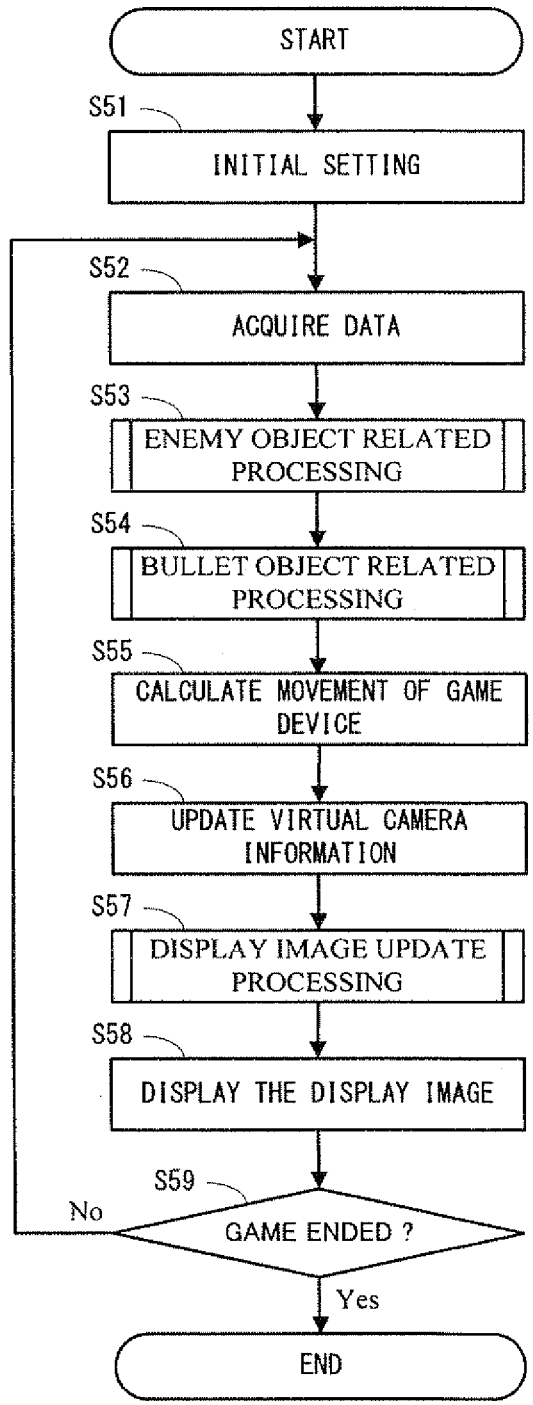
FIG. 29 is a flowchart illustrating an example of operation for image processing by the game device executing the image processing program.
Figure 30:
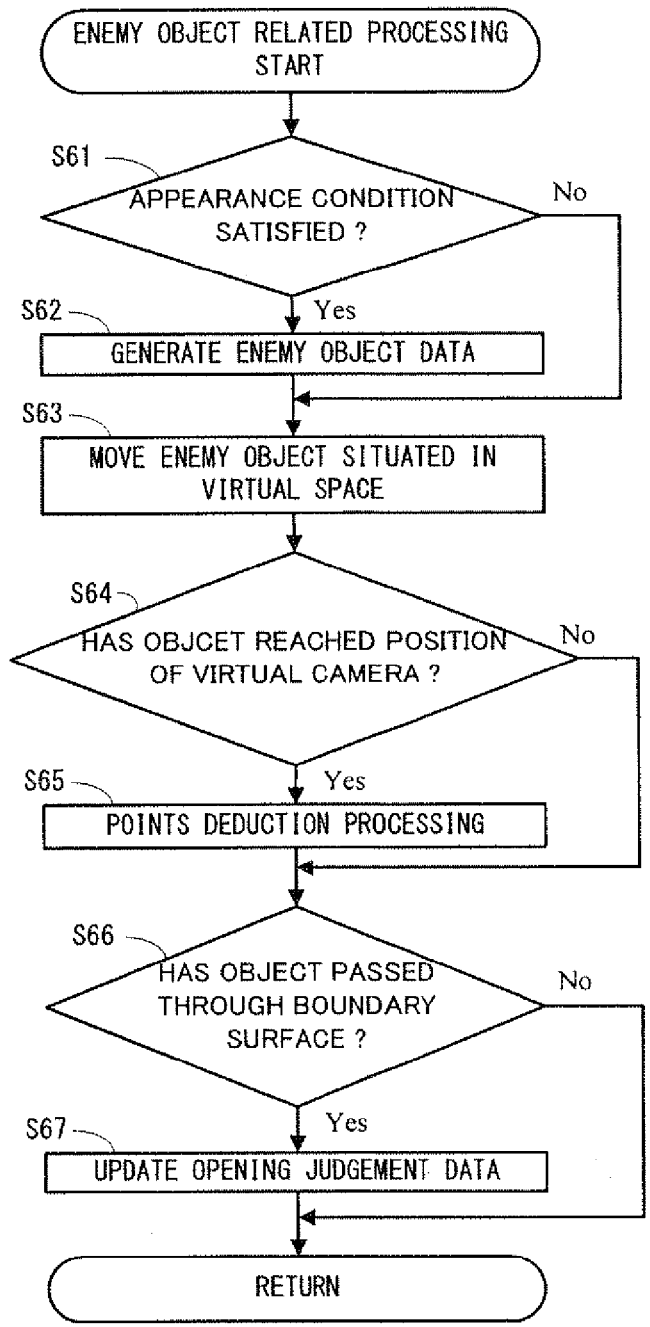
FIG. 30 is a subroutine flowchart illustrating an example of detailed operation of enemy-object-related processing of the image processing program.
Figure 31:
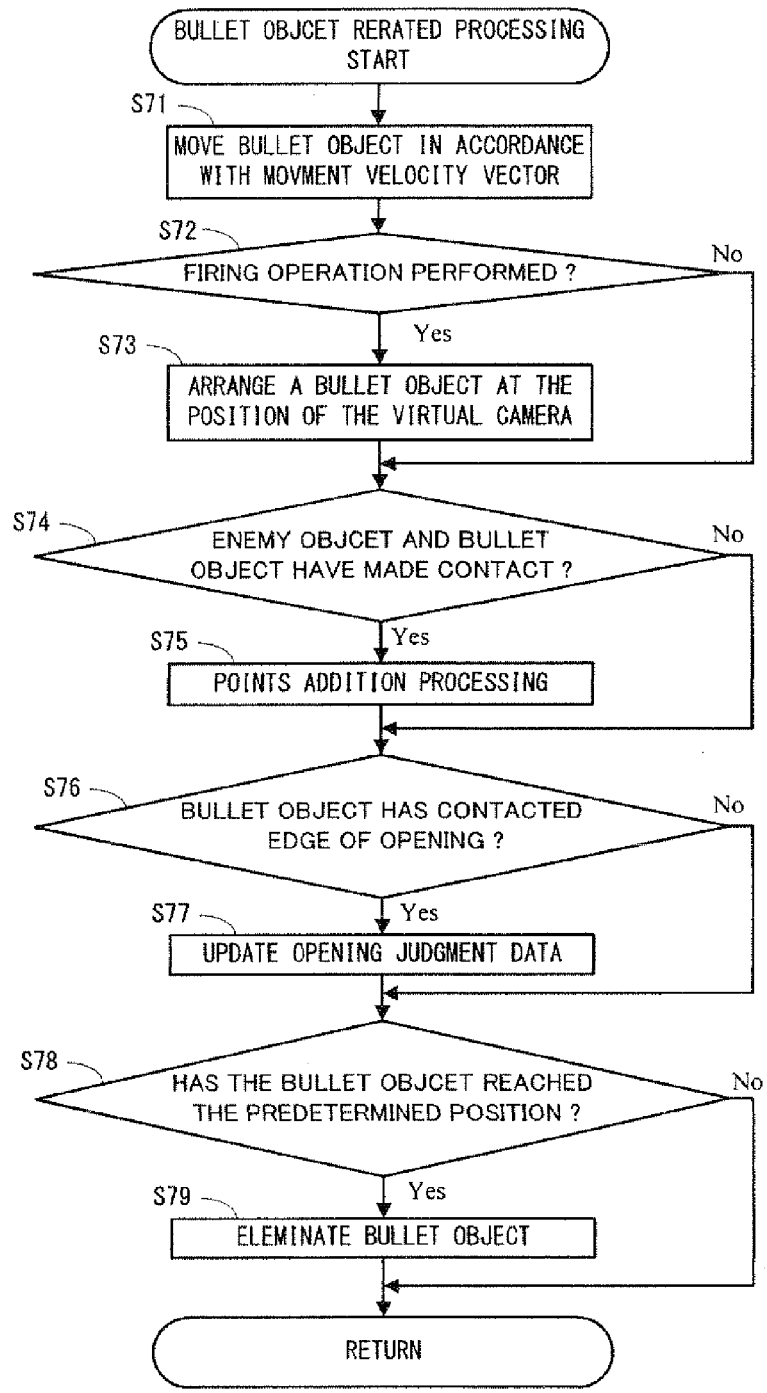
FIG. 31 is a subroutine flowchart illustrating an example of detailed operation of bullet-related processing of the image processing program.
Figure 32A:
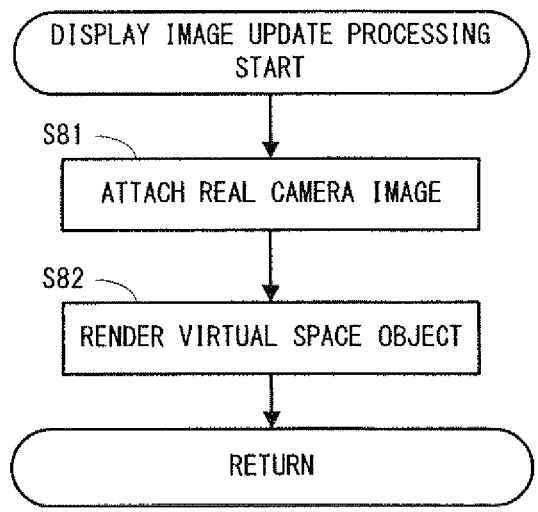
FIG. 32A is a subroutine flowchart illustrating an example of detailed operation of display image updating processing of the image processing program (first rendering method)
Figure 32B:
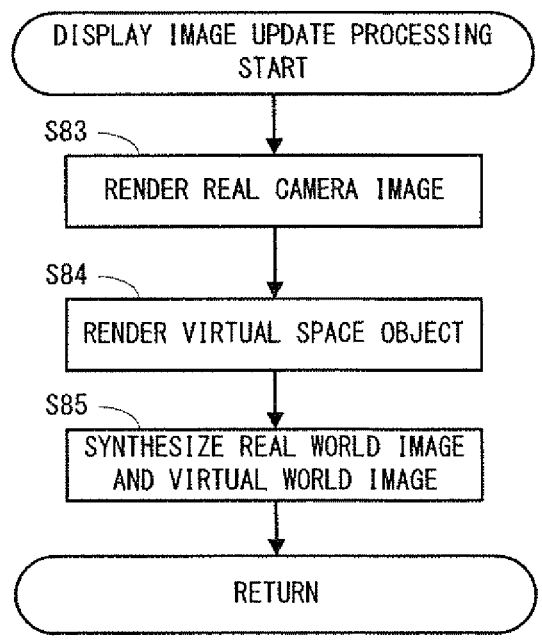
FIG. 32B is a subroutine flowchart illustrating an example of detailed operation of display image updating processing of the image processing program according to this embodiment (second rendering method)

Next, concrete examples of an image processing operation performed by the image processing program according to the present embodiment which is executed by the game device 10 will be described with reference to FIG. 29 to FIG. 31, FIG. 32A and FIG. 32B. FIG. 29 is a flowchart showing one example of an image processing operation performed by the game device 10 as a result of executing the image processing program. FIG. 30 is a flowchart of a sub-routine showing one example of the detailed operation of enemy object related processing carried out in step 53 in FIG. 29, FIG. 31 is a flowchart of a sub-routine showing one example of the detailed operation of bullet object related processing carried out in step 54 in FIG. 29, FIG. 32A and FIG. 32B are flowcharts of a sub-routine showing one example of the detailed operation of display image update processing (the first rendering method and the second rendering method) which is carried out in step 57 in FIG. 29.

<Example of Image Processing>

Next, the operation of the information processing unit 31 is described with reference to FIG. 29. Firstly, when the power supply to the game device 10 (the power button 14F) is switched on, a boot program is executed by the CPU 311, and by this means, a program stored in the built-in memory or the external memory 45 or the external data memory 46 is loaded into the main memory 32. By means of the information processing unit 31 (CPU 311) executing the loaded program, the steps shown in FIG. 29 are executed. In FIG. 29 to FIG. 32A, image processing and other peripheral processing which is not directly related to the image processing of the present invention is omitted.

In FIG. 29, the information processing unit 31 carries out initial setup for image processing (step 51) and then advances to the next step, step 52. For example, the information processing unit 31 sets an initial position and an initial direction of the virtual camera for generating a virtual world image (an image of a virtual space) in the virtual camera data Dj, and sets the coordinate axes of the virtual space where the virtual camera is disposed (for example, the XYZ axes).

Next, the information processing unit 31 acquires various data from the respective constituent parts of the game device 10 (step 52), and then advances to the next step, step 53. For example, the information processing unit 31 updates the real camera image data Db using a camera image captured by a currently selected imaging unit (the outside imaging unit 23 in the present embodiment). Furthermore, the information processing unit 31 updates the control data Da1 by acquiring data indicating that an operating button 14 or the analog stick 15 has been operated. Moreover, the information processing unit 31 acquires angular rate data Da2 indicating the angular velocity determined by the angular rate sensor 40.

Next, the information processing unit 31 executes enemy object related processing (step 53), and then advances to the next step, step 54. Below, the enemy object related processing is described with reference to FIG. 30.

In FIG. 30, the information processing unit 31 judges whether or not a condition for the appearance of an enemy object EO has been satisfied (step 61). For example, the condition for the appearance of an enemy object EO may be that the enemy object EO appears after each predetermined time period, that a new enemy object EO appears in accordance with the disappearance of an enemy object EO from the virtual world, or that an enemy object EO appears at random timing. The condition for the appearance of an enemy object EO is set by the program group Pa which is held in the main memory 32, for example.

When a condition for the appearance of an enemy object EO is satisfied, the information processing unit 31 advances to the next step, step 62. On the other hand, when a condition for the appearance of an enemy object EO is not satisfied, the information processing unit 31 advances to the next step, step 63.

In step 62, the information processing unit 31 generates enemy object data Df corresponding to an enemy object EO which has satisfied an appearance condition, carries out initial setup, and advances to the next step, step 63. For example, the information processing unit 31 acquires solid body data Df1, silhouette data Df2, opening shape data Df3 and data for a polygon corresponding to the enemy object EO, by using the program group Pa which is stored in the main memory 32. The information processing unit 31 then generates enemy object data Df which includes these various elements of data. Furthermore, for instance, the information processing unit 31 makes initial settings for the data indicating the arrangement direction and arrangement position in the virtual space of the polygon corresponding to the enemy object EO, and the data indicating the movement speed and movement direction in the virtual space of the enemy object EO, this data being included in the generated enemy object data Df. These initial settings can be made by a common known method.

Next, the information processing unit 31 moves the enemy object EO situated in the virtual space (step 63), and then advances to the next step, step 64. For example, the information processing unit 31 updates the data indicating the arrangement position of the enemy object EO which is included in the enemy object data Df, on the basis of the data indicating the movement speed and movement direction in the virtual space of the enemy object EO which is included in the enemy object data Df. In this, the information processing unit 31 updates the data indicating the direction of arrangement of the enemy object EO included in the enemy object data Df, on the basis of the data indicating the direction of movement described above. After this updating, the data indicating the movement velocity and movement direction of the enemy object EO in the virtual space, which is included in the enemy object data Df, may be updated in any way. By updating the data indicating the movement velocity and movement direction, the enemy object EO can move at any velocity and in any direction in the virtual space.

Next, the information processing unit 31 judges whether or not the enemy object EO has come within a predetermined distance of the position of the virtual camera (the virtual camera in the first rendering method or the virtual world rendering camera in the second rendering method) (step 64). For example, the information processing unit 31 compares the data indicating the arrangement position of the enemy object EO included in the enemy object data Df with the data indicating the arrangement position of the virtual camera included in the virtual camera data Dj (the virtual camera in the first rendering method or the vertical world rendering camera in the second rendering method). If the two data elements satisfy a predetermined condition (for example, if the distance between the arrangement position of the enemy object EO and the arrangement position of the virtual camera is smaller than a predetermined value), then the information processing unit 31 judges that the enemy object EO has come within a predetermined distance of the position of the virtual camera, and if the two data elements do not satisfy the predetermined condition, then the information processing unit 31 judges that the enemy object EO has not reached the position of the virtual camera. Below, where reference is made simply to the "virtual camera" without distinguishing between the first rendering method and the second rendering method, then this indicates the virtual camera in the case of the first rendering method or the virtual world rendering camera in the case of the second rendering method.

If the information processing unit 31 judges that the enemy object EO has reached the position of the virtual camera, then the information processing unit 31 advances to the next step, step 65. On the other hand, if the information processing unit 31 judges that the enemy object EO has not reached the position of the virtual camera, then the information processing unit 31 advances to step 66.

In step 65, the information processing unit 31 carries out points deduction processing and then advances to the next step, step 66. For example, the information processing unit 31 deducts a predetermined value from the game points score indicated by the points score data Dh, and updates the points score data Dh using the points score after deduction. In the points deduction processing described above, the information processing unit 31 may carry out processing for eliminating an enemy object EO which has reached the position of the virtual camera, from the virtual space (for example, processing for initializing the enemy object data Df relating to the enemy object EO which has reached the position of the virtual camera and making the enemy object EO cease to exist in the virtual space). Furthermore, the predetermined value in this points deduction processing may be any value, for example, the value may be set by the program group Pa held in the main memory 32.

In step 66, the information processing unit 31 judges whether or not the enemy object EO is passing through the boundary surface 3 (the enemy object EO is moving between the first space 1 and the second space 2). For example, the information processing unit 31 compares the data indicating the arrangement position of the enemy object EO which is included in the enemy object data De and the data indicating the arrangement position of the boundary surface 3 which is included in the boundary surface data Dd. The information processing unit 31 judges that the enemy object EO is passing through the boundary surface 3 if the two data elements satisfy a predetermined condition and judges that the enemy object EO is not passing through the boundary surface 3 if the two data elements do not satisfy a predetermined condition. The predetermined condition means that, for example, the coordinates (arrangement position) of the enemy object EO in the virtual space satisfy the condition formula of the spherical surface of the boundary surface 3. As stated above, the data indicating the arrangement position of the boundary surface 3 in the virtual space denotes the range in which the boundary surface 3 is present in the virtual space and is, for example, the condition formula of a spherical surface (the shape of the boundary surface 3 in the present embodiment). If the arrangement position of the enemy object EO satisfies this condition formula, then the enemy object EO is situated on the boundary surface 3 in the virtual space. In the present embodiment, in cases such as this, for example, it is judged that the enemy object EO is passing through the boundary surface 3.

If it is judged that the enemy object EO is passing through the boundary surface 3, then the information processing unit 31 advances to the next step, step 67. On the other hand, if it is judged that the enemy object EO is not passing through the boundary surface 3, then the information processing unit 31 terminates the processing of this sub-routine.

In step 67, the information processing unit 31 carries out processing for updating the opening judgment data included in the boundary surface data Dd, and then terminates the processing by this sub-routine. This processing is processing for registering, in the boundary surface data Dd, information about an opening in the boundary surface 3 which is created by the enemy object EO passing through the boundary surface 3. For example, in the first rendering method and the second rendering method, the information processing unit 31 multiplies together the alpha value of the region centered on the position corresponding to the position in the virtual space where the enemy object EO passes through the boundary surface 3 and the alpha value of the opening shape data Df3, these alpha values being contained in the opening judgment data included in the boundary surface data Dd. The opening shape data Df3 is texture data in which an alpha value of "0" centered on the arrangement position of the enemy object EO is stored. Therefore, due to this multiplication process, the alpha value of the opening judgment data is "0" for the region where an opening is created, centered on the arrangement position of the enemy object EO (the coordinates on the boundary surface 3 through which the enemy object EO passes). In other words, the information processing unit 31 is able to update the state of the boundary surface (and more specifically, the opening judgment data), without judging whether or not an opening is already present in the boundary surface 3. It is also possible to judge whether or not an opening is already present at the position of the collision between the enemy object and the boundary surface. If there is no opening, then it is possible to display an effect whereby the real world image corresponding to the impact position is broken into scattered fragments.

Furthermore, in the opening judgment data update processing described above, the information processing unit 31 may carry out scene processing to show that an opening has been created (for example, to create a scene where a wall is knocked down at the position where the opening is created). In this case, the information processing unit 31 needs to judge whether or not the position at which the enemy object EO passes through the boundary surface 3 (the range where the opening is created) was already in an open state. The information processing unit 31, for example, is able to judge whether or not the range where an opening is to be created was already in an open state by multiplying open shape data Df3 with an alpha value reversed from "0" to "1" by the alpha value of the opening judgment data multiplied above. In other words, if the whole range where an opening is created was already in an open state, then the alpha value of the opening judgment data will be "0" and therefore this multiplication result will be "0". On the other hand, if a portion of the range where the opening is to be created is not in an open state, then there is a portion where the alpha value of the opening judgment data is not "0", and hence the multiplication result will be a value other than "0".

The opening shape data Df3 of the enemy object EO is texture data storing an alpha value of "0" corresponding to the shape of the enemy object EO, but the information processing unit 31 may also convert the alpha value of this texture data to "1" as a result of a predetermined event. If the aforementioned processing is carried out after this change, the alpha value of the opening shape data Df3 will be "1", and therefore the alpha value of the opening judgment data is not changed. In this case, the enemy object EO passes through the boundary surface 3 without creating an opening. More specifically, by this means, a scene can be created in which the enemy object EO slips through the boundary surface 3 (see FIG. 22). The predetermined event may be a time interval which is set to a predetermined interval or random interval, or when a predetermined condition is satisfied in the game. These settings can be made by the program group Pa which is held in the main memory 32, for example.

Returning to FIG. 29, after the enemy object related processing in step 53, the information processing unit 31 carries out bullet object related processing (step 54) and then advances to the next step, step 55. Below, the bullet object related processing is described with reference to FIG. 31.

In FIG. 31, the information processing unit 31 moves the bullet object BO in the virtual space in accordance with a set movement velocity vector (step 71), and then advances to the next step, step 72. For example, the information processing unit 31 updates the data indicating the arrangement direction and the arrangement position of the bullet object BO, on the basis of the data indicating the movement velocity vector which is included in the bullet object data Dg. In this, the information processing unit 31 is able to update the data indicating the movement velocity vector by a commonly known method. Furthermore, for example, the information processing unit 31 is able to change the method of updating the data indicating the movement velocity vector, in accordance with the type of bullet object BO. For example, if the bullet object BO is a ball, then the information processing unit 31 takes account of the effects of gravity in the vertical direction of the virtual space, when updating the data indicating the movement velocity vector.

Thereupon, the information processing unit 31 judges whether or not a firing operation has been performed by the user of the game device 10 (step 72). For example, the information processing unit 31 judges whether or not the user has performed a predetermined firing operation (for example, pressing the button 14B (button A)), by referring to the control data Da1. If a firing operation has been performed, then the information processing unit 31 advances to the next step, step 73. On the other hand, if a firing operation has not been performed, then the information processing unit 31 advances to the next step, step 74.

In step 73, the information processing unit 31 arranges a bullet object BO at the position of the virtual camera in the virtual space, in accordance with the firing operation, and sets a movement velocity vector for that bullet object BO, before then advancing to the next step, step 74. For example, the information processing unit 31 generates bullet object data Dg corresponding to the firing operation. For instance, the information processing unit 31 stores data indicating the arrangement position and arrangement direction of the virtual camera which is included in the virtual camera data Dj, as the data indicating the arrangement position and arrangement direction of the bullet object BO which is included in the generated bullet object data Dg. Furthermore, for example, the information processing unit 31 stores an arbitrary value for the data indicating the movement velocity vector which is included in the generated bullet object data Dg. The value stored in the data indicating the movement velocity vector may be set by the program group Pa which is held in the main memory 32.

In step 74, the information processing unit 31 judges whether or not the enemy object EO and the bullet object BO have made contact within the virtual space. For instance, the information processing unit 31 compares the data indicating the arrangement position of the enemy object EO which is included in the enemy object data Df with the data indicating the arrangement position of the bullet object BO which is included in the bullet object data Dg, and judges whether or not the enemy object EO and the bullet object BO have made contact in the virtual space. If, for example, the data indicating the arrangement position of the enemy object EO and the data indicating the arrangement position of the bullet object BO satisfy a predetermined condition, then the information processing unit 31 judges that the enemy object EO and the bullet object BO have made contact. Furthermore, if this is not the case, then the information processing unit 31 judges that the enemy object EO and the bullet object BO have not made contact. The predetermined condition is, for instance, that the distance between the arrangement position of the enemy object EO and the arrangement position of the bullet object BO is less than a predetermined value. This predetermined value may be a value based on the size of the enemy object EO, for example.

If the information processing unit 31 judges that the enemy object EO and the bullet object BO have made contact, then the information processing unit 31 advances to the next step, step 75. On the other hand, if the information processing unit 31 judges that the enemy object EO and the bullet object BO have not made contact, then the information processing unit 31 advances to the next step, step 76.

In step 75, the information processing unit 31 carries out points addition processing and then advances to the next step, step 76. For example, in this points addition processing, the information processing unit 31 adds a predetermined number of points to the game points score indicated by the points score data Dh, and updates the points score data Dh using the points score after addition. Furthermore, in the points addition processing, the information processing unit 31 carries out processing for eliminating both objects (in other words, the enemy object EO and the bullet object BO) which are judged to have made contact in step 74 above (for example, the information processing unit 31 initializes the enemy object data Df and the bullet object data Dg relating respectively to the enemy object EO which has made contact with the bullet object BO and the bullet object BO which has made contact with the enemy object EO, and makes the enemy object EO and the bullet object BO cease to exist in the virtual space). Furthermore, the predetermined value in this points addition processing may be any value, for example, the value may be set by the program group Pa held in the main memory 32.

In step 76, the information processing unit 31 judges whether or not the bullet object BO has made contact with a non-open region of the boundary surface 3. For example, the information processing unit 31 judges whether or not the bullet object BO has made contact with the non-open region of the boundary surface 3 by using the opening judgment data and the data indicating the arrangement position of the bullet object BO which is included in the bullet object data Dg.

For example, the information processing unit 31 judges whether or not the data indicating the arrangement position of the bullet object BO which is included in the bullet object data Dg satisfies the condition formula of the spherical surface of the boundary surface 3, similarly to the processing of the enemy object EO described above. Thereupon, if the data indicating the arrangement position of the bullet object BO does not satisfy the condition formula of the spherical surface, then the information processing unit 31 judges that the bullet object BO is not in contact with the boundary surface 3. On the other hand, if the data indicating the arrangement position of the bullet object BO satisfies the condition formula of the spherical surface of the boundary surface 3, then this means that the bullet object BO is situated at the boundary surface 3 in the virtual space. In this case, the information processing unit 31, for example, acquires the alpha value of the opening judgment data for a predetermined region centered on a position corresponding to the position of the bullet object BO on the boundary surface 3. This predetermined region is a predetermined region centered on the point of contact between the bullet object BO and the boundary surface 3. If the alpha value in the opening judgment data corresponding to this predetermined region is an alpha value of "1" which corresponds to a non-open region, then it is judged that the bullet object BO has made contact with a non-open region of the boundary surface 3.

If the information processing unit 31 judges that the bullet object BO has made contact with a non-open region of the boundary surface 3, then the information processing unit 31 advances to the next step, step 77. On the other hand, if the information processing unit 31 judges that the bullet object BO has not made contact with a non-open region of the boundary surface 3, then the information processing unit 31 advances to the next step, step 78.

In step 77, the information processing unit 31 carries out processing for updating the opening judgment data and then advances to the next step, step 78. For example, in the update processing described above, the information processing unit 31 updates the alpha value of the opening judgment data for a predetermined region centered on the position on the boundary surface 3 corresponding to the arrangement position of the bullet object BO which has been judged to have made contact with a non-open region of the boundary surface 3, to an alpha value of "1" which corresponds to a non-open region. Furthermore, in the update processing described above, the information processing unit 31 carries out processing for eliminating, from the virtual space, the bullet object BO which is judged to have made contact at step 76 described above (for example, processing for initializing the bullet object data Dg relating to the bullet object BO which has made contact with a non-open region of the boundary surface 3, and making the bullet object BO cease to exist in the virtual space). The predetermined region in this update processing may be any region, for example, the region may be set by the program group Pa held in the main memory 32.

In step 78, the information processing unit 31 judges whether or not the bullet object BO has reached a predetermined position in the virtual space. The predetermined position may be a position where the back wall BW is situated in the virtual space. In this case, for example, the information processing unit 31 judges whether or not the data indicating the arrangement position of the bullet object BO which is included in the bullet object data Dg has collided with the back wall BW.

If the information processing unit 31 judges that the bullet object BO has reached the predetermined position, then the information processing unit 31 advances to the next step, step 77. On the other hand, if the bullet object BO has not reached the predetermined position, then the information processing unit 31 terminates processing by this sub-routine.

In step 77, the information processing unit 31 carries out processing for eliminating, from the virtual space, a bullet object BO which is judged to have reached the predetermined position at step 76 described above, and then terminates processing by this sub-routine. For example, the information processing unit 31 initializes the bullet object data Dg relating to the bullet object BO and makes that bullet object BO cease to exist in the virtual space.

Returning to FIG. 29, after the bullet object related processing in step 54, the information processing unit 31 calculates movement of the game device 10 (step 55) and then advances to the next step, step 56. For example, the information processing unit 31 calculates the movement of the game device 10 by using the angular velocity indicated by the angular rate data Da2 (for instance, the change in the imaging direction of the real camera provided in the game device 10), and updates the movement data Di on the basis of this movement. More specifically, if the user has changed the imaging direction of the real camera provided in the game device 10, in the real space, then the orientation of the whole game device 10 also changes, and an angular velocity corresponding to this change is produced in the game device 10. By detecting this angular velocity produced in the game device 10 by means of the angular rate sensor 40, data indicating the angular velocity is stored as angular velocity data Da2. Consequently, the information processing unit 31 can use the angular velocity indicated by this angular velocity data Da2 to calculate the movement of the game device 10 in terms of the direction of change and amount of change (angle) in the imaging direction of the real camera which is provided in the game device 10.

Next, the information processing unit 31 changes the direction of the virtual camera in the virtual space in accordance with the movement of the game device 10 (step 56), and then advances to step 57. For example, using the movement data Di, the information processing unit 31 applies the same change as the change in imaging direction of the real camera of the game device 10 in the real space, to the virtual camera in the virtual space, and updates the virtual camera data Dj using this changed position and direction of the virtual camera. For example, if the imaging direction of the real camera of the game device 10 in the real space is changed through A° to the left, then the direction of the virtual camera in the virtual space is changed through A° to the left. By this means, an enemy object EO and/or a bullet object BO which are shown as if arranged inside the real space are displayed so as to be disposed in the same position in the real space, even if the direction and/or position of the game device 10 changes in the real space.

Next, the information processing unit 31 executes display screen update processing (step 57), and then advances to the next step, step 58. Below, the display screen update processing is described with reference to FIG. 32A and FIG. 32B. FIG. 32A shows display screen update processing in the first rendering method. Furthermore, FIG. 32B shows display screen update processing in the second rendering method.

Firstly, the display screen update processing in the first rendering method will be described.

In FIG. 32A, the information processing unit 31 carries out processing for attaching a real camera image acquired at step 52 described above, to a screen object (boundary surface 3) in the imaging range of the virtual camera (step 81), and then advances to the next step, step 82. For example, the information processing unit 31 updates the texture data of the real camera image included in the real world image data Dc by using the real camera image data Db which has been updated at step 52. The information processing unit 31 then determines a point where the boundary surface 3 overlaps with the view direction of the virtual camera, by using the data indicating the arrangement direction and the arrangement position of the virtual camera in the virtual space, which is included in the virtual camera data Dj. The information processing unit 31 attaches the texture data of the real camera image described above, which is included in the real world image data Dc, by centering the texture data on the point thus determined, and updates the boundary surface data Dd accordingly. In this case, the information processing unit 31 acquires opening judgment data set for the region where the texture data is attached, for a region corresponding to each pixel of the texture data. The information processing unit 31 applies the alpha value set in the acquired opening judgment data (a value of "0" or "0.2") to the texture data. More specifically, the information processing unit 31 multiplies together the color information of each pixel of the texture data of the real camera image to be attached, and the alpha value of the corresponding position in the opening judgment data. By means of this processing, an opening appears in the real world image, as described previously. In the multiplication described above, the alpha value "0.2" (non-open region) stored in the opening judgment data is handled as an alpha value of "1" of a material as described above. Furthermore, in the present embodiment, the texture data of the real camera image which is attached to the boundary surface 3 is image data having a broader range than the imaging range of the virtual camera C0.

Next, the information processing unit 31 generates a display image by rendering the virtual space (step 82) and then terminates the processing of this sub-routine. For example, the information processing unit 31 generates an image in which a virtual space containing a boundary surface 3 (screen object), an enemy object EO, a bullet object BO, and a back wall BW is rendered, and uses this image to update the rendered image data of the virtual space which is included in the rendered image data Dk. Furthermore, the information processing unit 31 updates the display image data D1 using the rendered image data of the virtual space. Below, one example of this rendering process is described with reference to FIG. 33 and FIG. 34.

Figure 33:
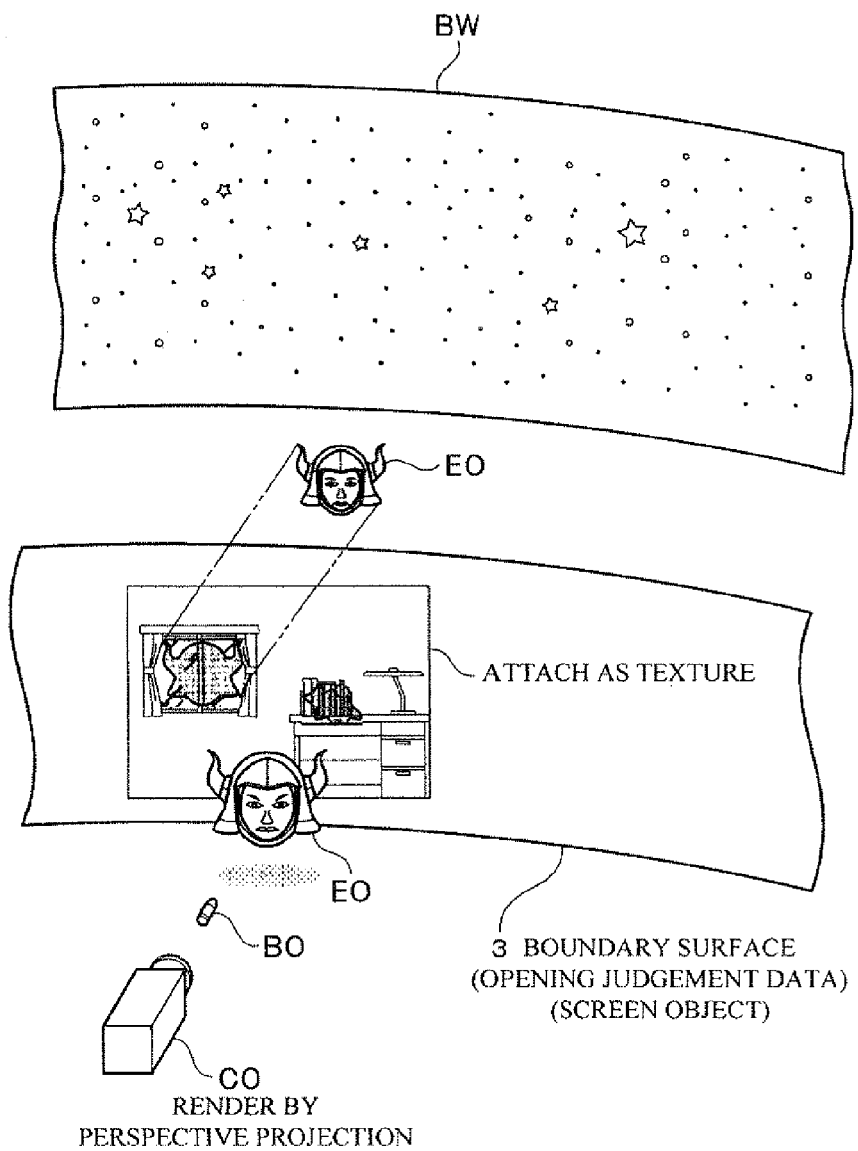
FIG. 33 is an explanatory diagram for explaining an example of rendering processing in the rendering method.
Figure 34:
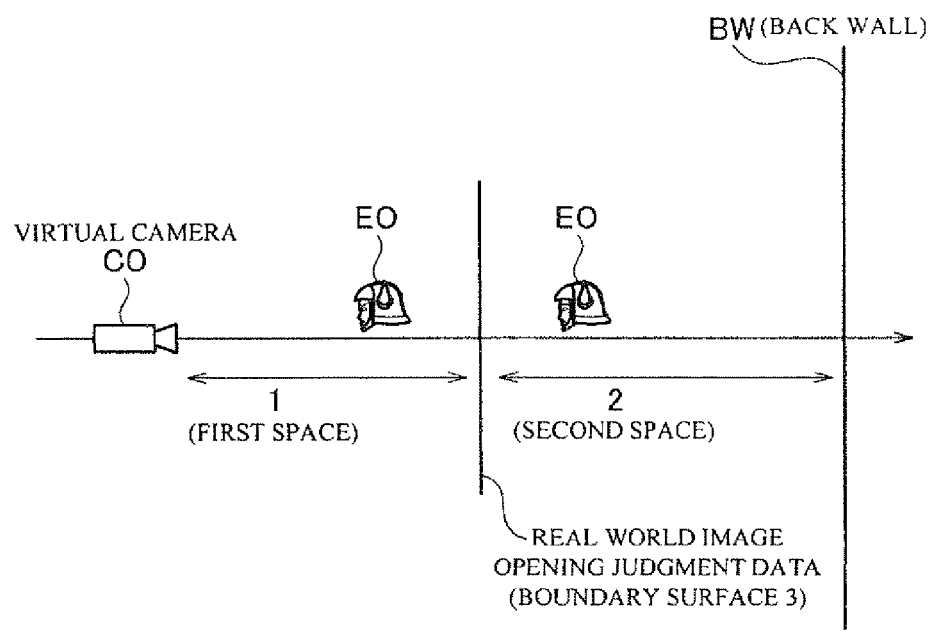
FIG. 34 is an explanatory diagram for explaining a positional relationship of the objects in FIG. 33.

FIG. 33 shows an example of the arrangement of an enemy object EO, a bullet object BO, a boundary surface 3 (a screen object on which opening judgment data is set) and a back wall BW, in the virtual space. Furthermore, FIG. 34 shows the positional relationships of the objects in a case where the virtual camera C0 in FIG. 33 is oriented in the direction (X,Y,Z)=(0,0,1) from the point of origin. In this way, the enemy object EO, the bullet object BO, the boundary surface 3 and the back wall BW are respectively arranged in accordance with data indicating the arrangement positions which is included in the enemy object data Df, the bullet object data Dg, the boundary surface data Dd and the back wall image data De. Furthermore, the virtual camera C0 for rendering the virtual space is arranged in the virtual space in accordance with data indicating the arrangement direction and the arrangement position which is included in the virtual camera data Dj.

The information processing unit 31 renders the enemy object EO, the bullet object BO and the back wall BW arranged in the virtual space including a boundary surface 3 as shown in FIG. 33 (or FIG. 34) by perspective projection by the virtual camera C0. In this case, the information processing unit 31 takes account of the rendering priority information. In normal perspective projection, an object which is situated in the second space 2 is not rendered, due to the presence of the boundary surface 3. In the game according to the present embodiment, an opening is provided in the boundary surface 3 (real world image), and a portion of the second space 2 is visible through this opening. Furthermore, a shadow of the object situated in the second space 2 is synthesized and rendered with the real world image. In so doing, it is possible to give the user a sense of the existence of a virtual world beyond the real world image. More specifically, the information processing unit 31 carries out the rendering process using the rendering priority information. The image processing program according to the present embodiment uses an alpha value as an example of the rendering priority.

In the perspective projection described above, an object present in the second space 2 (in the present embodiment, an enemy object EO or a back wall BW) is situated behind the boundary surface 3. Here, the boundary surface 3 is a screen object to which real camera image texture data has been attached in the direction of view (range of view) of the virtual camera C0, by step 81 described above. Furthermore, as described above, opening judgment data corresponding to each position is applied to the real camera image texture data. Consequently, a real world image to which opening judgment data has been applied is present in the range of view of the virtual camera C0.

In the present embodiment, for example, the information processing unit 31 renders images of a virtual object and/or a back wall which are present in a region of the second space 2 that is visible through a region (opening region) for which an alpha value of "0" is stored in the opening judgment data. Furthermore, the information processing unit 31 does not render a virtual object and/or back wall present in the second space 2 in a region for which an alpha value of "0.2" corresponding to a non-open region is stored in the opening judgment data (namely, a region which is treated as a region for which an alpha value of "1" indicating a non-open region has been stored). More specifically, a real world image which is attached at step 81 above is rendered in the portion of the displayed image which corresponds to this non-open region.

Consequently, image data included in the solid body data Df1 or the back wall image data De is rendered in a region where a value of "0" has been stored in the opening judgment data, from the viewpoint of the virtual camera C0. An image of a virtual object or a back wall is shown in the portion corresponding to this region, on the upper LCD 22.

Furthermore, the information processing unit 31 does not render a virtual object and/or back wall present in the second space 2 in a region for which an alpha value of "0.2" indicating a non-open region is stored in the opening judgment data viewed from the virtual camera C0 (namely, a region which is treated as a region for which an alpha value of "1" indicating a non-open region has been stored). In other words, a real world image is rendered in the portion corresponding to this region in the image displayed on the upper LCD 22. However, in the case of the shadow ES of an enemy object EO (silhouette model) which is situated in the second space 2, depth judgment with respect to the boundary surface 3 is disabled, and since the alpha value "1" of the silhouette model is greater than the alpha value "0.2" of the boundary surface 3, then the shadow ES is rendered in the region where an alpha value "1" indicating a non-open region is stored (a region for which an alpha value of "0.2" is stored in the opening judgment data). By this means, an image of a shadow ES of an enemy object EO is rendered on the real world image.

Furthermore, the shadow ES (silhouette model) of the enemy object EO is arranged with a size so as to be encompassed by the solid model, and depth judgment is set to be enabled between the solid model and the shadow ES (silhouette model) of the enemy object EO. If the enemy object EO is situated in the first space 1, then the silhouette model is hidden by the solid model and is therefore not rendered.

The shape of the boundary surface 3 in the present embodiment is the central portion of a spherical surface as shown in FIG. 20A, and depending on the view direction of the virtual camera C0, there does not exist any opening judgment data. In this case, the processing described above is carried out by artificially supposing that there exists opening judgment data storing an alpha value of "0.2". In other words, the region where there is no opening judgment data is treated as a region where an alpha value of "1" indicating a non-opening region is stored.

Furthermore, the silhouette data Df2 included in the enemy object data Df corresponding to the enemy object EO in the present embodiment is set in such a manner that there are a plurality of planar polygons having normal directions arranged in respective radiating directions when viewed from the enemy object, and texture of a silhouette image of the enemy object viewed from the corresponding direction is applied to each of the planar polygons. Consequently, in the image processing program according to the present embodiment, the shadow of the enemy object EO in the virtual space image is depicted as an image which reflects the orientation of the enemy object in the second space 2.

Furthermore, the information processing unit 31 carries out the aforementioned rendering process in such a manner that the image data included in the pointing cursor image data Dm is rendered preferentially in the center of the field of view of the virtual camera C0 (in the center of the rendered image).

By means of the processing described above, the information processing unit 31 renders an enemy object EO, a bullet object BO and a back wall BW which are arranged in the virtual space, by perspective projection to generate a virtual world image viewed from the virtual camera C0 (an image including a pointing cursor AL), and updates the rendered image data of the virtual space accordingly (step 82). Furthermore, the information processing unit 31 updates the display image data Dl using this updated rendered image data of the virtual space.

Next, the display screen update processing in the second rendering method will be described.

In FIG. 32B, the information processing unit 31 carries out processing for rendering the real camera image acquired at step 52 described above (step 83) and then advances to the next step, step 84. For example, the information processing unit 31 updates the texture data of the real camera image included in the real world image data Dc by using the real camera image data Db which has been updated at step 52. The information processing unit 31 generates a rendered image of the real camera image using the updated real world image data Dc, and updates the rendered image data of the real camera image which is included in the rendered image data Dk, using the generated image. Below, an example of processing for rendering the real camera image is described with reference to FIG. 35 and FIG. 36.

Figure 35:
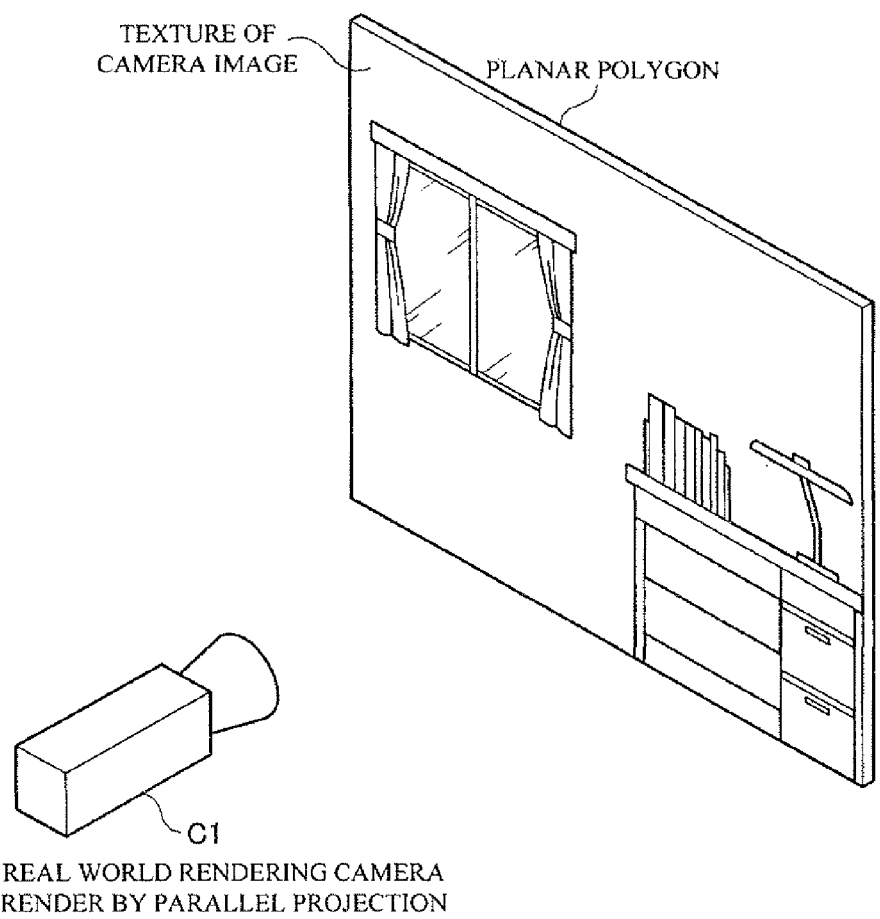
FIG. 35 is an explanatory diagram for explaining an example of processing for rendering a camera image.
Figure 36:
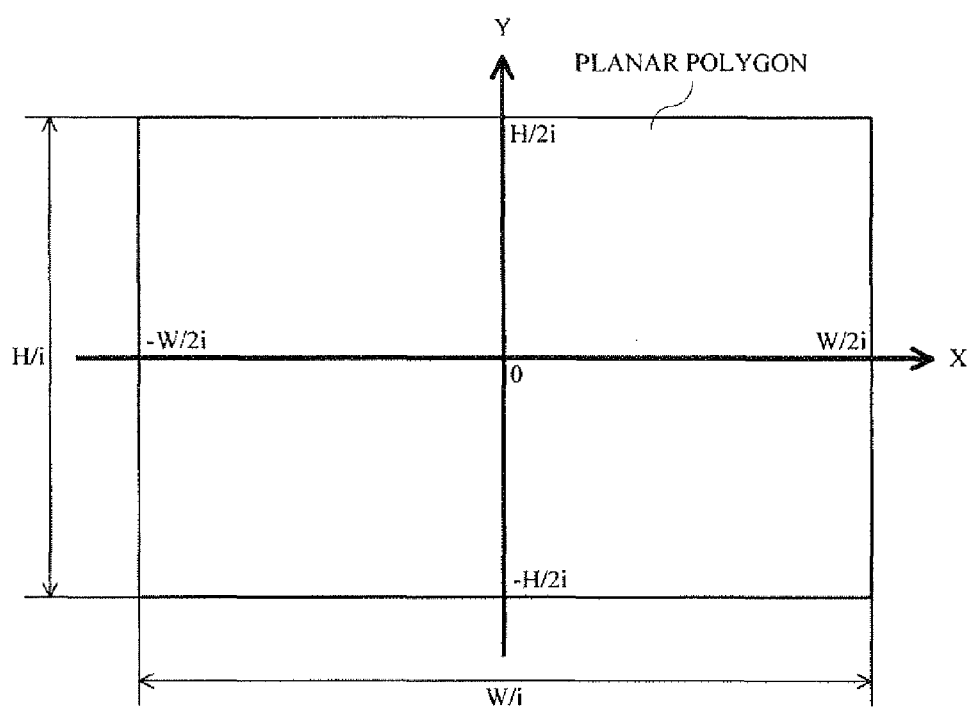
FIG. 36 is an explanatory diagram for explaining an example of coordinates used for rendering a camera image.

In the present embodiment, as shown in FIG. 35, the information processing unit 31 sets the real camera image obtained from a real camera of the game device 10, as a texture, and generates a planar polygon to which this texture is mapped. The information processing unit 31 generates, as a real world image, an image in which the aforementioned planar polygon is rendered by parallel projection from the real world image rendering camera C1. Here, an example of a real world image generating method is described in relation to a case where the whole real camera image obtained from the real camera of the game device 10 is displayed on the whole surface of the display screen of the upper LCD 22. In the present embodiment, a synthesized image according to the present embodiment (a synthesized image of the real world image and the virtual world image) is displayed on the whole display screen of the upper LCD 22, but it is also possible for the synthesized image to be displayed on a portion of the display screen of the upper LCD 22. In this case, the whole of the real camera image is displayed in the whole of this synthesized image.

Firstly, a planar polygon is considered in which an i pixel texture is mapped to one unit of the coordinates of the virtual space in which the planar polygon is arranged. In this case, texture of i pixels by i pixels is mapped to a region of 1 unit×1 unit of the aforementioned coordinates. Here, the display screen of the upper LCD 22 is W dots horizontally by H dots vertically, and the whole area of the W dot×H dot display screen corresponds to the whole area of the real camera image texture described above. In other words, the size of the texture data of the camera image is W pixels horizontally by H pixels vertically.

In this case, the coordinates described above should be determined as shown in FIG. 36, by taking account of the fact that the planar polygon is arranged in such a manner that 1 dot×1 dot on the display screen corresponds to 1 pixel×1 pixel of the real camera image texture. More specifically, the XY coordinates of the virtual space in which the planar polygon is arranged are set in such a manner that the planar polygon, onto the whole main surface of which the texture of the camera image is mapped, has a width corresponding to a coordinate amount of W/i, and a height corresponding to a coordinate amount of H/i. The planar polygon is arranged in such a manner that the center of the main surface of the planar polygon to which the texture has been mapped coincides with the point of origin of the XY coordinates of the virtual space, the horizontal direction of the planar polygon is the X axis direction (the leftward direction is the forward direction of the X axis), and the vertical direction of the planar polygon is the Y axis direction (the upward direction is the forward direction of the Y axis). In this case, the upper right corner position of the main surface of the planar polygon which to which the texture is mapped is located at (X,Y)=(W/2i, H/2i), the lower right corner position is located at (X,Y)=(W/2i, −H/2i), the upper left corner position is located at (X,Y)=(−W/2i, H/2i), and the lower left corner position is located at (X,Y)=(−W/2i, −H/2i).

By arranging the planar polygon in this way, a region of 1 pixel×1 pixel of the coordinates described above corresponds to a region of i pixels×i pixels of the texture, and therefore the (W/i) horizontal by (H/i) vertical region of the planar polygon corresponds to the W pixel by H pixel size of the texture.

As described above, by rendering the planar polygon arranged at the coordinates of the virtual space by parallel projection in such a manner that 1 dot on the display screen corresponds to 1 pixel on the real camera image (texture), a real world image corresponding to the real camera image obtained by the real camera of the game device 10 is generated.

Furthermore, as described above, the texture data of the real camera image included in the real world image data Dc is updated on the basis of the real camera image data Db, but there may be cases where the A (horizontal)×B (vertical) size of the image in the real camera image data Db does not match the W (horizontal)×H (vertical) size of the texture data. In this case, the information processing unit 31 performs updating of the texture data by any method. For example, the information processing unit 31 may update the texture data by using an image in which the horizontal size A and vertical size B of the image in the real camera image data Db is enlarged or reduced, so as to match an image of W×H size (texture data image). Moreover, for example, it is supposed that the horizontal size A and vertical size B of the image in the real camera image data Db are larger than the horizontal size W and vertical size H of the texture data. In this case, for example, the information processing unit 31 may update the texture data by extracting an image of W×H size (a texture data image) on the basis of the predetermined position of the image in the real camera image data Db. Moreover, for example, at least one of the horizontal A and vertical B size of the image in the real camera image data Db is taken to be smaller than the horizontal W and vertical H size of the texture data. In this case, for example, the information processing unit 31 may extract an image of W×H size (a texture data image) and update this texture data, on the basis of a predetermined position of the image after enlarging the real camera image data Db so as to be larger than the size of the texture data.

Furthermore, in the present embodiment, the horizontal× vertical size of the display screen of the upper LCD 22 matches the horizontal×vertical size of the texture data of the real camera image, but these sizes do not have to be matching. In this case, the display screen of the upper LCD 22 and the real world image do not have matching sizes, but the information processing unit 31 may alter the size of the real world image by a commonly known method when displaying the real world image on the display screen of the upper LCD 22.

Thereupon, as shown in FIG. 32B, the information processing unit 31 carries out processing for rendering the virtual space (step 84) and then advances to the next step, step 85. For example, the information processing unit 31 generates an image in which a virtual space containing the enemy object EO, bullet object BO, and back wall BW is rendered, taking account of the opening judgment data, and uses this image to update the rendered image data of the virtual space which is included in the rendered image data Dk. Below, one example of this rendering process is described with reference to FIG. 37 to FIG. 39.

Figure 37:
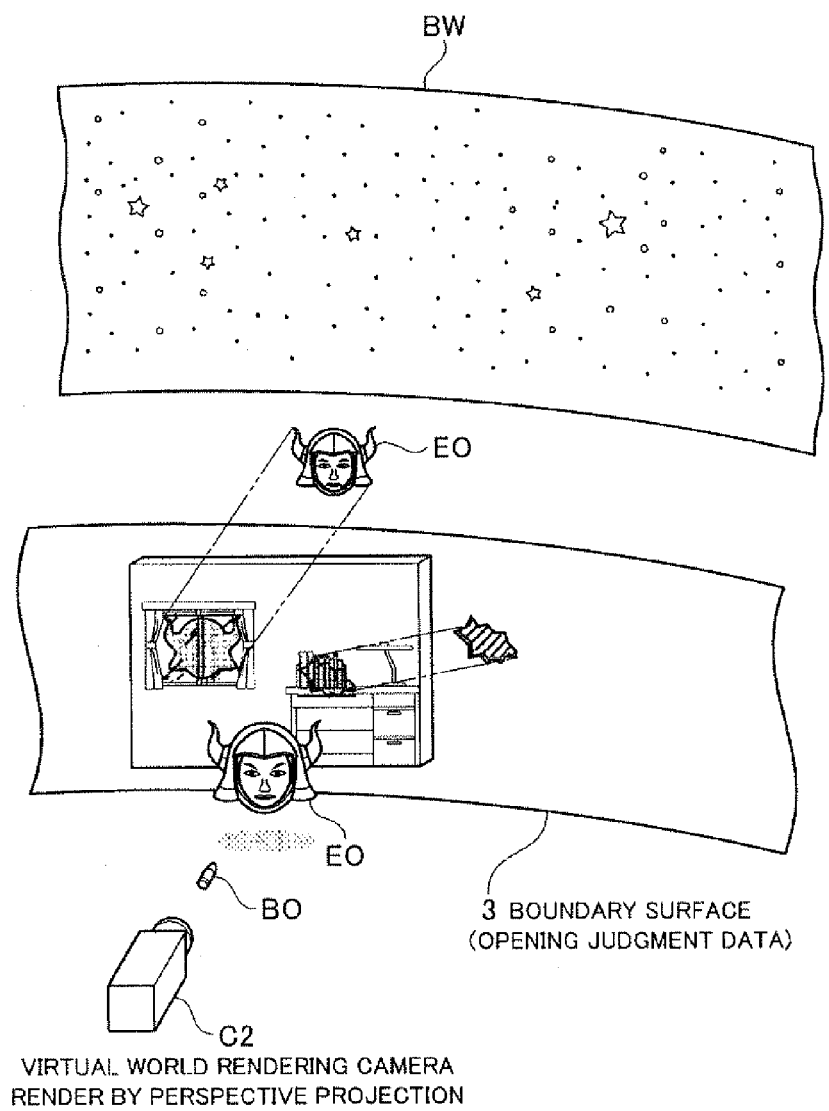
FIG. 37 is an explanatory diagram for explaining an example of processing for rendering a virtual space.
Figure 38:
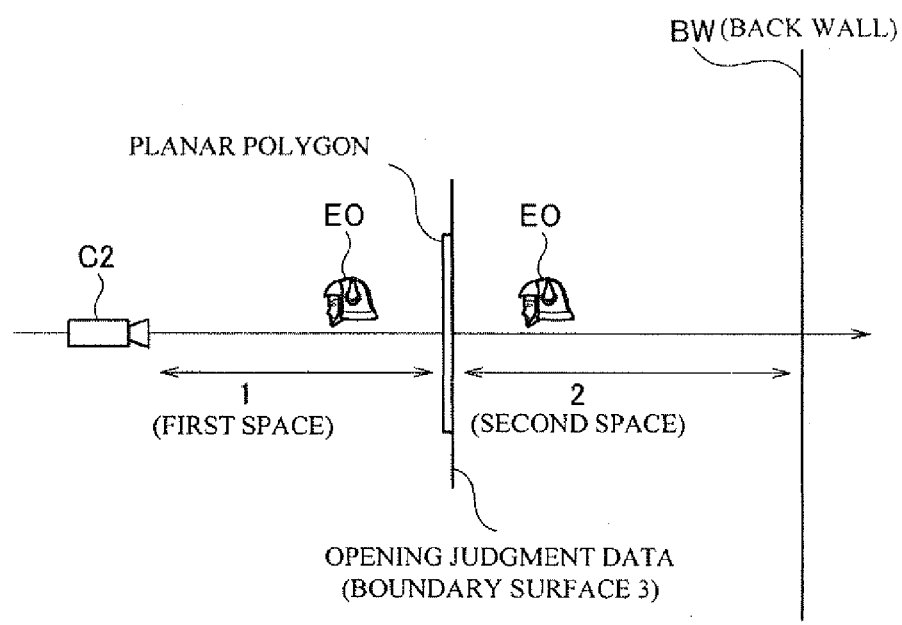
FIG. 38 is an explanatory diagram for explaining a positional relationship of the objects in FIG. 37.

FIG. 37 shows an example of the arrangement of an enemy object EO, a bullet object BO, a boundary surface 3 (opening judgment data) and a back wall BW, in the virtual space. Furthermore, FIG. 38 shows the positional relationships of the objects in a case where the virtual camera (virtual world rendering camera) in FIG. 37 is oriented in the direction (X, Y, Z)=(0,0,−1) from the point of origin. In this way, the enemy object EO, the bullet object BO, the boundary surface 3 and the back wall BW are respectively arranged in accordance with data indicating the arrangement positions included in the enemy object data Df, the bullet object data Dg, the boundary surface data Dd and the back wall image data De. Furthermore, the virtual world rendering camera C2 for rendering the virtual space is arranged in the virtual space in accordance with data indicating the arrangement direction and the arrangement position included in the virtual camera data Dj.

Here, firstly, the position of the boundary surface 3 (opening judgment data) will be described. As stated previously, in the image processing program according to the present embodiment, a real image in which an opening is formed is generated by multiplying the color information of the real world image (rendered image data of the real camera image) by the opening judgment data. Consequently, for example, 1 horizontal coordinate×1 vertical coordinate of the rendered image data of the real camera image (see the positional relationship of the planar polygon in FIG. 35 and FIG. 36) is taken to correspond to 1 horizontal coordinate×1 vertical coordinate of the boundary surface 3 in the virtual space (and more specifically, the opening judgment data). In other words, when the boundary surface 3 is viewed by perspective projection from the virtual world rendering camera C2 shown in FIG. 37 or FIG. 38, the range of view of the boundary surface 3 by the virtual world rendering camera C2 corresponds to the horizontal×vertical size of the rendered image data of the real camera image.

Figure 39:
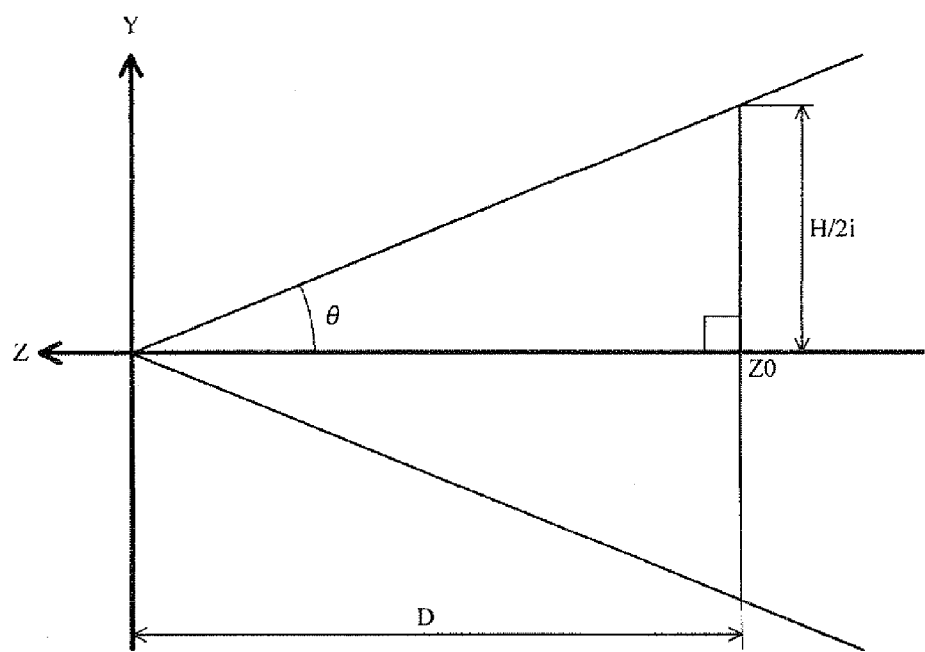
FIG. 39 is an explanatory diagram for explaining an example of coordinates of the boundary surface used for rendering a virtual space.

FIG. 39 shows an example of the positional relationship between the virtual world rendering camera C2 and the boundary surface 3. It is supposed that the boundary surface 3 is projected using perspective projection by the virtual world rendering camera C2 which is oriented in the direction (X, Y, Z)=(0,0,−1) from the point of origin. In this case, if the boundary surface 3 is taken to be located at a position of Z=Z0 shown in FIG. 39, then 1 horizontal coordinate×1 vertical coordinate of the opening judgment data will correspond 1 horizontal coordinate×1 vertical coordinate of the rendered image data of the real camera image. Here, the position Z=Z0 is a position where the length of the display range in the Y axis forward direction is H/2i from the viewpoint of the virtual world rendering camera C2 which is projecting the boundary surface 3 by perspective projection, when the angle of view of the virtual world rendering camera C2 in the Y axis direction is θ. As stated above, H is the number of dots in the vertical direction of the display screen of the upper LCD 22, and i is the number of pixels of the texture which is mapped to one coordinate unit of the virtual space. If the distance from the center of the virtual world rendering camera C2 to the position Z=Z0 is D (D>0), then Expression 1 below is established.

$$\tan \theta = (H/2i)/D = H/2Di \qquad \text{[Expression 1]}$$

Therefore, if the virtual world image is generated by perspective projection of the enemy object EO, and the like, as described below, by taking account of the boundary surface 3, then the virtual world rendering camera C2 which generates the virtual world image is set to "Angle of view in Y axis direction: θ=tan−1(H/2Di), aspect ratio=W:H". The boundary surface 3 (more specifically, the opening judgment data indicating the state of the boundary surface 3) is disposed at a view coordinate of Z=Z0 from the virtual world rendering camera C2. By this means, the range of view of the boundary surface 3 by the virtual world rendering camera C2 has a size of W×H.

Next, the rendering processing for the virtual space will be described. The information processing unit 31 generates a rendered image of the virtual space, with the boundary surface 3 situated at the position described above. The information processing unit 31 carries out the rendering process by taking account of the fact a real world image is to be synthesized subsequently. Below one example of the rendering processing is described in concrete terms.

The information processing unit 31 renders the enemy object EO, the bullet object BO and the back wall BW which are arranged in the virtual space, with the boundary surface 3 situated as shown in FIG. 37 (or FIG. 38), by perspective projection by the virtual world rendering camera C2. In this case, the information processing unit 31 takes account of the rendering priority information. In normal perspective projection, an object on the front side as viewed from the virtual camera in the virtual space is rendered so as to be depicted preferentially. Consequently, in normal perspective projection, since the boundary surface 3 is present, then the object in the second space 2 is not rendered. In the game according to the present embodiment, an opening is provided in the boundary surface 3 (real world image), and a portion of the second space 2 is visible through this opening. Furthermore, a shadow of the object situated in the second space 2 is synthesized and rendered with the real world image. In so doing, it is possible to give the user a sense of the existence of a virtual world beyond the real world image. More specifically, the information processing unit 31 carries out the rendering process using the rendering priority information. The image processing program according to the present embodiment uses an alpha value as an example of the rendering priority information.

In the perspective projection described above, an object present in the second space 2 (in the present embodiment, an enemy object EO or a back wall BW) is situated behind the boundary surface 3. Here, opening judgment data is set for the boundary surface 3. The opening judgment data is rectangular texture data storing an alpha value, as stated above, and each coordinate of the texture data corresponds to a respective position of the boundary surface in the virtual space. Consequently, the information processing unit 31 is able to identify the region of the opening judgment data which corresponds to the range of view of the object present in the second space 2 by the virtual world rendering camera C2.

In the present embodiment, for example, the information processing unit 31 renders images of a virtual object and/or a back wall which are present in a region of the second space 2 that is visible through a region (opening region) for which an alpha value of "0" is stored in the opening judgment data. Furthermore, the information processing unit 31 does not render a virtual object and/or back wall present in the second space 2 in a region for which an alpha value of "0.2" corresponding to a non-open region is stored in the opening judgment data (namely, a region which is treated as a region for which an alpha value of "1" indicating a non-open region has been stored). More specifically, a real world image is rendered in the portion of the displayed image which corresponds to this non-open region, by means of the synthesis processing in step 85 described below.

Consequently, image data included in the solid body data Df1 or the back wall image data De is rendered in a region where a value of "0" has been stored in the opening judgment data, from the viewpoint of the virtual world rendering camera C2. An image of a virtual object or a back wall is shown in the portion corresponding to this region, on the upper LCD 22, by the synthesis processing in step 85 which is described below.

Furthermore, the information processing unit 31 does not render a virtual object and/or back wall present in the second space 2 in a region for which an alpha value of "0.2" indicating a non-open region is stored in the opening judgment data viewed from the virtual world rendering camera C2 (namely, a region which is treated as a region for which an alpha value of "1" indicating a non-open region has been stored). More specifically, a real world image is rendered in the portion of the image displayed on the upper LCD 22 which corresponds to this non-open region, by means of the synthesis processing in step 85 described below. However, in the case of the shadow ES (silhouette model) of an enemy object EO described above, depth judgment with respect to the boundary surface 3 is disabled, and since the alpha value "1" of the silhouette model is greater than the alpha value "0.2" of the boundary surface 3, then the shadow ES is rendered in the region where an alpha value "1" indicating a non-open region is stored. By this means, the shadow ES of the enemy object EO is rendered on the real world image. Furthermore, the silhouette model of the enemy object EO is of a suitable size and is suitably arranged so as to be encompassed by the solid model, and if the enemy object EO is situated in the first space 1 where depth judgment is set to be enabled between the solid model and the silhouette model, then the silhouette model is hidden by the solid model and therefore is not rendered.

The shape of the boundary surface 3 in the present embodiment is the central portion of a spherical surface as shown in FIG. 20A, and depending on the view direction of the virtual world rendering camera C2, there does not exist any opening judgment data. In this case, the processing described above is carried out by artificially supposing that there exists opening judgment data storing an alpha value of "0.2". In other words, the region where there is no opening judgment data is treated as a region where an alpha value of "1" indicating a non-opening region is stored.

Furthermore, the silhouette data Df2 included in the enemy object data Df corresponding to the enemy object EO in the present embodiment is set in such a manner that there are a plurality of planar polygons having normal directions arranged in respective radiating directions when viewed from the enemy object, and texture of a silhouette image of the enemy object viewed from the corresponding direction is applied to each of the planar polygons. Consequently, in the image processing program according to the present embodiment, the shadow ES of the enemy object EO in the virtual space image is depicted as an image which reflects the orientation of the enemy object in the second space 2.

By means of the processing described above, the information processing unit 31 renders an enemy object EO, a bullet object BO and a back wall BW which are arranged in the virtual space, by perspective projection to generate a virtual world image viewed from the virtual world rendering camera C2, and updates the rendered image data of the virtual space accordingly (step 84 in FIG. 32B). The image generated by this processing is the display image shown in FIG. 40 excluding the real world image.

Next, the information processing unit 31 then generates a display image by synthesizing the real world image and the virtual space image (step 85), and terminates the processing of this sub-routine.

Figure 40:
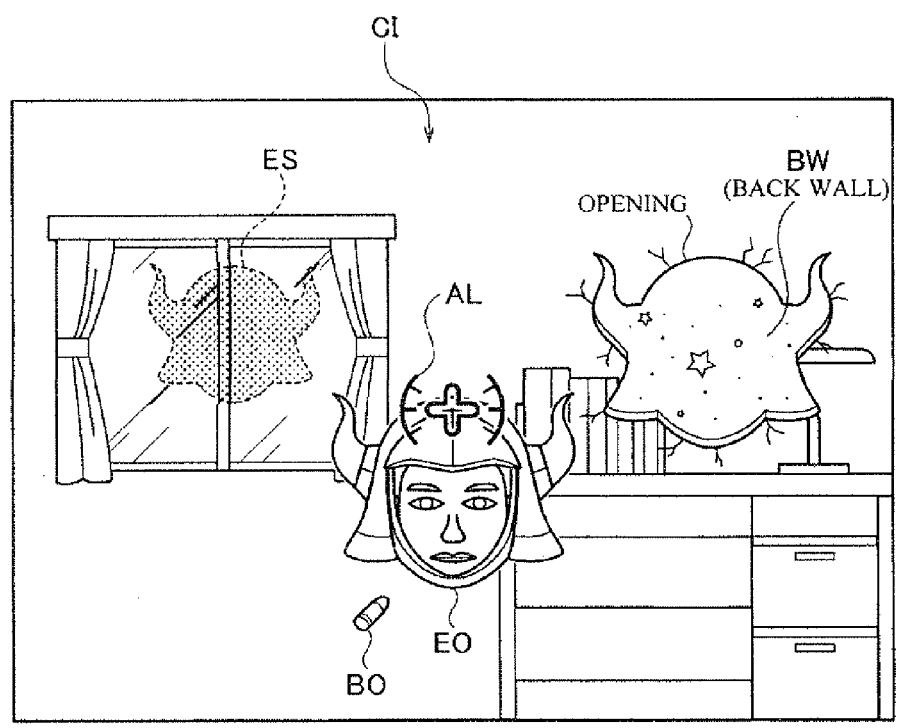
FIG. 40 is a diagram illustrating an example of a display image generated by the image processing program.

For example, the information processing unit 31 generates a synthesized image of a real world image and a virtual space image by synthesizing the rendered image data of the real camera image and the rendered image of the virtual space, giving priority to the rendered image of the virtual space. The information processing unit 31 then generates a display image (FIG. 40) by preferentially synthesizing image data including a pointing cursor image data at the center of the synthesized image (in the center of the field of view of the virtual world rendering camera C2). FIG. 40 shows one example of a display image generated by the first rendering method or the second rendering method. If a virtual space image has not been stored in the rendered image data of the virtual space, then the information processing unit 31 should store the real world image stored in the rendered image data of the camera image, directly, as the display image data Dl.

By means of the foregoing, the processing (sub-routine) relating to the updating of the display image by the first rendering method or the second rendering method is completed.

Returning to FIG. 29, after processing relating to updating of the display image in step 57, the information processing unit 31 displays the updated display image on the upper LCD 22 (step 58) and then advances to the next step, step 59. For example, the CPU 311 of the information processing unit 31 stores the display image data Dl (display image) which has been updated by step 57 above, in the VRAM 313. The GPU 312 of the information processing unit 31 then outputs the display image rendered in the VRAM 313, to the upper LCD 22, whereby the display image is displayed on the upper LCD 22.

Thereupon, the information processing unit 31 judges whether or not the game has ended (step 59). A condition for ending the game may be, for example, that a predetermined condition described above (game clear or game over) is satisfied, or that the user has performed an operation for ending the game, or the like. If the game has not ended, then the information processing unit 31 returns to step 52 described above and repeats processing. On the other hand, if the game has ended, then the information processing unit 31 terminates the processing according to this flowchart.

Advantages and Effects of Image Processing according to First Embodiment

As described above, in the image processing program according to the present embodiment of the invention, face images acquired by the face image acquisition processing are not made accessible to the user until the user succeeds in the game (first game) as illustrated by an example in FIG. 15. This means that the user is not allowed to save the acquired face image in the saved data storage area Do of the game until he/she succeeds in the game. The user is not allowed to duplicate, alter, or transfer the acquired face image, either. If the user stops retrying the game without succeeding in the game, the acquired face image will be discarded and the processing will be terminated. Furthermore, depending on the way of processing the first game, for example execution mode or specification of the first game, the face image is discarded immediately after the first game turns out unsuccessful, and the processing is terminated. Therefore, the user is caused to be attached to and to ardently strive to succeed in the game until the acquired face image is handed over to him/her, that is, until face image is saved in the saved data storage area Do. Thus, the image processing program of the present embodiment is able to allow the user to deeply enjoy playing the game while concentrating his/her attention to the game.

Further, effects as follows can be expected when an instruction to "acquire a face image with the inside imaging unit 24" is given by the user's operation on the GUI at start of the game (Yes in step 9 of FIG. 14), and the face image acquisition processing 1 (step 10 of FIG. 14) is executed. When face images are acquired with the inside imaging unit 24 at start of the game, a different face image can be obtained at each image capturing. This helps enhancing the user's motivation to succeed in the game in comparison with the case in which specific images are selected from those stored in another game device so that the selected images are used in the game. The same effects can be expected also when the face image acquisition processing 2 is executed with the use of the outside imaging unit 23 (step 12 of FIG. 14). This is because a different face image can be obtained at each image capturing, even if face images are acquired with the use of the outside imaging unit 23 at start of the game.

Further, the image processing program according to the present embodiment of the invention allows the user to collect various face images in the saved data storage area Do, provided that the user succeeds in the first game. The face images to be collected include face images of the user himself/herself, face images of people around the user, face images in images obtained with video equipment, face image of living creatures kept by the user, and so on. The game device 10 can display the collected face images on a screen as shown in FIG. 7 and FIG. 8. On the screen as shown in FIG. 8, for example, the game device 10 is able to express the state in which face images associated with the face image in the selection state make reactions. The reactions include, for example, looking at with one eye closed, glancing at, and turning the face to the face image in the selection state. Thus, the game device 10 is capable of expressing the human relationship based on affinity or the like in the real world, onto the world of virtual reality represented by the face images collected in the game device 10. As a result, the user who has collected the face images is allowed to have a sense of intimacy to the world of virtual reality created with the face images and to the collected face images, and to have the same affection or other feelings as those that the user would have to people or living creatures in the real world.

Further, the image processing program according to the present embodiment makes it possible to generate an enemy object EO by texture mapping a collected face image on the face part of the enemy object EO and to execute the game. The user is allowed to freely determine the casting of the game by pasting the collected face images on the enemy objects EO appearing in the game. Thus, the effects obtained from the faces of the enemy object EO while the user plays the game increase the possibility that the user is more absorbed in the game.

Further, according to the image processing program of the present embodiment, when a face image is set in the selection state to be pasted on an enemy object EO for creating the enemy object EO, face images associated with the face image in the selection state make reactions. Thus, the image processing program is able to cause the user who determines the enemy object EO to have a sense of intimacy to the world of virtual reality and the face images displayed in a list, and to have the same affection or other feelings as those that the user would have to people in the real world.

In the first embodiment described above, an enemy object EO is generated by pasting a face image on the enemy object EO. Such processing is applicable not only for generating the enemy object EO, but also applicable to creating character objects in general appearing in the game. For example, a face image acquired by the user may be pasted on an agent character which guides operation of the game device 10 or the procedure of the game. Further, a face image acquired by the user may be pasted on a character object modeled after the user himself/herself and appearing in the game, a character object appearing in the game in an amicable relationship with the user, or a character object representing the owner of the game device.

Although the above description has been made on the assumption that the face images are of human faces, this invention is not limited to human face images but also applicable to face images of animals. Specifically, for example, the face image acquisition processing as described in the first embodiment may be executed to acquire and collect face images of various animals including mammals such as dogs, cats and horses, birds, fishes, reptiles, amphibians, and insects. Likewise the example shown by the human-to-human relationship expressed on the screen of FIG. 8, the game device 10 is capable of expressing relationships between humans and animals in the world, by causing a bird to chirp to, a dog to bark to, or a cat to look at the human face image in the selection state. On the other hand, when a face image of a pet animal is set in the selection state, the game device 10 is also capable reflecting the feelings, minds and relationship between the pet animal and its owner in the real world into the virtual world, by causing the face images corresponding to the owner and his/her family to smile at or look at the pet animal. Thus, the game device 10 is capable of causing the user to play the game while being aware of the relationships in the world, by pasting the collected faces images on the enemy object EO and other character objects by means of the casting determination processing.

The relationship between a pet animal and its owner and the relationship between the owner and his/her family may be defined based on the face image management information Dn1 by means of a UIF, so that they can be referred to as the relationship between face images. The definition may be such that feelings such as likes and dislikes, and favorable and unfavorable feelings about pet animals of favorite and unfavorite persons can be expressed. The setting may be recorded in the image management information Dn1 such that, for example, if the face image of an animal can be stored in the saved data storage area Do of the game when the game played with the face image of its owner is successful, it indicates an intimate relationship between the animal and its owner. Thus, the game device 10 allows the user to generate character objects on the basis of various face images collected as described above and to play the game reflecting the feeling and minds in the real world.

The image processing program according to this embodiment, as shown in FIG. 16, guides the user to capture an image by using the inside imaging unit 24 prior to the two outside imaging units 23 (the outside left imaging unit 23a and the outside right imaging unit 23b). The inside imaging unit 24, which is principally for taking an image of the user operating the game device 10, is difficult to use for taking images of persons other than the user. In addition, the inside imaging unit 24, which is principally for taking an image of the user operating the game device 10, is suitable for taking an image of the owner of the game device 10. Therefore, this image processing program is effective to prohibit the use of the outside imaging unit 23 when neither the user nor the owner of the game device 10 has stored a face image in the game device 10. This enhances the possibility to prohibit a third person from taking an image using the game device 10 the owner or the user of which is not identified.

Further, the image processing program according to the present embodiment, as shown in FIGS. 19A to 19C, guides the user such that the information processing unit 31 captures a face image corresponding to unacquired attributes prior to other images. This effectively helps the user who wants to acquire face images with least bias in terms of attributes.

Further, in the image processing program relating to the present embodiment, a real world image obtained from a real camera and a virtual space image including objects situated behind the real world image are synthesized and displayed.

Therefore, the image processing program according to the present embodiment is able to generate an image capable of attracting the user's interest, by creating an image representing an unreal situation in a background based on a real world image. Furthermore, a player can be made to feel as if there is a virtual world beyond the real world. This increases the sense of depth of the game world.

Furthermore, in the present embodiment, a virtual object has an effect on the real world image, for instance, an opening is generated in the real world image and a virtual object appears through that opening, or a shadow of a virtual object is displayed on the real world image, and therefore it is possible to create an impression that the real world and the virtual world are related, rather than simply using the real world image as a background.

Furthermore, an object that is situated behind the real world image in the image that is synthesized and displayed (for example, an enemy object EO present in the second space 2) is displayed as a solid image in a region of the real world image (boundary surface 3) where there is an opening. Moreover, this object is displayed as a shadow image in a region of the real world image where there is no opening (see FIG. 24). In addition, the solid image and the shadow image are images which correspond to the arrangement direction of the object in the virtual space, or the orientation of the object depending on the movement of direction.

Therefore, the image processing program relating to the present embodiment is able to generate an image that enables the user to recognize the number of other objects which are present behind the real world image, and the action, such as the direction of movement, of these objects.

Furthermore, in the image processing program relating to the present embodiment, an image of an unreal space, such as an image of outer space, can be used for the image data of the back wall BW. This image of the unreal space can be viewed through an opening in the real world image. The position of the opening is specified in the virtual space. Furthermore, the orientation of the real camera and the orientation of the virtual camera are associated with each other.

Therefore, the image processing program relating to the present embodiment is able to provide an opening at a position corresponding to the orientation of the real camera and to represent the opening at the same position in the real world image. In other words, the image processing program relating to the present embodiment is able to generate an image which makes the user feel as if the real space and the unreal space are connected, since the opening is depicted at the same position in the real space, even if the orientation of the real camera is changed.

Furthermore, the real world image in which an opening is depicted is generated by multiplying the real world image obtained from the real camera by an alpha value.

Consequently, the image processing program relating to the present embodiment can depict an opening and generate an opening by means of a simple method.

Furthermore, an opening in the real world image which is produced by an enemy object EO passing through the boundary surface 3 is generated by multiplying the opening shape data Df3 included in the enemy object data Df by a predetermined position in the opening judgment data.

Consequently, the image processing program relating to the present embodiment is able to set an opening corresponding to the shape of a colliding character, by means of a simple method.

Furthermore, in the image processing program relating to the present embodiment, it is possible to achieve rendering of a shadow image by comparing alpha values. Furthermore, it is possible to switch the rendering of shadow images on or off, depending on variation in the alpha value set in the silhouette data Df2.

Consequently, the image processing program relating to the present embodiment can assign the rendering of a shadow image to a GPU, and can switch between displaying or not displaying a shadow, by a simple operation.

Modification Examples

Figure 41:
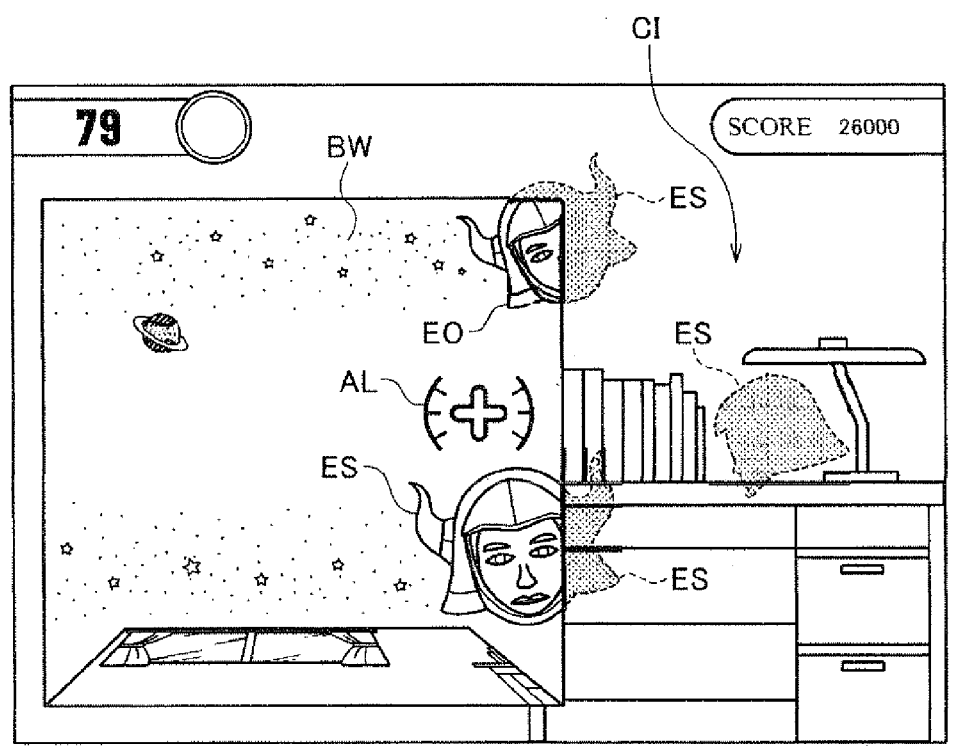
FIG. 41 is a diagram illustrating an example of dramatic techniques to cause the enemy object to emerge into the scene in the image processing program according to the embodiment.

In the embodiment described above, the information processing unit 31 does not especially execute appearance scene processing when an enemy object EO appears, but the information processing unit 31 may also execute enemy object EO appearance scene processing. FIG. 41 shows an example of the execution of appearance scene processing. As shown in FIG. 41, in this appearance scene processing, a predetermined range of the real world image is cut out in a rectangular shape as an opening, this rectangle falls down into the second space 2, and an enemy object EO appears through the opening thus generated. The information processing unit 31 may carry out appearance scene processing for an enemy object EO such as that shown in FIG. 41 when generating the enemy object data Df in step 62 in FIG. 18. The rectangular portion which falls into the second space 2 in FIG. 41 is depicted by cutting out texture in a predetermined range in the real world image, attaching the texture to a planar polygon corresponding to the size of the predetermined range, and causing the planar polygon to perform a predetermined movement. Furthermore, as stated previously, the open portion in FIG. 41 is realized by setting the alpha value to "0" in a predetermined position of the opening judgment data.

In the embodiment described above, an opening is generated as a result of an enemy object EO passing through the boundary surface 3, but the opening may be set in any fashion. In the present embodiment, the information processing unit 31 is able to set the opening in any fashion, by setting the alpha value "0" in any region of the opening judgment data.

In the embodiment described above, the information processing unit 31 carries out repair processing of the opening, as a result of a bullet object BO colliding with the edge of the opening which has been set in the boundary surface 3. In other words, the information processing unit 31 updates the alpha value of the opening judgment data at the position corresponding to the opening. However, this repair processing is not limited to the embodiment described above. For example, the repair processing may also be carried out as a result of a predetermined operating button 14 of the game device 10 being depressed while the pointing cursor AL lies over the edge of the opening. In this case, the information processing unit 31 uses data indicating the direction of arrangement of the virtual camera included in the virtual camera data Dj, as the position of the pointing cursor AL, for example. The information processing unit 31 sets an alpha value of "1" corresponding to a non-open region in the opening judgment data at the position of the boundary surface 3 corresponding to the direction of arrangement of the virtual camera. By this means, a region having an alpha value of "0" assumes an alpha value of "1" corresponding to a non-open region, and the opening is thus repaired.

In the embodiment described above, the information processing unit 31 detects the angular velocity produced in the game device 10 by the angular rate sensor 40, and uses this angular velocity to calculate the movement of the game device 10 in the real space, but the movement of the game device 10 may also be calculated by using another method.

In the first example, the information processing unit 31 may also calculate the movement of the game device 10 by using the acceleration detected by the acceleration sensor 39 built into the game device 10. For example, a case is imagined in which a computer carries out processing assuming that the game device 10 in which the acceleration sensor 39 is mounted is in a stationary state (more specifically, the acceleration determined by the acceleration sensor 39 is processed as acceleration due to gravity only). If the game device 10 is actually in a stationary state in this way, then the information processing unit 31 is able to identify whether or not the attitude of the game device 10 is inclined, and by how much, in the direction of gravity, on the basis of the determined acceleration. In a further example, it is imagined that the game device 10 in which the acceleration sensor 39 is mounted is assumed to be in a moving state. In cases of this kind, the acceleration sensor 39 determines the acceleration corresponding to the movement of the acceleration sensor 39 in addition to the acceleration due to gravity, and therefore if the acceleration due to gravity is removed by predetermined processing, the information processing unit 31 is able to identify the direction of movement of the game device 10, and the like. More specifically, if a game device 10 comprising an acceleration sensor 39 is moved and accelerated dynamically by the user's hand, then the information processing unit 31 is able to calculate various movements and/or positions of the game device 10 by processing the acceleration signal produced by the acceleration sensor 39. Furthermore, even assuming that the acceleration sensor 39 is in a moving state, if the acceleration corresponding to the movement of the acceleration sensor 39 is removed by predetermined processing, then the information processing unit 31 is able to identify the inclination of the game device 10 with respect to the direction of gravity.

In a second example, the information processing unit 31 may calculate the movement of the game device 10 by using the amount of movement of the camera image captured in real time by the real camera (the outside imaging unit 23 or the inside imaging unit 24) built into the game device 10. For example, if the imaging direction or imaging position of the real camera changes due to movement of the game device 10, then the camera image captured by the real camera also changes. Consequently, the information processing unit 31 is able to calculate the angle of change in the imaging direction of the real camera and the amount of movement of the imaging position, and the like, by using the change in the camera image captured by the real camera built into the game device 10. For example, the information processing unit 31 identifies a predetermined physical object from a camera image captured by a real camera which is built into the game device 10. The information processing unit 31 is then able to calculate the angle of change in the imaging direction of the real camera and the amount of movement in the imaging position, and the like, by comparing the angle and position at which the physical body is imaged, sequentially over time, and finding the amount of change in the angle and position. In a further example, the information processing unit 31 compares the whole camera image captured by the real camera built into the game device 10, sequentially over time. The information processing unit 31 can then calculate the angle of change in the imaging direction of the real camera and the amount of movement in the imaging position, and the like, from the amount of change in the imaging direction or imaging range of the whole image.

In a third example, the information processing unit 31 may calculate the movement of the game device 10 by a combination of at least two of: the angular velocity produced in the game device 10 described above, the acceleration produced in the game device 10, and the camera image captured by the game device 10. By this means, in circumstances where it is difficult to estimate the movement of the game device 10 when calculating the movement of the game device 10 on the basis of one parameter, the movement of the game device 10 can be calculated so as to compensate for these circumstances, by calculating the movement of the game device 10 by combining other parameters. For example, in calculating the movement of the game device 10 by means of the second example described above, if the captured camera image is moved in a horizontal direction sequentially over time, then it is difficult to judge accurately whether the imaging angle of the game device 10 is rotating about the vertical direction or whether the game device 10 is moving horizontally. In this case, the information processing unit 31 is able to judge readily whether the game device 10 is rotating or moving horizontally, by using the angular velocity produced in the game device 10.

In a fourth example, the information processing unit 31 may calculate the movement of the game device 10 by means of so-called AR (augmented reality) technology.

Furthermore, it is also possible to detect the orientation of the game device 10 by using a magnetic sensor.

Second Embodiment

Figure 42:
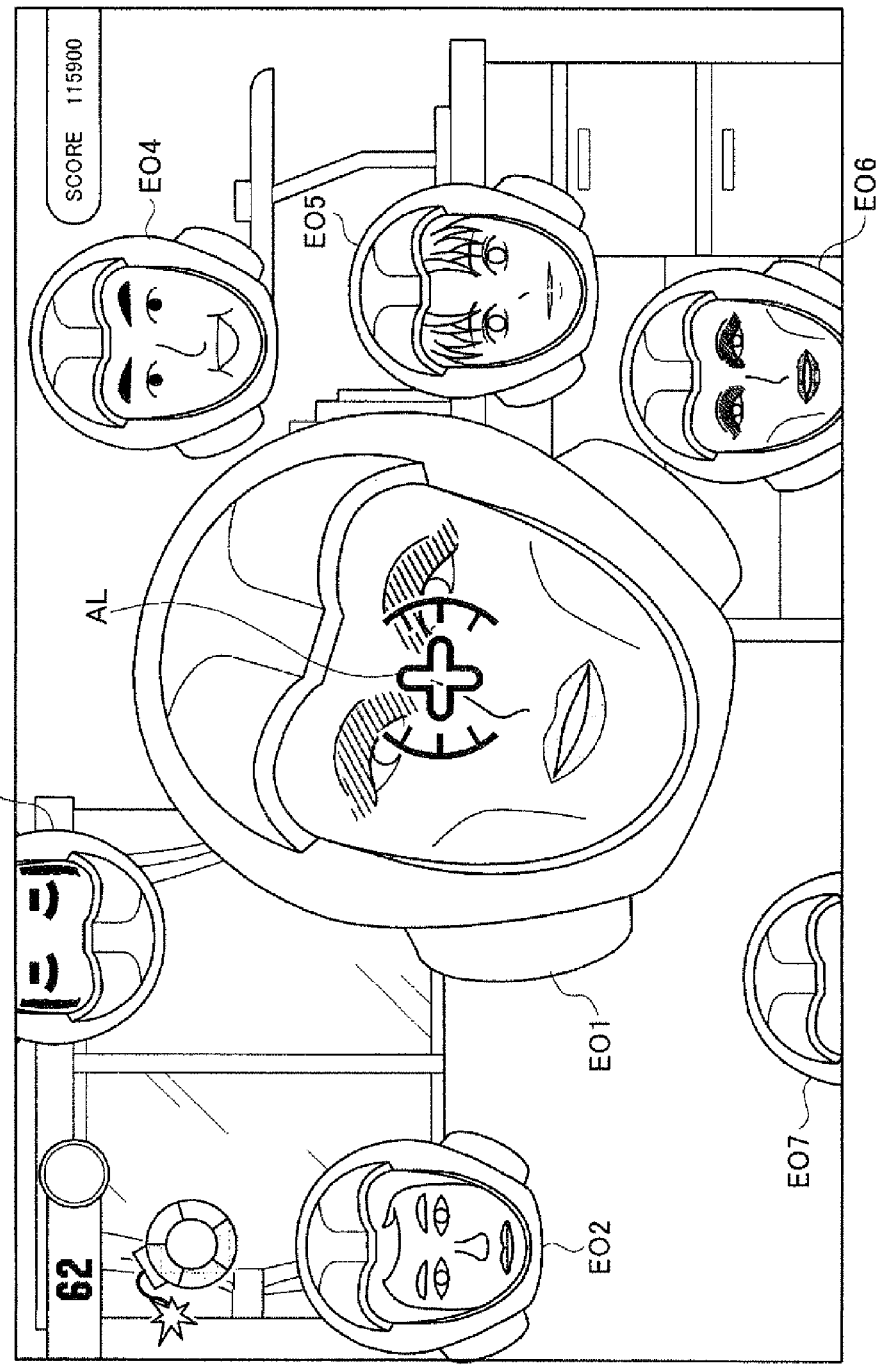
FIG. 42 illustrates an example of a screen of a game device according to a second embodiment.
Figure 43:
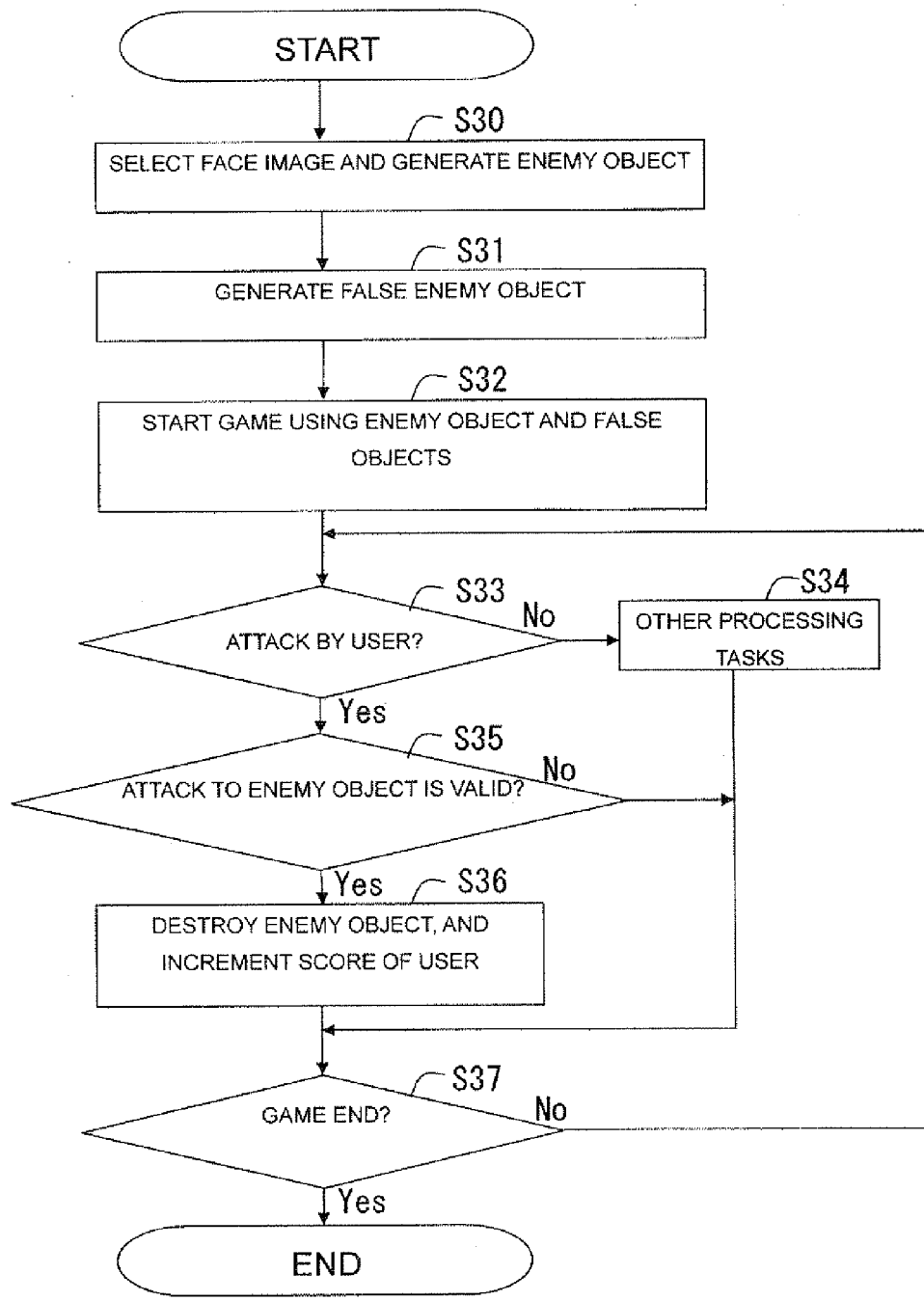
FIG. 43 is a flowchart illustrating an example of operation of the game device according to the second embodiment.

Referring to FIGS. 42 and 43, description will be made of an image processing device for executing an image processing program according to a second embodiment of this invention. According to the first embodiment described above, a first game is executed in the face image acquisition processing 1 (step 10 of FIG. 14), and only when the user succeeds in the first game, the game device 10 allows an image acquired by the face image acquisition processing 1 to be stored in the saved data storage area Do. The user is allowed to sequentially add acquired face images in the saved data storage area Do by the same procedure provided that the user succeeds in the first game. The game device 10 then generates a character object such as an enemy object EO based on the face images collected in the saved data storage area Do, either according to the user's operation or automatically. The game device 10 thus provides, to the user, a virtual world reflecting human relationships or the like in the real world by causing character objects generated based on the face images collected by the user to appear in the first game (step 106 of FIG. 15) or in the second game (step 18 of FIG. 14). In this manner, the user is allowed to execute and enjoy the game as illustrated in FIGS. 20A to 26, in its virtual world reflecting the real world. This second embodiment relates to another processing procedure for such a game to be played in a virtual world reflecting the real world. Like the first embodiment, the game according to the second embodiment is also provided to the user by the information processing unit 31 of the game device 10 executing an image processing program loaded into the main memory 32. The game of the second embodiment, like the one of the first embodiment, may be executed as the first game for the face image acquisition processing 1, for example, of step 10 shown in FIG. 14 (step 106 of FIG. 15). Further, the game of the second embodiment, like the second game (step 18 shown in FIG. 14) for example, may be executed on the assumption that face images have been collected and accumulated in the saved data storage area Do of the game.

FIG. 42 illustrates an example of a screen displayed on the upper LCD 22 of the game device 10 according to the second embodiment. This screen is created by the same procedure as that in the first embodiment. A situation is assumed, for example, in which the user holds the lower housing 11 of the game device 10 with both hands with the lower housing 11 and the upper housing 21 being opened, as illustrated in FIG. 4. Thus, the user is allowed to view the displayed screen of the upper LCD 22. In this state, the outside imaging device 23 is capable of taking an image of a space in front of the user's line of sight, for example. During execution of the game according to this embodiment, the game device 10 displays the image captured by the outside imaging device 23 in the background of the screen. More specifically, the information processing unit 31 texture-maps the image captured by the outside imaging device 23 frame by frame onto the background of the game screen. If the user changes the direction of the game device 10 held with his/her hands, an image obtained by the outside imaging device 23 from the direction of view of the outside imaging unit 23 that has been changed is displayed in the background of the game screen. This means that, the background of the screen of FIG. 42 is filled with the image obtained by the outside imaging unit 23 from the direction to which the user has pointed the game device 10.

There is further displayed, on the above-described background of the screen, an enemy object EO1 generated on the screen example of FIG. 10 according to the procedure described in relation to the casting determination processing of FIG. 18. A face image selected by the casting determination processing of FIG. 18 is texture-mapped in the face part of the enemy object EO1. The face part of the enemy object EO1 need not necessarily be formed by texture-mapping. The enemy object EO1 may be displayed by simply combining the face image with the peripheral part H13 of the head shape of the enemy object EO shown in FIG. 9. The following description will be made by using the expression that a face image is "pasted" on the face part of the enemy object.

In FIG. 42, there are further displayed, around the enemy object EO1, enemy objects EO2 to EO7 having a smaller shape than the enemy object EO1. There are displayed seven enemy objects enemy objects EO in total, namely enemy objects EO1 to EO7 on the screen of FIG. 42. However, the number of enemy objects EO used in the game of the game device 10 according to this second embodiment is not limited to seven. As already mentioned in the first embodiment, the enemy object will be simply referred to as the enemy object EO when the enemy objects EO1 to EO7 need not be specifically distinguished from each other.

One or more of the enemy objects EO1 to EO7, for example the enemy object EO6 has the same face image pasted on its face part as the enemy object EO1. On the other hand, the other enemy objects EO2 to EO5 have different face images pasted on their face parts from that of the enemy object EO1.

There is further displayed, in the screen of FIG. 42, a pointing cursor AL for attacking the enemy object EO1 or the like. The positional relationship and relative movement among the pointing cursor AL, the background, and the enemy object EO1 are the same as those described in the first embodiment (FIGS. 23 to 26).

The enemy object EO1 moves freely in the screen of FIG. 42. More specifically, the enemy object EO1 moves around freely in the virtual space having the image captured by the outside imaging unit 23 as the background. Thus, the user looking at the upper LCD 22 can see the enemy object EO1 as if it moves around freely in the space where the user himself/herself is present. The enemy objects EO2 to EO7 are arranged around the enemy object EO1.

Therefore, the pointing cursor AL displayed on the screen can be pointed to any of the enemy objects EO1 to EO7 moving around freely in the virtual space by the user changing the direction of the game device 10 toward those enemy objects EO1 to EO7. By pressing the operation button 14B (A-button) corresponding to the trigger button with the enemy object EO1 pointed with the pointing cursor AL, the enemy objects EO1 to EO7 can be shot.

It should be noted, however, that in the game of the second embodiment, no attack is valid for the enemy objects EO1 to EO7 except the attacks to the enemy objects having the same face image as that of the enemy object EO1. For example, if the user attacks the enemy object EO1 and an enemy object having the same face image as the enemy object EO1, the user earns points, or the enemy objects lose points. The user earns more points by attacking the enemy objects EO2 to EO7 which are smaller than the enemy object EO1, than attacking the enemy object EO1. In other words, the enemy objects lose more points when the enemy objects EO2 to EO7 are attacked than when the enemy object EO1 is attacked. However, attacks to the enemy objects, from among the enemy objects EO1 to EO7, having a different face image from that of the enemy object EO1 are all invalid. This means that the user is obliged to attack an enemy object having the same image as that of the enemy object EO1. In the description below, an enemy object having a face image different from that of the enemy object EO1 shall be referred to as a false object. In FIG. 42, the enemy objects EO2 to EO7 have the same type of head shape. However, any of the enemy objects EO2 to EO5 and EO7 which are the false objects may have a different type of head shape. As already mentioned in the above, the enemy object shall be referred to simply as the enemy object EO if the enemy objects EO1 to EO7 need not be specifically distinguished from each other.

An example of operation with image processing program executed by the information processing unit 31 of the game device 10 will be described with reference to FIG. 43. FIG. 43 is a flowchart illustrating an example of operation by the information processing unit 31. In this procedure, the information processing unit 31 accepts a selected face image and generates an enemy object (step 30). The processing in step 30 is the same as the casting determination processing shown in FIG. 18.

Subsequently, the information processing unit 31 generates a false object (step 31). The generation of the false object can be carried out by pasting a face image other than the face image selected in step 30, on the face part of the head shape of the enemy object EO. There is no limitation to selection of face image for the false object. For example, a face image for the false object may be selected by the user from the acquired face images as shown in FIGS. 7 and 8. Alternatively, face images for the false object may be preliminarily stored in the internal data storing memory 35 before shipment of the game device 10. The face images for the false object may also be stored in the internal data storing memory 35 at the same time when the image processing program is installed or upgraded. Alternatively, face image used for the false object may formed by deforming the face image of the enemy object EO, for example by replacing the face parts such as eyes, nose, and mouth with those of other face images.

Subsequently, the information processing unit 31 starts the game using the enemy object EO and false objects (step 32). The information processing unit 31 then determines whether or not there is an attack by the user (step 33). The attack by the user is detected when a trigger is input, for example by pressing the operation button 14B, in the state in which the pointing cursor AL is pointed at the enemy object EO as shown in FIG. 42. If the attack by the user is detected, the information processing unit 31 determines whether or not the attack is a valid attack to the enemy object EO (step 35). If the attack is a valid one to the enemy object EO, the information processing unit 31 destroys the attacked enemy object EO, and increments the score of the user (step 36). In contrast, if it is determined in step 35 that the detected attack is to a false object other than the enemy object EO, the information processing unit 31 determines the attack to be invalid and performs no further processing. Further, if no attack by the user is detected in step 33, the information processing unit 31 executes other processing tasks (step 34). These other processing tasks are those unique to respective games. For example, the processing tasks include a task to cause the enemy object EO6 and the false objects EO2 to EO5 in FIG. 42 to proliferate, and a task to exchange the position of the enemy object EO6 with the position of any of the false objects EO2 to EO7 in FIG. 42.

The information processing unit 31 determines whether or not the game is to be terminated (step 37). The game is terminated, for example, when the user has destroyed all of the proliferating enemy objects EO, or the user's score has exceeded a reference value. The game is also terminated, for example, when the enemy objects EO have proliferated beyond a predetermined limit, or when the user has lost points beyond a predetermined limit. If the game is not to be terminated, the information processing unit 31 returns the control to step 33.

The image processing program according to this second embodiment as described above enables the game to be executed by generating the enemy objects EO using collected face images. Therefore, the user is allowed to play the game in a world of virtual reality using the face images of persons existing in the real world.

Further, the game device 10 according to this embodiment enables the game to be played while confusing the user by combining a true enemy object EO and false objects. Thus, the user is required to correctly identify the face image of the true enemy object EO, and consequently required to have enough capability and power of concentration to identify the enemy object EO correctly and quickly. The game device 10 according to the second embodiment thus offers a feeling of tension to the user when playing the game, or enables the user to activate the brain as a result of activities to identify the face images.

In the second embodiment described above, the game is executed by generating the enemy objects EO on the basis of the face images stored in the saved data storage area Do of the game in the same manner as the casting determination processing in step 16 and the execution of the game in step 18 of FIG. 14. However, the processing in steps 100 to 105 FIG. 15 may be executed as the processing in step 30 of FIG. 43. Specifically, the game of the present embodiment can be executed in the state in which face images have been acquired by the face image acquisition processing but have not been stored in the saved data storage area Do of the game. Like the processing in steps 107 to 110 of FIG. 15, the acquired face images can be stored in the saved data storage area Do of the game only if the user succeeds in the game. Like the first embodiment, this configuration is effective to cause the user to concentrate more on playing the game so that the acquired face image can be stored.

Third Embodiment

Figure 44:
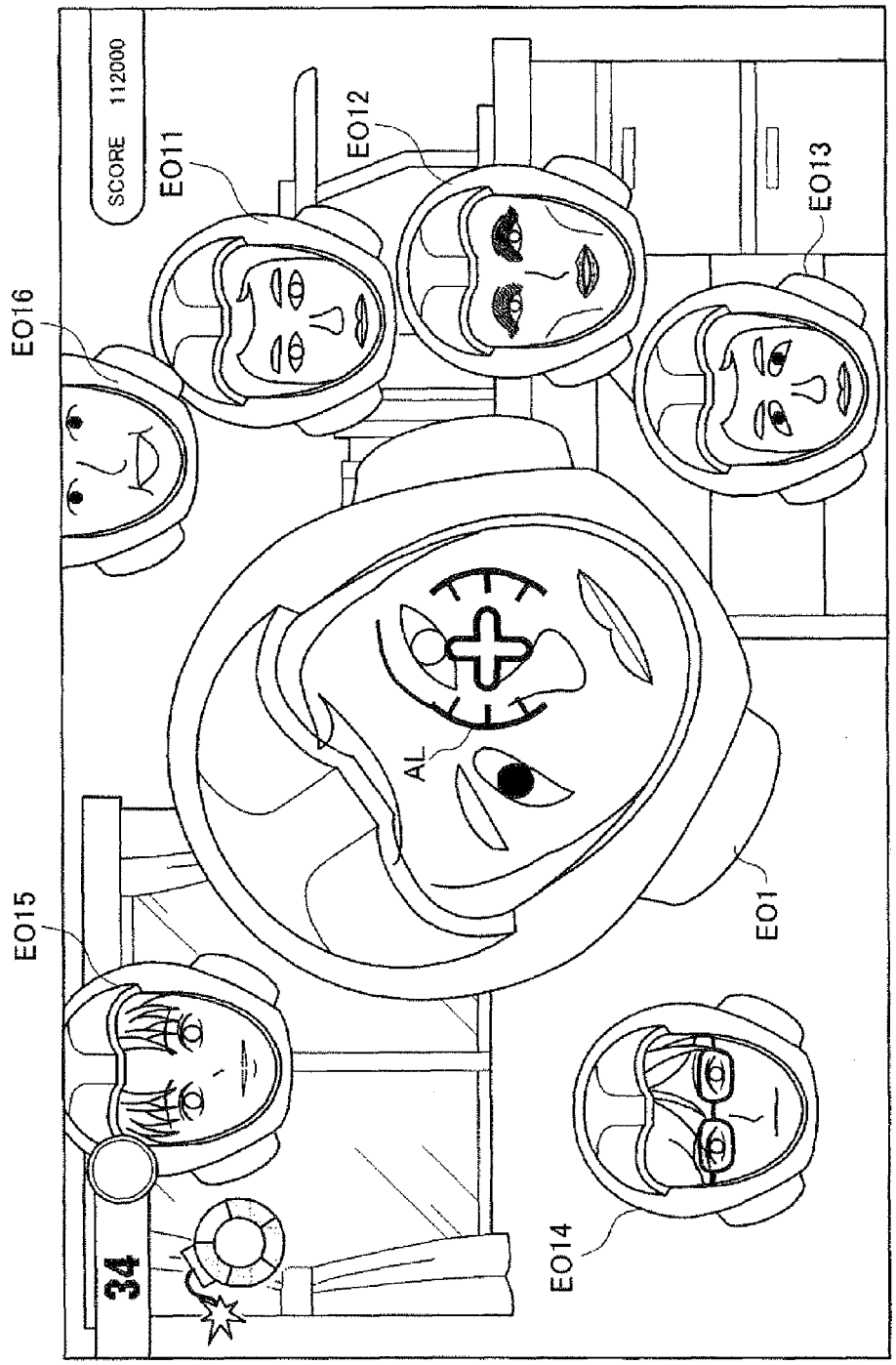
FIG. 44 illustrates an example of a screen of a game device according to a third embodiment.
Figure 45:
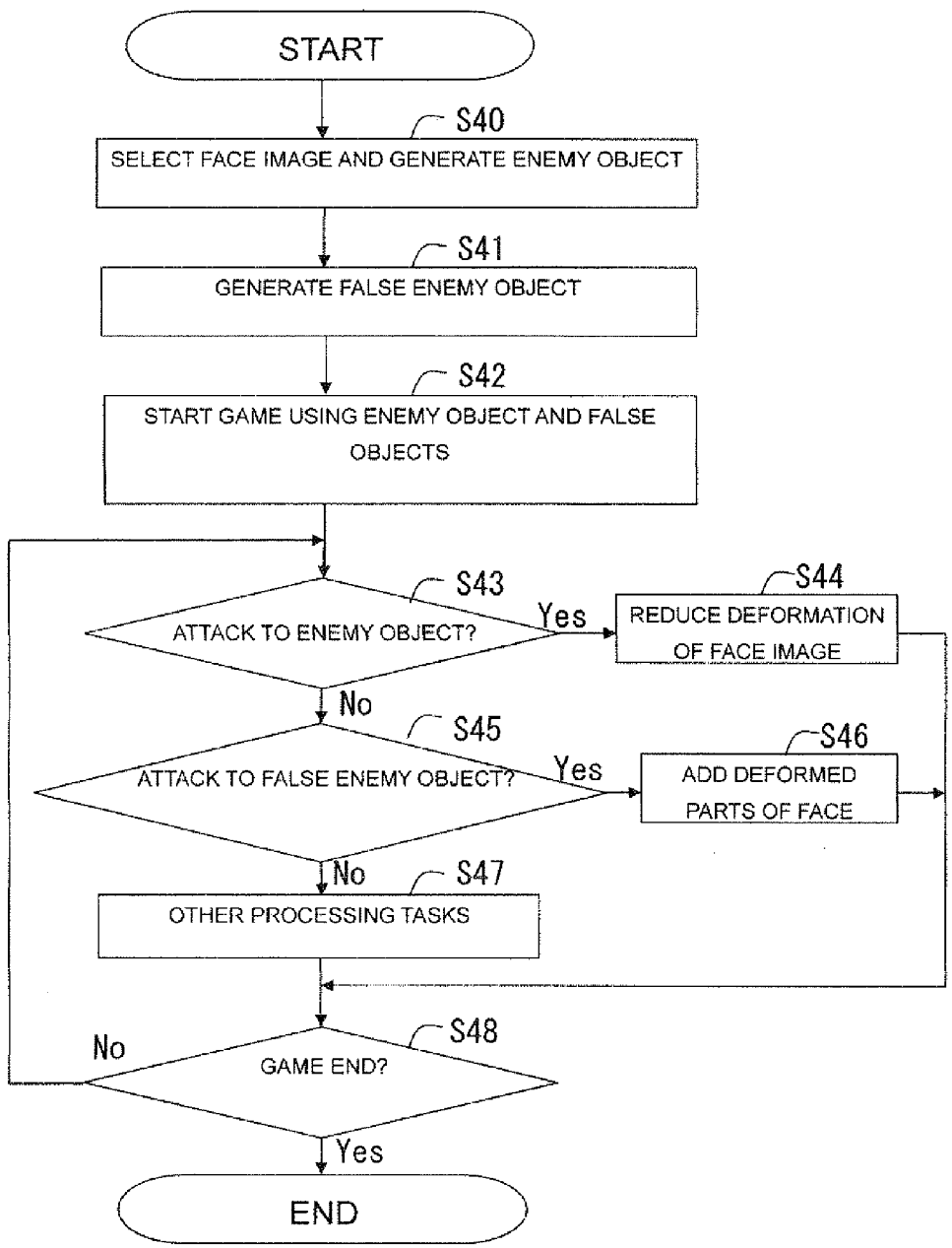
FIG. 45 is a flowchart illustrating an example of operation of the game device according to the third embodiment.

Referring to FIGS. 44 and 45, an image processing device for executing an image processing program according to a third embodiment of this invention will be described. Like the game of the first embodiment, the game of the present embodiment may be executed as the first game for the face image acquisition processing 1 of step 10 shown in FIG. 14 (step 106 of FIG. 15). Like the second game (step 18 of FIG. 14), the game of the present embodiment also may be executed on the assumption that face images have been collected and accumulated in the saved data storage area Do of the game.

Specifically, in the same manner as described in the second embodiment, the information processing unit 31 of the game device 10 executes the game of the present embodiment as the casting determination processing of the first embodiment (step 16 of FIG. 14) and as an example of the second game (the game executed in step 18 of FIG. 14). The information processing unit 31 of the game device 10 may execute the game of the present embodiment as the first game of the first embodiment (the game executed in step 106 of FIG. 15).

The above description of the second embodiment has been made of an example of the game in which face images are acquired and an enemy object EO and false objects having the acquired face images are used. In the second embodiment, any attack to the false object is deemed to be invalid.

In place of the game of the second embodiment, the following description of the present embodiment will be made of a game which is designed such that when an attack to a false object is detected, a part of the face image of the enemy object EO is replaced with a part of another face image. Specifically, for example, the enemy object EO is formed by combining the peripheral part of the enemy object EO (see H13 in FIG. 9) with the face image of the user. A face image of a familiar person of the user may be used in place of the face image of the user. In this case, the face image of the user (or the face image of his/her familiar person) is displayed as if the user (or his/her familiar person) is captured by the enemy object EO. If the user defeats the enemy object EO in the game, the face image of the user (or the face image of his/her familiar person) may be displayed as if the user (or his/her familiar person) is released from the enemy object EO. In contrast, if the user continues to lose the game, the face image of the user (or the face image of his/her familiar person) captured by the enemy object EO will be gradually deformed. The game may be terminated once the degree of deformation exceeds a certain limit.

FIG. 44 illustrates an example of a screen displayed on the upper LCD 22 according to the present embodiment. In the example shown in FIG. 44, the enemy object EO1 (an example of the first character object) is displayed. There are also displayed, around the enemy object EO1, an enemy object EO11 which is smaller than the enemy object EO1 (and example of the second character object) and false objects EO12 to EO16 (examples of the third character object). The same face image as that of the enemy object EO1 is pasted on the enemy object EO11. Configuration of the false objects EO12 to EO16 is the same as in the second embodiment, and different face images from that of the enemy object EO1 are pasted thereon. The configuration shown in FIG. 44 is only for the purpose of illustration, and the number of enemy objects OE11 smaller than the enemy object EO1 is not limited to one.

The game of this embodiment is designed such that even if an attack to the enemy object EO1, which is larger in size and hence easier to point with the pointing cursor AL, is successful, the user is awarded fewer points, or the damage given to the enemy object EO1 is smaller. If an attack to the enemy object EO11, which is smaller in size and hence more difficult to point with the pointing cursor AL, is successful, the user is awarded more points and the damage to the enemy object EO1 is greater than the case of the enemy object EO1.

Further, according to the present embodiment, when the user attacks any of the false objects EO12 to EO16, a part of the face image pasted on the enemy object EO1 is replaced with a part of the face image of another false object. In the example shown in FIG. 44, an eyebrow and an eye of the face image pasted on the enemy object EO1 have been replaced with the eyebrow and eye of the face image EO13. Thus, if the user tries to attack the small enemy object OE11, the false objects EO12 to EO16 will confuse the user so that deformation of the enemy object EO1 is induced. In the example shown in FIG. 44, all the false objects EO12 to EO16 have the same type of head shape. However, any of the false objects EO12 to EO16 have a different type of head shape.

Referring to FIG. 45, an example of operation of the image processing program executed by the information processing unit 31 of the game device 10 will be described. FIG. 45 is a flowchart illustrating an example of operation by the information processing unit 31. In this procedure, the processing in steps 40 to 42 is the same as the processing in step 30-step 32 of FIG. 43, and hence description thereof will be omitted.

Upon detecting an attack to the enemy object EO (step 43), the information processing unit 31 reduces the deformation of the face image so that the face image of the enemy object EO11 is restored close to the one originally pasted (step 44). In this case, the user's attack to the enemy object EO11 of a smaller size as shown in FIG. 44 may be rewarded with more points than an attack to the enemy object EO1 of a greater size. Alternatively, the user's attack to the enemy object EO11 of a smaller size may be rewarded with a higher degree of reduction of deformation of the face image than an attack to the enemy object EO1 of a greater size.

Upon detecting an attack to any of the false objects EO12 to EO16 (step 45), the information processing unit 31 further advances the replacement of parts of the face image pasted on the enemy object EO1 further than the current condition. This means that the information processing unit 31 adds deformed parts of the face image (step 46). When the information processing unit 31 detects an attack to any other than the enemy object EO and the false objects, the information processing unit 31 performs other processing task (step 47). Such processing task is the same as the one in step 34 of FIG. 43. For example, the information processing unit 31 causes the enemy object EO to proliferate.

The information processing unit 31 then determines whether or not the game is to be terminated (step 48). The game is determined to be terminated if, for example, deformation of the face image of the enemy object EO has exceeded the reference limit. The game is determined to be terminated also when the user has destroyed the enemy objects EO and the user's score has reached a predetermined limit. In contrast, if the game is not to be terminated, the information processing unit 31 returns the control to step 43.

The game device 10 according to the third embodiment, as described above, restores the deformed face image if the user has succeeded in the attack to the enemy object EO. If the user attacks a false object, the degree of deformation of the face image is increased. Therefore, the user is required to concentrate in playing the game. Thus, tension that the user feels when playing the game is increased and the user is enabled to improve his/her ability to concentrate. Further, when the user plays the game with the game device 10 according to this embodiment, the user's face image as well as the face images of the user's familiar people are deformed, which increases the possibility that the user is absorbed in playing the game which offers a world of virtual reality reflecting the real world.

The third embodiment has been described on the assumption that the game is executed by generating the enemy objects EO based on face images stored in the saved data storage area Do of the game, in the same manner as the processing in step 30 of FIG. 43 and the casting determination processing in step 16 and game execution processing in step 18 of FIG. 14. However, the processing in steps 100 to 105 of FIG. 15 may be executed as the processing in step 40 of FIG. 45. This means that the game of the third embodiment may be executed before the face images acquired by the face image acquisition processing are stored in the saved data storage area Do of the game. Like in steps 107 to 110 of FIG. 15, the acquired face image may be stored in the saved data storage area Do of the game only when the user succeeds in the game. Like the first embodiment, this configuration of the third embodiment causes the user to concentrate more in playing the game.

Fourth Embodiment

Figure 46:
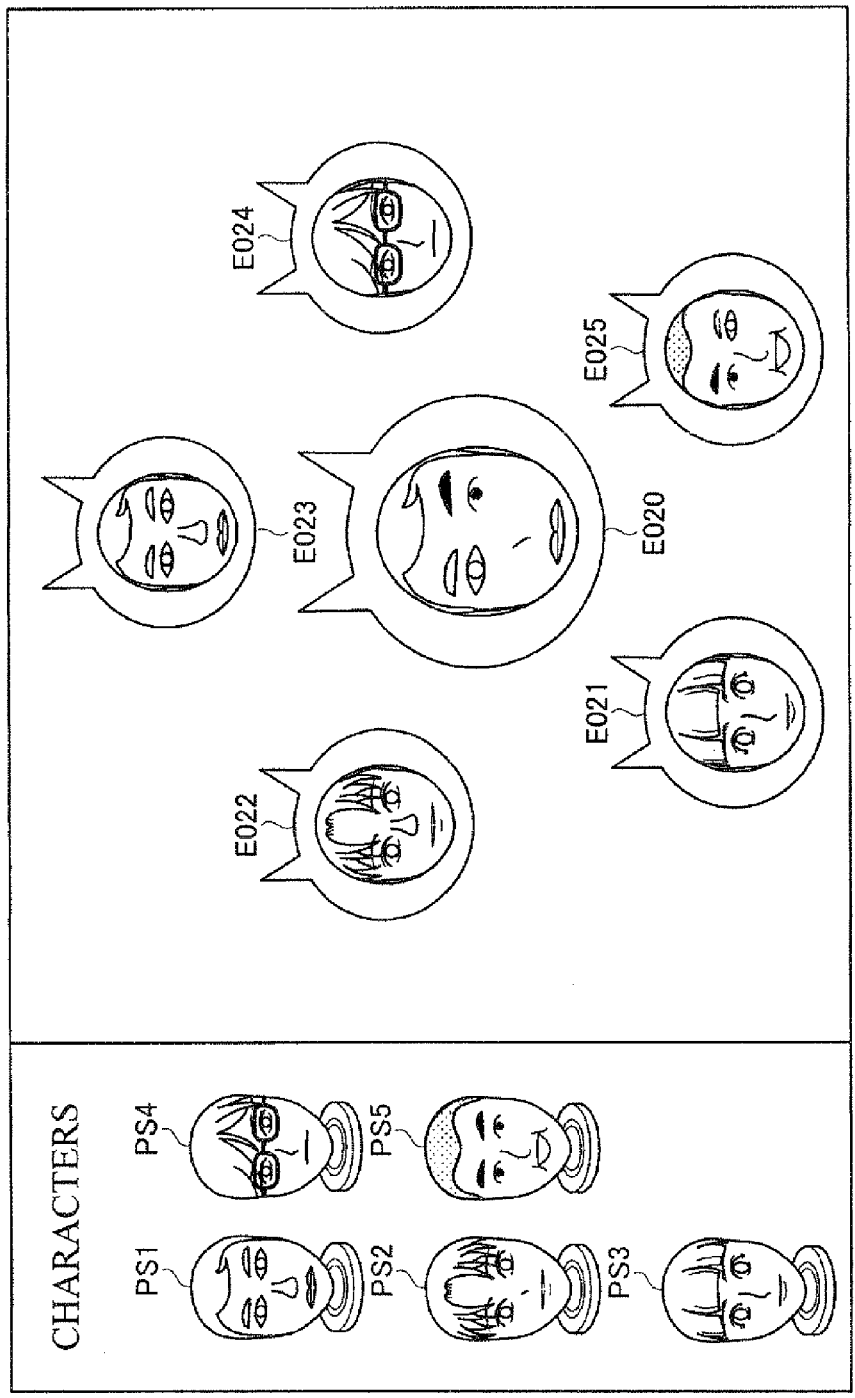
FIG. 46 illustrates an example of a screen according to a fourth embodiment.
Figure 47:
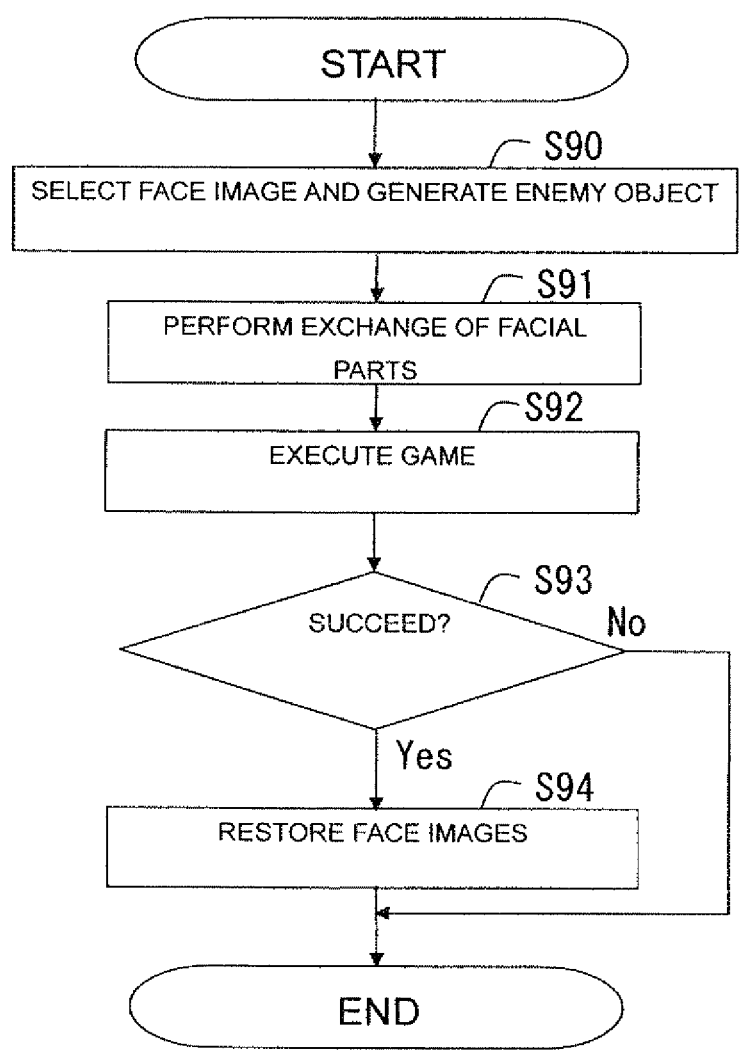
FIG. 47 is a flowchart illustrating an example of operation of a game device according to the fourth embodiment.

Referring to FIGS. 46 and 47, description will be made of an image processing device for executing an image processing program according to a fourth embodiment of this invention. Like the game of the first embodiment, the game of the present embodiment may be executed as the first game for the face image acquisition processing 1 in step 10 shown in FIG. 14 (step 106 of FIG. 15). The game of the present embodiment may be designed to be executed, like the second game (step 18 of FIG. 14), on the assumption that face images have been collected and accumulated in the saved data storage area Do of the game.

Specifically, in the same manner as described in the second embodiment, the information processing unit 31 of the game device 10 can execute the game of this fourth embodiment as the casting determination processing (step 16 of FIG. 14) or the second game (the game executed in step 18 of FIG. 14) of the first embodiment. The information processing unit 31 of the game device 10 also can execute the game of this embodiment as the first game (the game executed in step 106 of FIG. 15) of the first embodiment.

The third embodiment has been described in terms of an example of game processing in which face images are acquired, and enemy objects EO and false objects generated using these acquired face images are used. In the game according to the third embodiment, a part of the face image of the enemy object EO is replaced with a part of another face image once an attack to any of the false objects is detected.

Description of the present embodiment will be made in terms of game processing, instead of the game processing according to the second embodiment or the third embodiment, that is designed such that a part of a face image in the enemy object EO has been replaced with a part of another face image at the start of the game, and the part of the face image in the enemy object EO is returned to the original one when the user wins in the game.

FIG. 46 illustrates an example of a screen displayed on the upper LCD 22 according to the present embodiment. There are displayed, on the left side of the screen, a list of face images that can be pasted on the enemy object EO as characters appearing in the game (character section). However, this list of face image need not necessarily be displayed in the screen of the game device 10. The list of face images may be displayed, for example, when the information processing unit 31 detects the user's operation on the GUI to request display of the list. The section to display the list of face images is not limited to the left side of the screen as shown in FIG. 46. There are displayed, in the character section, face images PS1 to PS5, for example.

Further, enemy objects EO20 and EO21 to EO25 are displayed on the screen of FIG. 46. The enemy objects EO20 and EO21 to EO25 are the enemy objects EO which are generated on the screens of FIGS. 7 to 9 according to the first embodiment, or by a selection operation as described in relation to the casting determination processing in FIG. 18. According to the present embodiment, however, the enemy object EO20 is displayed in a large size at the center of the screen, whereas the enemy objects EO21 to EO25 are displayed around the enemy object EO20. A face image PS1, for example, has originally been pasted on the enemy object EO20. A face image PS2, for example, has been pasted on the enemy object EO22. A face image PS5 has been pasted on the enemy object EO25.

However, the facial parts are exchanged between the enemy object EO20 and the enemy objects EO21 to EO25 before the game is started. For example, the noses are exchanged between the enemy object EO20 and the enemy object EO22. The left eyebrows and the left eyes are exchanged between the enemy object EO20 and the enemy object EO25. The exchange of the facial parts may be performed during texture mapping of the face images in units of polygons forming the three-dimensional model to be texture-mapped.

Such exchange of facial parts may be performed randomly, for example, in terms of the number of facial parts to be exchanged, or in terms of facial parts to be exchanged. The number of facial parts to be exchanged may be determined according to a result or a score in the relevant game or other game that has been played. Specifically, for example, the number of facial parts to be exchanged may be decreased if the user got a good result or achieved a high performance in the game, whereas the number of facial parts to be exchanged may be increased if the user got a poor result or achieved a low degree of performance. Alternatively, different levels may be prepared for the game so that the number of facial parts to be exchanged is changed according to the level of the game. For example, the number of facial parts to be exchanged is decreased when the game is a beginner-level game, whereas the number of facial parts to be exchanged is increased when the game is an advanced-level game.

The number of facial parts to be exchanged may be determined by a method in which a face image of the user is acquired with the inside imaging unit 24 to recognize the user's face, and the number of facial parts to be exchanged is determined according to an expression on the recognized face. Specifically, it is determined if the facial expression is smiling, surprised, sad, or neutral, so that the number of facial parts to be exchanged may be determined based on a result of the determination. The facial expression may be determined based on the dimensions of the eyes, the area of the mouth, the shape of the mouth, and the position of the outline of the cheeks with respect to the center of the eyes, the center of the mouth, or the nose. Specifically, for example, a face image which is neutral in facial expression is preliminarily registered, so that once a face image of the user is newly acquired, the facial expression on this face image is estimated based on difference values between the values of the dimensions of the eyes, the area of the mouth, the shape of the mouth, and the position of the outline of the cheeks with respect to the reference point obtained from this newly acquired face image and the values obtained from the face image preliminarily registered. The method of estimating the facial expression is not limited to the method described above, but various other methods can be employed.

According to the present embodiment, the game device 10 executes a game in which the user attacks the enemy objects EO whose facial parts have been exchanged as shown in FIG. 46 and battles against the enemy objects EO. The way of attacking is the same as the one described in the first to third embodiments. If the user wins in the battle against the enemy objects EO, the exchanged facial parts may be restored to those in the original face images.

Referring to FIG. 47, description will be made of an example of operation by the image processing program executed by the information processing unit 31 of the game device 10. The processing task of step 90 is the same as those of step 30 of FIG. 43 and step 40 of FIG. 45. According to the present embodiment, the information processing unit 31 of the game device 10 subsequently performs exchange of facial parts (step 91). The information processing unit 31 then executes the game (step 92). The information processing unit 31 determines whether the game is successful or not (step 93). If the game is successful, the information processing unit 31 restores the face images in which the facial parts were exchanged by the processing in step 91 to the original face images as originally captured (step 94).

According to the image processing program of the present embodiment as described above, a face image of the user is acquired with the inside imaging unit 24, for example, and the game is started in the state where facial parts are exchanged between the acquired face image and other face images. If the user succeeds in the game, for example, by winning in a battle against the enemy objects EO, the face images whose facial parts have been exchanged are restored to the original ones.

Therefore, the user is highly motivated to succeed in the game if the face image the facial parts of which have been exchange is of the user himself/herself or of a person familiar with the user.

Further, the facial parts may be exchanged prior to starting the game of this embodiment according to the result of other game that the user has played, so that the user may be given a handicap or advantage according the result of the game. The exchange of the facial parts may be performed according to the challenge level of a game, whereby the challenge level of the game can be represented by the degree of deformation of the face images.

The description of the fourth embodiment has been made on the assumption that the game is executed after the enemy objects EO are generated based on face images stored in the saved data storage area Do, like the processing in step 30 of FIG. 43 or in step 40 of FIG. 45, or the casting determination processing in step 16 and the game execution processing instep 18 of FIG. 14. However, the processing in steps 100 to 105 of FIG. 15 may be executed as the processing in step 90 of FIG. 46. This means that the game of the present embodiment may be executed before the face images acquired by the face image acquisition processing are stored in the saved data storage area Do of the game. The acquired face images may be stored in the saved data storage area Do of the game if the user succeeds in the game, in the same manner as in steps 107 to 110 of FIG. 15. Like the first embodiment, this configuration causes the user to concentrate more in playing the game in order to be allowed to store the acquired face images.

Fifth Embodiment

Imaging of Face Images and Generating of Three-Dimensional Face Object in the Game Device 10

In the embodiment described below, there is explained an example of person face imaging using the game device 10 that is explained with reference to FIG. 1 to FIG. 6. In the present embodiment a three-dimensional face object is generated through pasting of a captured face image onto a three-dimensional shape model of a face. The generated three-dimensional face object may be used, for instance, as a character in various types of games. The expression of a face image can be modified by moving control points that make up the three-dimensional shape model of the face. Specifically, a character can be made to wink by moving the control points that make up the periphery of an eye in the three-dimensional shape model. An expression that involves opening of the mouth can be displayed by moving the control points that make up the periphery of the mouth.

The game device 10, for instance, generates a three-dimensional face object by pasting, onto a three-dimensional shape model, one face image that is captured by the outside imaging unit 23 or the inside imaging unit 24, in order make a character out of the face of the operator (hereafter also referred to as user) of the game device 10, or the face of a person standing close to the operator, on the spot and in a simple manner. The face image that is pasted onto the three-dimensional shape model is preferably an image that is captured from the front of the person to be imaged. In cases where one face image, i.e. a face image captured in one direction, is pasted onto a three-dimensional shape model, animations are often created such that there are no substantial differences between the shape of the face of the person to be imaged and the shape of the three-dimensional shape model. In a case where the left and right eyes and the mouth of the three-dimensional shape model are deformed, however, it is preferable to acquire a face image in which the positions of the left and right eyes and the mouth match the positions of the left and right eyes and the mouth in the three-dimensional shape model, in order to realize animation that is close to the expression of an actual person, but without eliciting a sense of visual weirdness. Adjustment of the position of the face is performed by the user of the game device 10 at a time when the user captures images of his/herself or of somebody else using the game device 10. In the present embodiment, therefore, the game device 10 performs guidance on the adjustment of the position of the face of the person to be imaged in order to generate a three-dimensional face object having an expression that is not too weird. The game device 10 supports thus imaging of an accurate face image for pasting onto the three-dimensional shape model.

Figure 48:
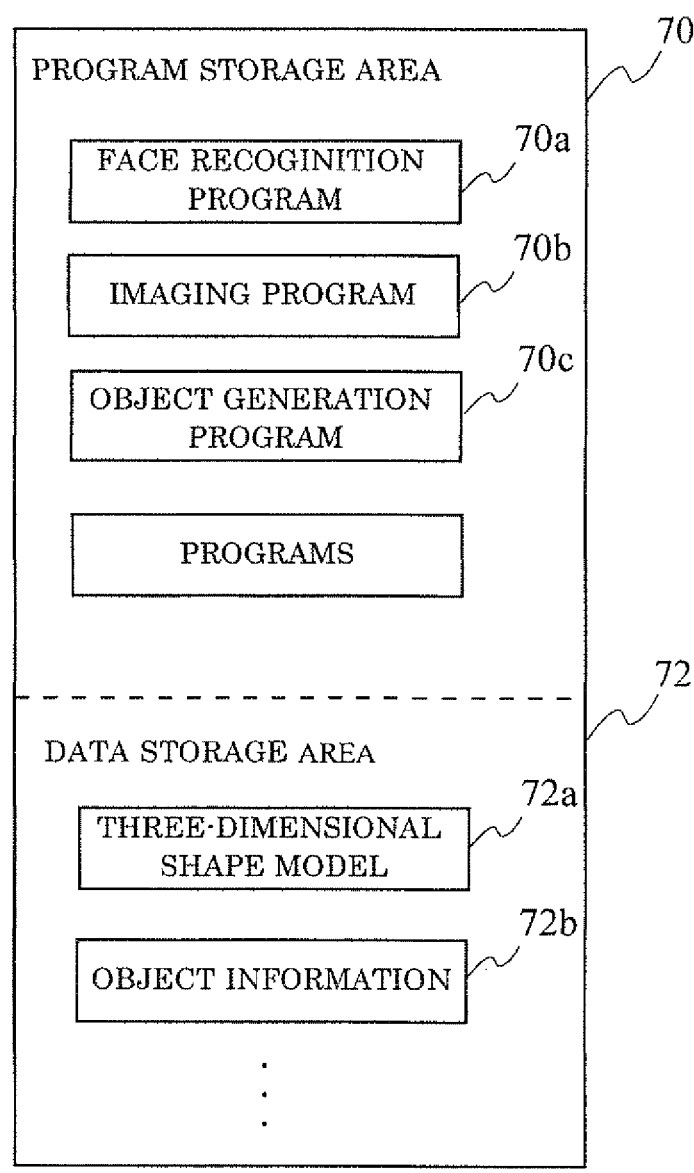
FIG. 48 is a diagram illustrating an example of a memory map of a main memory.

FIG. 48 is a diagram illustrating an example of a memory map of the main memory 32. The main memory 32 includes a program storage area 70 and a data storage area 72 in a work area. The program storage area 70 stores an application program (information processing program) such as a virtual game or the like. The information processing program has a face recognition program 70*a*, an imaging program 70*b*, a three-dimensional face object generation program 70*c*, and other programs.

The face recognition program 70*a* is a program for detecting feature points from a face image, and determining the sex and age of the person of the face image, on the basis of the detected feature points. Known software can be used in the face recognition program 70*a*, and hence a detailed explanation of the processing involved in the face recognition program 70*a* will be omitted.

Through execution of the face recognition program 70*a*, the information processing unit 31 performs image processing, such as edge detection, on the face image of the person to be imaged as captured by the outside imaging unit 23 or the inside imaging unit 24, at a predetermined period, and detects the positions of a plurality of feature points in the face image. In the present embodiment, the predetermined period over which feature points are detected is of 10 frames. A frame is a screen-refreshing unit time; herein one frame spans 1/60 seconds. Implementation of the present invention, however, is not limited to embodiments where the predetermined period of the feature point detection processing is 10 frames.

Figure 49:
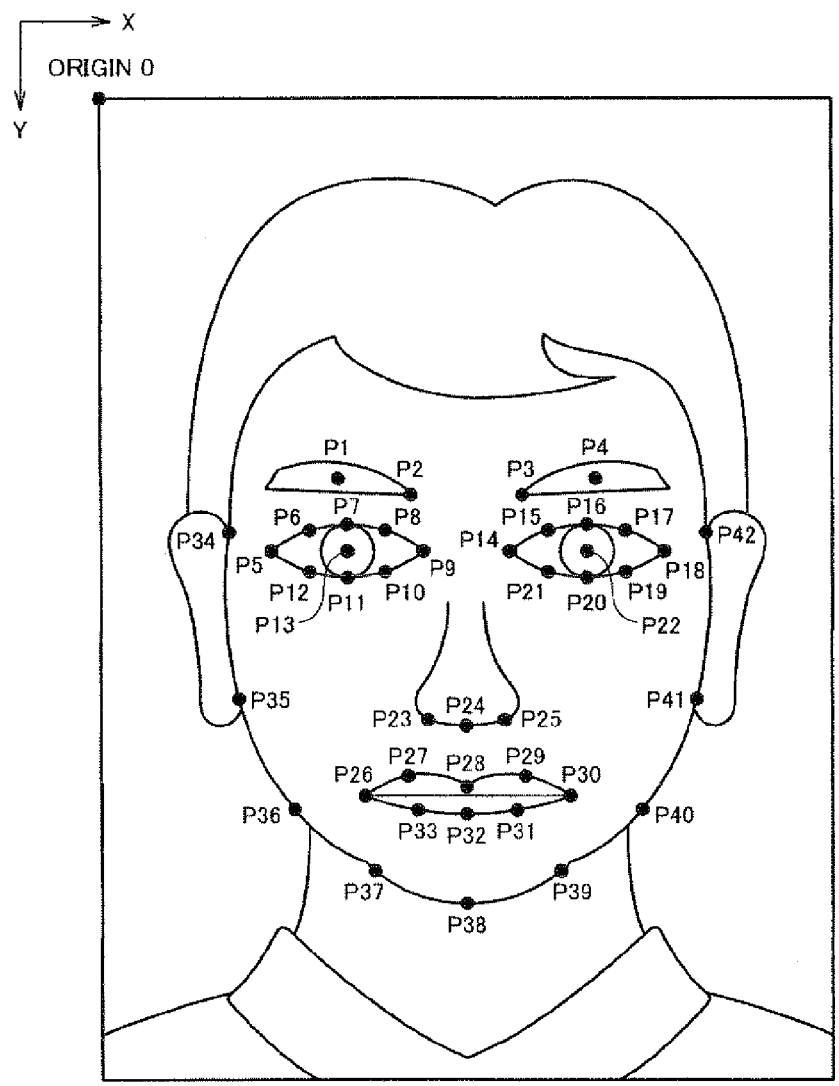
FIG. 49 is a diagram illustrating an example of feature points in a face.

FIG. 49 is a diagram illustrating an example of feature points of a face as detected through execution of the face recognition program 70*a*. In the present embodiment, execution of the face recognition program 70*a* yields 42 feature points from the face image. The feature points detected from the face image are not limited to 42 points, and may be appropriately modified in accordance with the process.

The positions of feature point P1 to feature point P42 detected by the face recognition program 70*a* are represented on a two-dimensional camera coordinate system. In the face image illustrated in FIG. 49, the upper left vertex of the face image is the origin O of the camera coordinate system. The rightwards direction of the face image is the positive direction in the X axis. The downwards direction of the face image is the positive direction in the Y axis. Position information of feature point P1 to feature point P42 is expressed in the form of X coordinates and Y coordinates in such a camera coordinate system. The face recognition program 70*a* supports also a database of data on, for instance, positional relationship characteristics of feature points for each sex and/or age, such that the sex and age of the person to be imaged can be determined on the basis of, for instance, the position information of feature points P1 to P42. The age determined through execution of the face recognition program 70*a* is, for instance, "child", "adult" or "elderly". Age may also be detected by assigning a given age span, for instance "younger than 10", "teens", "twenties", "thirties" . . . "seventies", "eighties and older". Sex and age determination processing is more complex than feature point detection processing, and hence takes comparatively more time than feature point detection processing. The narrower the age brackets that are determined, the more complex becomes the processing, which translates into the time required by the age determination processing.

The imaging program 70b is a program for imaging of face images that are used for pasting onto the three-dimensional shape model, through guidance on the alignment of the face of the person to be imaged. The three-dimensional shape model is a model (described in detail below) in which the left and right eyes and the mouth are deformed. The game device 10 includes the outside imaging unit 23 and the inside imaging unit 24, and hence the operator of the game device 10 can capture his/her own face by using the inside imaging unit 24. The face of persons other than the operator can be imaged by using the outside imaging unit 23. Specifically, the person to be imaged may be the operator of the game device 10, or a person other than the operator. Further, the imaging target is not limited to a person, and may be an animal, provided that the face thereof is recognized by the face recognition program 70a.

In the imaging program 70b, guidance on alignment of the face of the person to be imaged includes two steps, namely (1) guidance on the adjustment of distance between the face of the person to be imaged and the outside imaging unit 23 or the inside imaging unit 24; and (2) guidance on the alignment whereby the left and right eyes and the mouth of the face of the person to be imaged are aligned with the positions of the left and right eyes and the mouth of the three-dimensional shape model.

In the above guidance (1), it is determined whether the distance between the outside imaging unit 23 or the inside imaging unit 24 and the face of the person to be imaged is appropriate, on the basis of position information of the feature points of the face image acquired by the face recognition program 70a. Herein, an appropriate distance between the face of the person to be imaged and the outside imaging unit 23 or the inside imaging unit 24 denotes a distance such that, for instance, the portion of the face in the captured image has an appropriate size for pasting onto the three-dimensional shape model. A face image having an appropriate size for pasting onto the three-dimensional shape model implies an image in which, for instance, the difference in face dimensions and in positions of the feature points between this image and the three-dimensional shape model is within an allowable predetermined error range.

Upon execution of the imaging program 70b in the present embodiment, the information processing unit 31 determines whether the distance between the face of the person to be imaged and the outside imaging unit 23 or the inside imaging unit 24 is appropriate or not on the basis of the distance between the center points of the left and right eyes from among the feature points of the face image (distance between feature point P13 and feature point P22 in FIG. 49).

For instance, the imaging program 70b includes an allowable range of the distance between center points of the left and right eyes, such that upon reading of the imaging program 70b, the allowable range of the distance between the center points of the left and right eyes is held on the main memory 32. Upon execution of the imaging program 70b in the above guidance (1), a message is displayed that urges the operator of the game device 10 to adjust the distance between the face of the person to be imaged and the outside imaging unit 23 or the inside imaging unit 24, depending on whether or not the distance between the center points of the left and right eyes of the face image is within the allowable range.

Once the above guidance (1) is over, there is performed next (2) alignment guidance wherein the left and right eyes and the mouth of the face of the person to be imaged are aligned with the left and right eyes and the mouth of the three-dimensional shape model. A target range of the positions of the left and right eyes and the mouth is displayed on the upper LCD 22 on which there is displayed the image captured by the outside imaging unit 23 or the inside imaging unit 24. The target range corresponds to the positions of the left and right eyes and the mouth of the three-dimensional shape model. The operator performs alignment of the face of the person to be imaged while looking at the target positions of the face of the person to be imaged that is projected onto the upper LCD 22 and of the left and right eyes and the mouth that correspond to the three-dimensional shape model. Alignment guidance is performed thus aimed at the operator of the game device 10.

For instance, the imaging program 70b includes respective target ranges having, as reference points, the center points of the left and right eyes and the center point of the mouth of the three-dimensional shape model, such that, upon reading of the imaging program 70b, the left and right eyes and the mouth and respective target ranges thereof are held in the main memory 32. A face image of the person to be imaged for three-dimensional shape model pasting is imaged (stored) when it is determined that the center points of the left and right eyes and the center point of the mouth of the person to be imaged are positioned within respective target ranges. The detailed processing of the imaging program 70b is explained further on.

The three-dimensional face object generation program 70c is a program for pasting a face image onto a three-dimensional shape model and for generating a three-dimensional face object of the face of the person to be imaged. The detailed processing of the three-dimensional face object generation program 70c is explained further on.

The face recognition program 70a, the imaging program 70b, and the three-dimensional face object generation program 70c are stored in the data storage internal memory 35, and are appropriately read from the main memory 32 by the information processing unit 31. The storage scheme is not limited to the above-described one, and the imaging program 70b and the three-dimensional face object generation program 70c may be recorded on an external memory 45, and may be appropriately read from the main memory 32 by the information processing unit 31. Alternatively, the imaging program 70b and the three-dimensional face object generation program 70c may be acquired by, for instance, a server or the like other than the game device 10, by way of wireless LAN, and may be appropriately read from a main memory.

A three-dimensional shape model 72a and a three-dimensional face object information 72b are stored in a data storage area 72 of the main memory 32.

The three-dimensional shape model 72a is a three-dimensional face model that is used by the three-dimensional face object generation program 70c.

Figure 50:
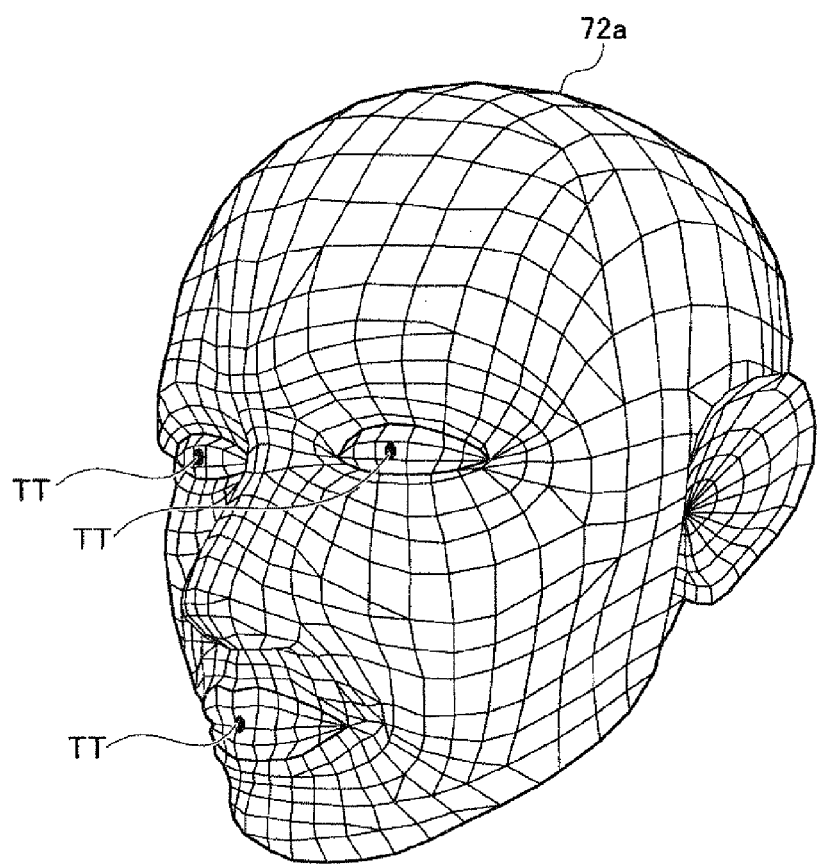
FIG. 50 is a diagram illustrating an example of a three-dimensional shape model.

FIG. 50 is a diagram illustrating an example of the three-dimensional shape model 72a. In the present embodiment, the three-dimensional shape model 72a is a three-dimensional shape model of a face defined by polygons. In a case where the three-dimensional shape model 72a is defined by polygons, the shape of the surface is determined on the basis of the three-dimensional coordinates of the vertices of the polygons. The three-dimensional shape model 72a has a plurality of control points that are used for deformation. The control points are disposed at sites that are to be deformed, for instance around the left and right eyes and around the mouth. By displacing the control points, the three-dimensional shape model 72a can modify the expression of the face through opening and closing of the eyes and/or the mouth. The three-dimensional shape model 72a allows also modifying the orientation and the like of the face.

Feature points TT are set in the three-dimensional shape model 72a. The feature points TT that can be selected include, for instance, portions having actual characteristics, such as the ends of the eyes or the mouth, the tip of the nose, the lower end of the jaw, or portions that can be easily characterized positionally even if lacking a characteristic of its own, for instance intermediate points of the foregoing. The center points of the left and right eyes and the center point of the mouth are set as the feature points TT in the three-dimensional shape model 72a illustrated in FIG. 50. The feature points TT are used as alignment reference points upon pasting of a two-dimensional face image onto the three-dimensional shape model 72a. More specifically, the feature points of the two-dimensional face image are pasted in such a way so as to match respective feature points of the three-dimensional shape model 72a.

The three-dimensional shape model 72a is not limited to a model defined by polygons, and may be a three-dimensional shape model defined by free surfaces. In a case where the three-dimensional shape model 72a is defined by free surfaces, the shape of the surfaces is decided based on the functions that define the surfaces and based on the coordinates of respective control points.

The three-dimensional shape model 72a is included in, for instance the three-dimensional face generation program 70c, such that upon reading of the three-dimensional face object generation program 70c, the three-dimensional shape model 72a becomes held in the main memory 32. Along with this, the main memory 32 holds also, for instance, the coordinates of the camera coordinate system of the center points of the left and right eyes and the center point of the mouth of the three-dimensional shape model 72a. The three-dimensional shape model 72a may also be stored in the data storage internal memory 35 of the game device 10 independently from the three-dimensional face generation program 70c.

The three-dimensional face object information 72b is information generated by the three-dimensional face object generation program 70c and relating to a three-dimensional face object in which a two-dimensional face image is pasted onto the three-dimensional shape model 72a.

Figure 51:
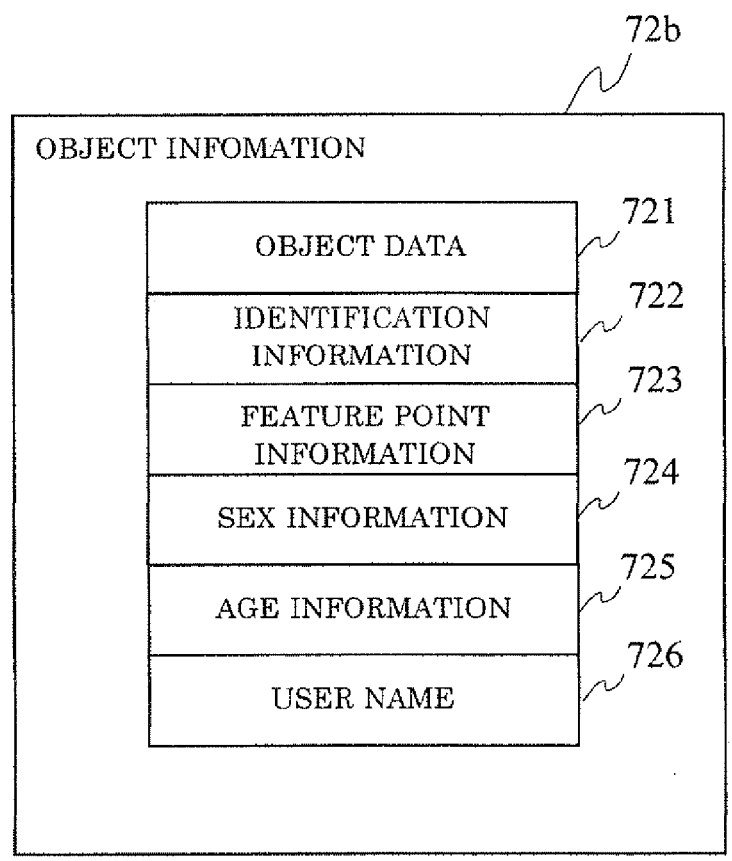
FIG. 51 is a diagram illustrating an example of three-dimensional face object information.

FIG. 51 is a diagram illustrating an example of the three-dimensional face object information 72b. The three-dimensional face object information 72b includes three-dimensional face object data 721, identification information 722, feature point information 723, sex information 724, age information 725 and a user name 726.

The three-dimensional face object data 721, which is generated by the three-dimensional face object generation program 70c, is a three-dimensional face object in which a face image is pasted onto the three-dimensional model 72a. The identification information 722 is information for enabling the game device 10 to identify internally the three-dimensional face object generated by the three-dimensional face object generation program 70c. The identification information 722 is, for instance, a combination of half-width alphanumeric characters allocated in such a manner so as not to overlap with another three-dimensional face object.

The feature point information 723 includes position information on respective feature points in a face image of the three-dimensional face object data 721 as detected by the face recognition program 70a. The sex information 724 is the sex of the face image of the three-dimensional face object data 721 as discriminated by the face recognition program 70a. The sex information 724 may be "male" or "female". The age information 725 is the age of the face image of the three-dimensional face object data 721 as determined by the face recognition program 70a. The age information 725 may be, for instance, anyone from among "child", "adult", "elderly" and the like.

The user name 726 is a name given to the three-dimensional face object 721 by the operator of the game device 10. For instance, the sex information 724, the age information 725 and the user name 726 are information items that are displayed on the upper LCD 22 or the lower LCD 12 of the game device 10, as a profile of the three-dimensional face object 721.

The three-dimensional face object information 72b is stored for each three-dimensional face object generated by the three-dimensional face object generation program 70c.

Operation Example

Figure 52:
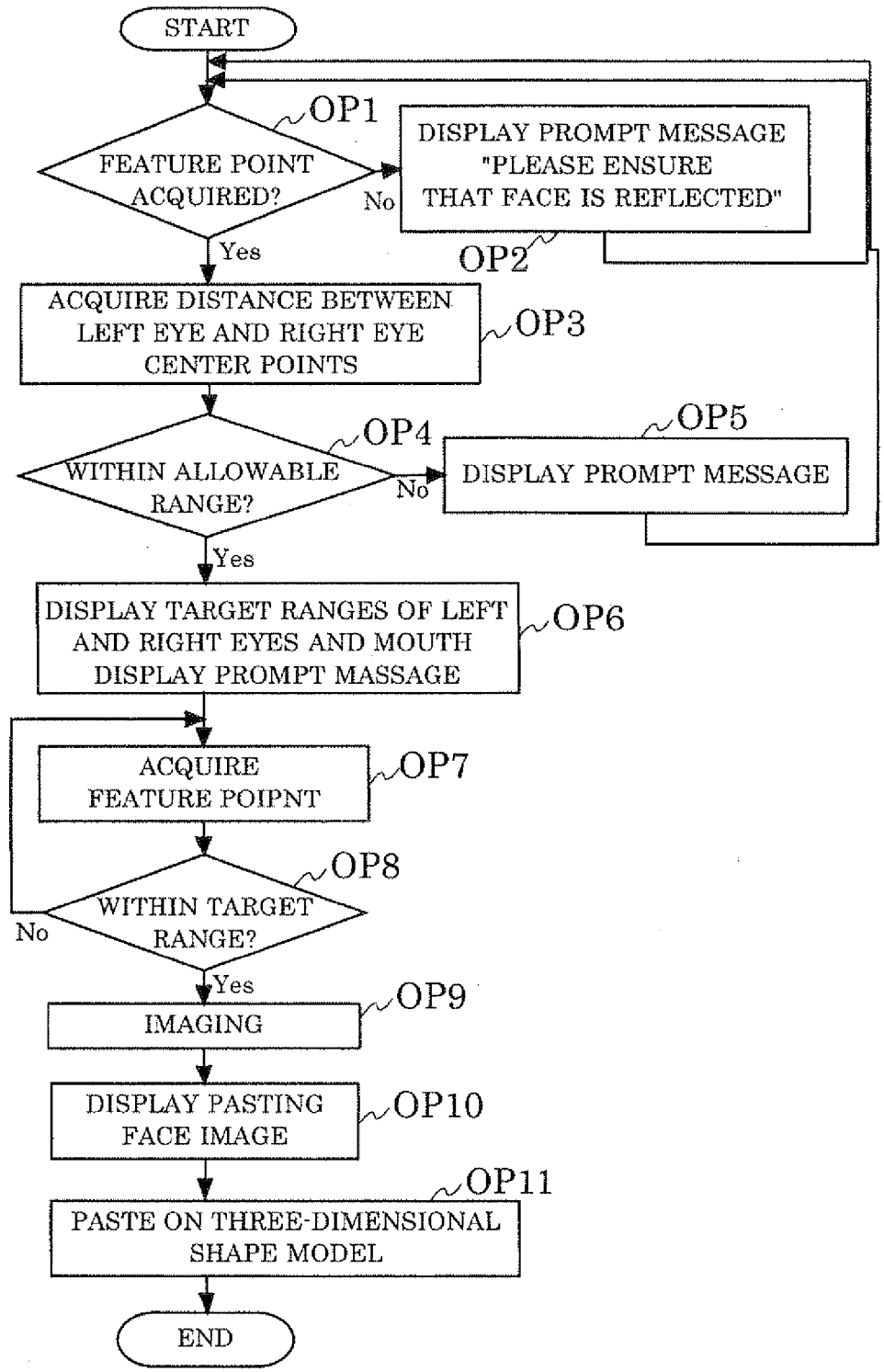
FIG. 52 is a diagram illustrating an example of process flow from guidance for imaging of face images in a game device up to generation of a three-dimensional face object.

FIG. 52 is a diagram illustrating an example of process flow from guidance for imaging of face images in the game device 10 up to generation of a three-dimensional face object. In the present embodiment, the images captured using the outside imaging unit 23 or the inside imaging unit 24 are outputted to the upper LCD 22 of the game device 10. The person to be imaged may be, for instance, the operator his/herself of the game device 10, a person other than the operator, or an image from a photograph or the like. Hereafter, the inside imaging unit 24 and the outside imaging unit 23 will be collectively referred to "imaging unit". Where the denomination "imaging unit" is used, the latter denotes the unit that is launched from among the inside imaging unit 24 and the outside imaging unit 23.

The flow illustrated in FIG. 52 starts when the operator of the game device 10 launches the imaging program 70b or an application program that uses the imaging program 70b. The face recognition program 70a is also launched upon launching of the imaging program 70b or an application program that uses the imaging program 70b. Through execution of the face recognition program 70a, the face image inputted from the imaging unit is processed, for instance over a 10-frame period, and feature points of the face image are outputted. In the embodiments of the present invention, however, the processing period of the face recognition program 70a is not limited to 10 frames. Through execution of the face recognition program 70a there is determined the sex and age of the face image inputted from the imaging unit. Sex and age determination of the face image takes time, and hence feature points are detected first, and the sex and age determination results are outputted thereafter.

If feature points of the face image detected by the face recognition program 70a cannot be acquired (OP 1: No), the information processing unit 31 outputs a prompt message for guiding the operator so as to cause the face of the person to be imaged to appear on the screen of the upper LCD 22 (OP 2). For instance, a prompt message such as "please ensure that face is reflected" is displayed on the screen of the upper LCD 22.

If feature points of the face image detected by the face recognition program 70a are acquired (OP 1: Yes), the information processing unit 31 acquires the distance between the center points of the left and right eyes from the feature points of the face image (OP 3). For instance, the information processing unit 31 calculates and acquires the distance between the left and right center points on the basis of the coordinates of the center points of the left and right eyes.

The information processing unit 31 determines whether the distance between the center points of the left and right eyes of the face image is within an allowable range (OP 4). If the distance between the center points of the left and right eyes of the face image is within an allowable range (OP 4: Yes), the process proceeds to OP 6. If the distance between the center points of the left and right eyes of the face image is not within an allowable range (OP 4: No), a prompt message urging adjustment of the distance between the face of the person to be imaged and the imaging unit is displayed on the screen of the upper LCD 22 (OP 5).

For instance, the distance between the center points of the left and right eyes in the camera coordinate system of the three-dimensional shape model 72*a* is held in the data storage area 72 of the main memory 32. The allowable range of the distance between the center points of the left and right eyes of the face image is a predetermined allowable error range having, as a reference value, the distance between the center points of the left and right eyes in the camera coordinate system of the three-dimensional shape model 72*a*. That is, the allowable range of the distance between the center points of the left and right eyes of the face image is reference value±error α. However, the allowable range of the distance between the centers of the left and right eyes of the face image is not limited thereto.

In the determination processing of OP 4, the information processing unit 31 determines whether the distance between the center points of the left and right eyes of the face image is smaller than a minimum value (reference value−error α) of the allowable range, and determines next whether the distance between the center points of the left and right eyes of the face image is greater than a maximum value (reference value+error α) of the allowable range. The specific procedure is as follows.

The information processing unit 31 determines whether the distance between the center points of the left and right eyes of the face image acquired in OP 3 is smaller than a minimum value (reference value−error α) of the allowable range. If the distance between the center points of the left and right eyes of the face image is smaller than a minimum value (reference value−error α) of the allowable range (OP 4: No), this indicates that the distance between the face of the person to be imaged and the imaging unit is excessive, and hence the information processing device 31 displays on the screen of the upper LCD 22 a guidance message for shortening of the distance between the face of the person to be imaged and the imaging unit (OP 5). The guidance message for shortening of the distance between the face of the person to be imaged and the imaging unit may be, for instance, "please move your face closer". Thereafter, the process returns to OP 1. The prompt message is displayed on the screen of the upper LCD 22 together with the images that are displayed on the screen of the upper LCD 22 as sequentially imaged by the imaging unit. However, display is not limited thereto, and for instance the prompt message alone may be displayed on the screen of the upper LCD 22, so that, after a predetermined lapse of time, the images captured by the imaging unit may be displayed on the screen of the upper LCD 22.

Figure 53:
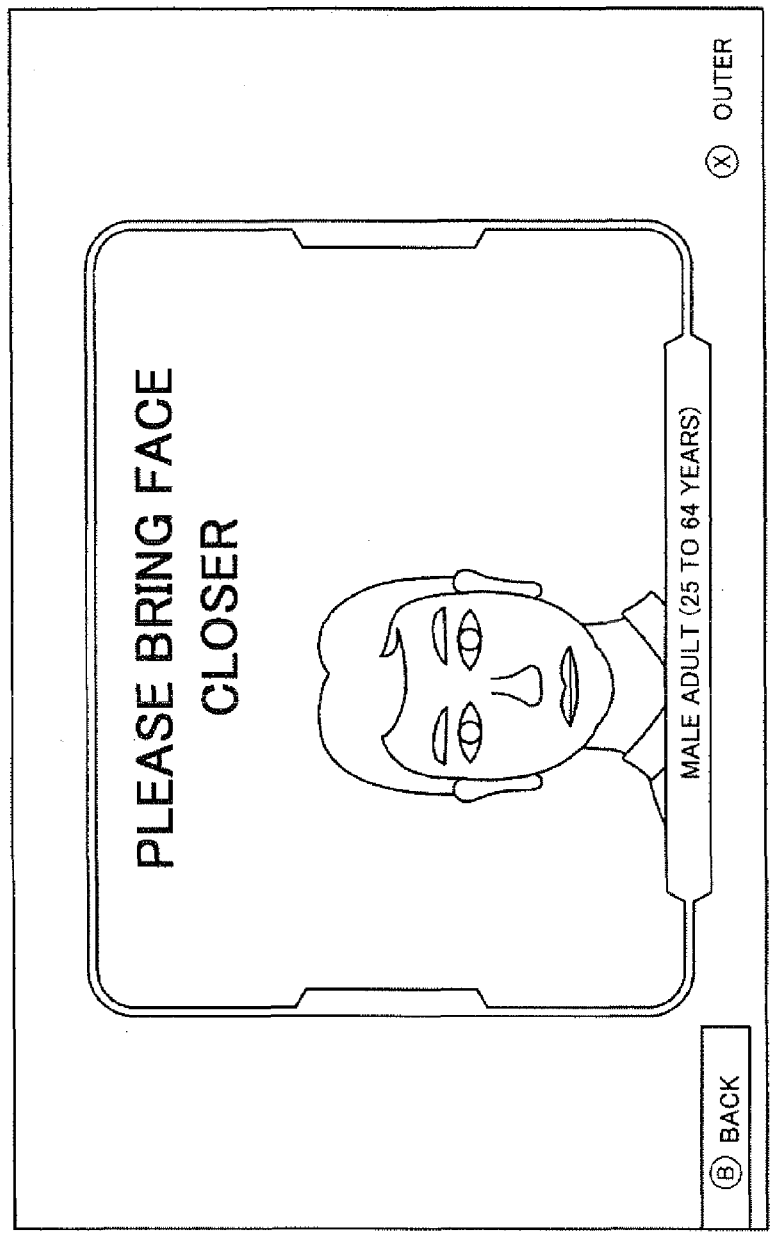
FIG. 53 is an example of a display screen of a prompt message in a case where the face of a person to be imaged is too far away from an outside imaging unit or inside imaging unit.

FIG. 53 is an example of a display screen of a prompt message in a case where the face of the person to be imaged is too far away from the imaging unit. In the example illustrated in FIG. 53, the distance between the left and right eyes of the face image of the person to be imaged is smaller than the allowable range, and hence a prompt message such as "please move your face closer" is displayed. In the example illustrated in FIG. 53, the prompt message is displayed on the screen of the upper LCD 22 together with the images that are sequentially captured by the imaging unit.

If the distance between the center points of the left and right eyes of the face image is not smaller than a minimum value (reference value−error α) of the allowable range, the information processing unit 31 determines whether the distance between the center points of the left and right eyes of the face image is greater than a maximum value (reference value+error α) of the allowable range. If the distance between the center points of the left and right eyes of the face image is greater than a maximum value (reference value+error α) of the allowable range (OP 4: No), this indicates that the distance between the face of the person to be imaged and the imaging unit is too short, and hence the information processing device 31 displays on the screen of the upper LCD 22 a guidance message for lengthening of the distance between the face of the person to be imaged and the imaging unit (OP 5). The guidance message for lengthening of the distance between the face of the person to be imaged and the imaging unit may be, for instance, "please move your face away". Thereafter, the process returns to OP 1.

If the distance between the center points of the left and right eyes of the face image is not smaller than a minimum value (reference value−error α) of the allowable range and is not greater than a maximum value (reference value+error α) of the allowable range, this indicates that the distance between the center points of the left and right eyes of the face image is within an allowable range (OP 4: Yes), and the process proceeds to OP 6.

Figure 54:
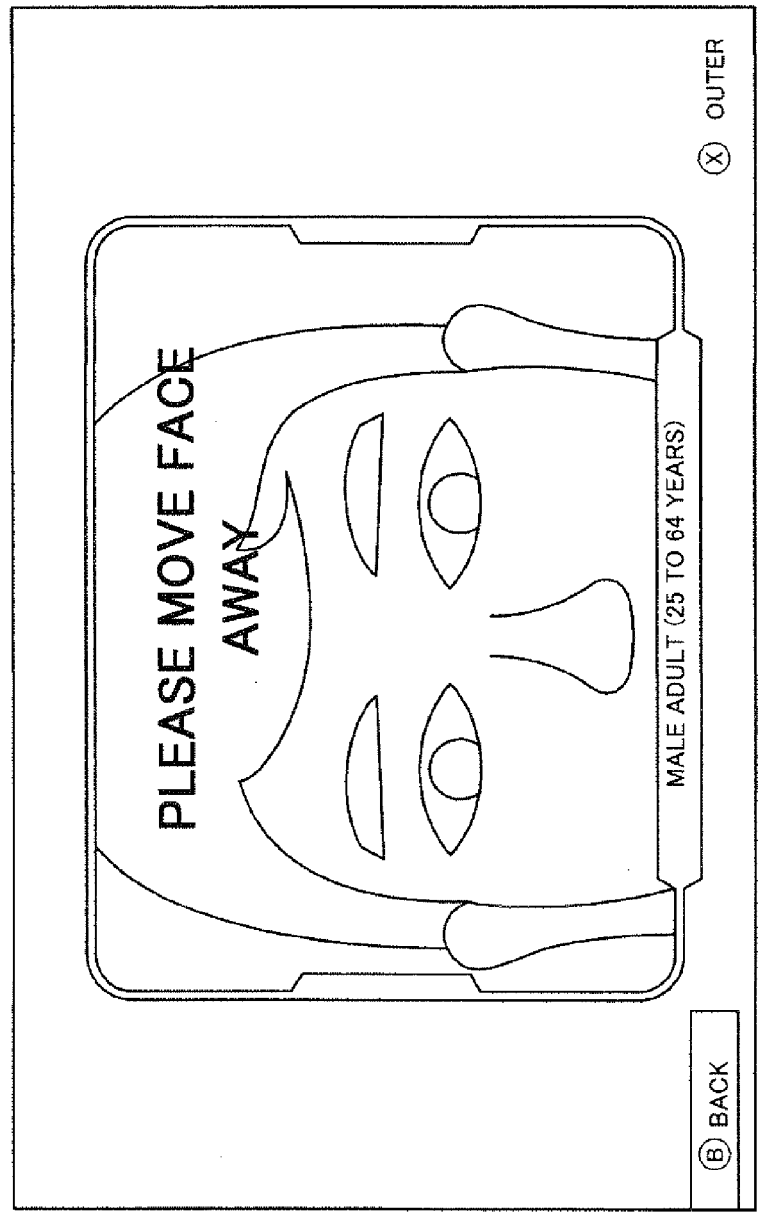
FIG. 54 is an example of a display screen of a prompt message in a case where the face of the person to be imaged is too close to an outside imaging unit or inside imaging unit.

FIG. 54 is an example of a display screen of a prompt message in a case where the face of the person to be imaged is too close to the imaging unit. In the example illustrated in FIG. 54, the distance between the left and right eyes of the face image of the person to be imaged is greater than the allowable range, and hence a prompt message such as "please move your face away" is displayed. In the example illustrated in FIG. 54, the prompt message is displayed on the screen of the upper LCD 22 together with the images that are sequentially captured by the imaging unit. At this stage there is guidance only for adjustment of the distance between the person to be imaged and the imaging unit. Accordingly, the information processing unit 31 performs the determination of OP 4, provided that the distance between the center points of the left and right eyes can be acquired, even if the face of the person to be imaged is at a position removed from the center of the screen, as illustrated in FIG. 54. A prompt message can be thus displayed.

The determination processing executed in OP 4 is not limited to the above-described processing. The order of the determination is not limited to the above-described one; i.e. it may be determined whether the distance between the center points of the left and right eyes of the face image is greater than a maximum value (reference value+error α) of the allowable range, and, thereafter, it may be determined whether the distance between the center points of the left and right eyes of the face image is smaller than a minimum value (reference value−error α) of the allowable range.

In the determination processing executed in OP 4, it may be determined whether the distance between the center points of the left and right eyes of the face image is equal to or greater than a minimum value and equal to or smaller than a maximum value of the allowable range, such that if the distance is equal to or greater than the minimum value and equal to or smaller than the maximum value, the process proceeds to OP 6. If the distance between the center points of the left and right eyes of the face image is not equal to or greater than a minimum value and equal to or smaller than a maximum value of the allowable range, it may be determined next whether the distance between the center points of the left and right eyes of the face image is smaller than a minimum value of the allowable range, and there is displayed a prompt message according to the determination result. Instead of determining whether the distance between the center points of the left and right eyes of the face image is smaller than a minimum value of the allowable range, there may be determined whether the distance between the center points of the left and right eyes of the face image is greater than a maximum value of the allowable range. There is no limitation as to the determinations that are carried out.

In OP 4, the feature of lying within the allowable range is not limited, and may denote being equal to or greater than a minimum value but smaller than a maximum value of the allowable range, being equal to or greater than a minimum value and equal to or smaller than a maximum value, being greater than a minimum value and equal to or smaller than a maximum value, or being greater than a minimum value but smaller than a maximum value.

If the distance between the center points of the left and right eyes of the face image is determined to be within the allowable range (OP 4: Yes), this indicates that the adjustment of the distance between the face of the person to be imaged and the imaging unit is complete. Next, in order to guide adjustment of the positions of the left and right eyes and the mouth of the person to be imaged, the information processing unit 31 displays a target range of the left and right eyes and the mouth, as well as a prompt message, on the upper LCD 22 (OP 6). The target range of the left and right eyes and the mouth and the prompt message are displayed on the screen of the upper LCD 22 together with a new image that is periodically captured and updated by the imaging unit (for instance, at periods of 1/60 seconds), such that the new image allows checking the state of the face of the person to be imaged substantially in real time. However, display is not limited thereto, and for instance the prompt message alone may be displayed on the screen of the upper LCD 22, and, after a predetermined lapse of time, an image captured by the imaging unit and the target ranges of the left and right eyes and the mouth are displayed on the screen of the upper LCD 22. The operator of the game device 10 can perform alignment smoothly, while checking the position of the face of the person to be imaged, through display, on the screen of the upper LCD 22, of the target positions of the left and right eyes and the mouth together with the images displayed on the screen of the upper LCD 22 as sequentially captured by the imaging unit.

The target ranges of the left and right eyes and the mouth of the face image are defined, for instance, as reference points in the form of the coordinates of the center points of the left and right eyes and the center point of the mouth in the three-dimensional shape model 72a converted to a camera coordinate system. The position information of the center points of the left and right eyes and the center point of the mouth in the three-dimensional shape model 72a is stored, for instance, in the form of respective coordinates converted to the camera coordinate system (FIG. 49). The target ranges, for instance, are defined as a $\pm\beta$ range in the X axis direction and a $\pm\gamma$ range in the Y axis direction, from a reference point. The target ranges may be defined as a range of distance $\sigma$ from a reference point. The embodiments of the present invention are not limited to any given definition.

Figure 55:
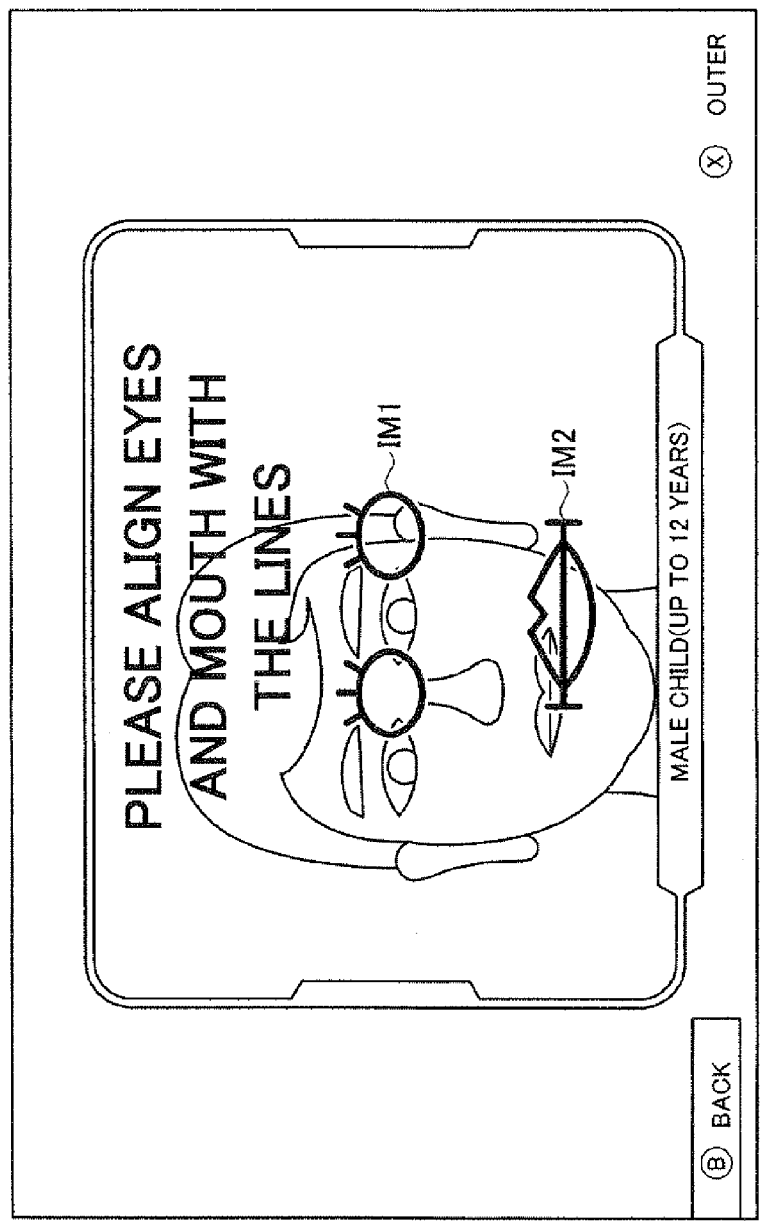
FIG. 55 is a diagram illustrating an example of screen display with a prompt message and target range for guidance of the adjustment of the positions of the left and right eyes and the mouth of a person to be imaged.

FIG. 55 is a diagram illustrating an example of screen display with a prompt message and a target range for guidance of the adjustment of the positions of the left and right eyes and the mouth of the person to be imaged. In the example illustrated in FIG. 55, the target ranges of the left and right eyes and the mouth are displayed in the form of an image IM 1 of the left and right eyes and an image IM 2 of the mouth. A prompt message such as "please align eyes and mouth with the lines" is displayed for guiding alignment of the image IM 1 of the left and right eyes and the image IM 2 of the mouth. The size (dimensions) of the image IM 1 of the left and right eyes and the image IM 2 of the mouth need not match exactly the respective target ranges. The target ranges of the left and right eyes and the mouth are not limited to being displayed in the form of images. Herein, display can adopt various forms, for instance display of the center points of the left and right eyes and the center point of the mouth in the three-dimensional shape model 72a, or display of circles. Also, the prompt message can be modified in accordance with the form in which the target positions are displayed.

In a case where, in OP 6, determination of the sex and age of the face image of the face recognition program 70a is over upon display of the prompt message, the information processing unit 31 may output the determination result of the sex and age of the face image together with the target positions of the left and right eyes and the mouth. In FIG. 55, the determination result for the sex of the person to be imaged is "male" and the age determination result is "child". These results are disposed at the lower portion of the screen. By the stage of OP 6, the face of the person to be imaged is not always at an appropriate position, and hence sex and age determination is not final.

In OP 6, after display of the prompt message and the target ranges of the left and right eyes and the mouth, the information processing unit 31 acquires the feature points of the face image as detected anew through execution of the face recognition program 70a (OP 7). The information processing unit 31 determines whether the center points of the left and right eyes and the center point of the mouth of the face image newly acquired are all within the target ranges (OP 8).

In a case where, for instance, the target ranges are defined as a $\pm\beta$ range in the X axis direction and a $\pm\gamma$ range in the Y axis direction, from a reference point, the information processing unit 31 determines whether the center points of the left and right eyes and the center point of the mouth of the face image are within a respective target range by determining whether the respective coordinates of the center points of the left and right eyes and the center point of the mouth of the face image are within respective target ranges.

In a case where, for instance, the target ranges are defined as ranges within a distance $\sigma$ from a reference point, the information processing unit 31 measures the respective distances, from a reference point, for the center points of the left and right eyes and the center point of the mouth of the face image, and determines whether the center points of the left and right eyes and the center point of the mouth of the face image are within respective target ranges by determining whether the measured distances are equal to or smaller than the distance $\sigma$.

In all cases, the target ranges of the left and right eyes and the mouth of the face image are set to be narrower (strict condition) than the allowable range (reference value±error $\alpha$) of the distance between the center points of the left and right eyes of the face image. That is because the position of the face image is firstly adjusted roughly through adjustment of the distance between the face of the person to be imaged, and next there is performed a fine adjustment of aligning the left and right eyes and the mouth of the face image to target positions. In the game device 10, guidance on rough adjustment of the face of the person to be imaged is performed first through the comparatively simple process of determining the distance between the center points of the left and right eyes, and guidance on a comparatively complex fine adjustment, namely alignment of the left and right eyes and the mouth, is performed next. The operator can be guided smoothly thereby.

If none of the center points of the left and right eyes and the center point of the mouth of the face image is within a respective target range (OP 8: No), the information processing unit 31 waits until subsequent feature points of the face image are detected through execution of the face recognition program 70*a*, and the processes of OP 7 and OP 8 are repeated. The prompt message and the target ranges of the left and right eyes and the mouth remain displayed on the screen of the upper LCD 22 display.

If both the center points of the left and right eyes and the center point of the mouth of the face image are within a respective target range (OP 8: Yes), the information processing unit 31 automatically releases the shutter of the imaging unit and captures an image (OP 9). Specifically, after the information processing unit 31 has determined that the center points of the left and right eyes and the center point of the mouth of the face image are both within respective target ranges, the face image captured by the imaging unit is stored in a work area of the main memory 32 as a pasting face image on the three-dimensional shape model 72*a*. The operation is not limited to the above, and imaging of the pasting face image may be carried out through release of the shutter as a result of operation of a button by the operator of the game device 10.

Figure 56:
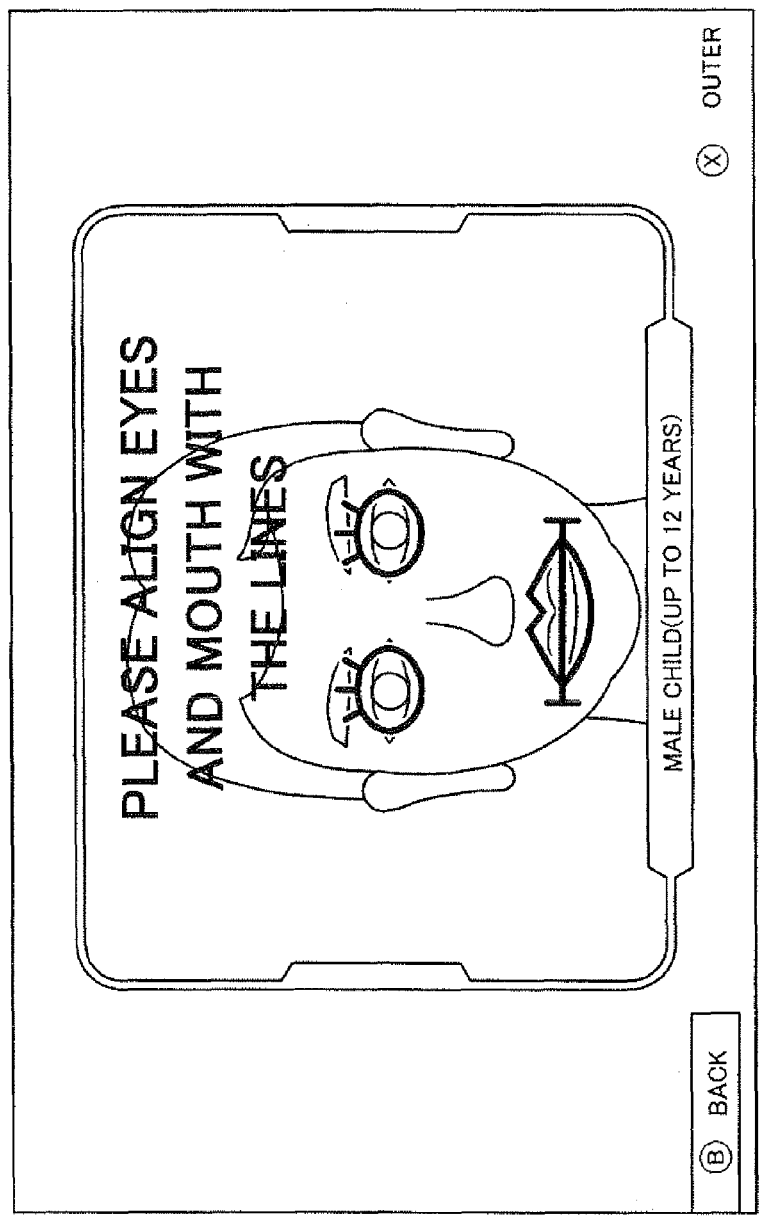
FIG. 56 is a diagram illustrating an example of a display screen at a time when the center points of the left and right eyes and the center point of the mouth of a person to be imaged are within a target position.

FIG. 56 is a diagram illustrating an example of a display screen at a time when the center points of the left and right eyes and the center point of the mouth of a person to be imaged are within a target position. In a state such as the one illustrated in FIG. 56, the information processing unit 31 determines that the center points of the left and right eyes and the center point of the mouth of the face image are within respective target ranges, and imaging is performed automatically through release of the shutter of the imaging unit. The sex and age determination result of the face image are also displayed in FIG. 56, in the same way as in FIG. 55.

The information processing unit 31 displays, on the screen of the upper LCD 22, the captured pasting face image, and urges confirmation by the operator of the game device 10. At this time, the information processing unit 31 displays, as final results, the sex and age determination result of the face image as determined by the face recognition program 70*a* (OP 10).

Figure 57:
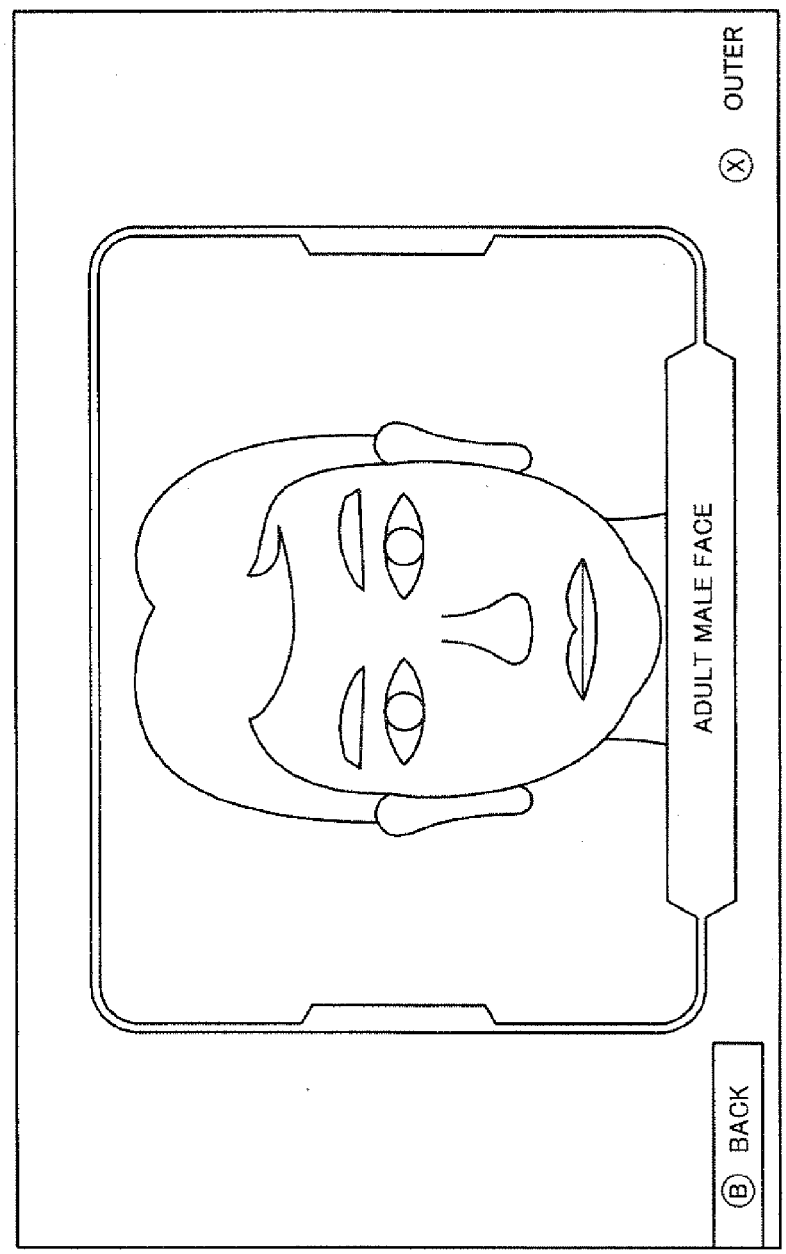
FIG. 57 is a diagram illustrating an example of a display screen of a captured face image, for pasting.

FIG. 57 is a diagram illustrating an example of a display screen of a captured face image, for pasting. The final results of the sex and age determination of the face image are also displayed along with the pasting face image. In the example illustrated in FIG. 57, "male adult face" is displayed as the final result of the sex and age determination. Determination results such as "female child face" or "male elderly face" are displayed as determination results for other sexes and ages.

Upon confirmation of the pasting face image through an operation by the operator of the game device 10, the information processing unit 31 launches the three-dimensional face object generation program 70*c*, and pastes the pasting face image to the three-dimensional shape model 72*a*, to generate a three-dimensional face object (OP 11). The information processing unit 31 stores the generated three-dimensional face object in the data storage area 72 in a work area of the main memory 32. Alongside the three-dimensional face object, the information processing unit 31 stores also the feature points of the face image, the sex and age determination results and so forth as the three-dimensional face object information 72*b*. The three-dimensional face object information stored in the main memory 32 is recorded in the data storage internal memory 35 or data storage external memory 46, through an operation by the operator of the game device 10 or through a power-off sequence of the game device 10.

Figure 58:
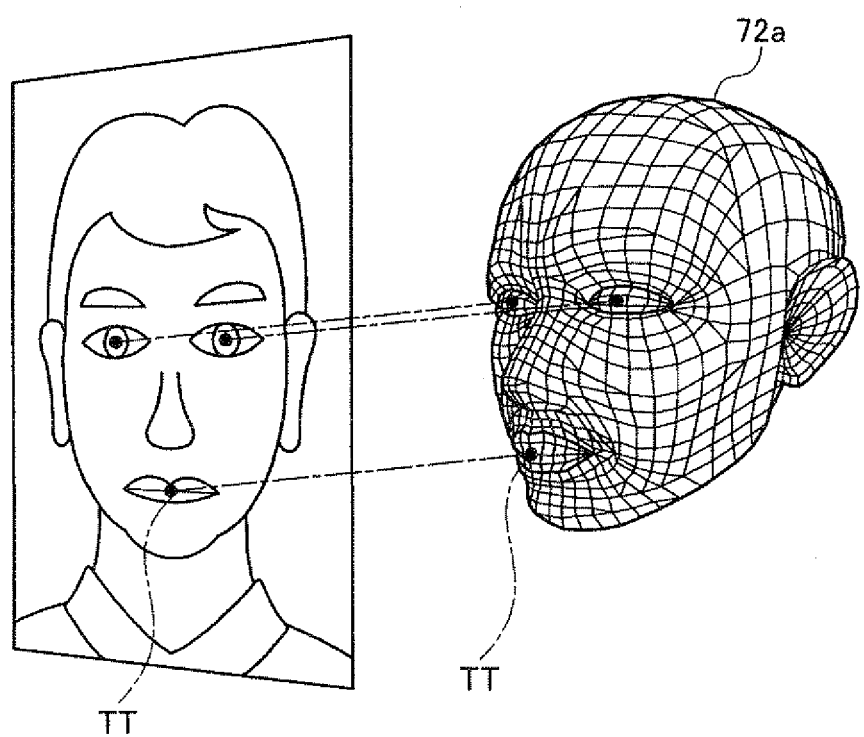
FIG. 58 is a diagram illustrating an example of alignment upon pasting of a pasting face image to a three-dimensional shape model.

FIG. 58 is a diagram illustrating an example of alignment between a two-dimensional face image and the three-dimensional shape model 72*a* upon pasting of a pasting face image onto the three-dimensional shape model 72*a*. Through execution of the three-dimensional face object generation program 70*c*, the information processing unit 31 maps the center points of the left and right eyes and the center point of the mouth of the pasting image to the center points of the left and right eyes and the center point of the mouth of the three-dimensional shape model 72*a*, and modifies the positions, orientation and so forth in the three-dimensional shape model 72*a* in such a way so as minimize the distances between the foregoing center points. For instance, an energy function or the like may be used for alignment. For instance, there may be minimized the sum of the squares of distances ($D1^2 + D2^2 + D3^2$) between the pasting image and the three-dimensional shape model 72*a*, wherein distance D1 denotes the distance between the left eye center points, the distance D2 denotes the distance between right eye center points, and distance D3 denotes the distance between the mouth center points.

The pasting face image is captured, in OP 9 in the flow of FIG. 52, through face position adjustment under the strict condition that mandates matching of the center points of the left and right eyes and the mouth with the three-dimensional shape model 72*a*. Therefore, alignment with the three-dimensional shape model 72*a* can be performed with good precision.

(Example of Usage of a Three-Dimensional Face Object)

Figure 59:
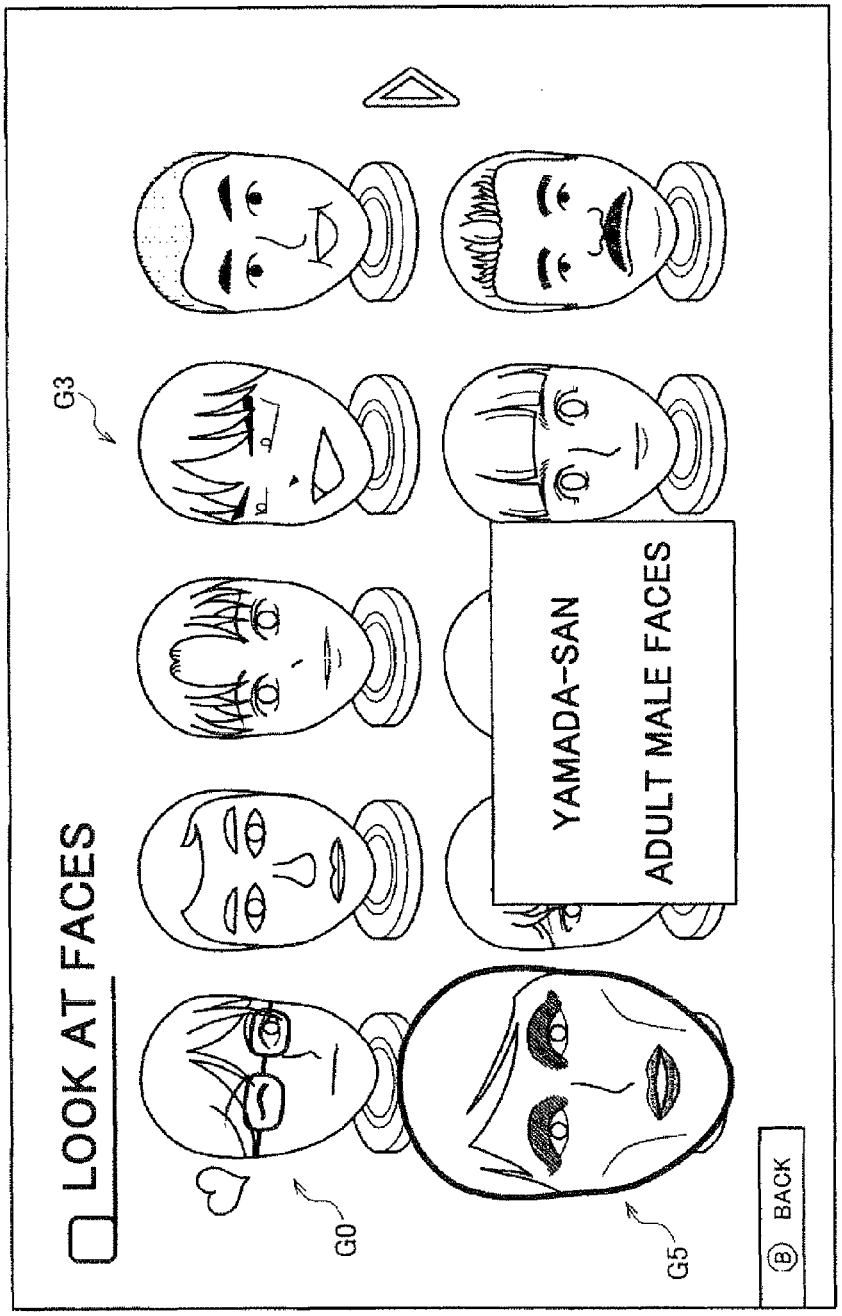
FIG. 59 is a diagram illustrating a Use example 1 of a three-dimensional face object.

FIG. 59 is a diagram illustrating a Use example 1 of a three-dimensional face object. FIG. 59 is a diagram illustrating an example of a list screen of a three-dimensional face object stored in the game device 10. The three-dimensional face objects are operated by an application program. In the example illustrated in FIG. 59, a three-dimensional face object G0 is winking by closing the right eye. A three-dimensional face object G3 is turning the face towards a three-dimensional object G5. Information in the three-dimensional face object information 72*b* on the three-dimensional face object G5 is displayed upon selection, for instance, of the three-dimensional face object G5 through an operation by the operator. For instance, there are displayed the user name ("Yamada-san" in FIG. 59) of the three-dimensional face object G5, as well as the sex, age and so forth (in FIG. 59, "male adult face").

For all the three-dimensional face objects illustrated in FIG. 59, the pasting face image is captured in such a manner that the center points of the left and right eyes and the mouth of the three-dimensional shape model 72*a* match the center points of the left and right eyes and the mouth of the face image. A natural expression having little weirdness can be brought out thereby. For instance, a closed-eye expression can be displayed by moving the control points around an eye in the three-dimensional shape model 72. In this case, the center point of the eye in the three-dimensional shape model 72 and the center point of the eye in the face image fit each other, and hence the closed-eye expression can be displayed accurately.

FIG. 43 is a diagram illustrating a Use example 2 of a three-dimensional face object. FIG. 43 is a diagram illustrating an example of a screen displayed during execution of an application program of a game. The three-dimensional face object, for instance, is used as an enemy character of a three-dimensional object in a game, through combination of a character frame, in a game that involves destroying a three-dimensional object enemy that breaks through out of a rear side of the real world (virtual space) that is projected onto the screen of the upper LCD 22 of the game device 10, into the real world. For instance, the user may select a three-dimensional face object of an enemy character by using the list screen of three-dimensional face objects displayed in FIG. 59. In FIG. 43, some of the three-dimensional face objects of the example illustrated in FIG. 59 are used as enemy characters E01 to E07. Such enemy characters of three-dimensional objects utilize the three-dimensional shape model 72a, so that the expression and orientation or characters can change.

Effect of the Present Embodiment

In order to capture a face image that is pasted to a three-dimensional shape model 72a in which the left and right eyes and the mouth are deformed, the game device 10 performs (1) guidance on adjustment of the distance between the face of the person to be imaged and the imaging unit, and performs (2) guidance on adjustment of the positions of the left and right eyes and the mouth in the face image of the person to be imaged. Through the above guidance (1) there is adjusted, to some extent, the position of the left and right eyes, and through the above guidance (2) the operator of the game device 10 can be guided through display of a target position for alignment of the left and right eyes and the mouth. As a result, the operator of the game device 10 can align the left and right eyes and the mouth of the person to be imaged more easily than in a case where the positions of the left and right eyes and the mouth are adjusted all at once. Processing in the game device 10 is less complex than when the positions of the left and right eyes and the mouth are adjusted all at once, and hence the load placed on the game device 10 can be eased. Also, there can be enhanced the accuracy of the arrangement of the left and right eyes and the mouth of the person to be imaged with respect to the target positions of the left and right eyes and the mouth in the image. The captured face image is thus imaged under the strict conditions of conforming to the three-dimensional shape model 72a. This allows increasing the precision of alignment with the three-dimensional shape model 72a. An object can be generated as a result having the face of the person to be imaged that is imbued with a natural expression that has no weirdness.

The face image of the person to be imaged is captured so as to conform to the three-dimensional shape model 72a. Therefore, the game device 10 can generate a plurality of three-dimensional face objects of changing expression using one model, without creating a model out of a captured face image and without preparing a plurality of three-dimensional shape models.

The game device 10 goes through the above steps (1) and (2) in order to capture a face image for three-dimensional face objects, and hence imaging is not possible without the consent of the person to be imaged. This has the effect of preventing covert image capture.

The game device 10 determines the sex and age of the person to be imaged through execution of the face recognition program 70a. However, sex and age determination takes longer than feature point detection in a face image. The operator of the game device 10 performs position adjustment according to the guidance for face position adjustment, such as those in (1) and (2) above, during the sex and age determination processing by the face recognition program 70a. Therefore, this allows easing the annoyance to the operator on account of the wait time until the results of the sex and age determination of the person to be imaged are outputted.

Variation

In the present embodiment, guidance for adjustment of the distance between the face of the person to be imaged and the imaging unit according to (1) above is performed on the basis of the distance between the center points of the left and right eyes of the face image. Alternatively, the game device 10 may perform guidance for adjustment of the distance between face of the person to be imaged and the outside imaging unit 23 or the inside imaging unit 24, on the basis of the surface area of a triangle that is formed by the center points of the left and right eyes and the center point of the mouth of the face image. In this case, the game device 10 holds beforehand an allowable range of the surface area of such a triangle, the information processing unit 31 works out the surface area of the triangle on the basis of position information of the center points of the left and right eyes and the center point of the mouth of the face image, and determines whether the surface area is within the allowable range. If the surface area is smaller than a minimum value of the allowable range, the information processing unit 31 displays a prompt message for urging the operator to bring the face of the person to be imaged closer to the imaging unit. If the surface area is greater than the maximum value of the allowable range, the information processing unit 31 displays a prompt message for urging the operator to move the face of the person to be imaged away from the imaging unit. The prompt message is not limited to a message displayed on the screen of the upper LCD 22 or the lower LCD 12, and may be outputted as a voice message.

Guidance for adjustment of the distance between the face of the person to be imaged and the imaging unit according to (1) above is not limited to being performed on the basis of the distance between the center points of the left and right eyes of the face image and of the surface area of a triangle formed by the center points of the left and right eyes and the center point of the mouth of the face image, and may be performed on the basis of the distance between two feature points of the face image. Once guidance for adjustment of the distance between the face of the person to be imaged and the imaging unit is over, there may be displayed the target positions of the above two feature points and of one feature point other than these two feature points. Firstly, the positional relationship between the imaging device and the face of the person to be imaged is adjusted to some extent using two feature points; thereupon, the operator of the information processing device or of the imaging device can be guided through display of a target position for matching the positions of the two feature points and another one feature point. As a result, the operator can perform alignment of the three feature points more easily than when adjusting the position of three feature points all at once. The distance between two feature points in a face varies depending on the person. However, the face image is captured in such a manner that the distance between two feature points is the distance between the two feature points in the three-dimensional shape model 72a, and hence the two feature points can be matched to the three-dimensional shape model 72a for any given person. Likewise, the positional relationship between the two feature points and the other one feature point varies depending on the person. However, the other one feature point can be matched to the model, while in a state where the two feature points are matched to the three-dimensional shape model 72a, for instance through tilting of the imaging unit. As a result, this allows imaging a face image that is pasted on the three-dimensional shape model 72a, and allows generating a three-dimensional face object of the person to be imaged, regardless of who the person to be imaged is.

In the above guidance (1) in the present embodiment, a prompt message is displayed, and guidance for adjustment of the distance between the face of the person to be imaged and the imaging unit is performed, in a case where the distance between the center points of the left and right eyes of the face image is not within an allowable range. The game device 10 may display target ranges of the left and right eyes and the mouth of the face image, in the guidance (2) above, when the distance between the center points of the left and right eyes of the face image is within the allowable range, without displaying a prompt message for guidance on adjustment of the distance between the face of the person to be imaged and the imaging unit, as in a case where the distance between the center points of the left and right eyes of the face image is not within an allowable range.

In the present embodiment there are displayed target ranges having, as reference points, respective center points of the left and right eyes and the mouth of the three-dimensional shape model 72a. However, the present embodiment is not limited thereto, and for instance the game device 10 may display target ranges having, as reference points, the center of the left and right eyes and the tip of the nose, so that the operator is guided to cause the left and right eyes and nose of the person to be imaged to be within a target range. That is, a site displayed as a target range need only be a range such that any of the feature points of the face is used as reference. The game device 10 may display the outline of the three-dimensional shape model 72a, such the operator is guided to match the outline of the face of the person to be imaged to the outline of the three-dimensional shape model 72a.

(Others)

The series of processes in the face recognition program 70a, the imaging program 70b and the three-dimensional face object generation program 70c as explained above for the present embodiment are not limited to the game device 10. For instance, the processes can be used in an imaging device such as a camera-equipped cell phone or a digital camera, and in a device that is provided with an imaging device and a display device that displays images captured by such the imaging device. Guidance processing for alignment of the face of the person to be imaged can be used in a personal computer that is connected to, or can communicate with, an imaging device and a display device.

The face recognition program 70a, the imaging program 70b and the three-dimensional face object generation program 70c of the present embodiment can be held in a server on a network such as the Internet. For instance, a face image captured by a user terminal such as a camera-equipped cell phone, a camera-equipped information processing terminal, a camera-equipped personal computer or the like is transmitted to such a server on a network. The server may execute the face recognition program 70a, the imaging program 70b and the three-dimensional face object generation program 70c to analyze thereby the transmitted face image (determination of the distance between the center points of the left and right eyes and positions of the left and right eyes and the mouth), and may transmit the analysis results in the form of, for instance, prompt messages and target ranges of the left and right eyes and the mouth, as a reply to the user terminal. If the left and right eyes and the mouth of the face image transmitted by the user terminal are within respective target ranges, the server may paste the face image onto the three-dimensional shape model 72a, generate a three-dimensional face object, and transmit the latter to the user terminal. Alternatively, the server may use the generated three-dimensional face object as a character in a game that is provided via the Internet.

Modification Examples

Moreover, in the embodiment described above, a planar image of the real world (a planar view image in the sense of the opposite to the stereoscopically viewable image described above) which is based on a camera image CI acquired by the outside imaging unit 23 or the inside imaging unit 24 is displayed, but it is also possible to display an image which can be viewed stereoscopically with the naked eye (a stereo image). For example, as described above, the game device 10 is able to display a stereoscopically viewable image (stereo image) using camera images acquired from the outside left imaging unit 23a and the outside right imaging unit 23b, on the upper LCD 22. Here, an image is displayed on the upper LCD 22 which allows the user to experience a view of a world situated further behind the stereo image (real world image).

In this case, the information processing unit 31 carries out the image processing described above by using the left-eye image obtained from the outside left imaging unit 23a and the right-eye image obtained from the outside right imaging unit 23b as the camera image CI.

More specifically, in the first rendering method, in the image processing in step 81 shown in FIG. 32A, the information processing unit 31 attaches, to the boundary surface 3, a left-eye image (texture data) obtained from the outside left imaging unit 23a and a right-eye image (texture data) obtained from the outside right imaging unit 23b such that the left-eye image and right-eye image are respectively staggered by a predetermined distance. In the image processing in step 82 shown in FIG. 32A, the information processing unit 31 respectively acquires a left-eye virtual world image and a right-eye virtual world image, by perspective projection of the objects arranged in the virtual space from the two virtual cameras (a stereo camera). The left-eye virtual world image and the right-eye virtual world image form the left-eye display image and the right-eye display image respectively. The GPU 312 of the information processing unit 31 then outputs the left-eye display image and the right-eye display image, to the upper LCD 22, whereby a stereo image is displayed on the upper LCD 22.

Furthermore, more specifically, according to the second rendering method, in the image processing in step 83 shown in FIG. 32B, the information processing unit 31 generates rendered images of the respective real camera images (the left-eye real world image and the right-eye real world image), by using the left-eye image obtained from the outside left imaging unit 23a and the right-eye image obtained from the outside right imaging unit 23b. Moreover, in the image processing in step 84 shown in FIG. 32B, the information processing unit 31 respectively acquires a left-eye virtual world image and a right-eye virtual world image, by perspective projection of the objects arranged in the virtual space from the two virtual world rendering cameras (stereo camera). In the image processing of step 85 shown in FIG. 32B, the information processing unit 31 generates the left-eye display image by synthesizing the left-eye real world image and the left-eye virtual world image. Similarly, the information processing unit 31 generates a right-eye display image by synthesizing the right-eye real world image and the right-eye virtual world image. The GPU 312 of the information processing unit 31 then outputs the left-eye display image and the right-eye display image, to the upper LCD 22, whereby a stereo image is displayed on the upper LCD 22.

Furthermore, in the embodiment described above, a real-time moving image captured by the real cameras built into the game device 10 is displayed on the upper LCD 22, but different variations are possible for the image displayed on the upper LCD 22. In a first example, a previously recorded moving image, or a moving image obtained from a television broadcast or other apparatus, or the like, can be displayed on the upper LCD 22. In this case, the position of the moving image in the virtual space is specified by mapping onto the boundary surface 3. In the second example, a still image obtained from a real camera built into the game device 10 or another real camera can be displayed on the upper LCD 22. In this case also, similarly to the example described above, the position of the still image in the virtual space is specified by mapping onto the boundary surface 3. Here, the still image obtained from a real camera may be a still image of the real world which is captured in real time by a real camera built into the game device 10 or may be a still image of the real world which has been captured previously by the real camera in the game device 10 or another real camera. Furthermore, the still image obtained from the real camera may be a still image obtained from a television broadcast or another apparatus.

Furthermore, in the embodiment described above, the upper LCD 22 is a parallax barrier type of liquid crystal display device, which can be switched between stereoscopic display and planar display by controlling the on/off switching of the parallax barrier. In a further embodiment, for example, the upper LCD 22 may be a lenticular type of liquid crystal display device which is capable of displaying a stereo image and a planar image. If the upper LCD 22 is a lenticular type of liquid crystal display device, similarly to the embodiment described above, an image is displayed stereoscopically by dividing two images captured by the outside imaging unit 23 into strip shapes in the vertical direction, and arranging the images in alternating fashion. Furthermore, even if the upper LCD 22 is a lenticular type of liquid crystal display device, similarly to the embodiment described above, it is possible to display the image in planar view by presenting one image captured by the inside imaging unit 24 to the user's left and right eyes. In other words, even if the liquid crystal display device is a lenticular type of device, the same image is divided into strip shapes in the vertical direction, and by arranging the divided images in alternating fashion, it is possible to present the same image to both the user's left and right eyes. By this means, it is possible to display the image captured by the inside imaging unit 24 as a planar image.

Moreover, the example of the liquid crystal display unit divided into two screens which is given in the embodiment described above is a case where a physically divided lower LCD 12 and upper LCD 22 are disposed respectively in upper and lower positions (an upper screen and a lower screen). However, the composition of the two-screen display screen may adopt another composition. For example, the lower LCD 12 and the upper LCD 22 may be arranged in left/right fashion on one of the main surfaces of the lower housing 11. Moreover, it is also possible to adopt a composition in which a vertically long LCD screen having the same horizontal width as the lower LCD 12 and twice the vertical length of the lower LCD 12 (more specifically, an LCD screen which is one screen physically and has a display size corresponding to two screens vertically), is disposed on one of the main surfaces of the lower housing 11, in such a manner that two images (for example, a captured image and an image showing an operating instructions screen, or the like) are displayed in upper/lower fashion (in other words, the images are displayed adjacently without a boundary region between the upper and lower images). Furthermore, it is also possible to adopt a composition in which a horizontally long LCD having the same vertical width as the lower LCD 12 and twice the horizontal length of the lower LCD 12 is disposed on one of the main surfaces of the lower housing 11, in such a manner that two images are displayed in left/right fashion in the horizontal direction (in other words, the images are displayed adjacently without a boundary region between the left and right images). In other words, two images may be displayed by using one physical screen and dividing the screen into two areas. Furthermore, when displaying the two images described above by using one physical screen and dividing the screen into two areas, a touch panel 13 may be arranged over the whole surface of the screen.

Moreover, in the embodiment described above, the touch panel 13 is provided in an integrated fashion with the game device 10, but the present invention may of course also be realized by composing the game device and the touch panel separately. Furthermore, it is also possible to provide a touch panel 13 on the upper surface of the upper LCD 22 and to show the display image that was displayed on the lower LCD 12 described above, on this upper LCD 22.

Moreover, the embodiment described above was explained with reference to a portable game device 10 or a stationary game device, but the present invention may also be realized by executing the image processing program according to the present invention in an information processing device such as a generic personal computer. Furthermore, in another embodiment, the device is not limited to a game device, and may be any portable electronic device, such as a PDA (Personal Digital Assistant), mobile telephone, personal computer, camera, or the like. For example, a mobile telephone may comprise two display units on a main surface of one housing, and also comprise a real camera.

Moreover, in the embodiment described above, the image processing program is executed in one game device 10, but at least a portion of the processing steps of the image processing program may be executed in another device. For example, if a game device 10 is composed so as to be capable of communicating with another device (for example, a server or another game device), then the processing steps in the image processing described above may be executed by coordinated operation of the game device 10 and the other device. For example, coordinated operation may be employed in such a manner that the other apparatus executes the processing from step 52 to step 57 in FIG. 29, and the game device 10 executes the processing in step 58 and step 59 in FIG. 29. In this way, by executing at least a portion of the processing steps in the image processing described above by another device, it is possible to achieve similar processing to the image processing described above. Thus, the image processing described above can be executed by one processor or coordinated operation of a plurality of processors included in an information processing system constituted by at least one information processing device.

Furthermore, in the embodiment described above, processing according to the flowchart described above is carried out by means of the information processing unit 31 of the game device 10 executing a predetermined program, but it is also possible to carryout all or a portion of the processing by means of a dedicated circuit provided in the game device 10.

Moreover, the form of the game device 10 described above, and the form, number and arrangement positions of the operating buttons 14, analog stick 15, touch panel 13, and the like, provided in the game device 10, are merely examples and it is of course possible to realize the present invention using other forms, numbers and arrangement positions. Furthermore, the processing sequence, the set values and the values for judgment, and the like, in the image processing described above are merely examples and the present invention can of course be realized using other sequences and values.

Furthermore, the image processing program (game program) described above may also be supplied to the game device 10 via a wired or wireless communication circuit, apart from being supplied to the game device 10 via an external storage medium, such as an external memory 45, external data memory 46, or the like. Moreover, the program described above may be recorded previously in a non-volatile storage device inside the game device 10. Apart from a non-volatile memory, the information storage medium which stores the program may be an optical disk-shaped recording medium, such as a CD-ROM, DVD or similar medium, or a flexible disk, a hard disk, a magneto-optical disk, magnetic tape, or the like. Furthermore, the information storage medium which stores the program may be a non-volatile memory which temporarily stores the program.

Moreover, the display device may be a head-mounted display.

The present invention was described in detail above, but the description given above gives no more than an example of the present invention and does not limit the scope of the invention. Needless to say, various improvements and modifications may be applied without departing from the scope of the present invention. The scope of the present invention should be interpreted on the basis of the "Claims" only. Furthermore, it is understood that a person skilled in the art could implement an equivalent scope of technology on the basis of the description of the present invention and their technical knowledge, from the description of the concrete embodiments of the present invention. Moreover, it should be understood that, unless specified otherwise, terminology used in the present specification is used with the meaning normally employed in the related field. Therefore, unless defined otherwise, all specialist terms and technical terms used in the present specification have the same meaning as that generally understood by a person skilled in the related art to which the present invention belongs. In the case of any contradictions, the present specification (including definitions) takes priority.

What is claimed is:

1. A non-transitory computer-readable storage medium storing an image processing program for causing a computer of an image processing device to process images, the image processing program comprising instructions, when executed by the computer, configured to:
    acquire a captured image of a real-world subject with an imaging device;
    determine an imaging direction of a virtual camera arranged in a virtual space based on motion of the imaging device;
    locate a virtual object in the virtual space so that the virtual object surrounds and encloses the virtual camera;
    associate the captured image of the real-world subject to the virtual object located in the virtual space;
    determine a particular portion of a piece of information in accordance to the imaging direction, the piece of information being information on visual characteristics at each position of the virtual object;
    generate, in accordance with the virtual camera with the determined imaging direction, an image of the virtual space by adjusting visual characteristics of the virtual object with the associated captured image based on the determined particular portion of the piece of information; and
    cause a display device to display the generated image, wherein the image is generated on a real-time basis with acquisition of the captured image;
    wherein the acquired captured image is processed such that a portion of the virtual space is displayed in preference to the particular portion of the captured image.

2. The non-transitory computer-readable storage medium according to claim 1, wherein the determined particular portion of the piece of information includes a data group indicating whether or not predetermined image processing is to be performed for each portion of the captured image.

3. The non-transitory computer-readable storage medium according to claim 1, wherein the determined particular portion of the piece of information includes a data group synthesized with the captured image for each pixel and indicating transparency of each pixel of the captured image.

4. The non-transitory computer-readable storage medium according to claim 1, wherein the piece of information corresponds to a region allocated in the virtual space.

5. The non-transitory computer-readable storage medium according to claim 4, wherein the region allocated in the virtual space corresponds to an imaged portion that is imaged by the virtual camera when the imaging device is rotated 360 degrees.

6. The non-transitory computer-readable storage medium according to claim 1, wherein the instructions are further configured to:
    locate another virtual object in the virtual space with the virtual camera,
    wherein the generated image includes a view of the another virtual object.

7. The non-transitory computer-readable storage medium according to claim 1, wherein the instructions are further configured to:
    detect the motion of the imaging device,
    wherein the imaging direction is changed in accordance with changes in detected motion.

8. The non-transitory computer-readable storage medium according to claim 1, wherein the captured image is an image captured by a monocular imaging device or a compound-eye imaging device.

9. The non-transitory computer-readable storage medium according to claim 1, wherein:
    the determined piece of information is set into the virtual object arranged in the virtual space; and
    the virtual object partitions the virtual space into a near side space and a far side space as viewed from the virtual camera.

10. The non-transitory computer-readable storage medium according to claim 9, wherein the instructions are further configured to:
    render a shadow of another object arranged in the far side space on the virtual object partitioning the virtual space.

11. The non-transitory computer-readable storage medium according to claim 1, wherein:
    there is arranged in the virtual space a character object on which a face image of a person to be imaged captured by the imaging device is pasted; and
    when the face image is captured, the instructions are further configured to:
        determine, based on the face image captured by the imaging device, whether or not a distance between the face of the person to be imaged and the imaging device is within a range; and
        display, to the display device, a target position for alignment of at least one feature point contained in the face image of the person to be imaged together with the face image of the person to be imaged that is repeatedly captured by the imaging device, if the distance between the face of the person to be imaged and the imaging device is within the range.

12. The non-transitory computer-readable storage medium according to claim 1, wherein:
    there is arranged in the virtual space a character object on which a face image of a person to be imaged captured by the imaging device is pasted; and the instructions are further configured to:
acquire the face image and temporarily store the same in a first storage area at start of a game;
generate a character object based on the stored face image;
perform game processing for a game based on accepted operations from a user and the character object containing the face image;
determine whether or not the user succeeds in the game executed based on the accept operations; and
accumulatively store, in a second storage area, the face image stored in the first storage area when the user succeeds in the game.

13. The non-transitory computer-readable storage medium according to claim 1, wherein:
there are arranged in the virtual space character objects on each of which a face image of a person to be imaged captured by the imaging device is pasted; and
the instructions are further configured to:
acquire the face image;
generate a first character object based on the acquired face image; and
execute game processing by displaying, together with the first character object, a second character object different from the first character object,
the game processing comprising:
contributing to the success in the game by user operations that attack the first character object; and
invalidating the user operations that attack the second character object.

14. The non-transitory computer-readable storage medium according to claim 1, wherein:
there are arranged in the virtual space character objects on each of which a face image of a person to be imaged captured by the imaging device is pasted; and
the instructions are further configured to:
acquire the face images;
generate a first character object containing one of the acquired face images; and
execute game processing for a game while displaying, together with the first character object, a second character object containing the same face image as the first character object but being smaller in size than the first character object, and a third character object containing a face image other than the face image of the first character object but being smaller in size than the first character object,
the game processing comprising:
increasing deformation of the face image contained in the first character object in response to user operations that attack the third character object; and
decreasing the deformation in response to user operations that attack the second character object, such that the deformed face image contained in the first character object is restored closer to the original acquired face image.

15. The non-transitory computer-readable storage medium according to claim 1, wherein:
there is arranged in the virtual space a character object on which a face image of a person to be imaged captured by the imaging device is pasted; and
the instructions are further configured to:
acquire the face image;
generate a character object containing a face image produced by deforming the acquired face image;
execute a game based on accepted user operations for the game;
conduct the game associated with the face image;
determine whether or not the user succeeds in the game executed by the accept user operations; and
restore the deformed face image to the original acquired face image if the result indicates success in the game.

16. An image processing device for processing a captured image of a real-world subject captured by an imaging device, the image processing device comprising:
a processing system that includes at least one processor, the processing system configured to:
acquire, via the imaging device, the captured image;
determine an imaging direction of a virtual camera arranged in a virtual space based on a detected physical motion;
locate a virtual object in the virtual space so that the virtual object surrounds and encloses the virtual camera;
associate the captured image of the real-world subject to the virtual object located in the virtual space;
determine a particular portion of a piece of information in accordance with the imaging direction of the virtual camera, the piece of information being information on visual characteristics at each position of the virtual object;
generate, in accordance with the virtual camera with the determined imaging direction, an image of the virtual space by adjusting visual characteristics of the virtual object with the associated captured image based on the determined particular portion of the piece of information, where a portion of the virtual space is included in the image instead of the determined portion of the acquired image; and
cause a display device to display the generated image on a real-time basis with capturing of the real-world subject.

17. An image processing system comprising:
an imaging device configured to capture an image of a real-world subject;
a display device; and
a processing system including at least one processor, the processing system configured to:
render at least a virtual object that is located in a virtual space;
determine an imaging direction of a virtual camera that is arranged in the virtual space in accordance with a detected motion;
locate a virtual object in the virtual space so that the virtual object surrounds and encloses the virtual camera;
associate the captured image of the real-world subject to the virtual object located in the virtual space;
determine a particular portion of a particular piece of information in accordance with the determined imaging direction, the piece of information being information on visual characteristics at each position of the virtual object;
generate, in accordance with the virtual camera with the determined imaging direction, an image of the virtual space by adjusting visual characteristics of the virtual object with the associated captured image by using the determined particular piece of information; and
output the generated image to the display device for display thereon on a real-time basis with the imaging device capturing the image, the generated image including at some of the virtual space and at least some of the captured image of a real-world subject where a portion of the virtual space is displayed in preference to the determined portion of the captured image.

18. An image processing method for rendering an object arranged in a virtual space, the method comprising:
   acquiring a captured image of a subject captured by an imaging device;
   determining an imaging direction of a virtual camera arranged in the virtual space based on a detected motion associated with the imaging device;
   locating a virtual object in the virtual space so that the virtual object surrounds and encloses the virtual camera;
   associating the captured image of the real-world subject to the virtual object located in the virtual space;
   specifying a particular portion of a piece of information according to the imaging direction of the virtual camera, the piece of information being information on visual characteristics at each position of the virtual object;
   generating, via a processing system that includes at least one processor and in accordance with the virtual camera with the determined imaging direction, an image of the virtual space by adjusting visual characteristics of the virtual object with the associated captured image based on the determined particular portion of the piece of information; and
   causing a display device to display the generated image on a real-time basis with the acquiring of the captured image of the subject,
   wherein the acquired captured image is processed such that a portion of the virtual space is displayed in preference to the particular portion of the captured image.

19. The medium of claim 1, wherein:
   the particular piece of information is set into an object in the virtual space,
   the visual characteristics of a first portion of the object are adjusted and visual characteristics of a second, different, portion are not adjusted.

20. A non-transitory computer readable storage medium storing computer executable instructions for use with a processing system of a computing apparatus, the stored computer executable instructions comprising instructions, when executed by the processing system, configured to:
   acquire a real-world image;
   maintain a virtual three-dimensional world that includes at least one object;
   store visual characteristic information to be used to adjust a visual characteristic of at least some portion of the at least one object;
   determine an imaging direction for a virtual camera of the virtual three-dimensional world, where the at least one object surrounds the virtual camera;
   associate at least some portion of the acquired real-world image to the at least one object in accordance with the determined imaging direction;
   determine a partial portion of the stored visual characteristic information;
   generate, in accordance with the virtual camera with the imaging direction and on a real-time basis with respect to the acquisition of the real-world image, an augmented reality image of the virtual three-dimensional world based on the at least one object and the associated at least some portion of the acquired real-world image, where the partial portion of the stored visual characteristic information is used to adjust the visual characteristic of the virtual object to at least partly reveal other objects in the virtual space that are located behind, in reference to the virtual camera, the at least one object; and
   output, to a display device, the generated augmented reality image of the virtual three-dimensional world.

21. The medium of claim 20, wherein the augmented reality image is further based on texture mapping the visual characteristic information to the at least one object of the virtual three-dimensional world.

22. The image processing system of claim 17, wherein the processing system is further configured to:
   generate a texture based on the captured image; and
   map the texture to the virtual object in accordance with the determined imaging direction,
   wherein the at least some portion of the captured image is associated to the virtual object via the mapped texture and the image is generated based on the mapped texture.

23. The image processing system of claim 22, wherein the particular piece of information is transparency information and generation of the texture is further based on the determined partial portion of the transparency information.

24. The image processing system of claim 17, wherein the particular piece of information is transparency information stored as anis an alpha texture and the partial portion of the alpha texture is determined in accordance with the determined imaging direction.

25. The non-transitory computer-readable storage medium of claim 1, wherein the piece of information is an alpha texture used to specify transparency information for the virtual object.

26. The non-transitory computer-readable storage medium of claim 1, wherein the instructions are further configured to:
   texture map the captured image to the virtual object.

27. The non-transitory computer-readable storage medium of claim 1, wherein the visual characteristic information is transparency information and the visual characteristic is transparency.

* * * * *

UNITED STATES PATENT AND TRADEMARK OFFICE
CERTIFICATE OF CORRECTION

| | |
|---|---|
| PATENT NO. | : 8,956,227 B2 |
| APPLICATION NO. | : 13/223708 |
| DATED | : February 17, 2015 |
| INVENTOR(S) | : Suzuki et al. |

It is certified that error appears in the above-identified patent and that said Letters Patent is hereby corrected as shown below:

On the title page, change "(73) Assignee: Nintendo Co., Ltd., Tokyo (JP)" to

--(73) Assignee: Nintendo Co., Ltd., Kyoto (JP); HAL Laboratory, Inc., Tokyo (JP)--

Signed and Sealed this
Fifth Day of July, 2016

Michelle K. Lee
*Director of the United States Patent and Trademark Office*